US012341360B1

(12) United States Patent
Smith et al.

(10) Patent No.: US 12,341,360 B1
(45) Date of Patent: Jun. 24, 2025

(54) REMOTE POWER SYSTEMS, APPARATUS AND METHODS

(71) Applicant: STEELCASE INC., Grand Rapids, MI (US)

(72) Inventors: Bruce Smith, Grand Rapids, MI (US); Bo Anderson, Byron Center, MI (US); Karl Jahn Mead, Grand Rapids, MI (US); Robert Scheper, Grand Rapids, MI (US); Hyun Yoo, Grand Rapids, MI (US); Michael Held, Munich (DE); Justin Glen Beitzel, Baltimore, MD (US)

(73) Assignee: STEELCASE INC., Grand Rapids, MI (US)

( * ) Notice: Subject to any disclaimer, the term of this patent is extended or adjusted under 35 U.S.C. 154(b) by 0 days.

(21) Appl. No.: 18/634,268

(22) Filed: Apr. 12, 2024

Related U.S. Application Data

(63) Continuation of application No. 17/389,999, filed on Jul. 30, 2021, now Pat. No. 11,984,739.

(60) Provisional application No. 63/059,284, filed on Jul. 31, 2020.

(51) Int. Cl.
*H01M 10/46* (2006.01)
*H02J 7/00* (2006.01)

(52) U.S. Cl.
CPC ........ *H02J 7/00034* (2020.01); *H02J 7/0044* (2013.01); *H02J 7/0049* (2020.01)

(58) Field of Classification Search
CPC ..... H02J 7/00034; H02J 7/0044; H02J 7/0049
USPC .................. 320/107, 108, 109, 114, 115, 116
See application file for complete search history.

(56) References Cited

U.S. PATENT DOCUMENTS

| | | |
|---|---|---|
| 4,751,399 A | 6/1988 | Koehring |
| 5,050,077 A | 9/1991 | Vincent |
| 5,086,385 A | 2/1992 | Launey |
| 5,097,672 A | 3/1992 | Takenaka |
| 5,293,097 A | 3/1994 | Elwell |
| 5,406,176 A | 4/1995 | Sugden |

(Continued)

FOREIGN PATENT DOCUMENTS

| | | |
|---|---|---|
| AU | 2011203137 A1 | 7/2011 |
| AU | 2013203919 A1 | 5/2013 |

(Continued)

OTHER PUBLICATIONS

Ah Kun et al., Co-Present Photo Sharing on Mobile Devices, 9th International Conference on Human Computer Interaction with Mobile Devices and Services (MobileHCI'07), 2007, pp. 277-284.

(Continued)

*Primary Examiner* — Edward Tso
(74) *Attorney, Agent, or Firm* — Quarles & Brady LLP

(57) ABSTRACT

A system and methods including workstations for use in office spaces where the workstations include electrical couplers and power distribution systems for coupling portable and rechargeable batteries to the arrangements and delivering electrical charge to affordance devices where battery charging stations are located at different locations throughout a facility and alerts including nearest charging station with fully charged batteries are provided to employees at the stations when battery depletion thresholds are met or where batteries are automatically delivered to facility locations via automated robotic carts when needed.

34 Claims, 57 Drawing Sheets

(56) References Cited

U.S. PATENT DOCUMENTS

| | | | |
|---|---|---|---|
| 5,455,487 | A | 10/1995 | Mix |
| 5,476,221 | A | 12/1995 | Seymour |
| 5,489,827 | A | 2/1996 | Xia |
| 5,570,301 | A | 10/1996 | Barrus |
| 5,717,856 | A | 2/1998 | Carleton |
| 5,872,924 | A | 2/1999 | Nakayama |
| 5,898,579 | A | 4/1999 | Boys |
| 5,915,091 | A | 6/1999 | Ludwig |
| 5,933,597 | A | 8/1999 | Hogan |
| 6,038,542 | A | 3/2000 | Ruckdashel |
| 6,064,976 | A | 5/2000 | Tolopka |
| 6,100,663 | A | 8/2000 | Boys |
| 6,140,921 | A | 10/2000 | Baron |
| 6,144,942 | A | 11/2000 | Ruckdashel |
| 6,177,905 | B1 | 1/2001 | Welch |
| 6,266,612 | B1 | 7/2001 | Dussell |
| 6,266,691 | B1 | 7/2001 | Watanabe |
| 6,288,716 | B1 | 9/2001 | Humpleman |
| 6,297,621 | B1 | 10/2001 | Hui |
| 6,304,068 | B1 | 10/2001 | Hui |
| 6,342,906 | B1 | 1/2002 | Kumar |
| 6,360,101 | B1 | 3/2002 | Irvin |
| 6,361,173 | B1 | 3/2002 | Vlahos |
| 6,424,623 | B1 | 7/2002 | Borgstahl |
| 6,434,158 | B1 | 8/2002 | Harris |
| 6,434,159 | B1 | 8/2002 | Woodward |
| 6,466,234 | B1 | 10/2002 | Pyle |
| 6,487,180 | B1 | 11/2002 | Borgstahl |
| 6,501,364 | B1 | 12/2002 | Hui |
| 6,532,218 | B1 | 3/2003 | Shaffer |
| 6,546,419 | B1 | 4/2003 | Humpleman |
| 6,548,967 | B1 | 4/2003 | Dowling |
| 6,587,782 | B1 | 7/2003 | Nocek |
| 6,691,029 | B2 | 2/2004 | Hughes |
| 6,724,159 | B2 | 4/2004 | Gutta |
| 6,760,412 | B1 | 7/2004 | Loucks |
| 6,760,749 | B1 | 7/2004 | Dunlap |
| 6,803,744 | B1 | 10/2004 | Sabo |
| 6,839,417 | B2 | 1/2005 | Weisman |
| 6,850,837 | B2 | 2/2005 | Paulauskas |
| 6,888,438 | B2 | 5/2005 | Hui |
| 6,906,495 | B2 | 6/2005 | Cheng |
| 7,000,660 | B2 | 2/2006 | Chen |
| 7,003,728 | B2 | 2/2006 | Berque |
| 7,027,995 | B2 | 4/2006 | Kaufman |
| 7,042,196 | B2 | 5/2006 | Ka |
| 7,043,532 | B1 | 5/2006 | Humpleman |
| 7,084,758 | B1 | 8/2006 | Cole |
| 7,124,164 | B1 | 10/2006 | Chemtob |
| 7,139,976 | B2 | 11/2006 | Kausik |
| 7,149,776 | B1 | 12/2006 | Roy |
| 7,163,263 | B1 | 1/2007 | Kurrasch |
| 7,180,503 | B2 | 2/2007 | Burr |
| 7,212,414 | B2 | 5/2007 | Baarman |
| 7,221,937 | B2 | 5/2007 | Lau |
| 7,239,110 | B2 | 7/2007 | Cheng |
| 7,248,017 | B2 | 7/2007 | Cheng |
| 7,266,383 | B2 | 9/2007 | Anderson |
| 7,268,682 | B2 | 9/2007 | Bialecki, Jr. |
| 7,293,243 | B1 | 11/2007 | Ben-Shachar |
| 7,340,769 | B2 | 3/2008 | Baugher |
| 7,370,269 | B1 | 5/2008 | Prabhu |
| 7,393,053 | B2 | 7/2008 | Kurrasch |
| 7,394,405 | B2 | 7/2008 | Godden |
| 7,421,069 | B2 | 9/2008 | Vernon |
| 7,474,058 | B2 | 1/2009 | Baarman |
| 7,475,078 | B2 | 1/2009 | Kiilerich |
| 7,495,414 | B2 | 2/2009 | Hui |
| 7,499,462 | B2 | 3/2009 | MacMullan |
| 7,518,267 | B2 | 4/2009 | Baarman |
| 7,519,664 | B2 | 4/2009 | Karaki |
| 7,522,878 | B2 | 4/2009 | Baarman |
| 7,525,283 | B2 | 4/2009 | Cheng |
| 7,526,525 | B2 | 4/2009 | Hagale |
| 7,554,316 | B2 | 6/2009 | Stevens |
| 7,554,437 | B2 | 6/2009 | Axelsen |
| 7,576,514 | B2 | 8/2009 | Hui |
| 7,577,522 | B2 | 8/2009 | Rosenberg |
| 7,590,941 | B2 | 9/2009 | Wee |
| 7,605,496 | B2 | 10/2009 | Stevens |
| 7,612,528 | B2 | 11/2009 | Baarman |
| 7,615,936 | B2 | 11/2009 | Baarman |
| 7,619,366 | B2 | 11/2009 | Diederiks |
| 7,622,891 | B2 | 11/2009 | Cheng |
| 7,634,533 | B2 | 12/2009 | Rudolph |
| 7,639,110 | B2 | 12/2009 | Baarman |
| 7,639,514 | B2 | 12/2009 | Baarman |
| 7,639,994 | B2 | 12/2009 | Greene |
| 7,643,312 | B2 | 1/2010 | Vanderelli |
| 7,649,454 | B2 | 1/2010 | Singh |
| 7,664,870 | B2 | 2/2010 | Baek |
| 7,689,655 | B2 | 3/2010 | Hewitt |
| 7,693,935 | B2 | 4/2010 | Weber |
| 7,707,249 | B2 | 4/2010 | Spataro |
| 7,714,537 | B2 | 5/2010 | Cheng |
| 7,715,831 | B2 | 5/2010 | Wakefield |
| 7,734,690 | B2 | 6/2010 | Moromisato |
| 7,735,918 | B2 | 6/2010 | Beck |
| 7,741,734 | B2 | 6/2010 | Joannopoulos |
| 7,810,025 | B2 | 10/2010 | Blair |
| 7,825,543 | B2 | 11/2010 | Karalis |
| 7,844,306 | B2 | 11/2010 | Shearer |
| 7,847,675 | B1 | 12/2010 | Thyen |
| 7,849,135 | B2 | 12/2010 | Agrawal |
| 7,863,861 | B2 | 1/2011 | Cheng |
| 7,868,482 | B2 | 1/2011 | Greene |
| 7,868,587 | B2 | 1/2011 | Stevens |
| 7,869,941 | B2 | 1/2011 | Coughlin |
| 7,873,470 | B2 | 1/2011 | Baba |
| 7,881,233 | B2 | 2/2011 | Bieselin |
| 7,885,925 | B1 | 2/2011 | Strong |
| 7,893,953 | B2 | 2/2011 | Krestakos |
| 7,896,436 | B2 | 3/2011 | Kurrasch |
| 7,898,105 | B2 | 3/2011 | Greene |
| 7,904,209 | B2 | 3/2011 | Podgorny |
| 7,915,858 | B2 | 3/2011 | Liu |
| D636,333 | S | 4/2011 | Kulikowski |
| 7,925,308 | B2 | 4/2011 | Greene |
| 7,925,525 | B2 | 4/2011 | Chin |
| 7,932,618 | B2 | 4/2011 | Baarman |
| 7,941,133 | B2 | 5/2011 | Aaron |
| 7,941,753 | B2 | 5/2011 | Meisels |
| 7,948,448 | B2 | 5/2011 | Hutchinson |
| 7,952,324 | B2 | 5/2011 | Cheng |
| 7,953,369 | B2 | 5/2011 | Baarman |
| 7,965,859 | B2 | 6/2011 | Marks |
| 7,973,635 | B2 | 7/2011 | Baarman |
| 7,973,657 | B2 | 7/2011 | Ayed |
| 7,989,986 | B2 | 8/2011 | Baarman |
| 7,999,669 | B2 | 8/2011 | Singh |
| 8,004,235 | B2 | 8/2011 | Baarman |
| 8,021,164 | B2 | 9/2011 | Epstein |
| 8,022,576 | B2 | 9/2011 | Joannopoulos |
| 8,024,661 | B2 | 9/2011 | Bibliowicz |
| 8,026,908 | B2 | 9/2011 | Ku |
| 8,028,020 | B2 | 9/2011 | Huck |
| 8,032,705 | B2 | 10/2011 | Klitsner |
| 8,035,255 | B2 | 10/2011 | Kurs |
| 8,035,340 | B2 | 10/2011 | Stevens |
| 8,039,995 | B2 | 10/2011 | Stevens |
| 8,040,103 | B2 | 10/2011 | Hui |
| 8,041,586 | B2 | 10/2011 | Jethani |
| 8,049,301 | B2 | 11/2011 | Hui |
| 8,054,854 | B2 | 11/2011 | Poslinski |
| 8,055,310 | B2 | 11/2011 | Beart |
| 8,055,644 | B2 | 11/2011 | Crowley |
| 8,057,069 | B2 | 11/2011 | Mangiardi |
| 8,061,864 | B2 | 11/2011 | Metcalf |
| 8,069,100 | B2 | 11/2011 | Taylor |
| 8,069,465 | B1 | 11/2011 | Bartholomay |
| 8,073,614 | B2 | 12/2011 | Coughlin |
| 8,076,800 | B2 | 12/2011 | Joannopoulos |
| 8,076,801 | B2 | 12/2011 | Karalis |
| 8,081,083 | B2 | 12/2011 | Hinterlong |

(56) References Cited

U.S. PATENT DOCUMENTS

| | | |
|---|---|---|
| 8,084,889 B2 | 12/2011 | Joannopoulos |
| 8,091,029 B1 | 1/2012 | Gay |
| 8,093,758 B2 | 1/2012 | Hussmann |
| 8,097,983 B2 | 1/2012 | Karalis |
| 8,097,984 B2 | 1/2012 | Baarman |
| 8,102,235 B2 | 1/2012 | Hui |
| 8,106,539 B2 | 1/2012 | Schatz |
| 8,112,100 B2 | 2/2012 | Frank |
| 8,115,448 B2 | 2/2012 | John |
| 8,116,681 B2 | 2/2012 | Baarman |
| 8,116,683 B2 | 2/2012 | Baarman |
| 8,117,262 B2 | 2/2012 | Kumar |
| 8,120,311 B2 | 2/2012 | Baarman |
| 8,126,974 B2 | 2/2012 | Lyle |
| 8,127,155 B2 | 2/2012 | Baarman |
| 8,129,864 B2 | 3/2012 | Baarman |
| 8,138,875 B2 | 3/2012 | Baarman |
| 8,140,701 B2 | 3/2012 | Rajan |
| 8,141,143 B2 | 3/2012 | Lee |
| 8,149,104 B2 | 4/2012 | Crum |
| 8,150,449 B2 | 4/2012 | Onozawa |
| 8,159,090 B2 | 4/2012 | Greene |
| 8,164,222 B2 | 4/2012 | Baarman |
| 8,170,946 B2 | 5/2012 | Blair |
| 8,174,152 B2 | 5/2012 | Baumann |
| 8,180,663 B2 | 5/2012 | Tischhauser |
| 8,188,856 B2 | 5/2012 | Singh |
| 8,200,520 B2 | 6/2012 | Chen |
| 8,204,272 B2 | 6/2012 | Marks |
| 8,204,935 B2 | 6/2012 | Vernon |
| 8,209,618 B2 | 6/2012 | Garofalo |
| 8,214,061 B2 | 7/2012 | Westrick, Jr. |
| 8,219,115 B1 | 7/2012 | Nelissen |
| 8,222,827 B2 | 7/2012 | Kuennen |
| 8,223,508 B2 | 7/2012 | Baarman |
| 8,228,025 B2 | 7/2012 | Ho |
| 8,228,026 B2 | 7/2012 | Johnson |
| 8,234,189 B2 | 7/2012 | Taylor |
| 8,238,125 B2 | 8/2012 | Fells |
| 8,239,890 B2 | 8/2012 | Kooman |
| 8,259,428 B2 | 9/2012 | Mollema |
| 8,262,244 B2 | 9/2012 | Metcalf |
| 8,266,535 B2 | 9/2012 | Brown |
| 8,269,456 B2 | 9/2012 | Hui |
| 8,270,320 B2 | 9/2012 | Boyer |
| 8,280,453 B2 | 10/2012 | Beart |
| 8,280,948 B1 | 10/2012 | Chen |
| 8,290,479 B2 | 10/2012 | Aaron |
| 8,296,669 B2 | 10/2012 | Madonna |
| 8,299,753 B2 | 10/2012 | Hui |
| 8,300,784 B2 | 10/2012 | Choi |
| 8,301,077 B2 | 10/2012 | Xue |
| 8,301,079 B2 | 10/2012 | Baarman |
| 8,301,080 B2 | 10/2012 | Baarman |
| 8,304,935 B2 | 11/2012 | Karalis |
| 8,315,561 B2 | 11/2012 | Baarman |
| 8,315,621 B2 | 11/2012 | Lau |
| 8,315,650 B2 | 11/2012 | Lau |
| 8,324,759 B2 | 12/2012 | Karalis |
| 8,327,410 B2 | 12/2012 | Andersen |
| 8,338,990 B2 | 12/2012 | Baarman |
| 8,339,274 B2 | 12/2012 | Van De Sluis |
| 8,341,532 B2 | 12/2012 | Ryan |
| 8,346,166 B2 | 1/2013 | Baarman |
| 8,346,167 B2 | 1/2013 | Baarman |
| 8,350,971 B2 | 1/2013 | Malone |
| 8,351,856 B2 | 1/2013 | Baarman |
| 8,352,296 B2 | 1/2013 | Taneja |
| 8,354,821 B2 | 1/2013 | Cheng |
| 8,362,651 B2 | 1/2013 | Hamam |
| 8,364,400 B2 | 1/2013 | Coughlin |
| 8,370,516 B2 | 2/2013 | Salesky |
| 8,373,310 B2 | 2/2013 | Baarman |
| 8,373,386 B2 | 2/2013 | Baarman |
| 8,375,103 B2 | 2/2013 | Lin |
| 8,380,255 B2 | 2/2013 | Shearer |
| 8,380,786 B2 | 2/2013 | Hoffert |
| 8,385,894 B2 | 2/2013 | Takehara |
| 8,390,669 B2 | 3/2013 | Catchpole |
| 8,395,282 B2 | 3/2013 | Joannopoulos |
| 8,395,283 B2 | 3/2013 | Joannopoulos |
| 8,400,017 B2 | 3/2013 | Kurs |
| 8,400,018 B2 | 3/2013 | Joannopoulos |
| 8,400,019 B2 | 3/2013 | Joannopoulos |
| 8,400,020 B2 | 3/2013 | Joannopoulos |
| 8,400,021 B2 | 3/2013 | Joannopoulos |
| 8,400,022 B2 | 3/2013 | Joannopoulos |
| 8,400,023 B2 | 3/2013 | Joannopoulos |
| 8,400,024 B2 | 3/2013 | Joannopoulos |
| 8,407,289 B2 | 3/2013 | Chen |
| 8,410,636 B2 | 4/2013 | Kurs |
| 8,415,897 B2 | 4/2013 | Choong |
| 8,421,407 B2 | 4/2013 | Johnson |
| 8,423,288 B2 | 4/2013 | Stahl |
| 8,432,062 B2 | 4/2013 | Greene |
| 8,438,333 B2 | 5/2013 | Edwards, III |
| 8,441,154 B2 | 5/2013 | Karalis |
| 8,441,354 B2 | 5/2013 | Padmanabhan |
| 8,443,035 B2 | 5/2013 | Chen |
| 8,446,046 B2 | 5/2013 | Fells |
| 8,446,450 B2 | 5/2013 | Mauchly |
| 8,450,877 B2 | 5/2013 | Baarman |
| 8,456,509 B2 | 6/2013 | Khot |
| 8,457,888 B2 | 6/2013 | Ranford |
| 8,461,719 B2 | 6/2013 | Kesler |
| 8,461,720 B2 | 6/2013 | Kurs |
| 8,461,721 B2 | 6/2013 | Karalis |
| 8,461,722 B2 | 6/2013 | Kurs |
| 8,461,817 B2 | 6/2013 | Martin |
| 8,466,583 B2 | 6/2013 | Karalis |
| 8,471,410 B2 | 6/2013 | Karalis |
| 8,473,571 B2 | 6/2013 | Penner |
| 8,476,788 B2 | 7/2013 | Karalis |
| 8,482,158 B2 | 7/2013 | Kurs |
| 8,482,160 B2 | 7/2013 | Johnson |
| 8,484,494 B2 | 7/2013 | Siegel |
| 8,487,480 B1 | 7/2013 | Kesler |
| 8,489,329 B2 | 7/2013 | Coughlin |
| 8,494,143 B2 | 7/2013 | DeJana |
| 8,497,601 B2 | 7/2013 | Hall |
| 8,499,119 B2 | 7/2013 | Balraj |
| 8,504,663 B2 | 8/2013 | Lowery |
| 8,508,077 B2 | 8/2013 | Stevens |
| 8,510,255 B2 | 8/2013 | Fadell |
| 8,519,668 B2 | 8/2013 | Hui |
| 8,527,549 B2 | 9/2013 | Cidon |
| 8,527,610 B2 | 9/2013 | Koike |
| 8,528,014 B2 | 9/2013 | Reynolds |
| 8,531,153 B2 | 9/2013 | Baarman |
| 8,531,294 B2 | 9/2013 | Slavin |
| 8,533,268 B1 | 9/2013 | Vernon |
| 8,538,330 B2 | 9/2013 | Baarman |
| D692,010 S | 10/2013 | Verghese |
| 8,552,592 B2 | 10/2013 | Schatz |
| 8,554,476 B2 | 10/2013 | Coughlin |
| 8,554,477 B2 | 10/2013 | Coughlin |
| 8,558,411 B2 | 10/2013 | Baarman |
| 8,558,693 B2 | 10/2013 | Martin |
| 8,560,024 B2 | 10/2013 | Beart |
| 8,560,128 B2 | 10/2013 | Ruff |
| 8,560,232 B2 | 10/2013 | Coughlin |
| 8,567,048 B2 | 10/2013 | Singh |
| 8,569,914 B2 | 10/2013 | Karalis |
| 8,587,153 B2 | 11/2013 | Schatz |
| 8,587,154 B2 | 11/2013 | Fells |
| 8,587,155 B2 | 11/2013 | Giler |
| 8,593,105 B2 | 11/2013 | Baarman |
| 8,594,291 B2 | 11/2013 | Bieselin |
| 8,596,716 B1 | 12/2013 | Caruso |
| 8,598,721 B2 | 12/2013 | Baarman |
| 8,598,743 B2 | 12/2013 | Hall |
| 8,600,670 B2 | 12/2013 | Kim |
| 8,604,714 B2 | 12/2013 | Mohan |
| 8,610,400 B2 | 12/2013 | Stevens |

(56) References Cited

U.S. PATENT DOCUMENTS

| | | |
|---|---|---|
| 8,610,530 B2 | 12/2013 | Singh |
| 8,618,696 B2 | 12/2013 | Kurs |
| 8,618,749 B2 | 12/2013 | Kuennen |
| 8,618,770 B2 | 12/2013 | Baarman |
| 8,620,484 B2 | 12/2013 | Baarman |
| 8,620,841 B1 | 12/2013 | Filson |
| 8,621,245 B2 | 12/2013 | Shearer |
| D697,477 S | 1/2014 | Jonas, III |
| 8,622,314 B2 | 1/2014 | Fisher |
| 8,629,578 B2 | 1/2014 | Kurs |
| 8,629,755 B2 | 1/2014 | Hashim-Waris |
| 8,630,741 B1 | 1/2014 | Matsuoka |
| 8,631,126 B2 | 1/2014 | Veiseh |
| 8,638,062 B2 | 1/2014 | Baarman |
| 8,643,326 B2 | 2/2014 | Campanella |
| 8,650,600 B2 | 2/2014 | Ogle |
| 8,653,927 B2 | 2/2014 | Singh |
| 8,659,417 B1 | 2/2014 | Trundle |
| 8,660,790 B2 | 2/2014 | Stahl |
| 8,665,310 B2 | 3/2014 | Verthein |
| 8,666,051 B2 | 3/2014 | Gilzean |
| 8,667,401 B1 | 3/2014 | Lozben |
| 8,667,452 B2 | 3/2014 | Verghese |
| 8,669,676 B2 | 3/2014 | Karalis |
| 8,669,844 B2 | 3/2014 | Walker |
| 8,670,018 B2 | 3/2014 | Cunnington |
| 8,680,960 B2 | 3/2014 | Singh |
| 8,683,345 B2 | 3/2014 | Lee |
| 8,686,598 B2 | 4/2014 | Schatz |
| 8,686,647 B2 | 4/2014 | Ono |
| 8,687,452 B2 | 4/2014 | Kishibe |
| 8,688,100 B2 | 4/2014 | Aaron |
| 8,690,362 B2 | 4/2014 | Wendt |
| 8,692,410 B2 | 4/2014 | Schatz |
| 8,692,412 B2 | 4/2014 | Fiorello |
| 8,692,639 B2 | 4/2014 | Baarman |
| 8,692,641 B2 | 4/2014 | Singh |
| 8,692,642 B2 | 4/2014 | Singh |
| 8,694,026 B2 | 4/2014 | Forstall |
| 8,694,165 B2 | 4/2014 | Smith |
| 8,694,597 B1 | 4/2014 | Raj |
| 8,698,590 B2 | 4/2014 | Singh |
| 8,698,591 B2 | 4/2014 | Singh |
| 8,700,060 B2 | 4/2014 | Huang |
| 8,707,546 B2 | 4/2014 | Singh |
| 8,710,948 B2 | 4/2014 | Singh |
| 8,712,858 B2 | 4/2014 | Blair |
| 8,713,112 B2 | 4/2014 | Hewitt |
| D705,745 S | 5/2014 | Kurs et al. |
| 8,716,903 B2 | 5/2014 | Kurs |
| 8,717,400 B2 | 5/2014 | Ranganath |
| 8,719,070 B2 | 5/2014 | Jabbour |
| 8,723,366 B2 | 5/2014 | Fiorello |
| 8,729,737 B2 | 5/2014 | Schatz |
| 8,731,116 B2 | 5/2014 | Norconk |
| 8,737,950 B2 | 5/2014 | Jonsson |
| 8,742,625 B2 | 6/2014 | Baarman |
| 8,743,171 B2 | 6/2014 | Hiller |
| 8,743,198 B2 | 6/2014 | Padmanabh |
| 8,756,348 B2 | 6/2014 | Beel |
| 8,760,007 B2 | 6/2014 | Joannopoulos |
| 8,760,008 B2 | 6/2014 | Joannopoulos |
| 8,760,265 B2 | 6/2014 | Krueger |
| 8,766,484 B2 | 7/2014 | Baarman |
| 8,766,485 B2 | 7/2014 | Joannopoulos |
| 8,766,487 B2 | 7/2014 | Dibben |
| 8,767,032 B2 | 7/2014 | Rodman |
| 8,768,309 B2 | 7/2014 | Robbins |
| 8,772,971 B2 | 7/2014 | Joannopoulos |
| 8,772,972 B2 | 7/2014 | Joannopoulos |
| 8,772,973 B2 | 7/2014 | Kurs |
| 8,782,527 B2 | 7/2014 | Karlson |
| 8,788,448 B2 | 7/2014 | Fadell |
| 8,792,912 B2 | 7/2014 | Gits |
| 8,797,159 B2 | 8/2014 | Kirkpatrick |
| 8,810,379 B2 | 8/2014 | Murphy |
| 8,812,028 B2 | 8/2014 | Yariv |
| 8,813,196 B2 | 8/2014 | Weller |
| 8,819,136 B1 | 8/2014 | Vernon |
| 8,819,138 B2 | 8/2014 | Houston |
| 8,825,597 B1 | 9/2014 | Houston |
| 8,838,681 B2 | 9/2014 | Motes |
| 8,842,153 B2 | 9/2014 | Ranganath |
| 8,843,816 B2 | 9/2014 | Stull |
| 8,849,914 B2 | 9/2014 | Bove |
| 8,856,256 B1 | 10/2014 | Srinivasan |
| 8,866,619 B2 | 10/2014 | Knibbe |
| 8,872,432 B2 | 10/2014 | Kercso |
| 8,875,195 B2 | 10/2014 | Ogle |
| 8,878,439 B2 | 11/2014 | Noguchi |
| 8,884,742 B2 | 11/2014 | Gits |
| 8,887,069 B2 | 11/2014 | Tipirneni |
| 8,896,656 B2 | 11/2014 | Epstein |
| 8,898,231 B2 | 11/2014 | Crawford |
| 8,904,293 B2 | 12/2014 | Bastide |
| 8,909,702 B2 | 12/2014 | Golovchinsky |
| 9,098,502 B1 | 8/2015 | Horling |
| 9,140,555 B1 | 9/2015 | Andersson |
| 9,176,214 B2 | 11/2015 | Berrett et al. |
| 9,204,251 B1 | 12/2015 | Mendelson |
| 9,247,828 B2 | 2/2016 | Cvek |
| 9,339,106 B2 | 5/2016 | Epstein |
| 9,380,682 B2 | 6/2016 | Mead |
| 9,465,524 B2 | 10/2016 | Epstein |
| 9,642,219 B2 | 5/2017 | Mead |
| 9,703,274 B2 | 7/2017 | Li |
| 9,716,861 B1 | 7/2017 | Poel |
| 9,766,079 B1 | 9/2017 | Poel |
| 9,852,388 B1 | 12/2017 | Swieter |
| 9,871,978 B1 | 1/2018 | Epstein |
| 9,877,266 B1 | 1/2018 | Knas |
| 9,921,726 B1 | 3/2018 | Sculley |
| 9,955,316 B2 | 4/2018 | Jampani |
| 9,955,318 B1 | 4/2018 | Scheper |
| 9,980,112 B1 | 5/2018 | Newby |
| 10,021,530 B2 | 7/2018 | Sigal |
| 10,038,952 B2 | 7/2018 | Labrosse |
| 10,044,871 B2 | 8/2018 | Bargetzi |
| 10,057,963 B2 | 8/2018 | Mead |
| 10,121,113 B1 | 11/2018 | Swieter et al. |
| 10,161,752 B1 | 12/2018 | Poel |
| 10,225,707 B1 | 3/2019 | Scheper |
| 10,353,664 B2 | 7/2019 | Poel |
| 10,433,646 B1 | 10/2019 | Schmidt et al. |
| 10,459,611 B1 | 10/2019 | Sculley et al. |
| 10,561,006 B2 | 2/2020 | Mead et al. |
| 10,614,694 B1 | 4/2020 | Zwier et al. |
| 10,634,503 B2 | 4/2020 | Hill |
| 10,664,772 B1 | 5/2020 | Poel |
| 10,681,980 B2 | 6/2020 | Martin |
| 10,733,371 B1 | 8/2020 | Baloga |
| 10,860,954 B2 | 12/2020 | Yeluguri |
| 10,970,662 B2 | 4/2021 | Swieter |
| 11,085,771 B1 | 8/2021 | Scheper |
| 11,100,282 B1 | 8/2021 | Baloga |
| 11,143,510 B1 | 10/2021 | Poel |
| 11,150,859 B2 | 10/2021 | Poel |
| 11,168,987 B2 | 11/2021 | Poel |
| 11,212,898 B2 | 12/2021 | Mead |
| 11,280,619 B1 * | 3/2022 | Scheper ............... H04W 4/30 |
| 11,307,037 B1 | 4/2022 | Scheper |
| 11,321,643 B1 | 5/2022 | Poel |
| 11,330,647 B2 | 5/2022 | Sculley |
| 11,402,216 B1 | 8/2022 | Scheper |
| 11,402,217 B1 * | 8/2022 | Scheper ......... G06Q 10/063114 |
| 11,687,854 B1 | 6/2023 | Swieter |
| 11,690,111 B1 * | 6/2023 | Sculley ............... A47C 31/126 |
| | | 340/870.07 |
| 11,713,969 B1 | 8/2023 | Poel |
| 11,744,376 B2 | 9/2023 | Schmidt |
| 11,956,838 B1 * | 4/2024 | Sculley ............... G06F 16/2457 |
| 2001/0051885 A1 | 12/2001 | Nardulli |
| 2002/0015097 A1 | 2/2002 | Martens |
| 2002/0130834 A1 | 9/2002 | Madarasz |

(56) References Cited

U.S. PATENT DOCUMENTS

| | | |
|---|---|---|
| 2003/0097284 A1 | 5/2003 | Shinozaki |
| 2003/0103075 A1 | 6/2003 | Rosselot |
| 2003/0107498 A1 | 6/2003 | Drennan |
| 2003/0218537 A1 | 11/2003 | Hoch |
| 2004/0001095 A1 | 1/2004 | Marques |
| 2004/0015401 A1 | 1/2004 | Lee et al. |
| 2004/0051644 A1 | 3/2004 | Tamayama |
| 2004/0051813 A1 | 3/2004 | Marmaropoulos |
| 2004/0141605 A1 | 7/2004 | Chen |
| 2004/0153504 A1 | 8/2004 | Hutchinson |
| 2004/0210933 A1 | 10/2004 | Dresti |
| 2004/0215694 A1 | 10/2004 | Podolsky |
| 2004/0261013 A1 | 12/2004 | Wynn |
| 2005/0018826 A1 | 1/2005 | Benco |
| 2005/0027581 A1 | 2/2005 | Kjesbu |
| 2005/0071213 A1 | 3/2005 | Kumhyr |
| 2005/0144259 A1 | 6/2005 | Buckley |
| 2005/0160368 A1 | 7/2005 | Liu |
| 2005/0197877 A1 | 9/2005 | Kalinoski |
| 2005/0218739 A1 | 10/2005 | Maddin |
| 2005/0235329 A1 | 10/2005 | Karaoguz |
| 2005/0273372 A1 | 12/2005 | Bowne |
| 2005/0273493 A1 | 12/2005 | Buford |
| 2006/0009215 A1 | 1/2006 | Bogod |
| 2006/0015376 A1 | 1/2006 | Sattler |
| 2006/0021363 A1 | 2/2006 | Mizukoshi |
| 2006/0026502 A1 | 2/2006 | Dutta |
| 2006/0045107 A1 | 3/2006 | Kucenas |
| 2006/0080007 A1 | 4/2006 | Gerard |
| 2006/0080432 A1 | 4/2006 | Spataro |
| 2006/0168618 A1 | 7/2006 | Choi |
| 2006/0218027 A1 | 9/2006 | Carrion |
| 2007/0008181 A1 | 1/2007 | Rollert |
| 2007/0094065 A1 | 4/2007 | Wu |
| 2007/0118415 A1 | 5/2007 | Chen |
| 2007/0136095 A1 | 6/2007 | Weinstein |
| 2007/0162315 A1 | 7/2007 | Hodges |
| 2007/0197239 A1 | 8/2007 | Sane |
| 2007/0198744 A1 | 8/2007 | Wensley |
| 2007/0216131 A1 | 9/2007 | Potappel |
| 2007/0226034 A1 | 9/2007 | Khan |
| 2007/0282661 A1 | 12/2007 | Franco |
| 2007/0288291 A1 | 12/2007 | Earle |
| 2008/0028323 A1 | 1/2008 | Rosen |
| 2008/0091503 A1 | 4/2008 | Schirmer |
| 2008/0120370 A1 | 5/2008 | Chan |
| 2008/0122635 A1 | 5/2008 | Fujikawa |
| 2008/0162198 A1 | 7/2008 | Jabbour |
| 2008/0184115 A1 | 7/2008 | Back |
| 2008/0201664 A1 | 8/2008 | O |
| 2008/0239994 A1 | 10/2008 | Xiong |
| 2008/0244417 A1 | 10/2008 | Simpson |
| 2008/0288355 A1 | 11/2008 | Rosen |
| 2008/0291021 A1 | 11/2008 | Bhogal |
| 2008/0300660 A1 | 12/2008 | John |
| 2009/0019367 A1 | 1/2009 | Cavagnari |
| 2009/0055234 A1 | 2/2009 | Li |
| 2009/0066486 A1 | 3/2009 | Kiekbusch |
| 2009/0094533 A1 | 4/2009 | Bozionek |
| 2009/0106567 A1 | 4/2009 | Baarman |
| 2009/0146982 A1 | 6/2009 | Thielman |
| 2009/0164581 A1 | 6/2009 | Bove |
| 2009/0210822 A1 | 8/2009 | Schindler |
| 2009/0212637 A1 | 8/2009 | Baarman |
| 2009/0265280 A1 | 10/2009 | Taneja |
| 2009/0271713 A1 | 10/2009 | Stull |
| 2009/0286556 A1 | 11/2009 | Yumoto |
| 2009/0300174 A1 | 12/2009 | Floris |
| 2009/0327227 A1 | 12/2009 | Chakra |
| 2010/0017245 A1 | 1/2010 | Kristiansen |
| 2010/0037151 A1 | 2/2010 | Ackerman |
| 2010/0070334 A1 | 3/2010 | Monteverde |
| 2010/0088239 A1 | 4/2010 | Blair |
| 2010/0102640 A1 | 4/2010 | Joannopoulos |
| 2010/0127575 A1 | 5/2010 | Joannopoulos |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0153160 A1 | 6/2010 | Bezemer |
| 2010/0153983 A1 | 6/2010 | Philmon |
| 2010/0179854 A1 | 7/2010 | Shafer |
| 2010/0187911 A1 | 7/2010 | Joannopoulos |
| 2010/0207458 A1 | 8/2010 | Joannopoulos |
| 2010/0219694 A1 | 9/2010 | Kurs |
| 2010/0219791 A1 | 9/2010 | Cheng |
| 2010/0231340 A1 | 9/2010 | Fiorello |
| 2010/0235216 A1 | 9/2010 | Hehmeyer |
| 2010/0256823 A1 | 10/2010 | Cherukuri |
| 2010/0259110 A1 | 10/2010 | Kurs |
| 2010/0274855 A1 | 10/2010 | Wassingbo |
| 2010/0277121 A1 | 11/2010 | Hall |
| 2010/0283600 A1 | 11/2010 | Herbert |
| 2010/0308939 A1 | 12/2010 | Kurs |
| 2010/0315483 A1 | 12/2010 | King |
| 2010/0319066 A1 | 12/2010 | Berry |
| 2011/0043049 A1 | 2/2011 | Karalis |
| 2011/0072482 A1 | 3/2011 | Lau |
| 2011/0074346 A1 | 3/2011 | Hall |
| 2011/0084804 A1 | 4/2011 | Khorashadi |
| 2011/0088056 A1 | 4/2011 | Ansari |
| 2011/0095618 A1 | 4/2011 | Schatz |
| 2011/0121920 A1 | 5/2011 | Kurs |
| 2011/0126127 A1 | 5/2011 | Mariotti |
| 2011/0149809 A1 | 6/2011 | Narayanaswamy |
| 2011/0153738 A1 | 6/2011 | Bedingfield |
| 2011/0223899 A1 | 9/2011 | Hiraide |
| 2011/0225563 A1 | 9/2011 | Kim |
| 2011/0231216 A1 | 9/2011 | Fyke |
| 2011/0244798 A1 | 10/2011 | Daigle |
| 2011/0267002 A1 | 11/2011 | Baarman |
| 2011/0270952 A1 | 11/2011 | Ray |
| 2011/0295392 A1 | 12/2011 | Cunnington |
| 2011/0296465 A1 | 12/2011 | Krishnan |
| 2012/0007441 A1 | 1/2012 | John |
| 2012/0016678 A1 | 1/2012 | Gruber |
| 2012/0022909 A1 | 1/2012 | Ayatollahi |
| 2012/0032484 A1 | 2/2012 | Cvek |
| 2012/0032522 A1 | 2/2012 | Schatz |
| 2012/0062345 A1 | 3/2012 | Kurs |
| 2012/0068549 A1 | 3/2012 | Karalis |
| 2012/0068832 A1 | 3/2012 | Feldstein |
| 2012/0072030 A1 | 3/2012 | Elliott |
| 2012/0078676 A1 | 3/2012 | Adams |
| 2012/0086284 A1 | 4/2012 | Capanella |
| 2012/0086867 A1 | 4/2012 | Kesler |
| 2012/0089722 A1 | 4/2012 | Enholm |
| 2012/0091794 A1 | 4/2012 | Campanella |
| 2012/0091795 A1 | 4/2012 | Fiorello |
| 2012/0091796 A1 | 4/2012 | Kesler |
| 2012/0091797 A1 | 4/2012 | Kesler |
| 2012/0091819 A1 | 4/2012 | Kulikowski |
| 2012/0091820 A1 | 4/2012 | Campanella |
| 2012/0091949 A1 | 4/2012 | Campanella |
| 2012/0091950 A1 | 4/2012 | Campanella |
| 2012/0098350 A1 | 4/2012 | Campanella |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112668 A1 | 5/2012 | Van de Sluis |
| 2012/0112691 A1 | 5/2012 | Kurs |
| 2012/0119569 A1 | 5/2012 | Karalis |
| 2012/0119575 A1 | 5/2012 | Kurs |
| 2012/0119576 A1 | 5/2012 | Kesler |
| 2012/0119698 A1 | 5/2012 | Karalis |
| 2012/0136572 A1 | 5/2012 | Norton |
| 2012/0139355 A1 | 6/2012 | Ganem |
| 2012/0143639 A1 | 6/2012 | Rollert |
| 2012/0184338 A1 | 7/2012 | Kesler |
| 2012/0192084 A1 | 7/2012 | Dura |
| 2012/0204272 A1 | 8/2012 | Svensson |
| 2012/0206050 A1 | 8/2012 | Spero |

(56) References Cited

U.S. PATENT DOCUMENTS

| | | |
|---|---|---|
| 2012/0206096 A1 | 8/2012 | John |
| 2012/0216129 A1 | 8/2012 | Ng |
| 2012/0223573 A1 | 9/2012 | Schatz |
| 2012/0228952 A1 | 9/2012 | Hall |
| 2012/0228953 A1 | 9/2012 | Kesler |
| 2012/0228954 A1 | 9/2012 | Kesler |
| 2012/0228960 A1 | 9/2012 | Karalis |
| 2012/0229592 A1 | 9/2012 | White |
| 2012/0233205 A1 | 9/2012 | McDermott |
| 2012/0235500 A1 | 9/2012 | Ganem |
| 2012/0235501 A1 | 9/2012 | Kesler |
| 2012/0235502 A1 | 9/2012 | Kesler |
| 2012/0235503 A1 | 9/2012 | Kesler |
| 2012/0235504 A1 | 9/2012 | Kesler |
| 2012/0235505 A1 | 9/2012 | Schatz |
| 2012/0235566 A1 | 9/2012 | Karalis |
| 2012/0235633 A1 | 9/2012 | Kesler |
| 2012/0235634 A1 | 9/2012 | Hall |
| 2012/0239117 A1 | 9/2012 | Kesler |
| 2012/0239202 A1 | 9/2012 | Voysey |
| 2012/0242159 A1 | 9/2012 | Lou |
| 2012/0243158 A1 | 9/2012 | Gentil |
| 2012/0248886 A1 | 10/2012 | Kesler |
| 2012/0248887 A1 | 10/2012 | Kesler |
| 2012/0248888 A1 | 10/2012 | Kesler |
| 2012/0248981 A1 | 10/2012 | Karalis |
| 2012/0254909 A1 | 10/2012 | Serdiuk |
| 2012/0256494 A1 | 10/2012 | Kesler |
| 2012/0274586 A1 | 11/2012 | Southworth |
| 2012/0284672 A1 | 11/2012 | Madonna |
| 2012/0313449 A1 | 12/2012 | Kurs |
| 2012/0313742 A1 | 12/2012 | Kurs |
| 2012/0324589 A1 | 12/2012 | Nukala |
| 2012/0331108 A1 | 12/2012 | Ferdowsi |
| 2012/0331394 A1 | 12/2012 | Trombley-Shapiro |
| 2013/0007949 A1 | 1/2013 | Kurs |
| 2013/0013750 A1 | 1/2013 | Butler |
| 2013/0018952 A1 | 1/2013 | McConnell |
| 2013/0018953 A1 | 1/2013 | McConnell |
| 2013/0020878 A1 | 1/2013 | Karalis |
| 2013/0033118 A1 | 2/2013 | Karalis |
| 2013/0038402 A1 | 2/2013 | Karalis |
| 2013/0041973 A1 | 2/2013 | Zhou |
| 2013/0054863 A1 | 2/2013 | Imes |
| 2013/0057364 A1 | 3/2013 | Kesler |
| 2013/0062966 A1 | 3/2013 | Verghese |
| 2013/0069441 A1 | 3/2013 | Verghese |
| 2013/0069543 A1 | 3/2013 | Mohan |
| 2013/0069753 A1 | 3/2013 | Kurs |
| 2013/0073094 A1 | 3/2013 | Knapton |
| 2013/0080255 A1 | 3/2013 | Li |
| 2013/0088154 A1 | 4/2013 | Van Hoof |
| 2013/0099587 A1 | 4/2013 | Lou |
| 2013/0113249 A1 | 5/2013 | Cvek |
| 2013/0117158 A1 | 5/2013 | Cvek |
| 2013/0157509 A1 | 6/2013 | Srivastava |
| 2013/0167039 A1 | 6/2013 | Howell |
| 2013/0171981 A1 | 7/2013 | Woo |
| 2013/0175874 A1 | 7/2013 | Lou |
| 2013/0181541 A1 | 7/2013 | Karalis |
| 2013/0198653 A1 | 8/2013 | Tse |
| 2013/0199420 A1 | 8/2013 | Hjelm |
| 2013/0200721 A1 | 8/2013 | Kurs |
| 2013/0208186 A1 | 8/2013 | Malone |
| 2013/0218829 A1 | 8/2013 | Martinez |
| 2013/0221744 A1 | 8/2013 | Hall |
| 2013/0234481 A1 | 9/2013 | Johnson |
| 2013/0234531 A1 | 9/2013 | Budgett |
| 2013/0241439 A1 | 9/2013 | Nishigaki |
| 2013/0246901 A1 | 9/2013 | Massano |
| 2013/0249410 A1 | 9/2013 | Thompson |
| 2013/0262687 A1 | 10/2013 | Avery |
| 2013/0278073 A1 | 10/2013 | Kurs |
| 2013/0278074 A1 | 10/2013 | Kurs |
| 2013/0278075 A1 | 10/2013 | Kurs |
| 2013/0278631 A1 | 10/2013 | Border |
| 2013/0283325 A1 | 10/2013 | Chiniara |
| 2013/0300353 A1 | 11/2013 | Kurs |
| 2013/0304924 A1 | 11/2013 | Dhara |
| 2013/0307349 A1 | 11/2013 | Hall |
| 2013/0314543 A1 | 11/2013 | Sutter |
| 2013/0320773 A1 | 12/2013 | Schatz |
| 2013/0325526 A1 | 12/2013 | Tyler |
| 2013/0334892 A1 | 12/2013 | Hall |
| 2013/0334973 A1 | 12/2013 | Wagenaar Cacciola |
| 2014/0002012 A1 | 1/2014 | McCauley |
| 2014/0021798 A1 | 1/2014 | Kesler |
| 2014/0026025 A1 | 1/2014 | Smith |
| 2014/0028112 A1 | 1/2014 | Hui |
| 2014/0032327 A1 | 1/2014 | Prakash |
| 2014/0035378 A1 | 2/2014 | Kesler |
| 2014/0035704 A1 | 2/2014 | Efe |
| 2014/0044281 A1 | 2/2014 | Ganem |
| 2014/0044293 A1 | 2/2014 | Ganem |
| 2014/0046713 A1 | 2/2014 | Harvey |
| 2014/0049118 A1 | 2/2014 | Karalis |
| 2014/0052974 A1 | 2/2014 | Masters |
| 2014/0054961 A1 | 2/2014 | Metcalf |
| 2014/0058778 A1 | 2/2014 | McLarty |
| 2014/0062211 A1 | 3/2014 | Hamam |
| 2014/0067865 A1 | 3/2014 | Kirigin |
| 2014/0074930 A1 | 3/2014 | Kumashio |
| 2014/0084703 A1 | 3/2014 | Hall |
| 2014/0084859 A1 | 3/2014 | Hall |
| 2014/0091636 A1 | 4/2014 | Ofstein |
| 2014/0091756 A1 | 4/2014 | Ofstein |
| 2014/0103738 A1 | 4/2014 | Campanella |
| 2014/0108084 A1 | 4/2014 | Bargetzi |
| 2014/0108956 A1 | 4/2014 | Varenhorst |
| 2014/0109210 A1 | 4/2014 | Borzycki |
| 2014/0111304 A1 | 4/2014 | Hashim-Waris |
| 2014/0135648 A1 | 5/2014 | Holoien |
| 2014/0139426 A1 | 5/2014 | Kryze |
| 2014/0149519 A1 | 5/2014 | Redfern |
| 2014/0150059 A1 | 5/2014 | Uchida |
| 2014/0159589 A1 | 6/2014 | Pandharipande |
| 2014/0159652 A1 | 6/2014 | Hall |
| 2014/0164934 A1 | 6/2014 | Yang |
| 2014/0167618 A1 | 6/2014 | Wang |
| 2014/0175898 A1 | 6/2014 | Kurs |
| 2014/0181704 A1 | 6/2014 | Madonna |
| 2014/0181935 A1 | 6/2014 | Beckmann |
| 2014/0195149 A1 | 7/2014 | Yang |
| 2014/0195291 A1 | 7/2014 | Aaron |
| 2014/0195805 A1 | 7/2014 | Koo |
| 2014/0203659 A1 | 7/2014 | Madawala |
| 2014/0203921 A1 | 7/2014 | Baker |
| 2014/0215551 A1 | 7/2014 | Allain |
| 2014/0217785 A1 | 8/2014 | Arens |
| 2014/0223313 A1 | 8/2014 | Aebi |
| 2014/0225978 A1 | 8/2014 | Saban |
| 2014/0229578 A1 | 8/2014 | Chu |
| 2014/0236659 A1 | 8/2014 | Hapse |
| 2014/0244043 A1 | 8/2014 | Foster |
| 2014/0244678 A1 | 8/2014 | Zamer |
| 2014/0253813 A1 | 9/2014 | Bakar |
| 2014/0259047 A1 | 9/2014 | Bakar |
| 2014/0269531 A1 | 9/2014 | Luna |
| 2014/0274005 A1 | 9/2014 | Luna |
| 2014/0277757 A1 | 9/2014 | Wang |
| 2014/0277763 A1 | 9/2014 | Ramachandran |
| 2014/0278057 A1 | 9/2014 | Berns |
| 2014/0282013 A1 | 9/2014 | Amijee |
| 2014/0285113 A1 | 9/2014 | Huang |
| 2014/0297758 A1 | 10/2014 | Kidron |
| 2014/0300277 A1 | 10/2014 | Ono |
| 2014/0302795 A1 | 10/2014 | Chacon |
| 2014/0354429 A1 | 12/2014 | Henderson |
| 2014/0365568 A1 | 12/2014 | Huang |
| 2015/0005011 A1 | 1/2015 | Nehrenz |
| 2015/0012843 A1 | 1/2015 | Ouyang et al. |
| 2015/0015180 A1 | 1/2015 | Miller |
| 2015/0015399 A1 | 1/2015 | Gleckler |
| 2015/0035440 A1 | 2/2015 | Spero |

(56) References Cited

U.S. PATENT DOCUMENTS

| | | |
|---|---|---|
| 2015/0069915 A1 | 3/2015 | Ogawa |
| 2015/0085063 A1 | 3/2015 | Fish |
| 2015/0149929 A1 | 5/2015 | Shepherd |
| 2015/0179012 A1 | 6/2015 | Sharpe |
| 2015/0193739 A1 | 7/2015 | Min |
| 2015/0195620 A1 | 7/2015 | Buchner et al. |
| 2015/0200982 A1 | 7/2015 | Velagaleti |
| 2015/0201480 A1 | 7/2015 | Ogawa |
| 2015/0229644 A1 | 8/2015 | Nozawa |
| 2015/0234468 A1 | 8/2015 | Hwang |
| 2015/0296594 A1 | 10/2015 | Blum |
| 2015/0301727 A1 | 10/2015 | Miyazawa |
| 2015/0321590 A1 | 11/2015 | Mizoi |
| 2015/0324754 A1 | 11/2015 | Bathiya |
| 2015/0330780 A1 | 11/2015 | Yuzawa |
| 2015/0369612 A1 | 12/2015 | Nishimura |
| 2015/0370272 A1 | 12/2015 | Reddy |
| 2016/0026253 A1 | 1/2016 | Bradski et al. |
| 2016/0044071 A1 | 2/2016 | Sandholm |
| 2016/0049064 A1 | 2/2016 | McNabb |
| 2016/0162844 A1 | 6/2016 | Rachuri |
| 2016/0171566 A1 | 6/2016 | Pugh |
| 2016/0231731 A1 | 8/2016 | Carver |
| 2016/0253048 A1 | 9/2016 | Silcock |
| 2016/0304013 A1 | 10/2016 | Wolas |
| 2016/0327922 A1 | 11/2016 | Sekiguchi |
| 2016/0342950 A1 | 11/2016 | Pignataro |
| 2017/0046113 A1 | 2/2017 | Noyes et al. |
| 2017/0060350 A1 | 3/2017 | Zheng et al. |
| 2017/0083275 A1 | 3/2017 | Shin |
| 2017/0208664 A1 | 7/2017 | Mead |
| 2017/0223312 A1 | 8/2017 | McNelley |
| 2017/0238401 A1 | 8/2017 | Sadwick |
| 2017/0293458 A1 | 10/2017 | Poel |
| 2017/0314803 A1 | 11/2017 | Jacobson |
| 2018/0004178 A1 | 1/2018 | Haines |
| 2018/0107444 A1 | 4/2018 | Dunn |
| 2018/0137369 A1 | 5/2018 | Roth |
| 2018/0143025 A1 | 5/2018 | Kurata |
| 2019/0004178 A1 | 1/2019 | Motoyama et al. |
| 2019/0053012 A1 | 2/2019 | Hill |
| 2019/0118838 A1 | 4/2019 | Lequio |
| 2019/0141291 A1 | 5/2019 | McNelley |
| 2019/0272141 A1 | 9/2019 | Poel |
| 2019/0294018 A1 | 9/2019 | Shrivastava |
| 2019/0357676 A1 | 11/2019 | Matthai |
| 2019/0370700 A1 | 12/2019 | Ludwig |
| 2020/0007921 A1 | 1/2020 | Ojala |
| 2020/0012403 A1* | 1/2020 | Sculley ........... H04W 4/30 |
| 2020/0049509 A1 | 2/2020 | Hill |
| 2020/0096346 A1 | 3/2020 | Dhandapani |
| 2020/0096573 A1 | 3/2020 | Cha |
| 2020/0116493 A1 | 4/2020 | Colburn |
| 2020/0250879 A1 | 8/2020 | Foster |
| 2020/0272163 A1 | 8/2020 | Ha |
| 2021/0027208 A1 | 1/2021 | Clark |
| 2021/0392290 A1 | 12/2021 | McNelley et al. |

FOREIGN PATENT DOCUMENTS

| | | |
|---|---|---|
| AU | 2013203947 A1 | 5/2013 |
| CN | 102239633 A | 11/2011 |
| CN | 102439669 A | 5/2012 |
| CN | 102870338 A | 1/2013 |
| EP | 0935263 A2 | 8/1999 |
| EP | 2367146 A1 | 9/2011 |
| EP | 2388977 A1 | 11/2011 |
| EP | 2439686 A1 | 4/2012 |
| KR | 20140007006 A | 1/2014 |
| WO | 2007008646 A2 | 1/2007 |
| WO | 2008118178 A1 | 10/2008 |
| WO | 2009085896 A1 | 7/2009 |
| WO | 2009108958 A1 | 9/2009 |
| WO | 2009108959 A1 | 9/2009 |
| WO | 2010093997 A1 | 8/2010 |
| WO | 2011034759 A2 | 3/2011 |
| WO | 2011099873 A1 | 8/2011 |
| WO | 2011112795 A1 | 9/2011 |
| WO | 2012037279 A1 | 3/2012 |
| WO | 2012170278 A3 | 12/2012 |
| WO | 2013008252 A2 | 1/2013 |
| WO | 2013059441 A1 | 4/2013 |
| WO | 2013112185 A2 | 8/2013 |
| WO | 2013122483 A1 | 8/2013 |
| WO | 2014007656 A1 | 1/2014 |
| WO | 2014011059 A1 | 1/2014 |
| WO | 2014035260 A1 | 3/2014 |
| WO | 2014035263 A1 | 3/2014 |
| WO | 2014038966 A1 | 3/2014 |
| WO | 2014054953 A1 | 4/2014 |
| WO | 2014094107 A1 | 6/2014 |
| WO | 2014139781 A2 | 9/2014 |
| WO | 2017142541 A1 | 8/2017 |
| WO | 2019133264 A1 | 7/2019 |

OTHER PUBLICATIONS

Cisco, WebEx Meeting Center User Guide For Hosts, Presenters, and Participants, Version 8.23, Copyright 1997-2011 Cisco and/or its affiliates.

Citrix, GoToMeeting User Guide, Copyright 2015 Citrix Systems.

Citrix, GoToWebinar User Guide, Copyright 2015 Citrix Systems.

CiviCRM Books: User and Administrator Guide for Version 4.5, Published Sep. 2014, http://book.civicrm.org/user/current/email/scheduled-reminders/.

Davis, A Careful Return: How A Global Pandemic Changed a Workplace Design Firm's Office Spaces—and Its Business Direction Toward Safety-Tech Solutions, AV Technology, 2020, 13(6), 15(3), https://dialog.proquest.com/professional/printviewfile?accountid=131444, 3 pages.

Events and Room Reserve Scheduled Task Setup for Email Notifications, Article No. 268, Apr. 22, 2013, http://kb.evanced.info/article.php?id=268.

Greenberg et al., The Notification Collage: Posting Information to Public and Personal Displays, Proceedings of the ACM Conference on Human Factors in Computing Systems, [CHI Letters 3(1)], pp. 514-521.

Join.me forum and FAQ, Apr. 3, 2014.

Krumm et al., The NearMe Wireless Proximity Server, UbiComp 2004, The Sixth International Conference on Ubiquitous Computing, pp. 283-300, Sep. 7-10, 2004.

Lee, TechnicLee—My Thoughts on Technology, Business, and Innovation, Posted in Outlook, Scripting, Jan. 20, 2012, http://techniclee.wordpress.com/2012/01/20/sending-a-meeting-reminder-email-in-outlook/.

Lomas et al., Collaboration Tools, Educause Learning Initiative, 2008, 2(11):1-11.

Marrinan et al., SAGE2: A New Approach for Data Intensive Collaboration Using Scalable Resolution Shared Displays, 10th IEEE International Conference on Collaborative Computing: Networking, Applications and Worksharing, 2014, pp. 177-186.

NFS Technology Group, Rendezvous—Technology for Meeting Room, Desk Scheduling and Event Management, http://myrendezvous.net/rendezvous-event-booking-software/calendar-management/, Mar. 1, 2016, 2 pages.

Oracle Communications, Oracle Data Sheet—Calendar Server, Copyright 2015 Oracle and/or its affiliates, http://www.oracle.com/us/industries/communications/communications-calendar-server-ds-071728.pdf.

Stirworks, Inc., The Height-Adjustable, Standing Stir Kinetic Desk, http://www.stirworks.com/, Copyright 2015 Stirworks, Inc., 6 pages.

Tam et al., A Framework for Asynchronous Change Awareness in Collaborative Documents and Workspaces, International Journal of Human-Computer Studies, 2006, 64:583-598.

\* cited by examiner

Your battery charge is currently 18% of a maximum charge. At your current rate of use your battery will be depleted within 32 minutes.

| Employee Database 840 | | | | | | | |
|---|---|---|---|---|---|---|---|
| Employee | Current Assigned Battery | Typical Rate of Use (% max) | Employee Schedule 850 | Employee Location | Estimated TODepart. | Battery Swap Req. State | Device Address |
| E0001 | NA | 45 | Emp. 1 Sch. | NA | NA | NA | ADD0001 |
| E0002 | B0004 | 32 | Emp. 2 Sch. | A0034 | 6PM | Urgent | ADD0002 |
| E0003 | B0003 | 25 | Emp. 3 Sch. | A0498 | 6PM | OK | ADD0003 |
| E0004 | ... | | | | | | |
| EYYYY | | | | | | | |

You should swap your battery. A fully charged battery you may swap for your current battery is available on Cart C0001 which is located near the restroom 78.

Your battery charge is at 30%. To conserve energy select one or more of the following:

(1) Turn off light [Select]
(2) Turn off seat heater [Select]
(3) Turn off fan [Select]
(4) Turn off height adjust [Select]

[Enter] [No Thanks]

REMOTE POWER SYSTEMS, APPARATUS AND METHODS

CROSS-REFERENCE TO RELATED APPLICATIONS

This application is a continuation of U.S. patent application Ser. No. 17/389,999 filed on Jul. 30, 2021, which claims priority to U.S. Provisional Patent Application Ser. No. 63/059,284, filed on Jul. 31, 2020, which applications are hereby incorporated by reference in their entirety for all purposes.

STATEMENT REGARDING FEDERALLY SPONSORED RESEARCH OR DEVELOPMENT

Not applicable.

BACKGROUND OF THE DISCLOSURE

The field of the disclosure is power systems and more specifically battery systems and processes for use in office or other enterprise facilities.

While the present inventions can be used in different environments and by many different types of users, unless indicated otherwise and in the interest of simplifying this explanation, the present disclosure will be described in the context of a large corporate campus facility including several buildings situated on a large plot of land where each building includes several floors and each floor includes several different spaces including private offices, conference spaces, common areas (e.g., auditoriums, cafeterias, break rooms, etc.), and open office work spaces (e.g., hoteling workstations in an open (e.g., non-walled) office environment) and where different spaces outside the buildings provide suitable short term locations for different activity types. Herein, the term "facility" will be used to refer generally to all spaces and structures, both inside and outside, on the campus unless indicated otherwise. A typical system user operating within the campus facility will be referred to as an employee and a janitor or maintenance person that perform various activities related to the systems will be referred to as a power custodian or simply a custodian, unless indicated otherwise. Here, the term "employee" is used generally for convenience and may include any person that works for the owner of a facility or a person that operates within the facility without actually being employed by the owner.

For many years typical corporate employees worked at specific employer facilities daily. Employees participated in many different activities throughout their days at employer facilities including personal focused work activities, collaborative activities, as participants during presentations, in phone and telepresence calling, regenerative activities (e.g., rest, socialization, etc.), etc. Because the same employees came to and used the same spaces every day, employers developed different optimal stationary office space affordance arrangements for supporting routine employee activity types. For instance, to support personal focused work activities, personal workstations (hereinafter generally referred to as "workstations") were routinely/daily use by specific employees. Here, because a typical employee worked in the same space every day, specific stationary workstations were assigned to specific employees. To reduce space workstation requirements as well as station costs, workstations were often designed to be in close proximity to each other, often sharing common support structures, privacy panels and power distribution systems (e.g., wire management systems). To support employees during collaborative activities while avoiding disruption of other employees, private (e.g., audibly and visually or at least audibly private) conference and meeting spaces with walls and content sharing affordances were designed to temporarily support group activities. To enable large presentations, auditoriums and other reconfigurable multi-use spaces were constructed. To facilitate regenerative activities, cafeteria, lounge, exercise and other common areas were designed and constructed.

In recent years, many employees have migrated away from working predominantly at personal assigned workstations for several reasons. First, many employers and employees have come to the realization that face to face collaboration increases communication effectiveness and also builds relationships primarily because subtle messages that can only be gleaned from audible and visual communications belie deeper meanings than text based communications. While ZOOM, Microsoft Teams and other conferencing software works well, those face to face solutions are often disruptive to other employees when employed at a workstation near other workstations. In addition, conversations at workstations are not private as other employees at adjacent workstations can hear at least portions of verbal exchanges. For these reasons, it is often preferred that face to face meetings take the form of in person meetings in private conference spaces. In many cases employees needing to travel to disparately located conference spaces throughout a day opt to perform personal focused work near those conference spaces between meetings to avoid having to travel back to personal assigned workstations.

Second, for many employees, working at different locations throughout the day is simply personally preferred for one or more reasons. For instance, many employees embrace the idea that space gets stale and that changing work environments once or several times a day increases personal energy and increases creativity. As another instance, many employees use the opportunity to move between environments to participate in some physical exercise, to socialize or to rejuvenate in some other fashion. As still one other instance, many employees may prefer to be located proximate different other employees at different times or away from other employees at other times given activities being performed, locations of in face meetings, degree of focus required, for social reasons, etc.

Wireless laptops, tablets and other portable computing devices have made it possible for employees to work at almost any location within an employer's facility. While small computing devices enable employees to select and change preferred work environments, many environments lack other activity optimizing affordances. For instance, an employee working at a cafeteria table often will not have access to large display screens, preferred lighting devices, devices (e.g., speakers, camera, and microphone) that enhance conferencing software solutions, powered height adjustment worktops, etc.

To more fulsomely support employees that work in several environments throughout the day, the office furniture industry has adopted an affordance "hoteling" model where fully optimized workstations, lounge assemblies or other arrangements are provided for temporary use by employees so that one employee may use several (e.g., 2-5) different affordance sets for short durations throughout a day. Here, the idea is that all the affordances (e.g., screens, speakers, microphones, optimized cameras, lighting, etc.) for optimally supporting an employee at each affordance arrangement location are available and ready for use by any employee.

Very recently, there have been global health related situations which have led to employers and employees rethinking facility environments. To this end, recent virus outbreaks have fueled concerns about social distancing that are affecting workplace spacing and personal workspace preferences. Thus, employers are adopting policies that require employees to maintain minimum distances from each other, limit the number of people that can be simultaneously located in a conference room or otherwise commonly located, limit the number of people that can be simultaneously located within a facility, etc.

Employees are taking personal precautions to social distance. Anxiety levels of employees related to health situations vary widely and personal steps to socially distance vary as well. Thus, for instance, while one employee may be comfortable working at a distance of 6 feet from other employees, a second employee may only be comfortable working 20 feet or more from other employees, and a third employee may seek even more distance, physical barriers between himself and others, etc.

While most employer facilities have sufficient space including large cafeterias and other common spaces to accommodate social distancing policies and preferences, unfortunately in many cases legacy workstation and other affordance arrangements do not and would require substantial rearrangement or redesign. For instance, stationary and adjacent workstations that position employees in close proximity would have to be rearranged or replaced to accommodate policies and preferences. As another instance, where policies or preferences limit in person conference participant numbers, it is expected that ZOOM, Microsoft Teams, and other conferencing software use will increase even for employees within employer facilities as many meeting attendees that could travel to meeting spaces will have to or will opt to patch in to conferences via software links to participate. Here, more distance between a greater number of workstations or other affordance arrangements will be required for privacy purposes and to reduce audio distractions between employees.

In addition to problems associated with rearrangement of mechanical affordances that comprise a workstation, in many cases where affordance arrangement spacing is changed, power distribution systems that provide electricity to optimized sets of powered workstation devices need to be redesigned, rerouted and either rearranged or replaced. In this regard, while some devices like laptops and tablet computing devices have their own batteries, other activity optimizing affordances (e.g., lighting, large flat panel displays, speakers, microphones, cameras, etc.) typically do not and therefore wired power access at each affordance arrangement location is required. Distribution system modifications are expensive and time consuming as skilled electricians and other tradesmen are typically required to implement changes.

Complicating matters, it is expected that employer policies as well as employee practices related to social distancing will change periodically (e.g., seasonally, by month or even weekly), sometimes being more restrictive and other times being less restrictive. For instance, in winter months when virus spread rate is typically higher, policies may limit the number of employees simultaneously located in conference spaces more than in summer months when virus spread rate is lower. As another instance, a specific employee may be comfortable working within 10 feet of other employees that have no virus symptoms but may seek much greater distance from an employee that has a persistent cough. As still one other instance, a specific employee that has a particularly loud voice may prefer to have a substantial distance between a workstation he uses and other employees for privacy or other reasons when on a ZOOM or other type conferencing call but want to be closer to other employees when not on a call. Thus, it is expected that optimal power access locations will routinely be in flux given employer policies, user preferences, and development of new technologies that enable information access at virtually any location within an employer's facilities.

SUMMARY OF THE DISCLOSURE

It has been recognized that changing user and employer spacing preferences within office space can be accommodated irrespective of arrangement of conventional wired power locations by providing workstations and other affordance arrangements that include electrical battery coupling assemblies as well as integrated power distribution systems for electrically coupling rechargeable and portable batteries to device affordances located at the arrangements. In at least some cases the batteries have shapes and dimensions to be carried by hand from a charging station to an affordance arrangement for use. Thus, for instance, in some cases batteries will be limited to under 15 pounds with a maximum dimension less than 2 feet and in particularly advantageous cases limited to under 10 pounds with a maximum dimension less than 15 inches. Convenient shapes include but are not limited to cylindrical, plate like or book like shapes, rod like shapes and others. In at least some cases batteries are shaped to mirror at least portions of shapes that are commonly found at conventional workstations or other arrangements and the batteries are mounted or supported at the stations or arrangements at locations adjacent or internal to the other components so that the batteries can be added to stations without substantially affecting station appearance.

The electronic coupling assemblies can take many different forms including contacts, inductive coils, and other types. Mechanical support or coupling features at the affordance arrangements can also take many different forms including existing surfaces at workstations, shelf surfaces dedicated to battery support and electrical coupling, hook assemblies, and housing and other assemblies that are designed to receive batteries within cavities or other internal partially or entirely hidden spaces.

In at least some cases each battery may include a processor for monitoring battery charge and other battery parameters and performing some function when charge level drops to a threshold level (e.g., 30% maximum charge) or when some other battery condition occurs. In some cases each battery includes some type of signaling device for generating an alert signal perceivable by an employee using the battery to indicate when a charge depletion threshold level is reached. The signal is intended to encourage the employee to take action to replace the partially depleted battery with a fully or at least more charged battery. In some cases a workstation or other arrangement includes a backup battery controlled to provide power to affordance arrangement devices while battery swapping activities occur.

In at least some cases the signaling device may include an LED or other light device that is lit to indicate a depleted battery state or other battery conditions. In other cases the signaling device may include a display screen that can indicate a depleted battery charge generally or can provide more specific information like a percentage that indicates a percent of full battery charge or an estimated charge time left given average battery discharge rate or an actual most recent discharge rate. In still other cases the signaling device may include a speaker or other sound generating device and the signal may be a simple sound (e.g. a beep or buzz) or it may be a broadcast voice signal indicating the depleted state. In some embodiments a processor may be programmed to track locations of battery charging stations and an alerting message may indicate a closest battery charging station to an employee.

In other cases, a processor may monitor battery charge states at each charging station and may only indicate a specific battery charger in an alert message if at least one fully charged battery is located at that station for swapping. In some cases employees may respond to an alert signal by indicating an intent to retrieve a battery from a suggested charging station. Here, intent may be indicated via selection of a virtual icon on a display screen or via a hardware button that forms part of an affordance configuration or that is included in a battery assembly itself. In other cases a battery may include a microphone and intent may be expressed via voice captured by the microphone and processed by the battery processor.

In some embodiments manual or automated mobile battery charging stations may be provided that may be used to deliver charged batteries to different locations within a facility for pickup by employees during swapping activities. In some cases a system processor may present alerts to battery users within a facility indicating a time when a mobile charging station is in close proximity to their location or is going to be in their general area of a facility. In some cases a "charging station present" alert may only be presented to battery users that are currently using batteries having a charge state below some threshold depletion level. In some cases a processor may change automated or manual mobile station travel paths through a facility based on monitored battery charge states to deliver charged batteries where needed most. Thus, for instance, where 10 batteries are almost complete discharged in a first facility area and only 2 batteries are at a first depletion threshold level in a second area, the system may opt to move a charging station with many fully charged batteries to the first area first and then to the second area to meet immediate needs.

In some cases battery charging stations may including battery locking capabilities and may only release specific batteries to specific employees. For instance, in some cases a charging station may not release a battery for use by an employee until after the employee is identified and associated with the battery. Here, locking may include physical locking or disablement of discharging. Locking batteries and associating batteries with specific employees have several advantages. First, by associating batteries with specific employees, batteries scan be tracked for security purposes. Second, statistics on how specific employees use the batteries can be tracked and used to assess specific employee power needs for power planning purposes (e.g., an employee that depletes battery charge quickly may need to retrieve batteries more frequently than another employee that typically only depletes batteries at a slower rate). Third, charged batteries can be temporarily reserved for specific employees that indicate a need to avoid situations where an employee travels to a charging station to retrieve a battery and there is no fully charged battery for swapping. Fourth, rules regarding swapping a depleted battery prior to retrieving a charged battery can be enforced to ensure that depleted batteries are returned to charging stations to recharge in a timely fashion.

In some embodiments larger batteries that are not easily picked up and transported may be provided on wheels to be pushed around a facility or, in some cases, a battery processor may control integrated motors to drive one or more of the wheels to automatically move a battery between charging station locations and affordance arrangements or other facility locations for use.

In some cases power consuming devices may be integrated with batteries. For instance, in some cases a light, an access point, an HVAC subassembly, a speaker, a projector, etc., may be integrated into a battery housing. In some cases a power consuming device may be integrated into an automated mobile battery for delivery to facility locations when needed. For instance, in a case where a wireless communication signal from an access point is weak in a first facility location, a system processor may control an automated mobile battery cart including an extender access point to move to the first facility location to increase signal strength and support employees at that location.

In some cases, instead of or in addition to a battery having input and output devices like interface buttons, a microphone, a speaker, one or more signaling LEDs, a display screen, etc., a workstation or other affordance assembly where a battery is utilized may include these types on input and output devices where input from employees and output alerts and other messages or signals related to the disclosed power management system are generated for consumption.

In still other cases it is contemplated that where an employee uses and carries a personal portable computing device like a smart phone, a laptop computer, a tablet computing device, etc., alerts and other system messages may be provided to the employee via the personal device and feedback or other power management input from the employee may be received via the personal device. In some cases alerts and messages may be provided via e-mail, text or other application programs and employee input may be obtained via embedded selection tools (e.g., on screen icons) within those types of messages. In other cases an employee may download a power management application program to her personal device and may receive messages and provide input via that application program.

In yet other cases it is contemplated that one or more other power consuming devices at a workstation or other affordance arrangement that are provided for other purposes may be used as an input and/or output device for alerts, messaging, and user input. For instance, where a large display screen is located at a workstation and is used to view content from an employee's laptop in a large format, a system processor may be linked to the display and programmed to open pop-up windows to present messages and virtual input icons/buttons for receiving user input.

BRIEF DESCRIPTION OF THE SEVERAL VIEWS OF THE DRAWINGS

FIG. 38 is a view of a pop up window text message provided to a battery user when a battery depletion level reaches a threshold level;

FIG. 40 is a schematic illustrating a database representation corresponding to facility employees that is consistent with at least some aspects of the present disclosure;

FIG. 41 is similar to FIG. 38, albeit presenting a different alerting message;

FIG. 52 is similar to FIG. 38, albeit presenting a different alerting message;

DETAILED DESCRIPTION OF THE DISCLOSURE

Figure 1:
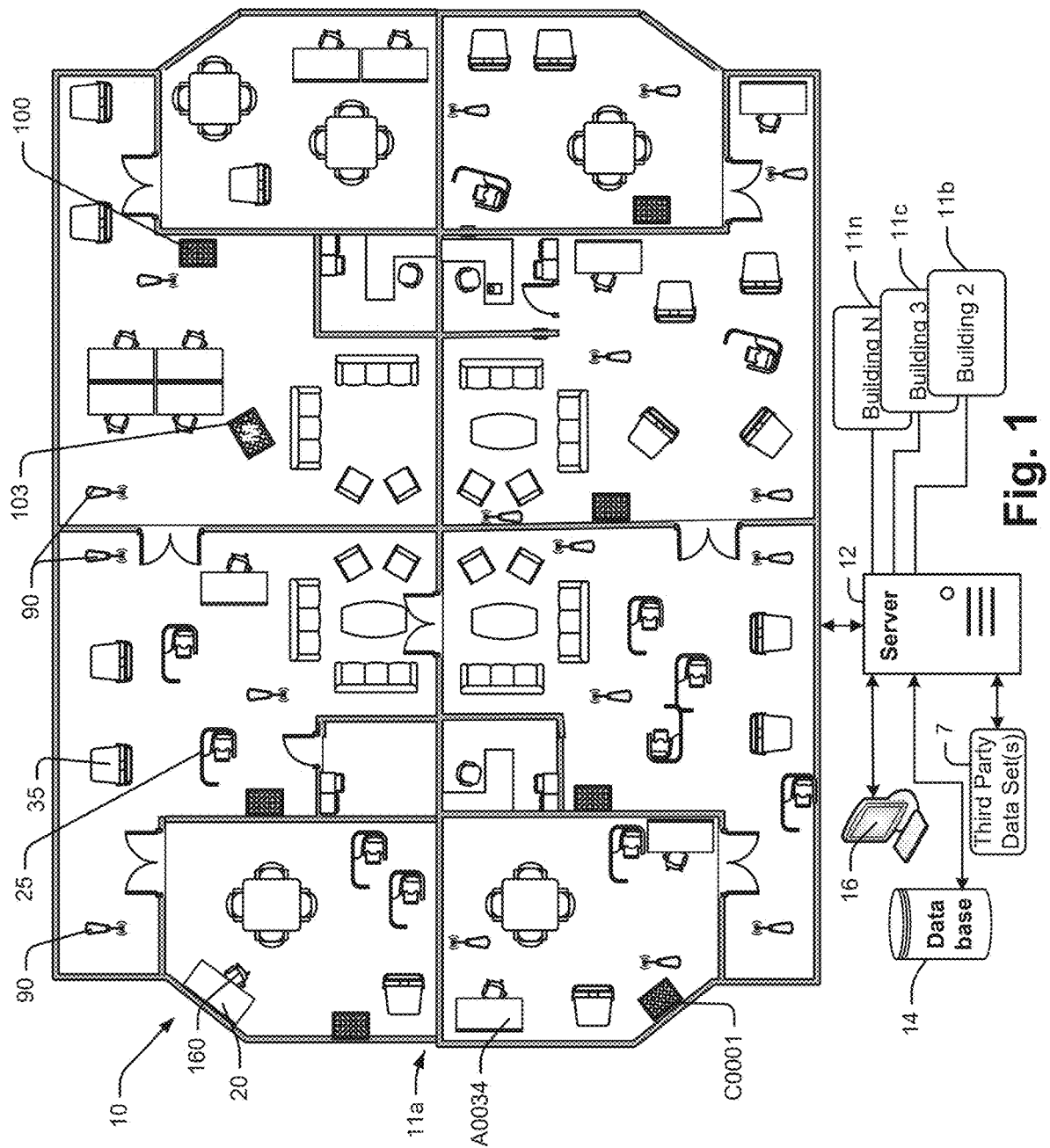
FIG. 1 is a top plan view of an exemplary facility and power management system that is consistent with at least some aspects of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Hereafter the disclosure describes several different methods and processes that are performed by system processors as well as different processors that can perform those methods and processes. While some processes are described as performed by a specific system processor, it should be appreciated that in cases where a subassembly includes two processors, either one of those processors may be programmed to perform the described process and, in many cases, only one of the processors may be required to perform all of the combined processes performed by the two processors. For instance, in a case where a battery is described as having a first processor and a battery charging station is described as having a second processor and the second processor is described as monitoring and alerting an employee to battery charging state or charged status, it is contemplated that the battery processor may instead perform those functions. As another instance, in a case where a workstation includes a first processor and a battery includes a second processor and the workstation is described as performing a power regulation process, it is contemplated that the battery processor may instead perform the regulation process. As one other example, where a system is described as including a workstation with a first processor and a battery with a second processor that performs some functions, it is contemplated that the second processor may be eliminated and the first processor may be programmed to perform all functions associated with the second processor. Here, where the second processor is described as controlling a speaker, a visual indication device, etc., at a workstation in response to battery conditions, it is contemplated that the battery processor would control those devices in a similar fashion. In this and other cases where a battery processor controls workstation devices or where a workstation processor controls battery devices, the system may provide a communication link, either wireless or wired/physically linked, between the station and battery. Similarly, in cases where a battery processor controls charging station devices or where a charging station processor controls battery devices, the system may provide a communication link, either wireless or connected, between the charging station and battery.

There are several teachings hereafter where locations of resources (e.g., batteries, mobile charging stations, workstations and other affordance arrangements) or employees within a facility are identified and tracked. Location tracking is known generally in the location tracking arts and therefore is not explained here in detail. Here it should suffice to say that any type of location tracking may be used in the present disclosure and, in some cases, specific types of tracking are preferred. For instance, in the case of tracking specific employees within a facility, where an employee carries a portable smart phone, tablet or other computing device that is associated with the employee, any of several different triangulation processes where the portable device transmits a signal to access points and a processor triangulates the location of the device based on signal strength, time of signal flight, etc., to determine the location of an employee's portable computing device may be performed to determine employee location. In other cases triangulation may be based on signals received at a portable device from access points. In the case of a mobile cart, charging station, workstation or other affordance, locations may also be tracked via a triangulation process. In some cases detection of one device or employee adjacent another device or affordance may be used to determine relative juxtaposition with respect to the adjacent device or affordance or to surmise the location of the one device or employee based on a known location of the adjacent device or affordance. Proximity near an affordance or device may be detected via a motion sensor or some other type of presence sensor that detects objects within a zone, via wireless interrogation and response within a zone, or via any other known system or process. In some cases different location systems may be used at different times or depending on where with respect to an overall facility an employee is located. For instance, when an employee is inside a building an access point based location system may be employed and when the employee is outside a building on a facility campus, a GPS system may be employed, with a system server switching between different location tracking systems as the employee moves about between locations.

Referring now to the drawings wherein like reference numerals correspond to similar elements throughout the several views and, more specifically, referring to FIG. 1, the present disclosure will be described in the context of an exemplary enterprise facility system 10 including a plurality of buildings 11a, 11b, 11c . . . 11n and campus space between those buildings that comprise a "facility", a server 12, a database 14, and an administrator's interface computing device 16. Buildings 11a through 11n are arranged on an employer's campus where each building (e.g., 11a as illustrated) includes one or more floors, space dividing walls, employee supporting affordances, and a battery power system for providing power to supporting affordances in ways described hereafter.

Figure 2:
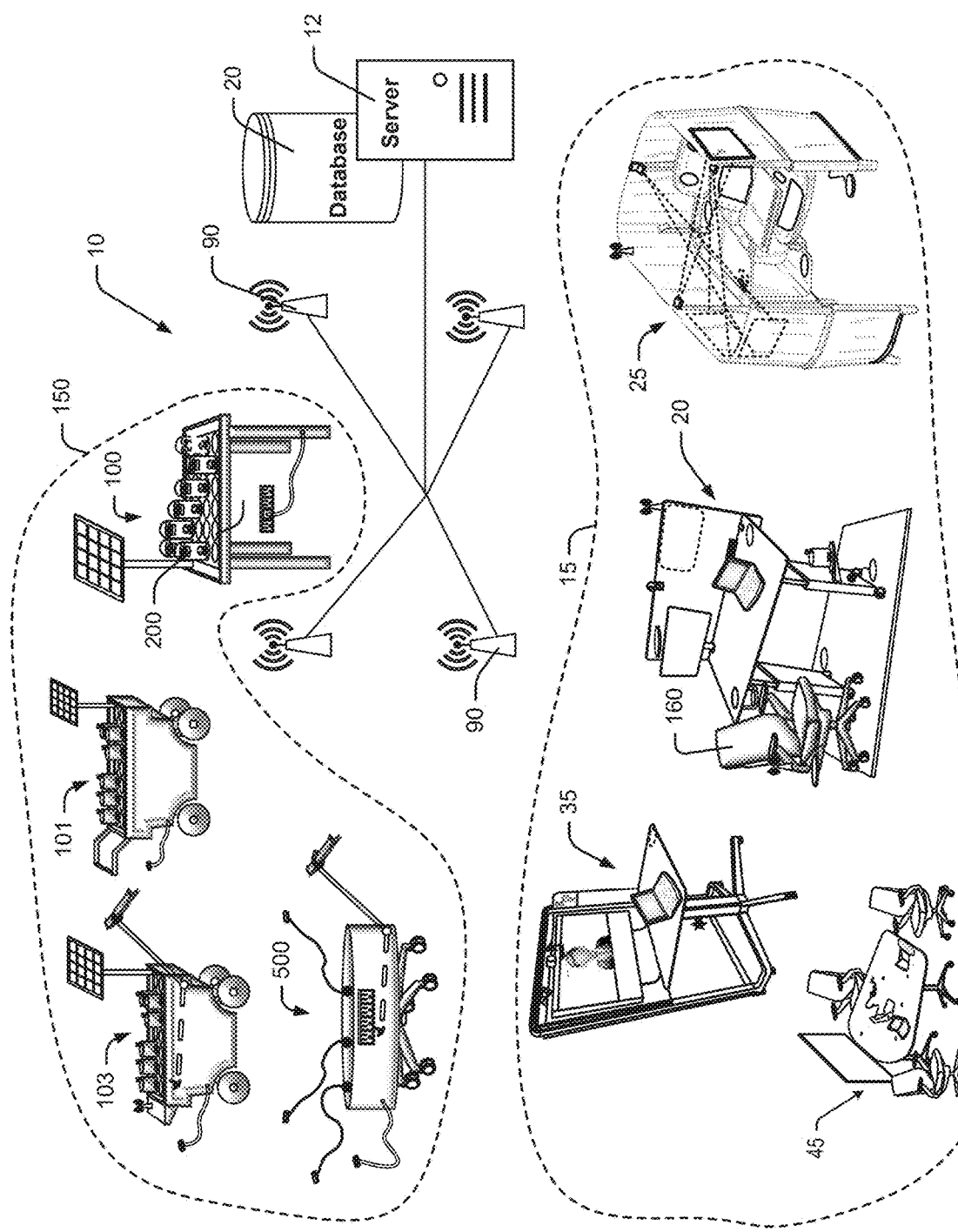
FIG. 2 is a schematic illustrating a portion of the power distribution system of claim 1 in more detail.

Referring also to FIG. 2, exemplary employee supporting affordances 15 include a workstation 20, a personal harbor assembly 25, and a telepresence station 35. An exemplary small group supporting affordance includes a small group conference arrangement 45. Other employee supporting affordance arrangements are contemplated. Personal seating affordances which may be treated as separate for power delivery purposes in at least some cases are labelled 160 unless indicated otherwise. Affordance arrangements 20, 25, 35, 45 and 160 are described hereafter. In many cases two or more employee supporting arrangements are located within a single open space defined by facility walls. In FIG. 2, the battery power system 150 is represented by exemplary charging stations 100, 101 and 103 as well as batteries 200 having a first form factor as well as a large mobile battery assembly 500. In other embodiments the charging stations and batteries may take other forms described hereafter.

Many aspects of the present disclosure will be described in the context of the exemplary workstation 20 and stationary battery charging station 100 shown in FIG. 3. Nevertheless, it should be appreciated that many of the disclosed aspects apply or will be associated with other affordance arrangements and charging stations disclosed herein and even arrangements that are not disclosed herein. Thus, when this disclosure describes features related to a "workstation", it should be appreciated that each of those features or combinations of disclosed features may be used in any of the affordance arrangements contemplated and when this disclosure describes features related to the stationary charging station 100, it should be appreciated that each of those features or combinations of disclosed features may be used with or added to any of the charging stations contemplated.

Figure 3:
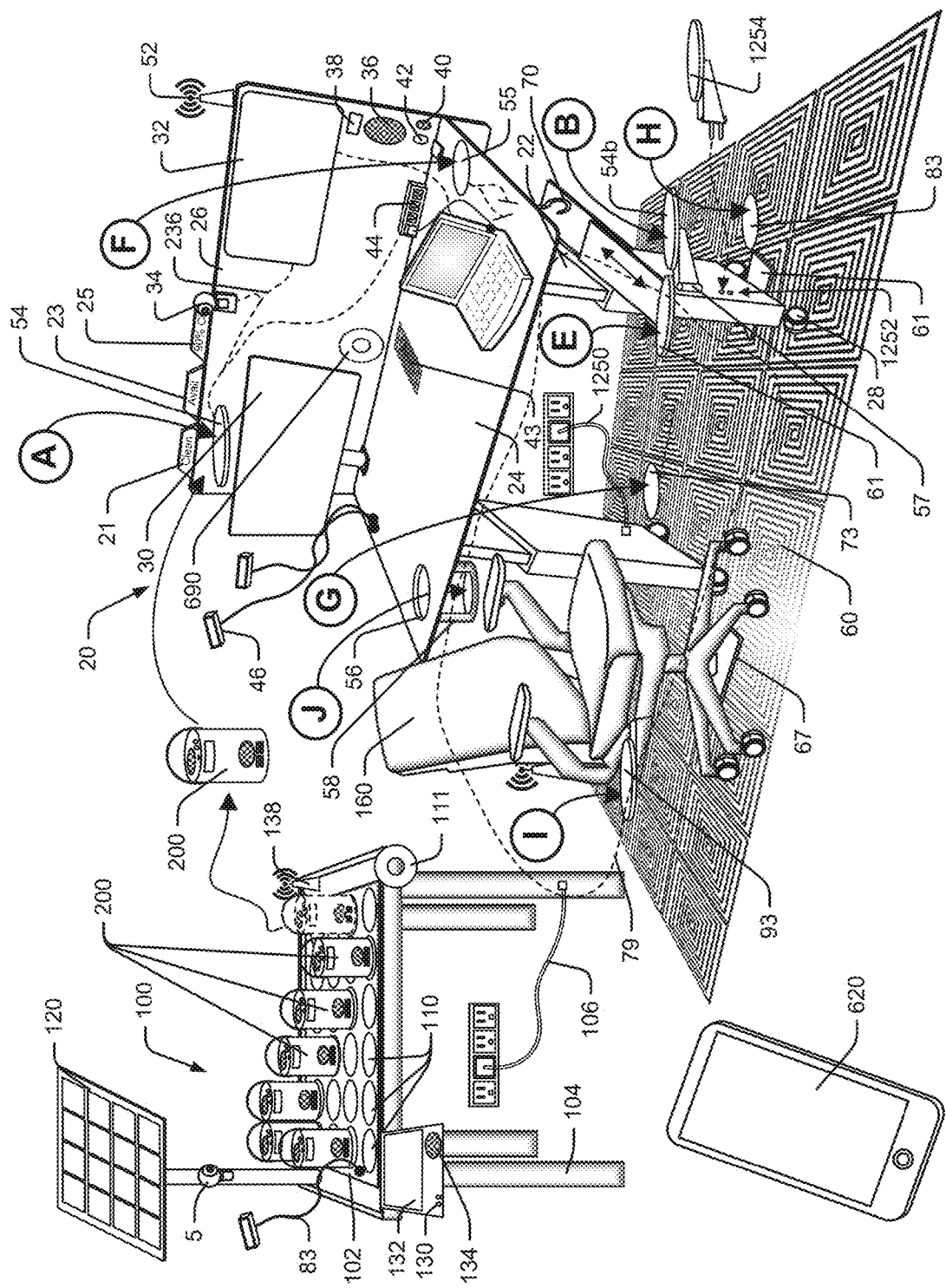
FIG. 3 is a view of an exemplary stationary battery charging station and an exemplary employee workstation that are consistent with at least some aspects of the present disclosure.

Referring to FIG. 3, exemplary workstation 20 includes, among other things, first and second telescoping height adjustable leg subassemblies 22, a horizontal worktop 24 mounted at the upper ends of the legs 22 and that forms an upper surface (also referred to by numeral 24) and a privacy screen 26 that is mounted along a rear edge of the worktop 24 which extends both downward and upward form the worktop height as illustrated. The workstation also includes several power consuming devices including a first display screen 30 mounted at a free end of an articulating support arm, a second display screen 32 mounted to a front surface of screen 26, a camera 34, a wireless (e.g., Bluetooth or other protocol) transceiver device 52, a speaker 36, a small display screen 38 and a microphone 40. In at least some cases the leg structures 22 will be height adjustable and, to that end, may include one or more electric motors for moving an upper leg member telescopically with respect to a lower leg member. Other power consuming devices are contemplated including but not limited to HVAC type devices (e.g., a fan, a heater, etc.), sound generators, light devices, personal assistant type devices (e.g., Alexa by Amazon, Google Voice by Google, etc.), various types of sensors 690 (see FIG. 3) (e.g., presence, temperature, motion, air flow, biometric, etc.), headphones, interface devices (e.g., a mouse, a track pad, etc.), and appliances (e.g., coffee makers, small ovens, toasters, etc.).

Workstation 20 further includes a power port subassembly 44 mounted near the rear edge of the worktop 24. While shown as a bank of four conventional power receptacles, subassembly 44 may include any of or a combination of standard power ports, USB ports, or other power connection ports for receiving different types of plugs for delivering power to laptop computers, tablet devices, appliances, etc. In other embodiments the port subassemblies may be provided at other useful locations including mounted to an undersurface of worktop 24 near a front edge (e.g., within ¼th to 3 inches), near a rear edge, near and facing a side edge, to one of the leg assemblies, etc. In some embodiments workstation 20 also includes power cables with end connectors 46 for connecting to other devices that need power. Here, the end connectors 46 may be any form known in the art and suitable to connect to a power consuming device or a cable that is associated with a power consuming device.

Workstation 20 includes at least one battery coupler assembly and a power distribution system for receiving power from a system battery and delivering power to the power consuming devices at the station. The present disclosure contemplates several different types of battery coupler assemblies including three general types. The first type is generally a surface type where a battery is placed on and supported by a horizontal worksurface such as, for instance, a top surface of shelf member 54 in FIG. 3. The second type is generally a hanging type where a battery is hung on a hook or the battery includes a hook that engages a surface at a workstation such as, for instance, as shown at location "H" in FIG. 11. The third type is generally a cavity type where a battery is partially or entirely received within a battery receiving channel at a workstation such as, for instance, as shown at location "J" in FIG. 11 (see also the cavity at location "J" in FIG. 3). In many cases an electrical coupling arrangement is integrated with the mechanical coupler arrangement so that when a battery is mechanically coupled to a workstation, electrical coupling also occurs. In other cases an electrical coupling mechanism is independent of the mechanical coupling mechanism. For instance, in some cases once a battery is mechanically coupled to a workstation, an electrical coupling cable at the station has to be independently connected to the battery to create the electrical coupling as shown at location "B" in FIG. 15.

While all options for coupling a battery to a battery charging station are not illustrated herein, it should be recognized that all the workstation mechanical and electrical coupling options described in this specification are also contemplated for use at any of the charging stations described herein. In most cases the charging station coupling assemblies will be similar to the workstation coupling assemblies so that the same battery coupling features are used in both environments. Thus, for instance, if a battery is received within a cavity for electrical and mechanical coupling at a workstation, system charging stations would include similar cavities for electrical and mechanical coupling.

The batteries can take several different forms. In some cases, all system batteries will have a single optimized form that is useable for powering any employee supporting affordance arrangement. For instance, in cases where exemplary affordance arrangements include five different arrangement types (e.g., workstation, personal harbor, telepresence arrangement, small group arrangement and chair), each arrangement may have the same battery coupling (e.g., mechanical and electrical) capabilities at a minimum so that a single battery having a single form factor can be used to provide power to any one of the arrangements. One advantage here is that employees needing power can simply grab one of the single form batteries, travel to an affordance arrangement, and connect the battery for power use without having to discern which of several different battery forms is required to power the arrangement. A second advantage here is that a single type of connection between each arrangement and a battery makes the system more intuitive. Thus, once a user understands how to connect the battery at one arrangement type, the user can do so at any of the arrangement types.

In other cases a power system may include two or more different battery forms where each has different power delivery capabilities (e.g., capacities, maximum instantaneous power delivery, etc.) and/or where each may be useable for different purposes. Exemplary batteries having a first form 20 are shown in FIGS. 3, 7, 8, 26, 27 and 33 as well as some other figures while batteries having other forms are shown in FIGS. 18 through 26, 29-34 and 37.

In some cases batteries with the same external form factor may have different power delivery capabilities (e.g., a second battery type may be capable of storing three times more charge than a first battery type). In some cases the electrical coupling features of batteries having different external form factors (e.g., different dimensions, shapes, etc.) may be identical so that, even though the batteries have different dimensions and/or shapes, each can connect to a charging station or a workstation or other affordance configuration in the same manner.

In some cases a battery may be equipped to couple to a workstation to discharge in more than one way. For instance, in some cases a battery may include a pair of electrical discharge contacts as well as a discharge coil where the contacts can be used to link to a workstation power delivery arrangement in a first way (e.g., via a pair of discharge contacts on the station) and the coil can be used to link to the workstation power delivery arrangement in a second way (e.g., via a complimentary coil integrated into the workstation).

In at least some cases the disclosed batteries can be coupled to a workstation or other affordance arrangement to provide power through a power distribution subassembly that is integrated into the workstation or, in the alternative, can be used independent of a workstation to provide power to directly coupled power consuming devices. Thus, for instance, in many cases in addition to including electrical coupling features for coupling to a workstation, a battery will include power output ports for connecting device plugs directly to the battery as shown at 210 in FIG. 15.

Figure 6:
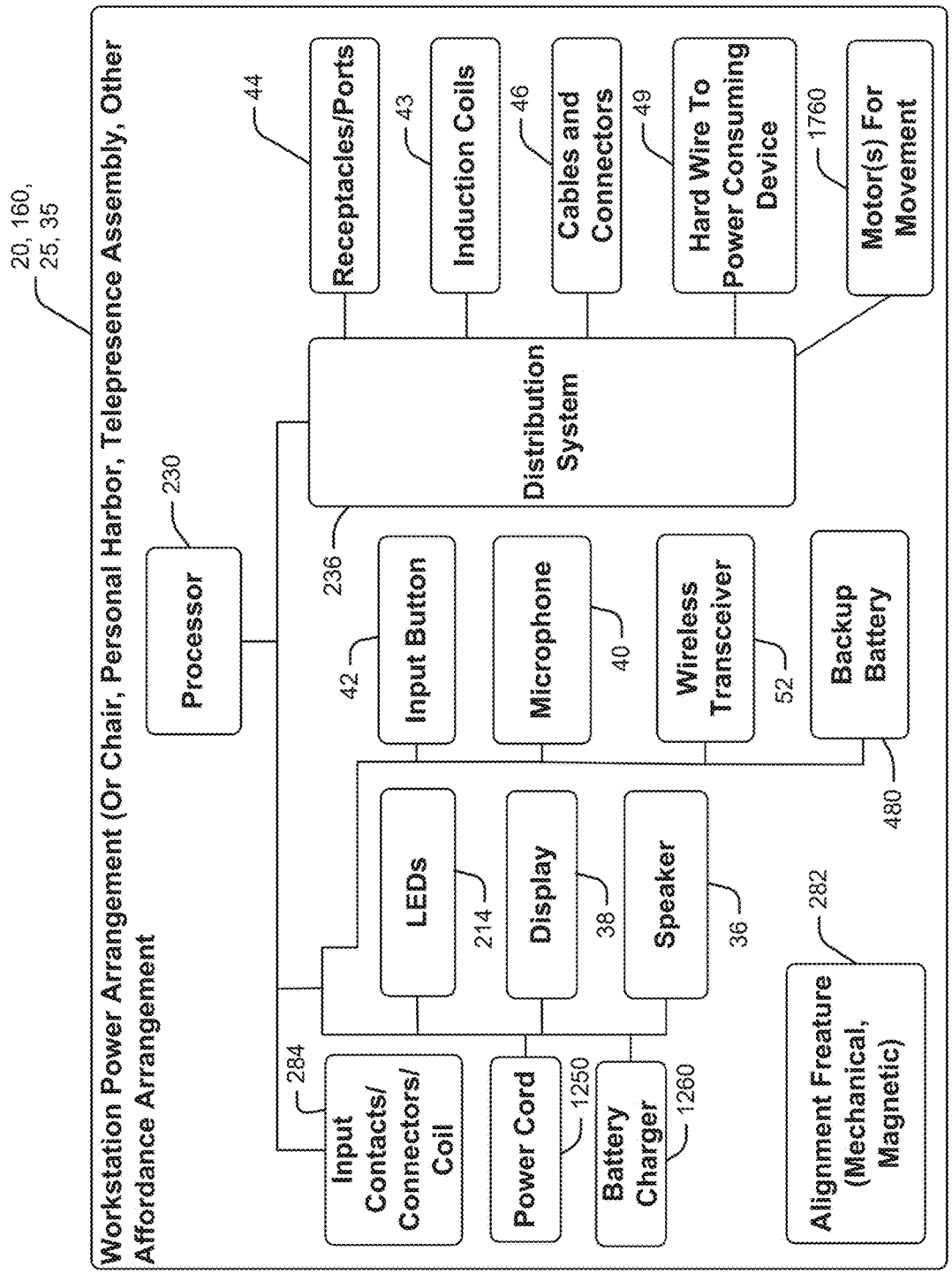
FIG. 6 is a schematic that illustrates components that may comprise a workstation of other affordance arrangement that is consistent with several aspects of the present disclosure.
Figure 9:
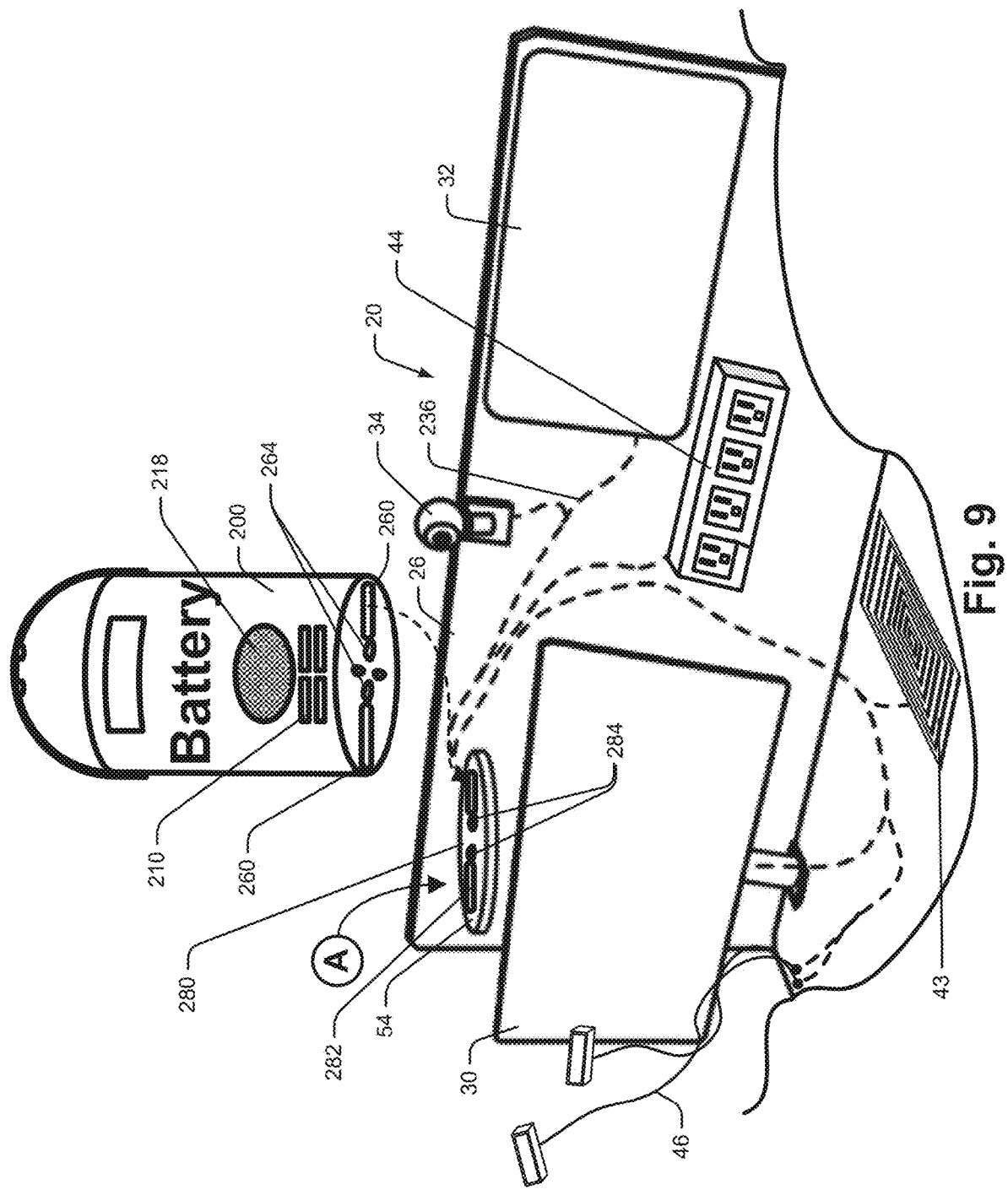
FIG. 9 is a view showing the FIG. 7 battery and a portion of an employee workstation.

Referring now to FIGS. 3 and 9, workstation 20 includes an exemplary shelf member 54 attached to a front surface of screen 26 where power coupling components are provided in an upper surface of the shelf 54 and a distribution system 236 links the coupling components to power consumption devices and components located at the station 20. Here, a battery may be positioned on the upper surface of shelf 54 at the location labelled "A" to link the battery to the distribution system 236. Referring also to FIG. 6, in some cases the power distribution system may include a processor 230 that performs various battery and power related methods and processes described hereafter. In other cases a battery processor may perform functions instead of or in addition to a station processor 230.

While FIG. 9 shows the distribution system 236 including wires or cables that extend from shelf 54 through the privacy screen, worktop 24 and the articulating screen support arm to power consumption devices, it should be appreciated that the distribution system in many embodiments will includes additional hard wired cables that extend through other workstation components such as the leg structures 22, other privacy screen arrangements, etc. Here, while the disclosure described a "power" distribution system 236, it should be appreciated that system 236 may also in some cases include some capability for data communication as well as electricity transfer. In this regard, in cases where a battery processor controls a speaker or LED that is integrated into a workstation for signaling battery charge state or providing some other battery related output, the battery needs to be connected to the speaker or LED to generate the output signals. In some cases system 236 will include both a power distribution system and a data link. In other cases battery 200 will include a Bluetooth or other wireless communication transceiver 221 (see FIG. 5) and the workstation 20 will include a similar transceiver 52 (see FIG. 6) so that the battery can communicate wirelessly with workstation devices.

Referring still to FIG. 3, in at least some cases workstation 20 may also include a power floor mat or other floor covering (e.g., carpet) 60 and a task chair 160. Where included, mat or floor covering 60 may include an electrical power distribution system for receiving power from a source and delivering that power to other station arrangements or devices as will be described hereafter. Chair 160 includes a supporting undercarriage, a seat, a backrest and arm subassemblies and, in at least some cases, includes power consuming devices or components to be described hereafter in more detail. In at least some cases the workstation table assembly power distribution arrangement may electrically couple to the distribution system in the mat and the chair distribution arrangement may electrically couple to the mat distribution system so that a single battery can provide power to any power consuming devices associated with the table assembly, the mat and the chair.

Referring again to FIG. 1, system 10 includes a wireless communication system represented by a plurality of wireless access points 90 that are spaced apart within the buildings that comprise the illustrated facility. Server 12 is operably linked to all of the access points for communication. The access points may be WiFi devices or may communicate via one or more other wireless communication protocols. Server 12 is also linked to database 14 where system software programs are stored as well as data that is needed to support various methods and processes that are performed by server 12. Although shown as a single server and a single database, it should be appreciated that in some cases the system may include two or more servers that cooperate to perform one or more disclosed processes and may include a plurality of different databases that store different programs and system data. For instance, in some cases one server 12 may be responsible for tracking and controlling battery delivery processes and may store battery requirement and location data in one database while a second processor monitors employee schedules via scheduling software and data that is stored in a second database. User interface 16 enables a system administrator to access system data and manipulate processes or settings as desired.

Referring again to FIG. 1, in at least some embodiments it is contemplated that a system server 12 may have access to third party data sets 7 that include data that may be used to perform various system processes and methods. For instance, in some cases where system batteries can be used in outside spaces (e.g., outside buildings on a campus), a system server 12 may use anticipated weather data maintained by a third party as a data set 7 to determine when battery charging carts should be maintained within buildings to avoid damage from rain or other precipitation. Similarly, a server 12 may be programmed to provide warnings to battery users about precipitation states, outside temperature or other conditions that may damage system batteries or affect battery operations to encourage battery users to avoid exposing batteries to poor conditions.

Referring to FIGS. 2 and 3, at a high level, systems consistent with the present disclosure include batteries 200 useable at employee workstations 20 (and other supporting affordance arrangements 15) to provide power to power consuming devices at those workstations to fully support employees within enterprise space at virtually any facility location irrespective of where within a facility hardwired power is available. Here, employees can rearrange facility affordances including workstations at will in at least some cases to accommodate social distancing rules as well as personal preferences without being restricted by pre-existing wired power delivery arrangements. To this end, rechargeable portable battery devices 200 can be picked up by hand and manually moved from charging workstations 100 that are located at different locations within the facility and carried to workstations 20 or other affordance arrangements at other locations for use.

Figure 4:
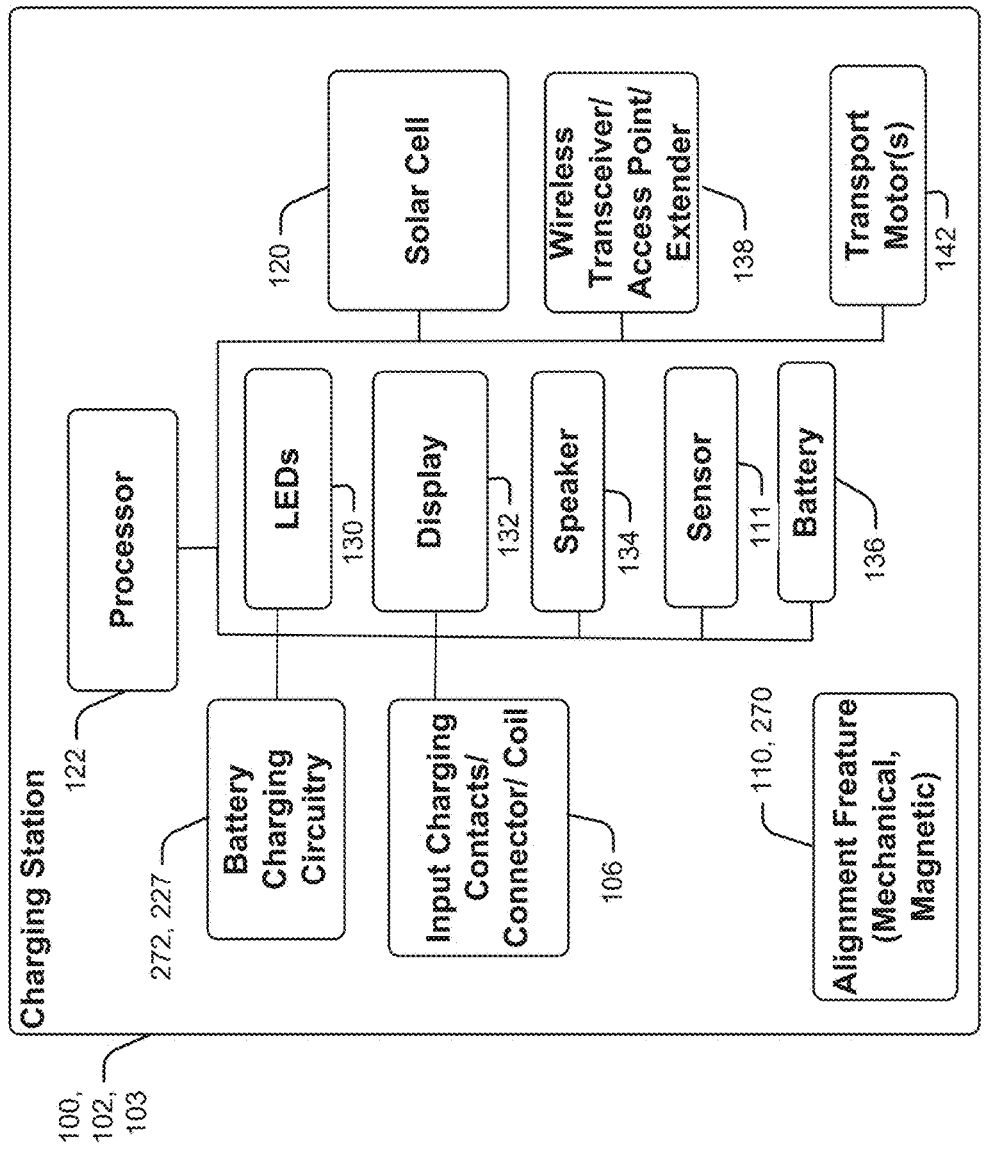
FIG. 4 is a schematic illustrating components that may comprise an exemplary charging station from FIG. 3 and component that may comprise exemplary manual mobile and automatic mobile charging stations described subsequently.
Figure 8:
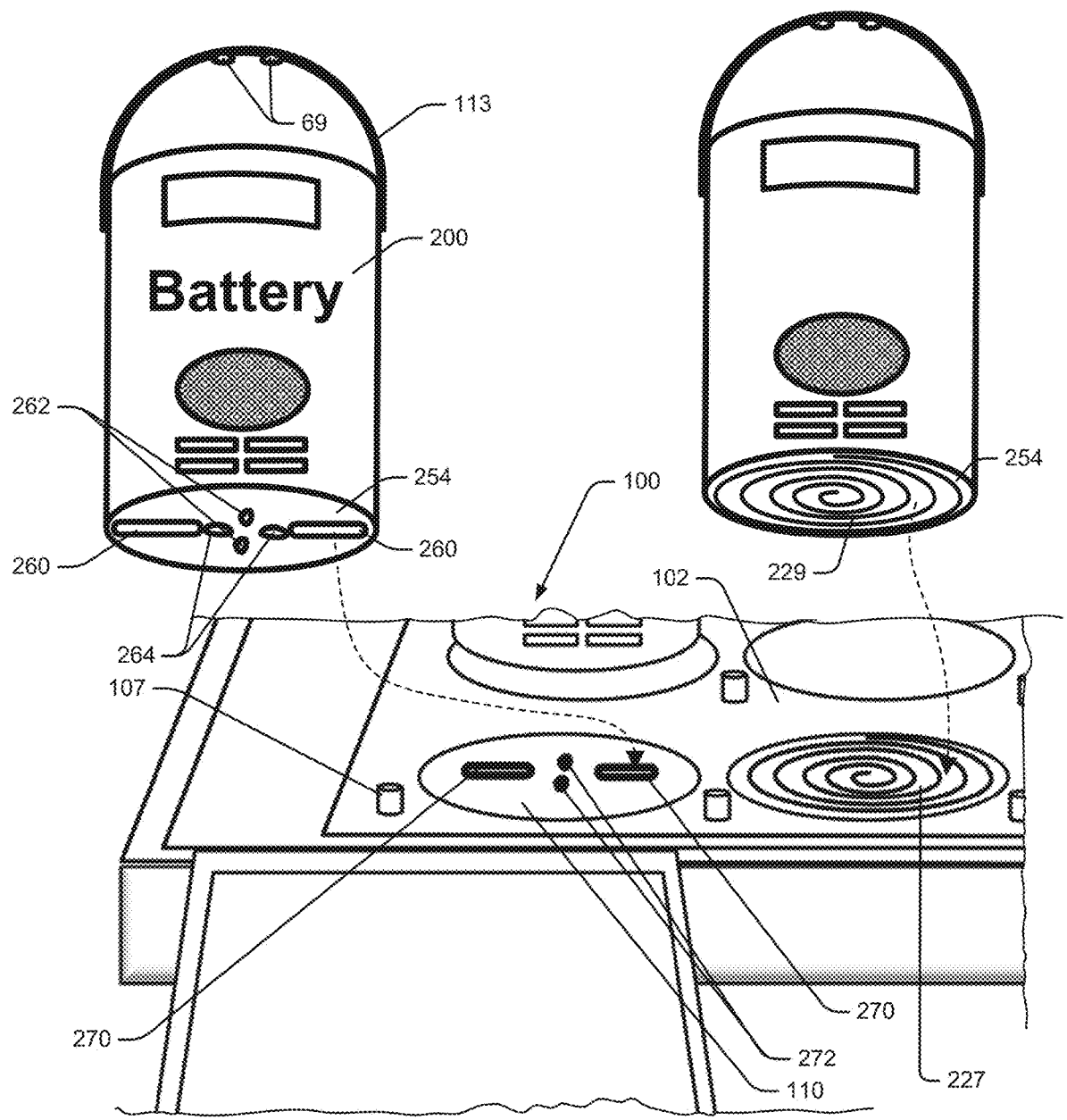
FIG. 8 is a view showing the battery of FIG. 7 and a charging station as well as a second battery type that includes an induction coil in an undersurface.

Referring now to FIGS. 3, 4 and 8, an exemplary stationary battery charging station 100 is illustrated that includes, among other things, a table assembly including a leg structure 104 that supports a horizontal member that forms a substantially flat top charging surface 102. In at least some cases station 100 includes a power cord 106 or other power linking arrangement that can be plugged into a standard wall receptacle to receive power from a conventional hardwired power transmission system. In some cases station 100 will include a solar cell 120 instead of or in addition to cord 106 for generating power to charge batteries that are connected to the charging system.

The station 100 includes some type of electrical charge coupling arrangement for electrically connecting batteries to the station during charging. To this end, in FIG. 8, at top surface 102, station 100 includes a pair of electrical charging contacts 272 for coupling to a similar pair of battery charging contacts 262 that reside on an undersurface 154 of an exemplary battery 200. Here, the contact type coupling arrangement requires batteries to be aligned with charging circuitry at surface 102 and, for that reason, in at least some cases, surface 102 may be provided with charging location indicia 110 to help employee's align batteries with the station charging circuitry. In some cases the indicia may simply include paint or a decal.

In other cases, surface 102 may include a mechanical recess or extending lip that defines each charging location for guiding battery placement so that charging circuitry aligns with a received battery on surface 102. In other cases mechanical alignment features that cooperate with features on an undersurface of a battery 200 may help an employee position a battery properly for charging at a station. In this regard, see ribs 270 in FIG. 8 that extend upward from surface 102 which cooperate with recesses 260 in an undersurface of a battery received in space 110 in at least some embodiments for aligning charging circuitry. See also that surface 102 includes exemplary charging contacts 272 which align with battery charging contacts 262 on the undersurface of battery 200 when mechanical ribs 270 are received in recesses 260.

In some cases, ribs 270 or recessed areas 260 may be replaced by magnets while the other of ribs 270 and recesses 260 are replaced by metal strips so that battery alignment with charging circuitry 272 can be affected more easily.

In at least some cases a system processor may indicate battery charging states by light devices, audibly via a speaker 134, or other sound generator, or in some other fashion via station 100 components. To this end, see LED light device 107 in FIG. 8 that may be illuminated a first color (e.g., green) when a battery associated with a charging location 110 is properly aligned with charging circuitry and is charging but may be illuminated a different color (e.g., red) or not illuminated at all when a battery is misaligned or not charging for some other reason. As illustrated, a different LED 107 is associated with each of the different charging locations 110 in at least some embodiments. In other cases a beep or voice message (e.g., "Battery properly positioned and charging.") may be presented via speaker 134 when a battery is properly positioned on surface 102 for charging and a different audible signal or voice message may indicate misalignment.

Figure 7:
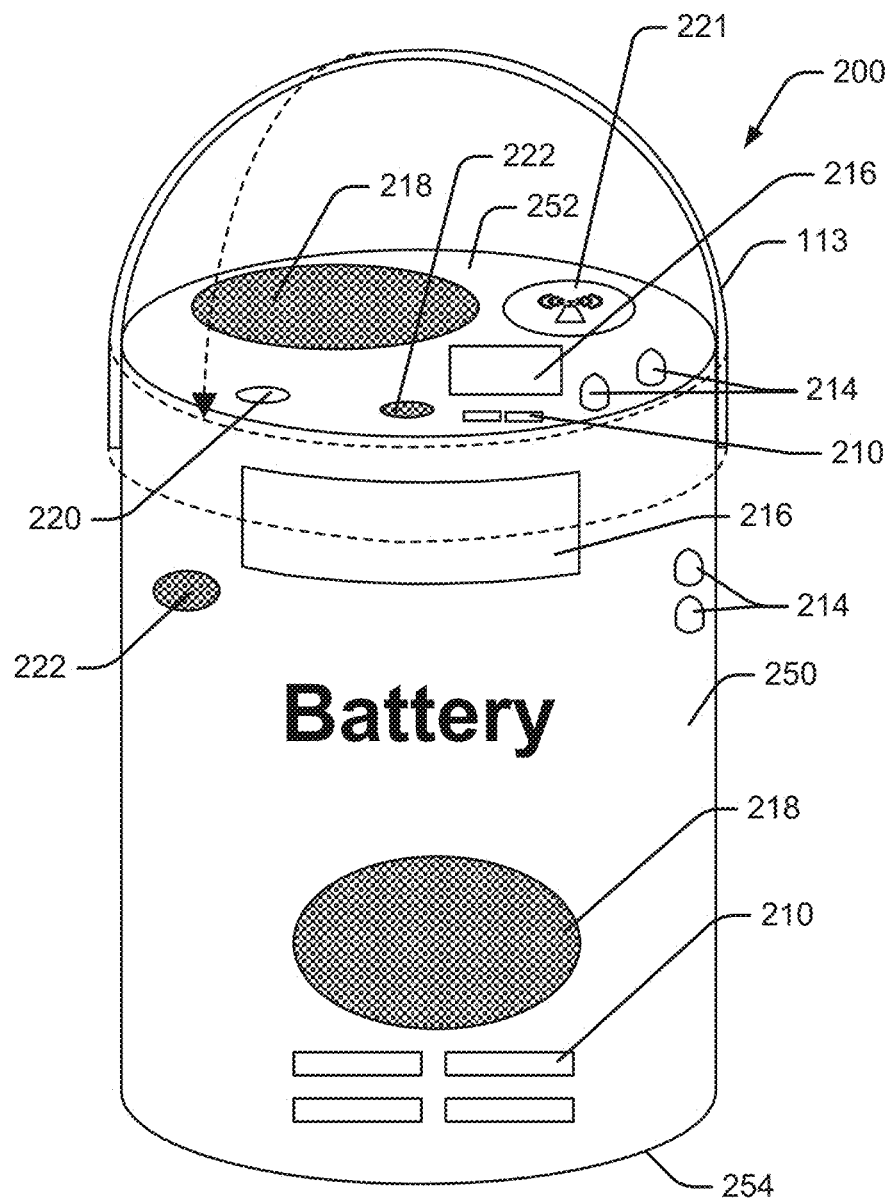
FIG. 7 is a perspective view of an exemplary battery having a first form factor.

As best shown in FIG. 7, in other cases each of the batteries 200 includes one or more LEDs 214 or other visual indicator devices (e.g., display screens) controlled to indicate charging state (e.g., green when charging, red or not illuminated when not charging). In some cases each battery may include one or more small, thin panel display screens (see 216 in FIG. 7) and a battery or other system processor may cause charging state messages to be presented on that screen. Each battery may be controlled to generate audible signals indicating charging or alignment states as well or instead of visual indications.

In at least some cases station 100 or battery devices 200 may be controlled to indicate charge status (e.g., charge % of maximum capacity) of batteries currently being charged. For instance, a charge level may be indicated by controlling an LED to illuminate green when a battery is fully charged or has been charged above some threshold level (e.g., 80%). As another instance, once a battery is charged to a level that should be able to provide power at a workstation for at least 6 hours under a typical or average load, a processor may illuminate an LED to indicate that condition even if the battery is not fully charged. In cases where an LED is controlled to indicating both charging state and charge status, the LED may be controlled at different times to indicate the state and status. Thus, for five seconds after a battery is first electrically coupled to a charging station, the LED may be green to indicate a charging state and thereafter the LED may indicate charge status (e.g., yellow when below a fully charged status and green thereafter).

In at least some cases a system processor may be programmed to identify one or a small subset of batteries from among a full set of batteries at a charging station that an employee should retrieve based on any number of factors and may suggest the one or small number of batteries to an employee to encourage specific battery selection. For example, where seven batteries are currently located on a top charging station surface 102, an LED associated with a battery that is most charged may be illuminated green while LEDs associated with all the other batteries are not illuminated or are illuminated red to visually distinguish a battery that an employee should take when a battery is needed. As another example, where three of seven batteries are fully charged at a station, LEDs associated with the three batteries may be lit green and the others yellow to indicate fully charged battery options. As yet one other example, in a more complex system, where an employee's schedule indicates that the employee will not be at a facility for more than 2 more hours, a processor may control an LED associated with a partially charged (e.g., 30% charged) battery to illuminate the LED green as the partial charge may be sufficient to meet the employee's anticipated power needs for the remainder of the employee's scheduled time at a facility.

In some cases the charging station may seek confirmation from an employee that the employee only needs power for 2 hours via a query presented on a charging station display 132 or via an audible query. The employee may respond via selection of a confirmation icon or virtual button on the screen 132 (in the case of a touch sensitive screen), via a hardware input button, or, in some cases where the charging station includes a microphone, via an audible response. In even more complex cases a system processor may apply other more complex rules when assessing which battery out of several on a charging surface 102 to "suggest" to an employee for use. For instance, rules related to past specific employee power use requirements, number of battery charging cycles associated with each battery at a station, current time of day, anticipated battery needs of other employees scheduled to be within a specific facility area, etc., may all operate as factors when determining which battery(s) to suggest to a specific employee.

As indicated above, in some cases, the charging station 100 includes a display screen 132 that can be used, among other things, to indicate battery charging states. For instance, in some cases charge percentages of different batteries may be presented on display 132. As another instance, an estimated duration of time that each specific battery will be able to power a typical workstation during normal use (e.g., under a typical workstation load) may be presented. In other cases a range of estimated power durations given light and heavy loading may be presented for each specific battery (e.g., 2-5 hours depending on load for a battery at 82% charge). In other cases where each battery 200 includes a display screen, charge percentage or estimated charge duration for each battery may be presented on the battery display screen.

In some cases station 100 includes a motion sensor 111 that can detect when an employee is located proximate the station within a sensing zone (e.g., within 3 feet of the station) and charge state information may only be presented when an employee is within the sensing zone proximate the station to conserve energy. A camera 5 (see again FIG. 3) may be provided as the sensor as well and may be provided for other purposes described in other parts of this specification. In other cases a more general employee location tracking system using access point data or data from facility cameras may be used to assess when an employee is proximate a charging station and a system processor may control the station to present charge state and status information when any employee is located near a station.

Referring again to FIG. 4, consistent with the above comments, exemplary station 10 includes, among other things, a processor 122, an input charging connector 106, battery alignment features 110, 270, LEDs 130, display 132, speaker 134, and sensor 111. Processor 122 is linked to other station 100 devices for controlling those devices per disclosed processes. In this regard, among other things, processor 122 may sense placement of batteries on the station surface 102 and removal of batteries from surface 102, charge percent of each battery as well as other battery conditions such as battery charging rate, a duration associated with most recent battery discharge, and may control battery charging to optimize overall. Thus, for instance, where there are several batteries at a station that are 100% charged and ready for use, the processor may be programmed to charge another battery at a relatively slow rate that is better for overall battery life expectancy than a fast charging process but where there are no fully charged batteries at the station, the processor may opt to charge a partially charged battery with a faster charging process despite effect on overall life of the battery.

As another instance, in some cases it is contemplated that different charging processes may be optimal for batteries at different stages in expected life cycles and processor 122 may be programmed to track specific batteries and use different charging processes for different batteries depending on battery age or other factors. Processor 122 may also control notifications or alerts to users related to battery charge states. Other components shown in FIG. 4 are described hereafter in the context of other embodiments.

Figure 36:
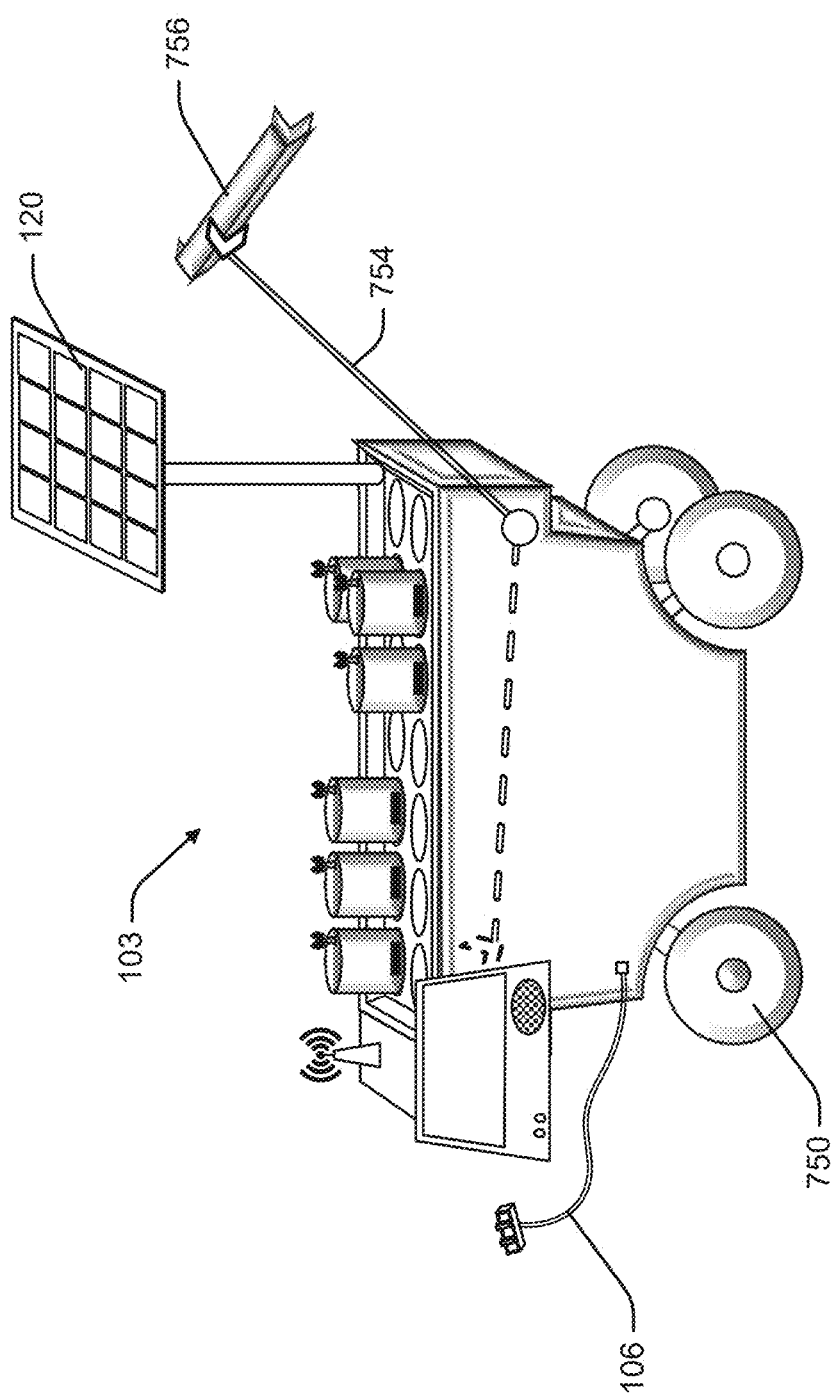
FIG. 36 is a view of an automated mobile battery charging station.

Charging connector 106 includes a standard power cable and wall plug so that station 100 can be connected to conventional wired power lines (e.g., a standard receptacle) within a facility. The charging circuitry may include two or more electrical contacts 272 as described above in some cases. In some cases a charging statin may also include a charging bar 756 (see FIG. 36), one or more induction coils 1012 (see FIG. 37) integrated into an ambient floor surface, and other charge coupling devices for charging other battery configurations as described hereafter.

Solar panel 120 is mounted above member 102 via a vertically extending leg member. Panel 120 collects sun light or other light and transforms that light into energy that is used to charge batteries that are coupled for charging to the station 100. Panels like panel 120 are known in the art and will not be described here in detail.

In at least some embodiments charging station 100 also includes a wireless transceiver for communicating with server 12 via access points 90 within a facility and, in some cases, with other system or personal computing devices. For instance, in FIG. 4 charging station 100 is shown to have a wireless transceiver 138 which may be a Bluetooth transceiver, an 802.11 transceiver, or a transceiver that operates via some other wireless communication protocol. Transceiver 138 may report battery charging state and charge status, identities of employees associated with specific batteries retrieved from the charging station, and other data and conditions to server 12 via the access points.

Transceiver 138 may also link to personal portable computing devices (e.g., tablets, cell phones, etc.) of employees to identify employees located proximate the station or that are performing battery swapping activities. In some cases battery state (e.g., charge %, estimated charge duration, etc.) may be transmitted via transceiver 138 to personal devices as well as text or audio messages for consumption by employees. For instance, in some cases, the charging station processor 122 may transmit a text message to an employee's smart phone or tablet device to be presented on a device display screen indicating "All batteries with a green lit LED are 100% charged", to encourage the employee to select a fully charged battery from the station as opposed to a partially charged battery. Other messages and instructions are contemplated.

In some embodiments, the transceiver 138 may also include or may instead be an access pointer a wireless repeater device useable to extend the wireless access system within space associated with the facility. Thus, for instance, in a case where an employee takes a battery outside buildings on a faculty campus where there is poor or weak wireless access, extender or point 138 may automatically link with other system components to extend wireless connectivity to the outside location.

In all cases where system messages are presented to an employee via a smart phone or other personal portable computing device, the personal device may be equipped to present the messages in any of several different ways. For instance, in some cases the system will simply rely on text, e-mail or other message services to provide battery related alerts and notifications to an employee via her personal device. In other cases, a battery application program may be downloaded to an employee's personal device where the application routinely operates while the employee is located within her employer's facility as part of the power management system. Here, battery related messages would be presented within an application program interface.

Figure 5:
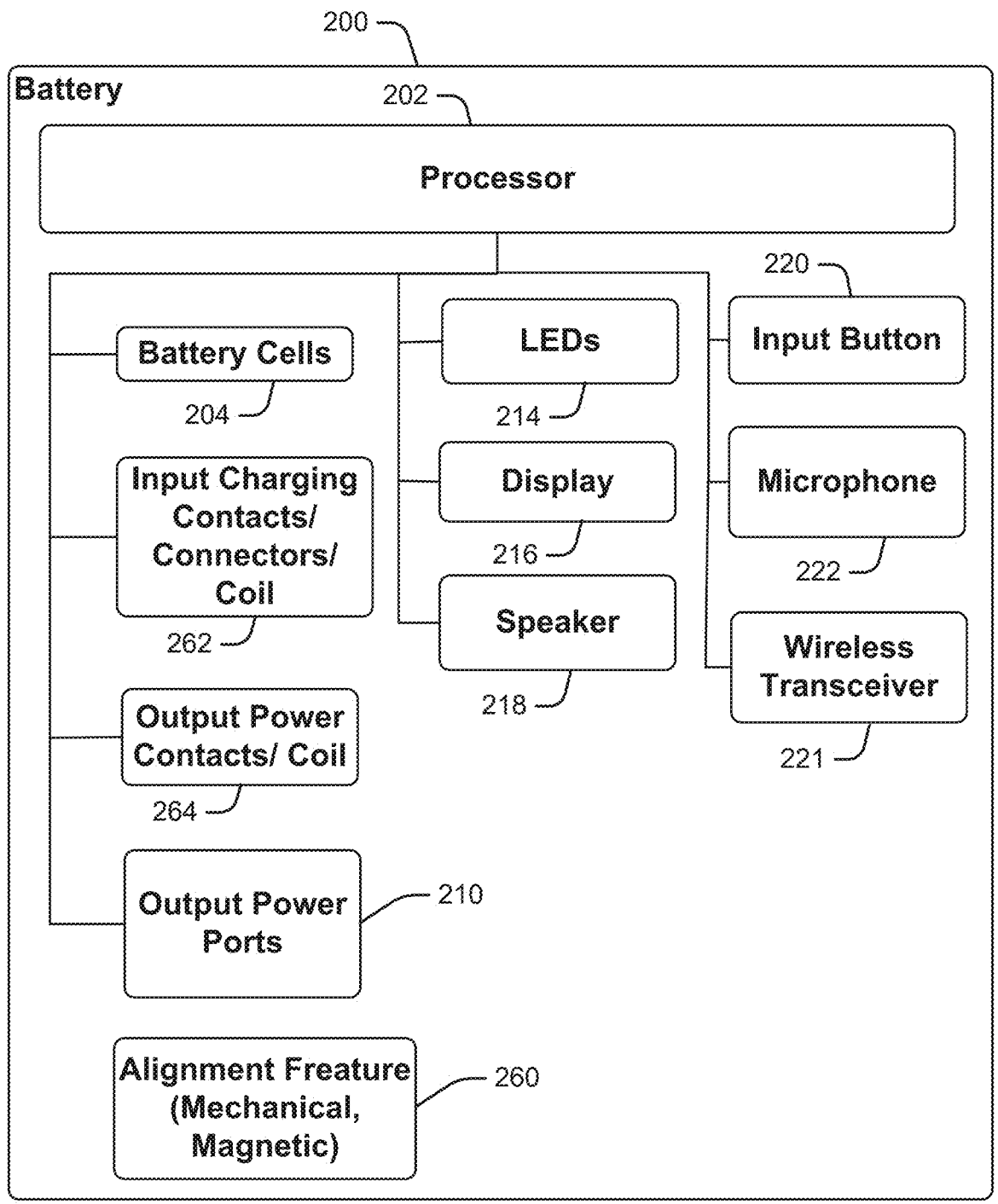
FIG. 5 is a schematic illustrating components that may comprise a battery that is consistent with several aspects of the present disclosure.

Referring again to FIGS. 3, 7 and 8 and also to FIG. 5, exemplary battery 200 includes an external housing structure 250 that is generally cylindrically shaped having top and bottom ends/surfaces 252 and 254, respectively, wherein the housing forms an internal cavity (not illustrated). Battery 200 includes a processor 202, battery storage cells 204, input charging connectors or contacts 262, output power contacts 264, and alignment features 260 (e.g., recesses or other mechanical features, magnets, etc.) as described above. In at least some cases battery 200 also includes output power ports 210 (e.g., USB, USB-C, others), LEDs 214 or other signaling light devices, one or more display screens 216, one or more speakers 218, one or more input buttons 220, one or more microphones 222 and a wireless transceiver 221.

In some cases the battery dimensions, shape, and weight are selected so that it is possible for most employees to pick up and transport the batteries by hand from a charging station to a workstation for use. In at least some cases batteries 200 will have a weight that is less than 20 pounds, less than 15 pounds, or in some cases, less than 10 pounds. In some cases a maximum battery dimension will be less than 2 feet and in particularly advantageous cases the maximum dimension will be less than 15 inches or even around 11 inches. Thus, for instance, the height of battery 200 may be around 15 inches and a diameter of the housing may be within a range between 2 inches and 12 inches.

The battery cells 204 can take any rechargeable form. In particularly advantageous cases the cells are lithium-ion cells which are known to charge quickly and which have the ability to store substantial charge in light weight packages.

Output contacts 264 are formed on undersurface 254 of the housing and are radially offset by 90 degrees with respect to the input charging contacts 262. Input contacts 262 are arranged to align with the charging station power contacts 272 as shown in FIG. 8 when alignment features 260 are aligned with the charging station alignment features 270. Similarly, battery output contacts 264 are arranged to align with workstation or other affordance arrangement input charging contacts 284 (see FIG. 9) when alignment features 260 are aligned with workstation alignment features 282.

Referring again to FIGS. 3, 5, 7 and 8, in the illustrated case, some power output ports are provided in the top battery surface 252 and some are provided in the cylindrical side surface of the battery housing. LEDs 214 are located on the upper and side surfaces, displays 216 are located in the upper and side surfaces, speakers 218, input buttons 220 and microphones 222, are each provided in the upper and side surfaces. The duplicate components in the illustrated example are provided so that the battery can be used in different receiving arrangements where at least one of the duplicative devices is optimally juxtaposed for use. In other embodiments the duplicative components may not be included. Processor 202 is linked to each of the battery components shown in FIG. 5 and is programmed to control those devices per processes disclosed herein.

Referring to FIG. 6, an exemplary simplified workstation power arrangement that may be provided as part of an employee workstation or other affordance arrangement is illustrated and includes a processor 230, input contacts or other power receiving components 284, a power distribution system 236, and power output components for delivering power to powered arrangement devices including but not limited to receptacles and power ports (e.g., USB and others) 44, induction coils 43 embedded in different surfaces, cables and end connectors 46, and hard wire connections to power consuming devices (e.g., display screens, cameras, speakers, microphones, workstation HVAC devices, etc.). Processor 230 is linked to the power receiving input contacts 284 and the distribution system 236 and regulates power use by power consuming devices located at the workstation. Here, power regulation may be on an entire workstation basis or may be on a device by device basis and may include reduced power or completely cutting off power to certain workstation devices. For instance, in the case of a workstation including a computer, a display screen and a light device, a reduced power or discharge state may call for turning off a light or reducing light output by 50%. In the case of the computer and display, reduced power consumption may cause the display brightness to be decreased or non-essential computer applications to be disabled. Other reduced power states are contemplated.

Input contacts 284 are arranged relative to the alignment features 282 so that when battery alignment features 260 are aligned with station alignment features 282, the contacts 284 are aligned with and make electrical contact with the battery contacts 264. Here, upon contact connection, the battery 200 is electrically coupled to the power distribution system 236 at station 20.

While separate charging and discharging battery contacts are described for receiving charge and providing power to a workstation, in other embodiments it is contemplated that a single pair of contacts may be provided that operate as input contacts while a battery is charging and output contacts when a battery is discharging to provide power to workstation or other arrangement devices. In this case, the charging station output contacts and workstation input contacts 284 would have the same arrangement relative to the battery alignment features and a switch within the battery would be controlled to change the battery between charging and discharging operating modes.

Figure 10:
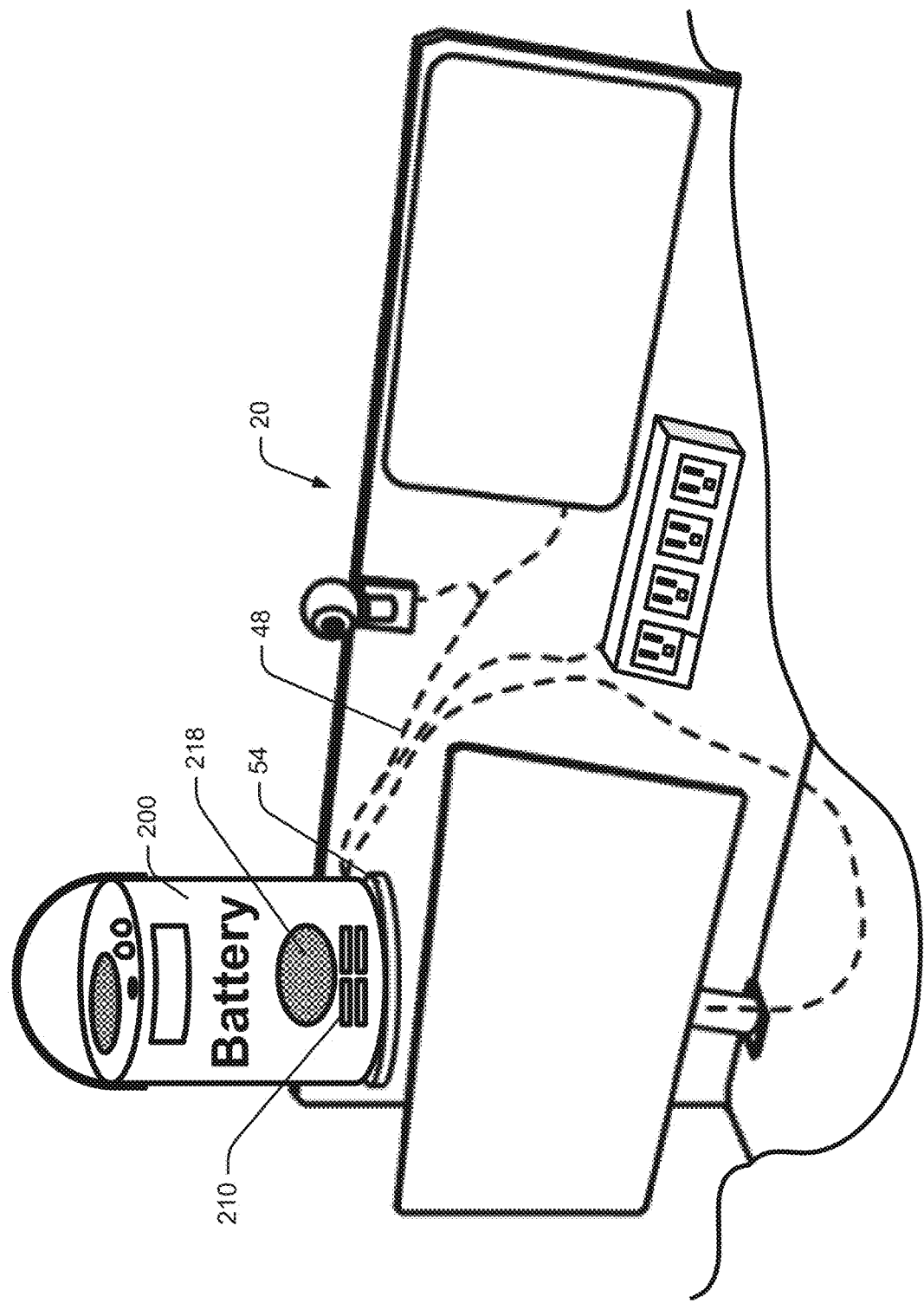
FIG. 10 is similar to FIG. 9, albeit where the battery resides on a battery support and coupling shelf.

In some cases where a battery includes input and output devices like speakers, LEDs, a screen, microphones and power output ports, it is contemplated that alignment features on the undersurface of the battery and the battery receiving surface may restrict the juxtaposition of the battery with respect to other workstation components so that those input and output devices are optimally arranged with respect to a user's typical location at the workstation. Thus, for instance, LEDs, displays, microphones and speakers should, in most cases, be positioned so that they or signals generated thereby are optimally perceivable by a station user and battery integrated buttons or selectable icons on a display screen should be positioned so that they are optimally accessible by the user. In FIGS. 9 and 10 for instance, alignment features 282 and 260 are located relative to station components so that the speaker 218 is facing a user zone adjacent a front edge of the workstation 20 where a station user would typically be located so that any sounds generated via the speaker are broadcast in an optimal direction. Similarly, output power ports 210 are arranged to face the user's location when a battery is properly positioned on a battery receiving shelf 54 with the alignment features aligned. In these cases, the input or output features face a user zone 79 (see FIG. 3) adjacent a rear edge of the worktop or tabletop member 24.

Referring again to FIG. 9, in some cases the workstation power distribution subsystem 236 includes power cables or wires that electrically connect the input power connectors either directly to power consuming devices at the workstation or to power output devices that the power consuming devices are linkable to. For instance, in some cases display screens 30 and 32 and camera 34 may be hard wired to the input connectors 284 or other battery coupling connectors and hard wires may also link to receptacles 44, to exposed extension cables and end connectors 46, to one or more charging coils 43 embedded in a worktop surface or other surface at station 20, etc. In at least some cases the distribution wiring may be integrated inside other station components or assemblies such as the support arm for screen 30, worktop 24 or leg assemblies 22. In other cases distribution wiring may be connected to hidden surfaces of workstation components such as the undersurface of worktop 24, a rear surface of the privacy screen, a back surface of a leg assembly 22, etc.

Referring again to FIG. 3, in at least some cases the distribution system 236 may extend from a workstation table assembly to a mat 60 there below and from the mat to a chair 160 and through the chair or other affordance that is also in electrical connection with the mat 60. To this end, see in FIG. 3 that a coupler plate 61 is provided on a bottom end of leg assembly 22 that is near or in contact with mat 60, depending on the type of electrical coupling supported. In some cases the coupler plate may include two or more electrical contacts on an undersurface that contact a similar pair of contacts in mat 60 to form an electrical charging circuit. In other cases it is contemplated that mat 60 may include a matrix of contacts and a plurality of switching devices that are controlled by a system processor to create an electrical circuit when a workstation 20 resides on the mat. To this end, a system processor may detect locations of the electrical contacts on the bottom of plate 61 and control the mat switches to connect a pair of the electrical connectors in the mat to the plate contacts to make an electrical connection.

In still other cases an induction coil may be provided on the undersurface of plate 60 and mat 60 may also include localized induction coils where one of the mat coils couples to the plate coil to form an electrical coupling. Induction type power transfer is well known in the electrical and charging arts and therefore will not be described here in detail.

Referring still to FIG. 3, a coupling plate 67 is shown mounted to and extending below chair 160. Here, in at least some cases plate 67 would have a similar construction to plate 61 at the bottom of the work table so that the chair power distribution system would couple to the mat 60 in a fashion similar to the way plate 61 couples to the mat. Thus, in at least some embodiments battery power may be distributed through the table distribution system 236 to mat 60 and from mat 60 to chair 160. Here, other affordance devices may also couple to the mat 60 via coupling arrangements like the one associated with plate 67.

Referring to FIGS. 3 and 6, workstation 20 may also include other input and output devices associated with the power system in at least some capacity including signaling LEDs 49, one or more display screens 38, one or more speakers 36, one or more input buttons 42, a microphone 40, and wireless transceiver 52. In at least some cases workstation 20 will further include a backup battery 480 provided primarily as a power source for power consuming devices at workstation 20 when no other power source is available. For instance, in cases where an employee disconnects a portable battery 200 from workstation 20 during a battery replacement activity, processor 230 may connect backup battery 480 to the power distribution system 236 to continuously provide power to station devices. As another instance, if a battery 200 inadvertently becomes disconnected from distribution system 236, the processor 230 would again connect backup battery 480 to system 236 to deliver charge to devices. In at least some cases it is contemplated that if a rechargeable battery 200 inadvertently or otherwise becomes disconnected from a workstation, a system processor would generate an alert or alarm signal to warn an employee of that condition so that the disconnect could be addressed. In some cases the backup battery 480 may have a charge capacity such that it can power station devices operating at a maximum discharge rate for up to an hour. In other cases the capacity may support maximum discharge for only a few minutes (e.g., 10-20 minutes) so that a battery swap would be required relatively quickly when a current battery charge is depleted.

Figure 46:
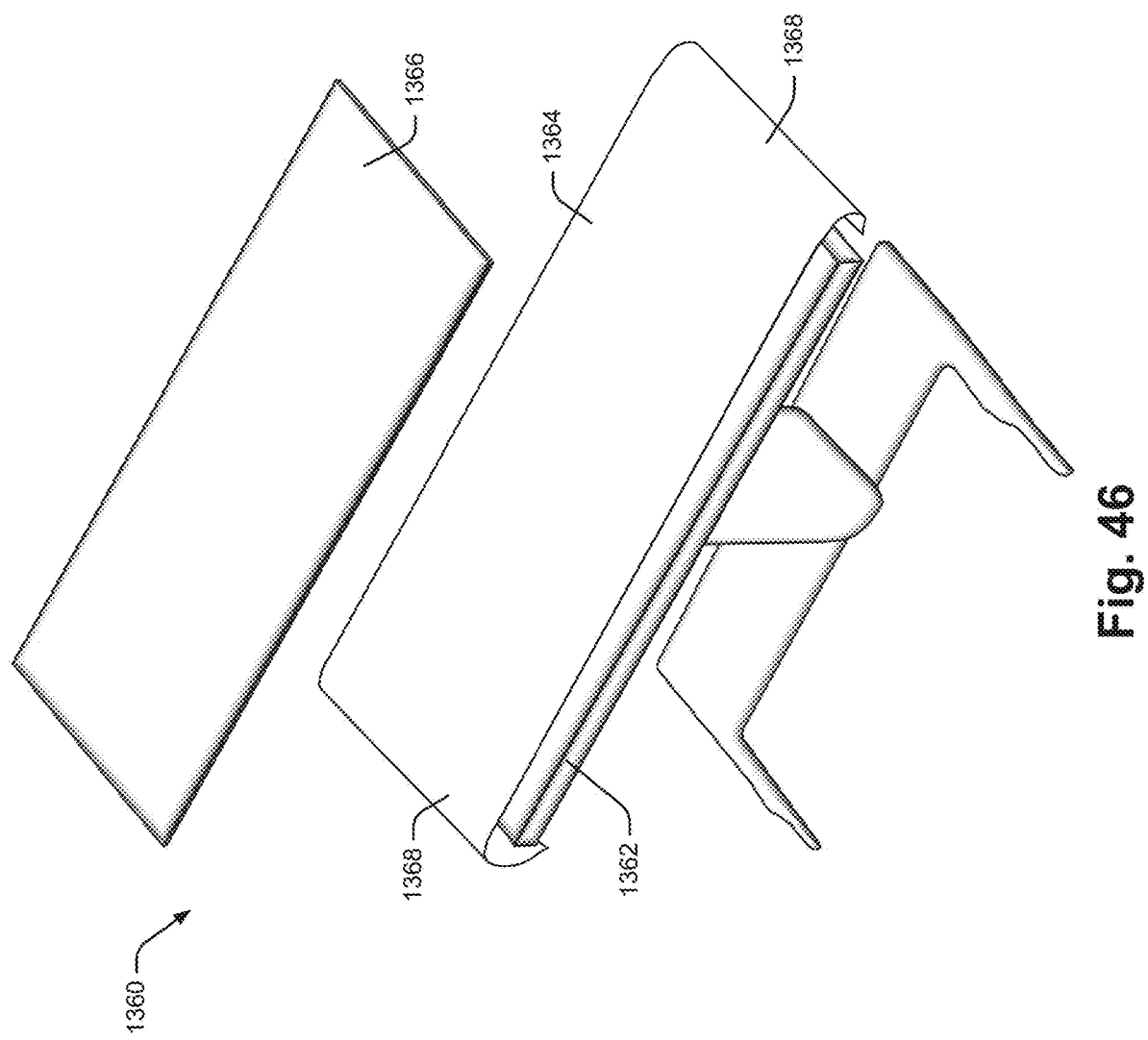
FIG. 46 is a perspective view of another workstation including an integrated sheet type battery subassembly.

A workstation backup battery need not be as accessible as the portable batteries 200 as backup batteries are intended for long term use and not to be routinely swapped. Thus, battery 480 may be relatively more integrated into the workstation 20 and need not have a form factor that is easy to carry. In this regard, see for instance FIG. 46 where another table assembly 1360 is illustrated that includes a tabletop 1362. Here, a backup battery is shown to take the form of a flat flexible sheet like member 1364 that may be adhered to or otherwise mechanically fastened to the worktop 1362 where the worktop offers rigidity to the battery assembly once installed. In some cases a top surface of the battery assembly will form the top surface of the table arrangement once installed and in other cases some other flat rigid and rectangular upper member 1366 formed of wood, plastic, metal, etc., may be adhered to the top surface of the battery assembly to sandwich the battery between other tabletop members. Because sheet 1364 is flexible, in some cases at least ends of that sheet may wrap around ends of a supporting top member as shown at 1368 in FIG. 46.

While workstation 20 is shown to include many input and output devices it should be appreciated that many of those devices are duplicative with similar devices described hereafter in relation to exemplary battery 200. While each of the batteries and the workstations and other affordance configurations may include all of the disclosed input and output devices, in other cases only the batteries or the affordance configurations may include each or a subset of the input and output devices and, in some cases, neither the batteries nor the affordance configurations may include one or a subset of the input and output device.

Referring again to FIG. 3, the electrical power coupler arrangement that is provided within shelf 54 at location "A" may be provided at other station 20 locations. To this end, see for instance the location labelled "B" (see also FIG. 15) where a shelf member 54*b* is mounted to an outward facing surface of a lower stationary leg member that forms part of the leg subassembly 22. In this case, a battery on shelf 54*b* would reside below the top surface of the worktop 24 so that battery would not obstruct use of the worktop space. In addition, because the battery would be supported by the lower leg member that does not move upward during height adjustment, battery support would be relatively stable. In other embodiments (not shown), the battery shelf may extend from the upper moveable leg portion of the leg assembly so that the shelf and a supported battery would move up and down with worktop 24 as the height of that top is changed per user preferences. In FIG. 3, shelf 54*b* is provided near a front end of the leg assembly 22 so that a supported battery resides below a front half of the worktop 24 and is easily accessible by an employee adjacent a front edge of worktop 24. In some cases shelf 54*b* may be mounted via a vertical pivot at 57 so that the shelf 54*b* can be rotated forward to provide even better access to a supported battery and rearward into a more concealed storage location fully under the worktop 24.

While not shown, in some cases a shelf may be mounted to an inside surface of the lower leg member. In some cases the shelf may be mounted near the rear end of a leg member below the rear half of the worktop 24. In some cases a battery supporting shelf may be mounted to the outward facing surface or the inward facing surface of the upper moving leg member and may be located below the front half or the rear half of the worktop 24.

Figure 15:
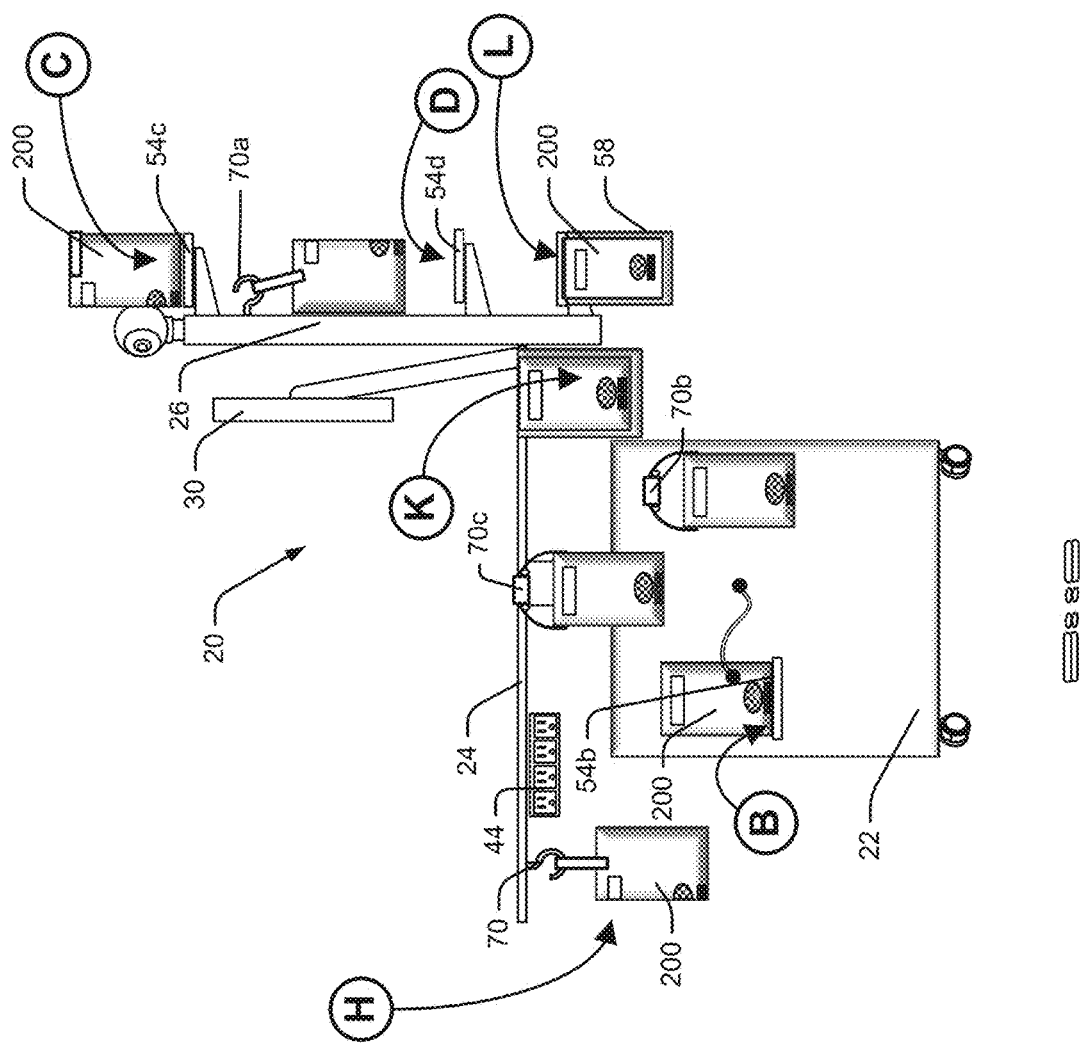
FIG. 15 is a view showing a workstation with batteries attached or coupled in several different ways at several different locations.

Referring to FIG. 15, in still other cases a shelf 54*c* may be mounted to a rear surface of screen 26 and near an upper edge of the screen as shown at location "C" so that at least a portion off the battery extends upward to a height higher than a top edge of the screen 26. In other cases the battery may not extend up above the highest screen edge height. In other cases a shelf 54*d* may be mounted to a rear surface of screen 26 and near a lower edge of the screen as shown at location "D".

Referring again to FIG. 3, a slidable shelf 61 may be mounted to leg assembly 22 below worktop 24 with a battery receiving member as shown at location "E". Here, a charging coupler is integrated into the shelf 61.

Instead of providing a separate shelf 54 for supporting a battery, an electrical charge coupling device may be integrated into an existing workstation surface for supporting and electrically coupling to a battery. To this end, see for instance the location labelled "F" in FIG. 3 where alignment indicia (e.g., ink or a decal or the like) is positioned on a portion of the upper surface of worktop 24 near a rear right hand corner of that surface. Here it is contemplated that a pair of electrical contacts akin to the contacts 284 (see again FIG. 9) and perhaps mechanical alignment features would be provided at 55 for forming a charging circuit with a battery places at location F. Here, location F may be selected to leave worktop 24 generally clear for use and also opposite the articulating screen supporting arm to limit obstruction of arm rotation or other movement.

In at least some cases it is contemplated that an electrical battery coupling assembly may be integrated into mat 60 or some other arrangement component that is electrically coupled to other components at the workstation 20. For instance, in FIG. 3 it is contemplated that where mat 60 includes an electrical contact matrix and switches, a battery could be placed anywhere on the top surface of the mat to create a charging circuit. In some cases indicia or other mechanical battery alignment features may be provided (see locations "G" and "H" in FIG. 3) on the top surface of the mat 60 akin to those described above with respect to the charging station 100. Here, power would flow from the battery to the mat and from the mat through plate coupler 61 to the table assembly and power consuming devices.

As another instance, a charge coupling shelf 93 may be provided on chair 160 as illustrated where a battery placed on that shelf at the location labelled "I" is coupled to mat 60 and the workstation table assembly via contacts or other coupling mechanisms.

In other cases the charging circuitry will include separate wireless induction coils 227 (see FIG. 8) located at each of the charging locations 110 and each battery will include a complimentary charging induction coil (see 229 in FIG. 8) in an undersurface for inductively coupling to the charging coil 227. In still other cases it is contemplated that the charging surface 102 may include a single large induction coil that is couplable to a plurality of charging coils in the batteries so that each battery can couple to the charging station irrespective of where the battery is positioned on the charging station surface 102. In still other cases, while not shown, it is contemplated that power cables may be provided at a station 100 where employees are expected to plug a cable into a battery to charge the battery at a station. Other charge coupling arrangements are contemplated.

The batteries 200 described above include a pair of charging contacts on an undersurface of the battery housing. In some embodiments it is contemplated that the contacts may be formed in a side surface of the housing instead of in the undersurface and in that case, the charging station and workstation contact pairs would have to be formed in a different vertically upright surface to make contact with the battery contacts when a battery is received at the station for charging or discharging. Here, the battery would likely be received within at least a shallow recess so that the recess surface would restrict battery location and hold the battery contacts against the station contacts to form a circuit.

The present disclosure contemplates other electrical coupling arrangements between the battery and the charging stations and the battery and a workstation or other affordance arrangement. For example, in some cases a charging station may include a plurality of charging cables (see 83 in FIG. 3) where each battery includes a charging port for receiving a plug at the end of one of the cables 83 for charging purposes. In this case, one of the cables 46 at a workstation 20 may also connect to the charging port on the battery for discharging purposes.

As another example, instead of having contacts on the undersurface of each battery, each battery may include an integrated induction coil in the undersurface of the battery housing. To this end, see for instance, FIG. 8 where an induction coil 229 is provided at undersurface 254. In this case charging stations 100 and workstations 20 would also include one or more inductive coils for coupling to the battery for charging and discharging operating modes. In this regard see for instance the charging station coil at 227. Alignment indicia or mechanical alignment features may be included at the charging station.

No coil is shown in the workstation surfaces but a coil could be integrated into any one of the horizontal surfaces provided by the shelves (e.g., 54), worktop 24, or other affordances. In addition, where a coil is provided in a side surface of the battery housing, a coil may be provided in a vertical surface provided at the workstation arrangement so that the battery coil would be placed proximate the station coil when the battery is supported at the station. Here, it is contemplated that alignment indicia would be provided at the battery receiving location(s) at the workstation to help an employee align a battery with the discharging coil at the station. Again, in some cases there may be a recess or extending lip about the battery receiving location to help with coil alignment.

In still other cases a matrix of switches and contacts or conductors may be provided within the top surface 102 at the charging station 100 (see again FIG. 8) where a station processor detects location of contacts 262 when a battery is placed on surface 102 and controls the switches to create a charging circuit between the station 100 and the battery 200. In this way, irrespective of where a battery is placed on surface 102, the processor would create a charging circuit. Similarly, here, a matrix of switches and contacts or conductors may be provided within the top surface of worktop 24 or in another workstation surface where a workstation processor detects location of contacts 264 when a battery is placed on surface 24 and controls the switches to create a charging circuit between a battery 200 and the station 24. Other charging and discharging coupling arrangements are contemplated.

Instead of placing a battery on a supporting surface at a charging station or at a workstation to mechanically and electrically couple to the station, in other embodiments it is contemplated that a battery may be hung from a hook or other mechanical component at a station where the hanging mechanism includes contacts or some other electrical coupling arrangement (e.g., a coil) that couples to the station for power delivery (e.g., charging or discharging). To this end see again FIG. 8 and also FIGS. 11, 15 and 16 where battery 200 includes a handle 113 that is useful for carrying the battery 200 between a charging station 100 and a workstation 20 for use. As shown, handle 113 includes a charging coupler in the form of first and second electrical contacts collectively labelled 69 which are connected through the handle via a wire 119 to other battery components. A hook 70 is mounted to the undersurface of worktop 24 (see also FIG. 3) where the hook includes coupling contacts 117 (only one shown in FIG. 16) on an upper surface of a hook arm where the contacts 117 are arranged similarly to the battery handle contacts 69. When handle 113 is hooked on hook 70, contacts 69 and contacts 117 are aligned and form an electrical coupling. While not shown, it is contemplated that a similar hook arrangement could be provided at a charging station 100.

Figure 11:
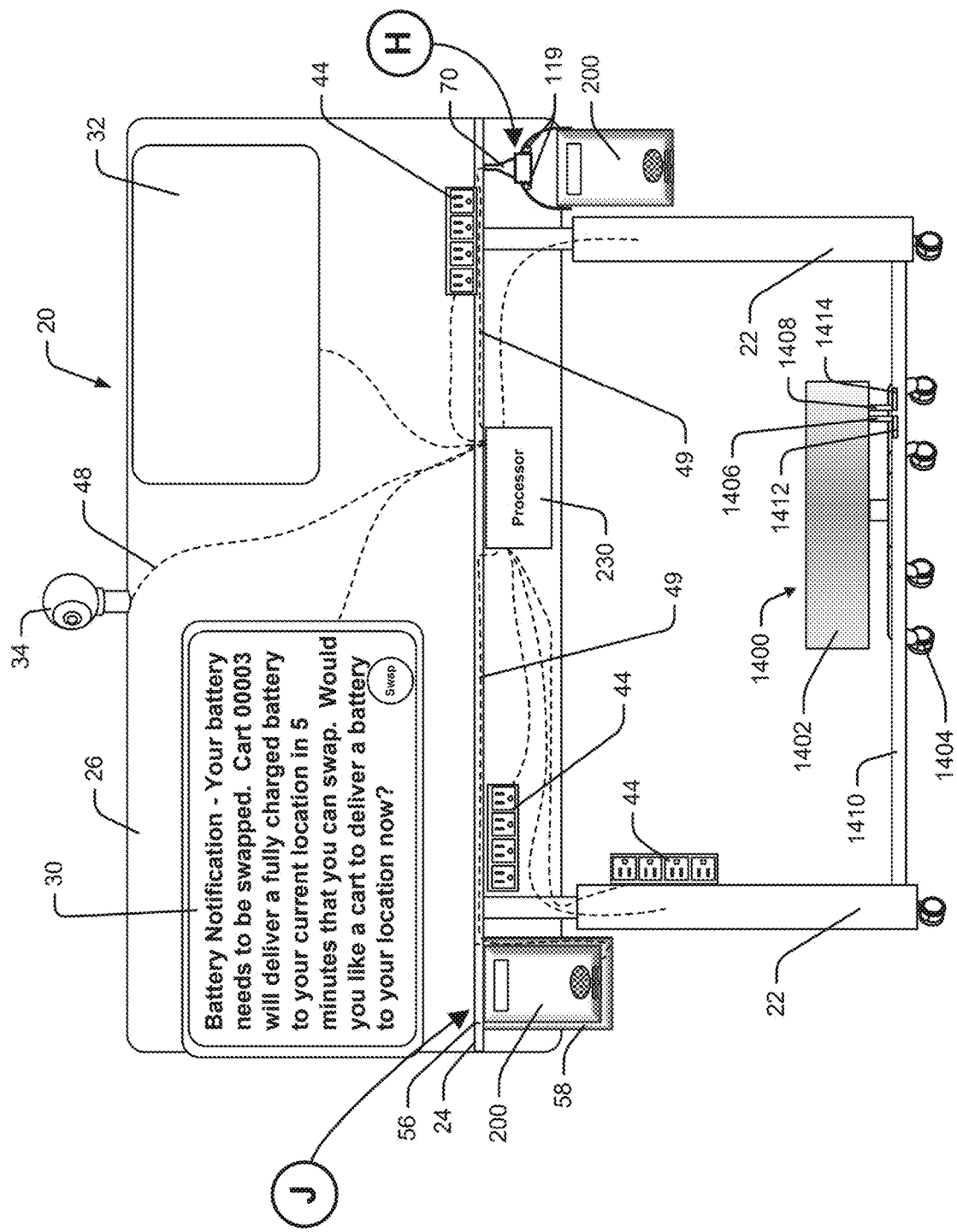
FIG. 11 is a front view of another workstation with several different battery arrangements mounted thereto.

Referring to FIG. 11, in some cases mechanical restricting members or ribs 119 may be formed on handle 113 that interact with side edges of the hook 70 to align handle contacts with hook contacts and ensure a good electrical connection and to avoid inadvertent disconnection.

In FIGS. 3, 11 and 15 the hook 70 is located near the front right edge of the worktop so it is handy for attaching a battery 200 from adjacent a front edge of the worktop 24. Once a battery is hung on hook 70, battery components like the side LEDs, side screen, speakers and input buttons are located just below the front right edge of the worktop 24 so that a user can best perceive signals generated by the battery processor and access input buttons when needed. In particularly advantageous cases the battery is dimensioned and the hook placed such that the battery does not extend laterally past the right edge or forward past the front edge of the worktop to reduce the likelihood that someone will inadvertently bump a battery hung on the hook and so that the battery does not interfere with other affordances adjacent the workstation. In other embodiments the hook 70 may be attached to the undersurface of worktop 24 at other locations like adjacent a rear edge and/or a side edge of the worktop 24.

Referring again to FIG. 15, the hook may be attached at other locations to the workstation components including, for instance, the front or rear surfaces of screen 26 (see hook 70a attached to the rear surface), to the inward facing or outward facing surfaces of the leg assembly 22 (see 70b attached to the outward facing surface), to a front edge, rear edge or side edge of the worktop 24 (see 70c attached to a side edge in FIG. 15), to different locations along the length or width of any of the edges, etc., including from a front half of an edge, a front quarter of an edge, a rear half of an edge, a rear quarter of an edge, etc.

Other battery receiving arrangements at a workstation may form a cavity or partial cavity for receiving at least a portion or essentially all of the battery 200 upon coupling. For instance, in FIG. 3 and also FIG. 11 see opening 56 formed in the left front corner of worktop 24 where a battery receiving basket assembly or housing 58 is attached below opening 56 for supporting and electrically coupling to an inserted battery at location "J". Referring also to FIG. 7, exemplary battery 200 includes flat top surface 252 and various input and output devices that are essentially flush with top surface 252. In at least some cases battery 200 is dimensioned such that when fully inserted into a battery receiving opening 56, the top surface 252 is substantially flush with a top surface of worktop member 24 and surface 252 has a shape that is circular to substantially fill the entire opening 56. In this regard see also FIGS. 13 and 14 where top surface 252 is flush with the upper surface of tabletop member 24. Thus, once installed, the input and output devices at surface 252 are accessible from above.

Figure 13:
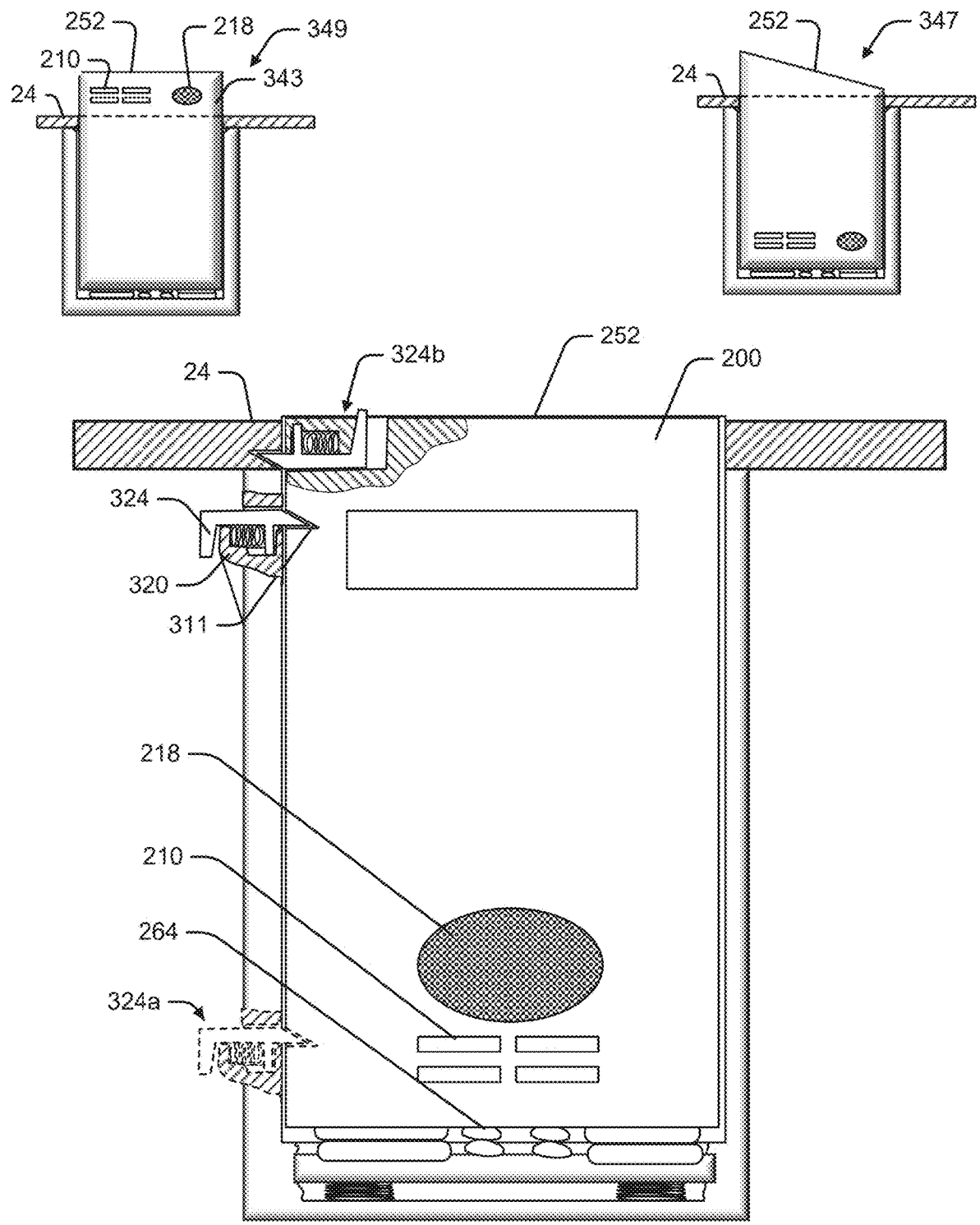
FIG. 13 is similar to FIG. 12, albeit where the battery is inserted and latched in place, FIG. 13 also shows two other embodiments as small representations to show other contemplated battery and coupling features.

Referring still to FIG. 13, basket 58 is mounted to an undersurface of top 24 generally below opening 56 and is designed to receive and support an inserted battery 200 and to make electrical contact with the battery output contacts 264 for power transfer. Alignment features 308 and electrical contacts 310 akin to those described above in the context of the battery supporting shelves are provide within a cavity formed by the basket 58. In at least some cases it is contemplated that basket 58 may have a floor member and side wall members that define one or more large side openings so that once a battery is inserted into the basket, input and output devices on the side surface of the battery are accessible through the openings under the worktop 24. Thus, for instance, see in FIG. 13 that connection ports 210 and speaker 218 are exposed through one of the basket side openings below worktop 24. In other cases microphones, displays, and other input and output devices are exposed through the basket windows or openings.

In cases where battery input and output devices are exposed laterally through basket openings, the battery may not include input and output components in the upper surface 252. Here, when the battery is placed within the opening 56, the top surface 252 may be flush with the top surface 24. In at least some cases there may be a seal placed around the rim of opening 56 or around the lateral edge that forms surface 252 so that once the battery 200 is installed in opening 56, there is a liquid seal about the edge.

Figure 12:
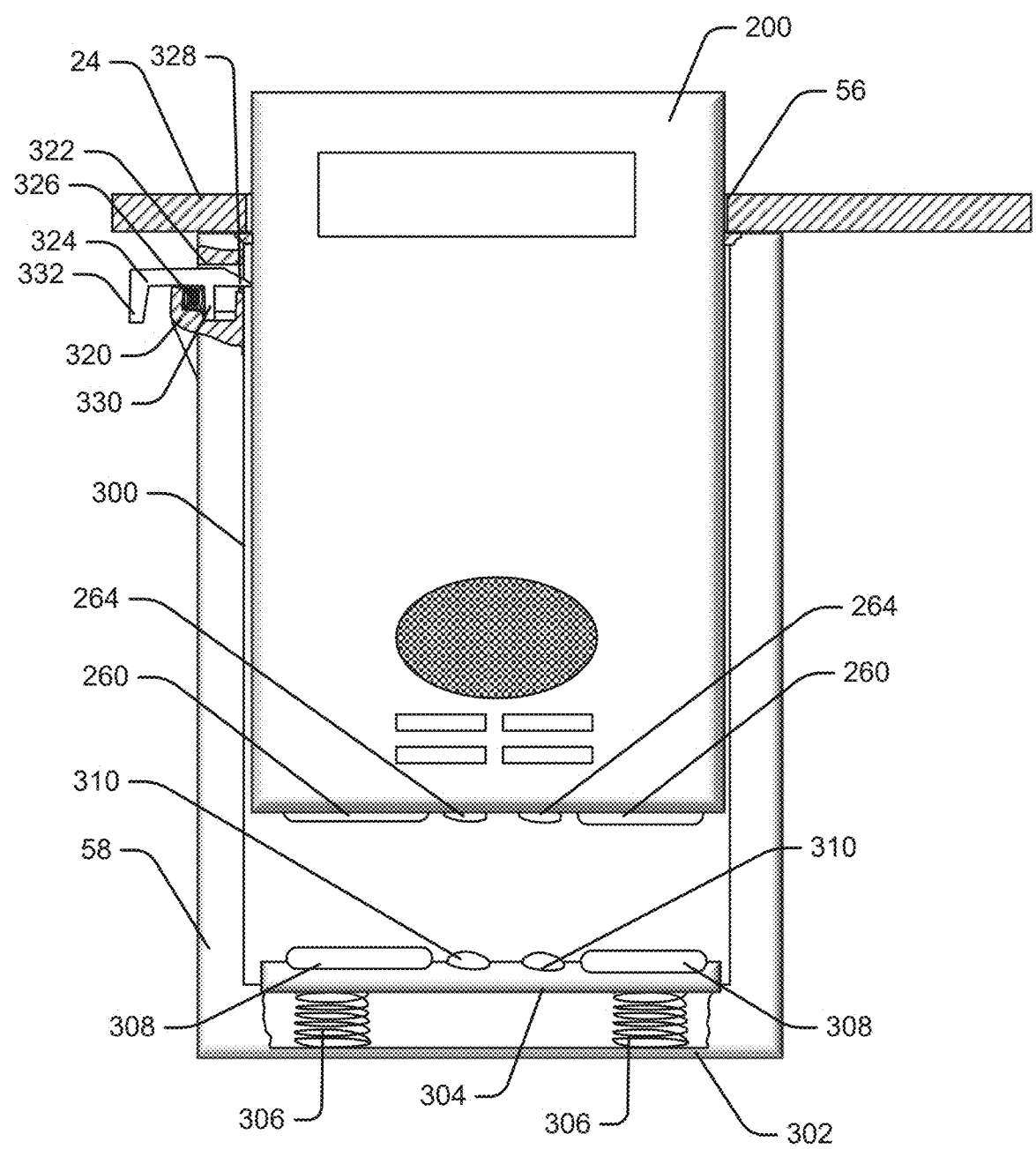
FIG. 12 is a partial cross sectional view of a battery partially inserted into a cavity formed by a battery receiving basket assembly.

In some cases the battery housing 250 may include a coupling mechanism that cooperates with a second coupling mechanism on the basket 58 or other battery receiving assembly that can lock the battery within a receiving opening 56 until intentionally removed. For instance, in FIG. 12, a latch 324 is located near the upper end of one of the basket 58 side walls which cooperates with a slot or opening 311 in a side surface of housing 250 to secure an inserted battery within the basket. Latch 324 includes an elongated arm member with two downwardly extending fingers 330 and 332 which is mounted within an opening 326 in the basket wall where a spring 320 urges a distal end 328 of the latch into the cavity 300 formed by the basket and into the opening 311 formed by the battery once a battery is placed within the basket. As shown, a plate 304 is located near the bottom of the basket cavity and is biased upward via springs 302. Alignment features 308 and contacts 310 are located at the top surface of plate 304. When a battery 200 is installed, the battery presses down against the force of springs 302 until latch 324 locks the battery in place with battery contacts and the plate contacts 310 in contact so power can be delivered to the station devices.

In operation, when a battery 200 is slid down through opening 56 a lower edge contacts the distal end of latch 324 and forces the latch against the force of spring 320. Once the battery 200 contacts plate 304 and is pushed down further, springs 306 compress until latch 324 is aligned with opening 311 (see FIG. 13) at which point spring 320 forces the distal latch end into opening 311 to secure the battery 200 within the basket 58. At this point the upper surface 252 is flush with or slightly proud of the top surface of tabletop member 24 and contacts 264 are in contact with plate contacts 310 so power delivery to the workstation can commence. To remove the battery 200, a user simply pulls on the latch finger 332 until the distal end of the latch is removed from opening 311 at which point springs 306 uncoil and push the battery 200 upward until the handle 113 is accessible and can be rotated upward to pull the battery from the opening 56.

Figure 14:
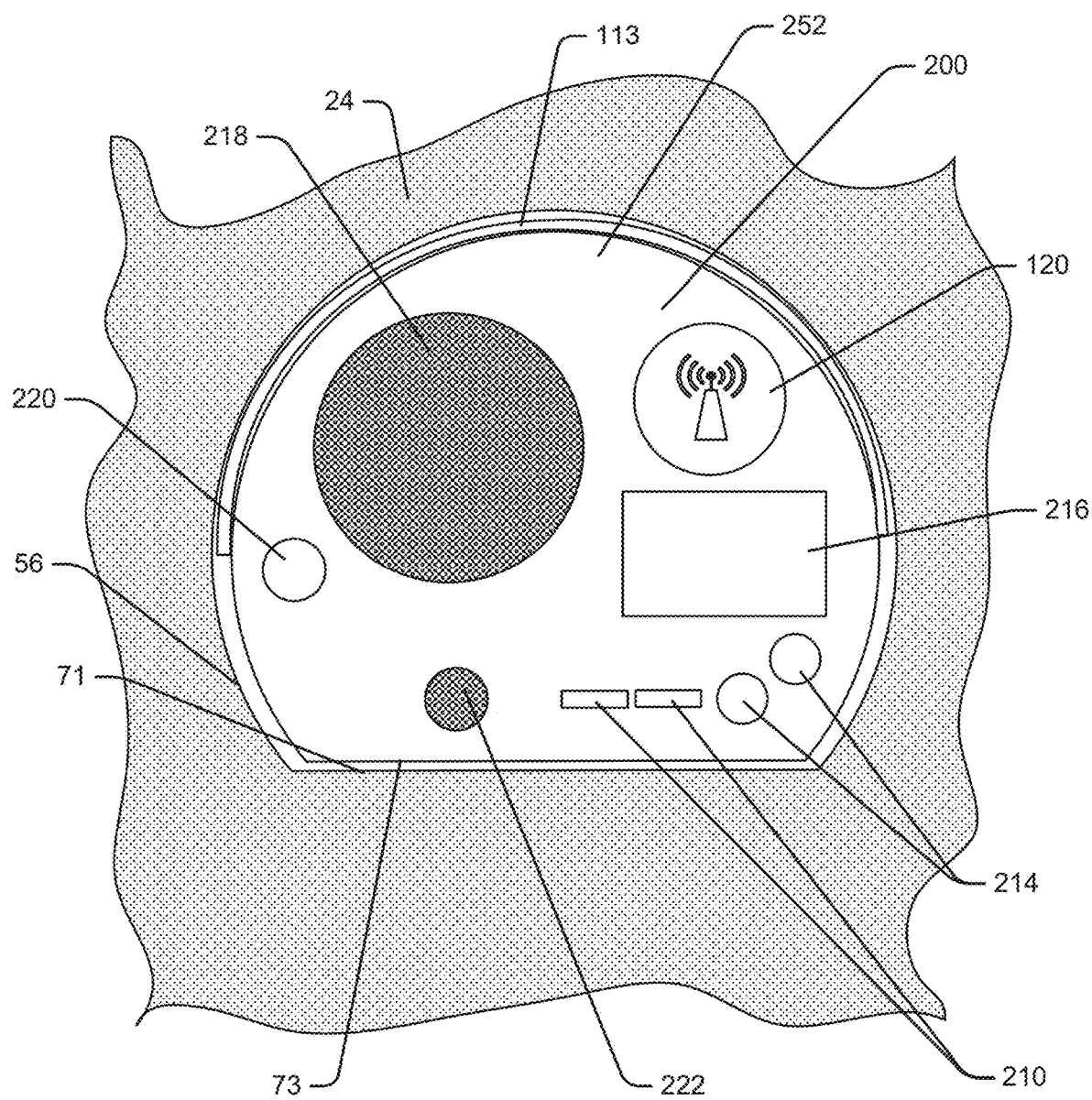
FIG. 14 is a top plan view of a battery with a flat side surface inserted into a cavity at a workstation.

In FIG. 13, while latch 324 is shown at the upper end of the basket 58, in other cases the latch and associated battery opening 311 may be located near the bottom end of the basket as shown in phantom at 324a to enable easier access below a worktop. In still other cases the moving latch mechanism may be included in the battery assembly as opposed to within the affordance that forms the cavity that receives the battery. To this end, see again FIG. 13 where a latch mechanism is provided at 324b near the upper end of the battery housing so that a latch finger member extends upward from the top battery surface 352 for access by an employee. Here, a distal end of a latch member is received in a recess formed in the inside surface of the tabletop 24 that forms the battery receiving opening. When inserted into the opening 56, handle 113 may fold down into the upper part of the opening as best shown in FIG. 14 (albeit in the context of a differently shaped battery having a flat side surface for alignment purposes as described hereafter) and as shown in phantom in FIG. 7.

In other cases the top surface 252 and an upper portion 343 of the battery 200 may stand proud of the top surface of tabletop 24 as also shown in FIG. 13 at 349 where speakers 218, ports 210 and other input and output devices may be constructed into the side surface at locations above the top surface 24 once the battery is installed. Here, in at least some cases the battery weight may be sufficient to keep the battery in place without a latching or other coupling mechanism.

In still other cases the top surface of a battery may not be horizontal when placed for use and instead may be angled with horizontal as shown at 347 in FIG. 13. Here, the top surface 252 may be angled downward in the direction of the location at which a station user will likely be located so that input and output devices on top surface 252 generally face and are accessible by a station user.

In addition to placing basket 58 near the front edge of tabletop 24, in other cases the basket 58 may be mounted at other locations such as, for instance, a location near the rear right corner of the worktop as shown at location K in FIG. 15 or even to a shelf member as shown at location L in FIG. 15.

Figure 17:
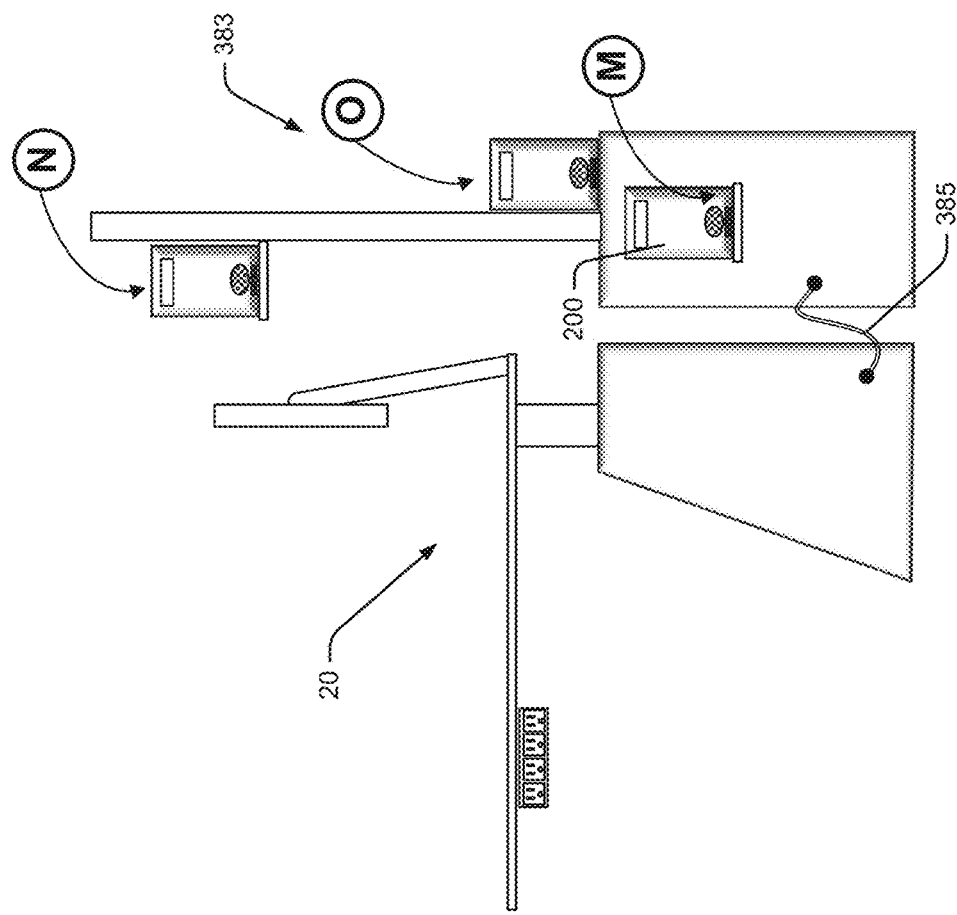
FIG. 17 is a side view of a workstation and a space dividing arrangement with batteries attached that is consistent with at least some aspects of the present disclosure.

In other embodiments a battery 200 may be received on a shelf or hook or within an opening formed by a spine type furniture arrangement 383 where one or more workstations 20 are linked to the spine arrangement for receiving power therefrom. In this regard, see exemplary batteries in FIG. 17 that are located on shelves or other support surfaces at locations M, N and O and where a power cord 385 links station 20 to spine 383. Hooks or battery receiving openings may replace any of the shelves in FIG. 17 in at least some embodiments.

In still other embodiments, a battery receiving cavity may be formed in a workstation leg support structure. To this end, see FIG. 18 where a workstation 390 includes an arrangement that can receive a battery 200 at location P generally within a leg structure 392. Workstation 390 includes a single central leg 392 that supports a tabletop 394. The top forms a generally central opening 396 and an upper end of the leg 392 forms a cavity 391 that aligns with the opening 396. Features like the spring loading and latch mechanisms illustrated in FIGS. 13 and 14 may be provided within one of wall members that define cavity 391 and when a battery is inserted into the opening 396, the top surface may be flush with the top surface of member 394.

Battery 200 described above includes a cylindrical battery that is rotationally symmetric where, in at least some embodiments, alignment features 260 (see FIG. 6) on the undersurface of the battery are provided that cooperate with alignment features on receiving surfaces to help an employee position the battery for charging and discharging purposes. In other embodiments non-rotationally symmetrical battery housings and mechanical receiving structures are contemplated so that the overall battery shape operates as an alignment feature and additional alignment features are not required. To this end, see for instance FIG. 14 where a battery receiving cavity 56 is shown to have a flat front edge or surface 71 and a battery 200 that is inserted into the receiving cavity 56 is shown to have a shape with a flat front surface 73 which compliments the shape of the receiving cavity 56. In this case, when an employee is going to insert the battery into the opening 56, it is intuitive to align the flat surface 73 with flat opening edge 71 which causes the battery and workstation contacts to align and create an electrical circuit once the battery 200 is lowered into the opening 56.

While FIG. 14 shows the battery 200 fully inserted into opening 56, similar "keyed" battery shape and complimentarily shaped receiving structures with less depth are contemplated. Thus, for instance, instead of having a full depth cavity 56, the internal surfaces of an extending lip or a recess on a surface at a workstation may be keyed to compliment a non-rotationally symmetric battery housing shape for placement guidance purposes. Other "keyed" battery and complimentary receiving arrangements are contemplated.

While FIG. 14 shows a battery received in an opening 56 at a workstation, similar keyed receiving arrangements would be provided at a charging station 100 in at least some embodiments.

Figure 19:
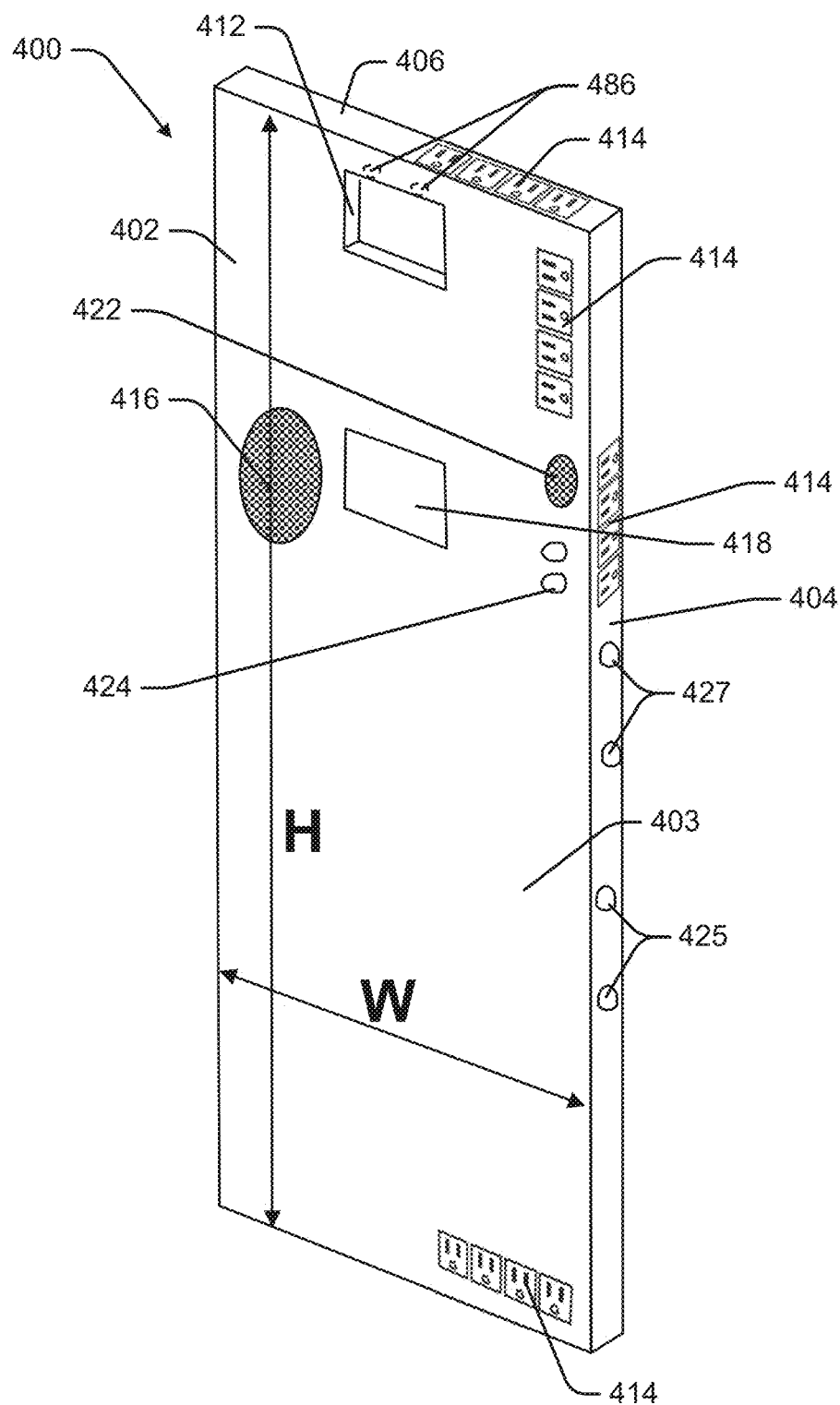
FIG. 19 is a view of a flat rectangular plate like battery that is consistent with several aspects of the present disclosure.

Referring now to FIG. 19, another useful battery configuration 400 includes a planar or plate like battery configuration where the battery has a rectangular plate shape with a minimal thickness (e.g., ½ inch to 2 inches). Here, an external housing 402 forms outside surfaces of the battery including a first flat side surface 403 and second flat side surface opposite the first 403, a top edge surface 406 and bottom edge opposite the top edge surface 406 and a first side edge surface 404 opposite a second side edge surface. The first flat side surface has a width dimension W and a height dimension H and the edges have a thickness dimension. The dimensions should be selected so that battery 400 is easy to carry and, in some cases, that means the battery may have width and height dimensions that are less than or similar to a typical sheet of paper (e.g., 8½ inches by 11 inches) so that that battery can be carried within a brief case, a nap sack, etc. In other cases the height of the battery may be less than the height of a typical table top supporting leg or less than a width or length dimension of a tabletop at a workstation where the battery is to be used. Thus, for instance, the height dimension of the battery may be less than about 28 inches based on a typical supporting leg height or less than 24 inches based on a typical width dimension of a workstation tabletop. In some cases the height dimension H is within a range between 8 inches and 30 inches and width dimension W is within a range between 6 inches and 20 inches. In particularly advantageous cases the dimensions of battery 400 are about the size of a large text book (e.g., 8 inches wide by 11 inches high and an inch thick).

Referring still to FIG. 19, in some cases input and output features or devices are arranged on one or a plurality of the battery surfaces similar to the way those types of devices were arranged in the cylindrical battery embodiments described above. Thus, for instance, speakers 416, a microphone 422, a display screen 418, power and other types of output portions 414 and LEDs 424 may be provided on one or more battery surfaces.

Power contacts or other charge coupling devices (e.g. coils, connection ports, etc.) may be provided at one or more of the battery surfaces or in some other fashion to enable connection for charging the battery 400 and so that the battery can link to the power distribution system 236 at a workstation. For instance, in FIG. 19, input charging contacts 425 are provided at one location along edge 404 while discharging contacts 427 are provided at a different location along edge 404. Here it is contemplated that a charging station would have a battery receiving slot and charging contacts within that slot that align with contacts 425 in battery 400 when the battery is inserted into the slot. Similarly, a workstation may include a battery receiving slot where contacts within that slot align with battery discharge contacts 427 when the battery 200 is inserted into the workstation slot.

Figure 53:
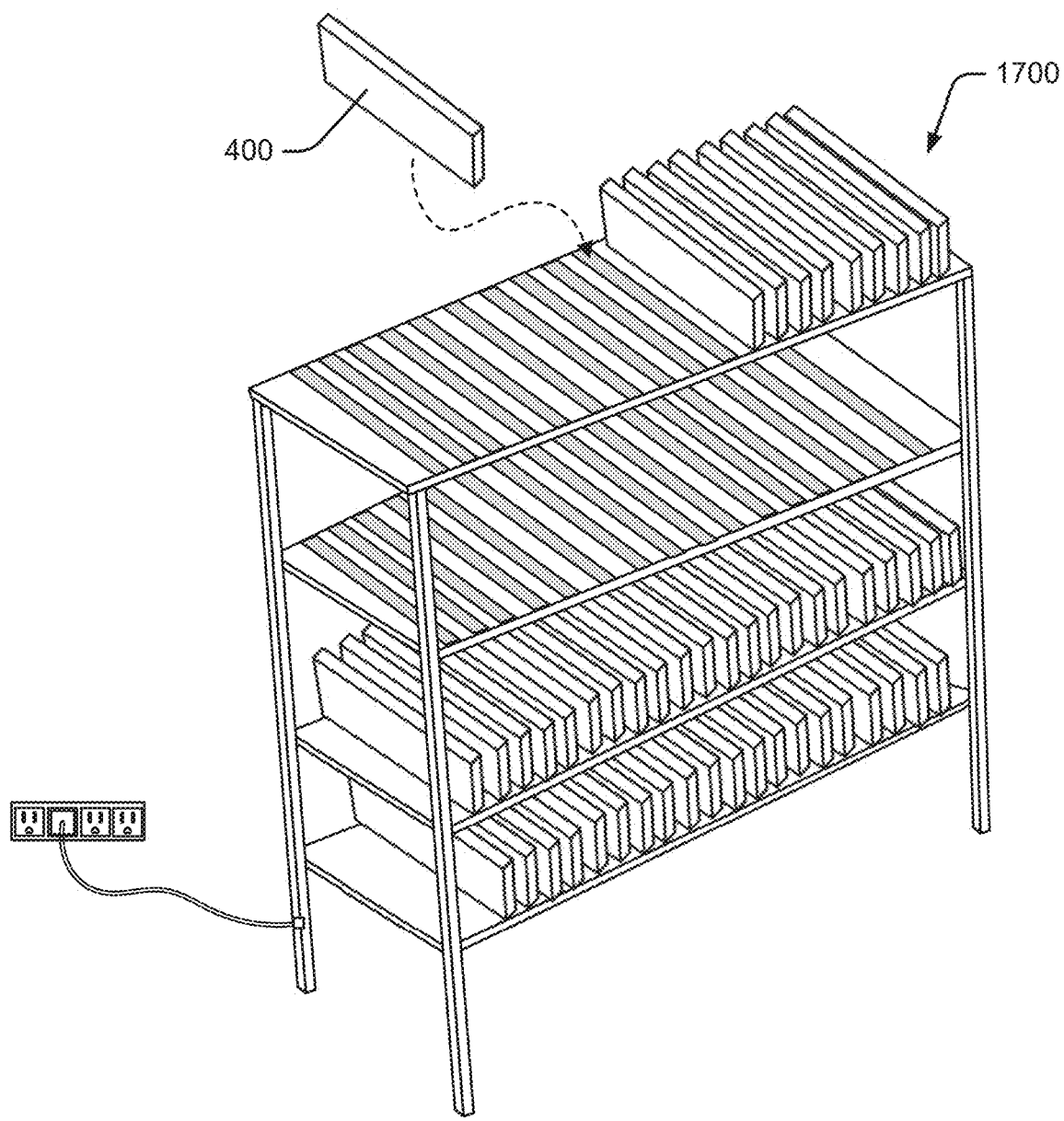
FIG. 53 is a view of another stationary charging station that is consistent with at least some aspects of the present disclosure.

Referring to FIG. 53, another stationary charging station 1700 is illustrated that includes a plurality of shelves, each shelf forming a plurality of slots, each slot designed to receive an edge of a battery to mechanically and electrically couple the battery to the station. Here, station 1700 may have all of the components shown in FIG. 4 and may operate in any of the ways described in this disclosure with respect to station 100.

Figure 20:
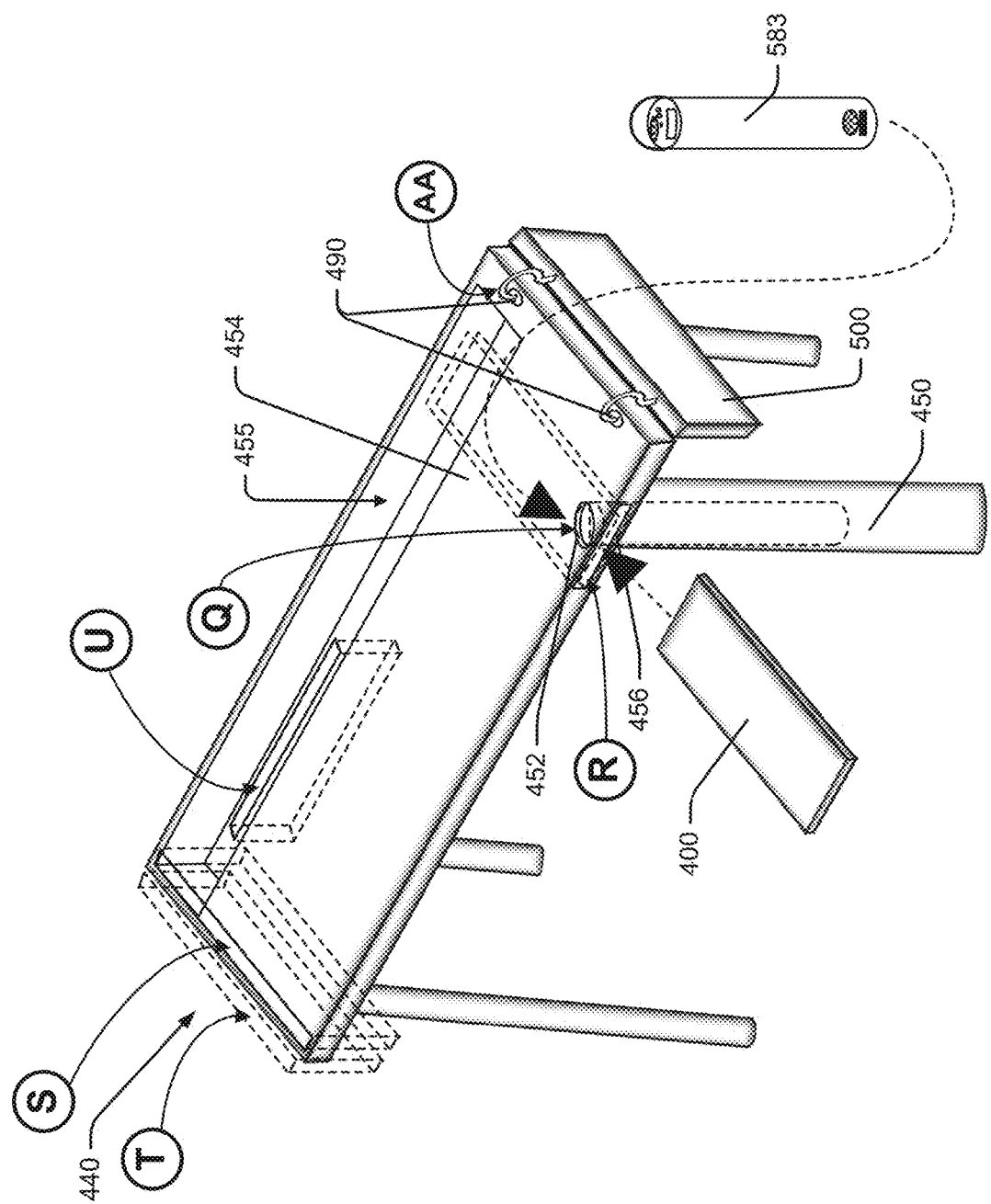
FIG. 20 is a view of another workstation with several batteries attached thereto.
Figure 21:
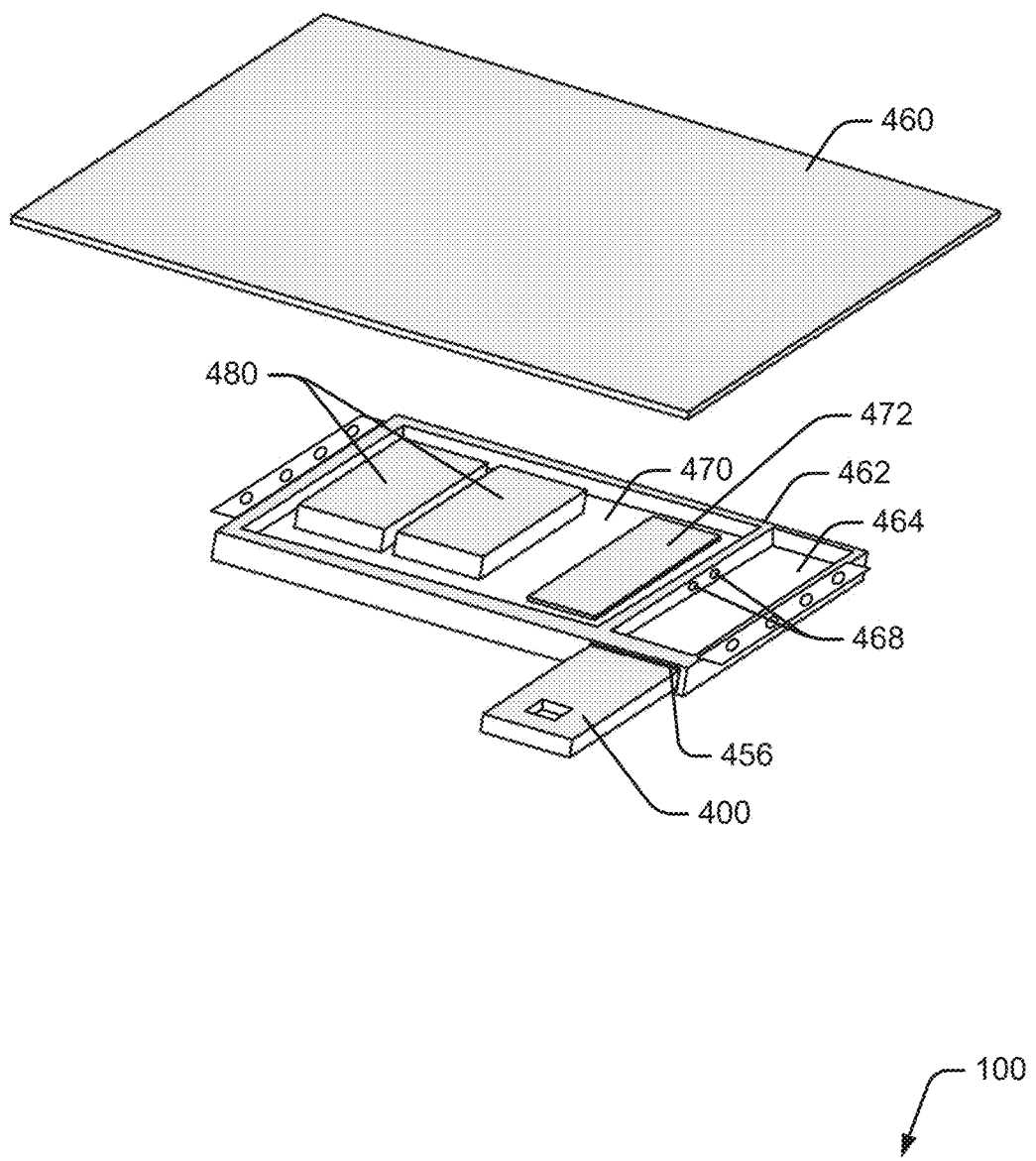
FIG. 21 is a partially exploded view of a tabletop subassembly including an internal compartment for a rechargeable swappable battery, control circuitry and a backup battery arrangement.

Referring now to FIG. 20 an exemplary workstation tabletop 454 forms a battery receiving slot 456 that extend rearward from a front edge so that a battery 400 can be slid into the tabletop member or assembly as shown at location R. In some cases the tabletop may include a single piece of material where the slot 456 is milled out of that material. In other cases the top member may be formed by laminating several layers of material together where the slot 456 is formed by voids in different material layers.

In another embodiment the tabletop may be replaced by a tabletop assembly that includes a top plate like member and a housing structure there below to form a battery receiving slot and to house other charging assembly components. To this end see FIG. 21 where a tabletop assembly includes a plate like top member 460 and a housing 462 that mounted to the underside of member 460 via screws or some other type of mechanical fastener. The housing 462 forms cavities including a first cavity 464 aligned with a battery receiving slot 456 for receiving a battery 400. Contacts 468 are shown within the cavity 464 that align with discharge contacts 427 (see again FIG. 19) on the side edge of battery 400. A second housing cavity 470 is provided adjacent cavity 464 for receiving workstation circuitry 472 as well as other components such as, for instance, backup batteries 480 that are described in more detail hereafter.

In at least some cases it is contemplated that battery receiving slots will be constructed so that when a battery is installed at a workstation, the battery had minimal effect on the appearance or functionality of the workstation arrangement. Thus, for instance, in the case of FIG. 21, the slot 456 and cavity 464 are arranged so that the width and height battery dimensions extend in a plane that is parallel to an undersurface of an associated worktop. In addition, the cavity 464 is locates off center to one side of the assembly which may, in some embodiments, allow more leg room below a central portion of the worktop 460 if a thicker worktop assembly is required to accommodate the battery 400.

Referring again to FIG. 20, while battery receiving slot 456 is shown in a front edge of tabletop 454, in other embodiments the slot may be formed in a rear edge of the top member or in one of the side edges of the top member.

Referring still to FIG. 20, in still other cases it is contemplated that a "basket" akin to the basket 58 described above may be provided below the tabletop member 454 as shown at location S in phantom, albeit forming a cavity shaped and dimensioned to receive battery 400 and where a slot in the top member opens above the cavity. In still other cases a battery receiving basket may hang from an edge of top member 454 as indicated at location T in FIG. 20. In other cases a battery slot may be provided within a wire management well 455 or the like as shown at location U in FIG. 20. Here, the slot may not be as deep as the slots at locations S and T where the slot is formed in a lower wall member of the wire management structure so that the upper part of the battery would be located within a wire management cavity and below the top surface of the tabletop top member 454.

Referring to FIG. 19, in some cases a handle opening 412 may be formed in the battery housing 402 near an edge of the housing. Here, as in the case of the cylindrical battery form 200 described above, the handle may also be used to attach the battery 400 to a workstation during use. To this end, see FIG. 22 where a hook 480 is provided that extends from a workstation leg 482 generally below a front edge of a worktop 484 for supporting a battery 400 at location U. Opening 412 can be aligned with hook 480 and hung thereon. In addition, in some cases discharge contacts may be formed within opening 412 as shown in phantom at 486 which align with contacts 488 on hook 480 when the battery 400 is hung thereon.

Figure 22:
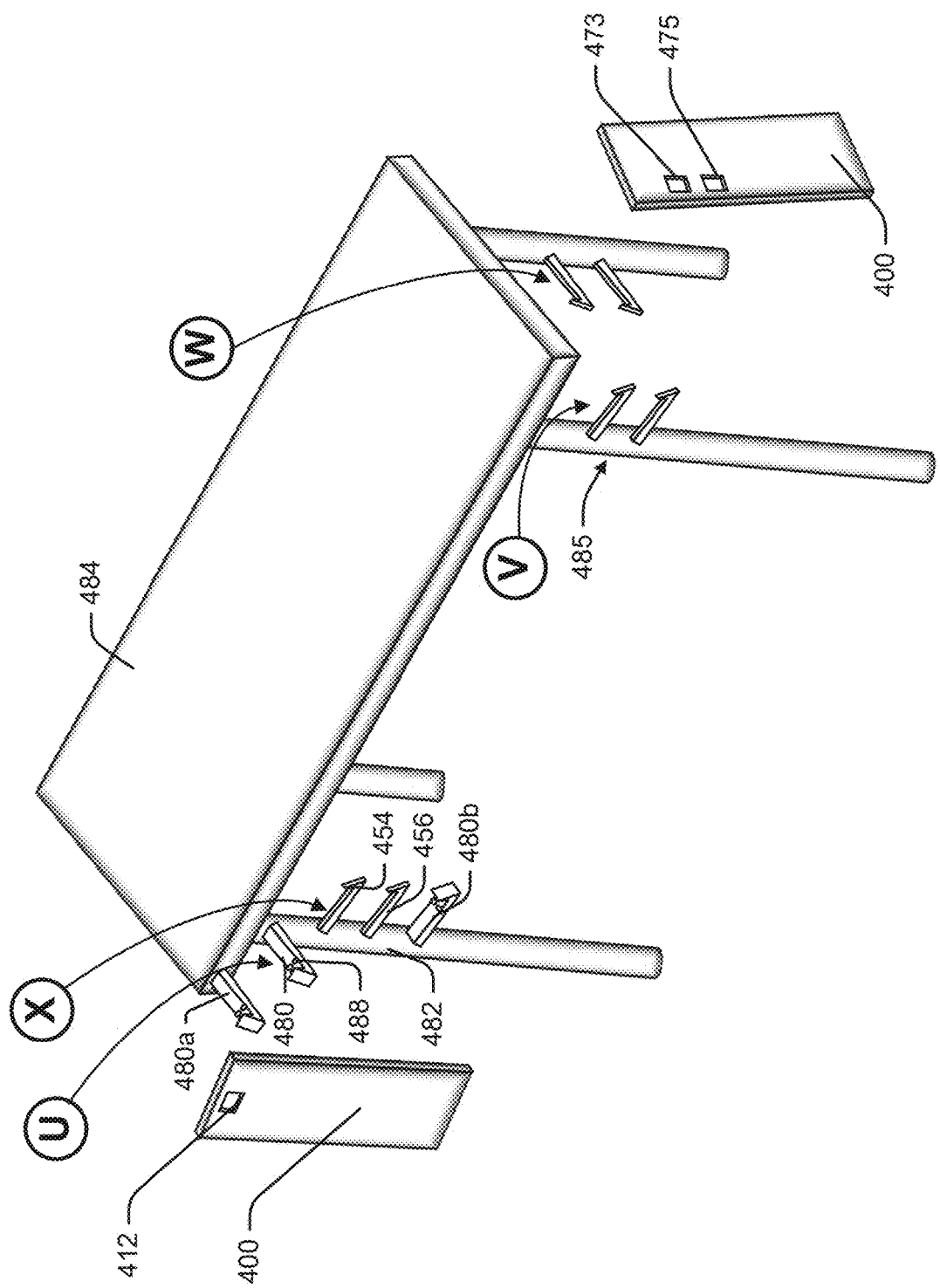
FIG. 22 is yet another view of a workstation with several batteries attached or proximate thereto.

In other embodiments the hook 480 may be located at other locations at a station such as mounted to and extending from the front edge of a tabletop as shown at 480a, from the rear edge of the worktop, from a side edge of the worktop, from an inner side of a leg as shown at 480b in FIG. 22 so that the battery is located completely below the tabletop member 484, form an other side of one of the legs (not illustrated), etc.

Referring again to FIG. 22, in some cases two openings 472 and 475 may be formed in the battery housing where a separate contact is provided in each of the openings. In this case a dual hook arrangement as shown at 485 may be provided at a station for coupling to the openings to mount a battery 400 to a station leg or other structure at any of the locations V, W or X as illustrated in FIG. 22 to locate the battery on any inward facing leg surface or outward facing leg surface where the battery is either fully below the tabletop or extends at least partially outward past one of the tabletop edges. Similarly a dual hook arrangement may extend from a side, front or rear edge of the tabletop member 484.

Figure 23:
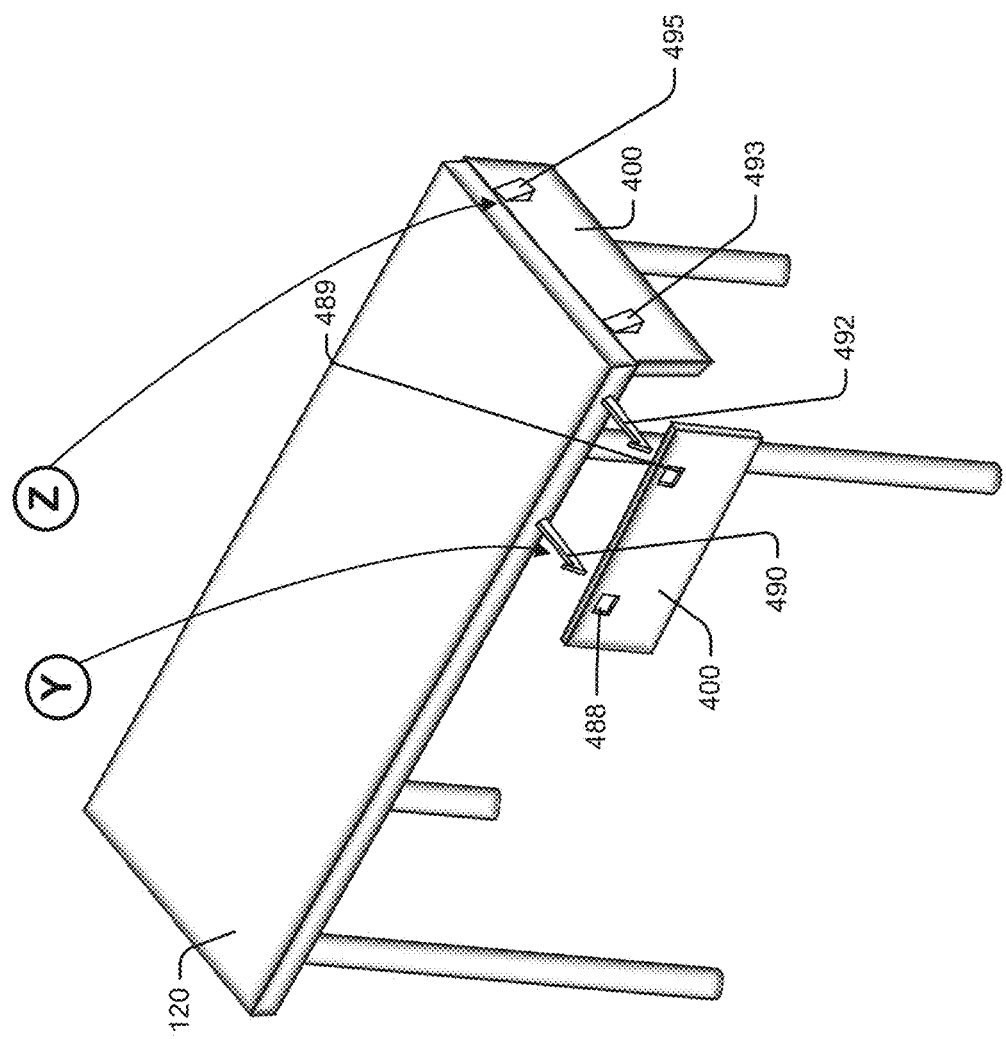
FIG. 23 is yet another view of a workstation with several batteries attached or proximate thereto.

Referring to FIG. 23, yet other batteries 400 may include spaced apart openings 488 and 489 along one of the long edges of the battery housing and station hooks 490 and 492 may extend outwardly from one of the tabletop edges that are arranged to mate with the openings 488 and 489 to support a battery 400 at location Y. In still other cases the station hooks may extend from an undersurface of the tabletop and then outwardly as shown at 493 and 495 to accommodate a battery 400 generally below a lateral edge of the tabletop with an outward facing battery surface substantially flush with a side edge of the tabletop member at location Z. In each of these cases the battery may be dimensioned and the coupling mechanisms may be positioned so that ends do not extend past tabletop edges (see the battery mounted to hooks 493 and 495 in FIG. 232) and so that an outward facing side surface is flush with or recessed from a worktop edge there above.

Figure 24:
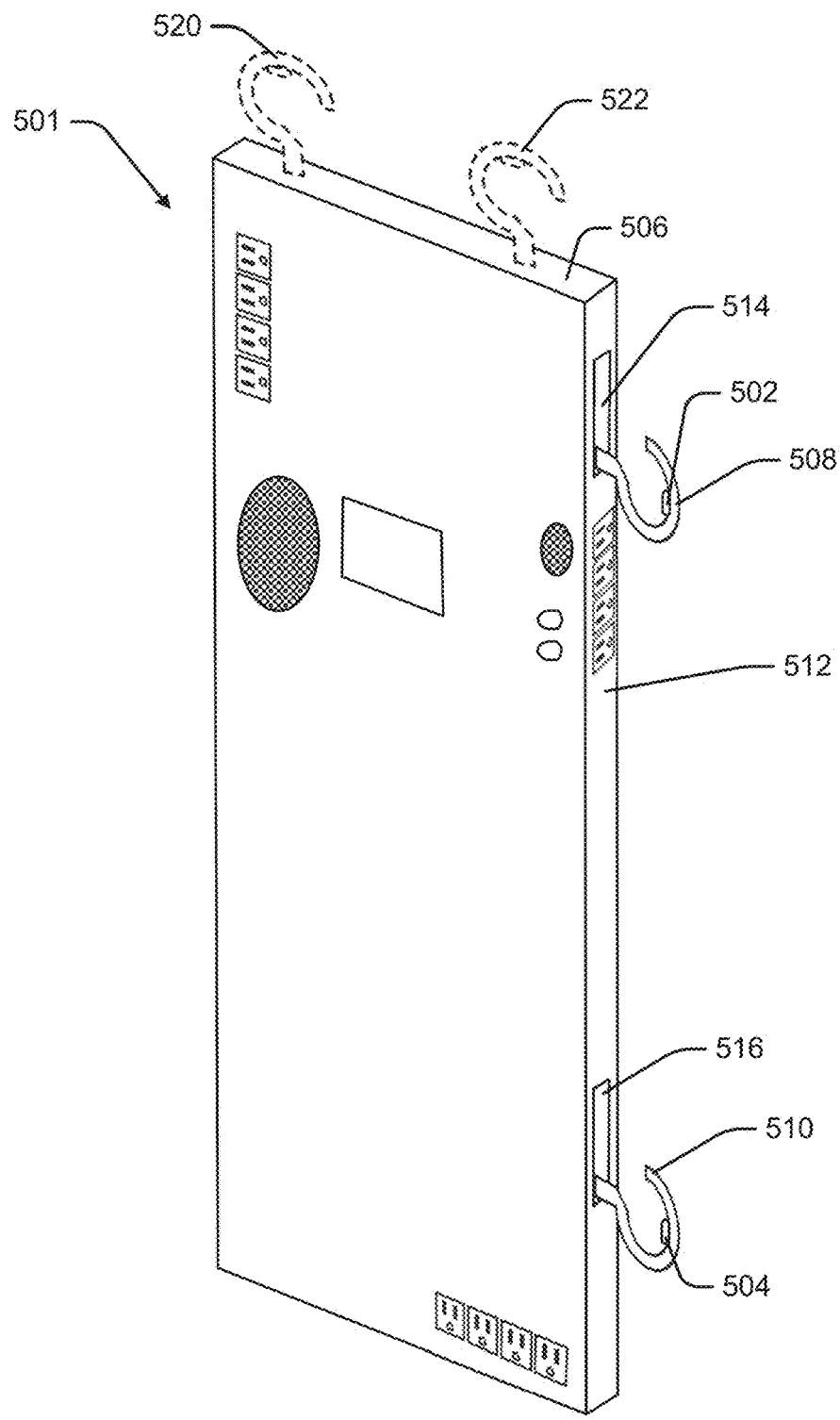
FIG. 24 is a view of another battery configuration consistent with at least some aspects of the present disclosure.

FIG. 24 shows another battery assembly 501 similar to battery 400 described above in form factor but where the battery 501 includes hanging hooks for attaching the battery at a workstation or at a charging station in some embodiments. Exemplary side edge hooks are shown at 508 and 510 that extend from side housing edge 512 where the battery housing forms a separate hook slot 514 and 516 for each of the hooks where the hooks can be rotated in and out of the slot between a storage position (in the slot) and a use position. Here, hook 508 includes a contact 502 and hook 510 includes a contact 504 for making electrical connections with contacts at a workstation or a charging station. Other exemplary hooks are shown in phantom extending from a top housing edge 506 at 520 and 522.

Referring again to FIG. 20, worktop 454 is shown to form couplers at 490 for receiving hooks 508 and 510 to secure battery 501 to the top at location AA. As shown, the couplers 490 include openings 490 in a top surface of the tabletop 454 along a side edge. In other cases the openings may be provided along a rear edge of the tabletop. Where hooks extend from a short edge of the battery as at 520 and 522 in FIG. 24, the openings may be provided along an end portion of a front edge of the tabletop in other embodiments. In each case including a hooking coupler on a battery, contacts may be provided within the portion of the hooking coupler that contacts a coupler on a station so that electrical connection can be formed automatically when a battery is mounted to the station.

In still other embodiments it is contemplated that a battery may be constructed to connect to a workstation component in a more integrated fashion so that the battery housing itself forms a portion of the external surface of the component that it is connected to thereby providing a relatively finished appearance. To this end see again FIG. 18 where another battery 550 includes a housing that has a length equal to a length dimension of a tabletop edge that the battery 550 is to be attached to where an outward facing housing surface is curved to present a finished appearance when the battery is attached to a tabletop edge 552. In this case, the battery and edge include couplers for connecting the battery to the edge. As illustrated, the edge couplers include openings 554 and 556 and the battery couplers include pegs 558 and 560 that are received in the openings to mount the battery to the edge. Although not shown, in this case it is contemplated that the pegs and openings would include electrical contacts for electrically coupling the battery to the power distribution system within the workstation 390. In addition, it is contemplated that the couplers may also include latching mechanisms akin to those described above with respect to FIGS. 12 and 13 for maintaining the battery 550 on edge 552 once installed unless affirmatively removed via a de-latching activity.

Referring again to FIG. 18, as in the case of the other batteries described above, battery 550 may include speakers, microphones, LED devices, a display screen, selectable buttons, etc., for input and output functions. In some cases the input and output devices will be located along a battery surface that is upwardly facing once the battery is installed on edge 552 so that a station user can best perceive output and best access input buttons or other input features.

Figure 25:
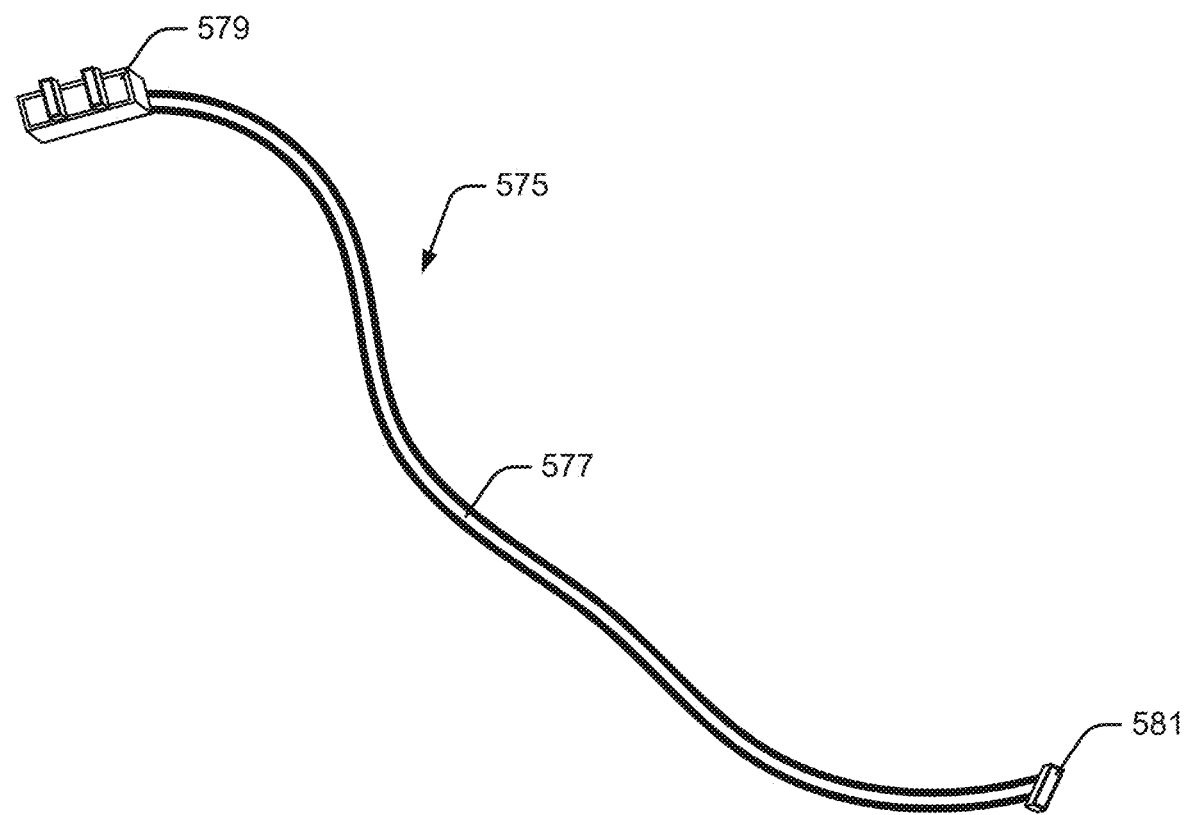
FIG. 25 is a view of a cord shaped battery.

FIG. 25 shows another cable shaped battery form 575 that includes an elongated cable housing 577 having a charging plug 579 at a first end and a charge output coupler 581 at a second end. Here, it is contemplated that battery cells would be included within the cable housing along with battery circuitry. To charge the battery 575 plug 579 would be inserted into a conventional power receptacle. Workstations 20 would each include at least one port for connecting to coupler 581 to receive charge therefrom.

FIG. 20 shows yet one other battery form 583 that is cylindrical but elongated and thinner than batteries 200 described above. Here, the thin battery form 583 makes it more suitable to be inserted into elongated members such as a workstation leg 450 as in FIG. 20. As shown, an opening 453 is provided in a tabletop for receiving a cylindrical battery 200 at location Q in a fashion similar to that shown in FIG. 18. The narrowness of battery 583 makes it easier to conceal that battery inside cavities formed in long components and therefore battery 583 is a more universal shape than wider battery forms.

Figure 26:
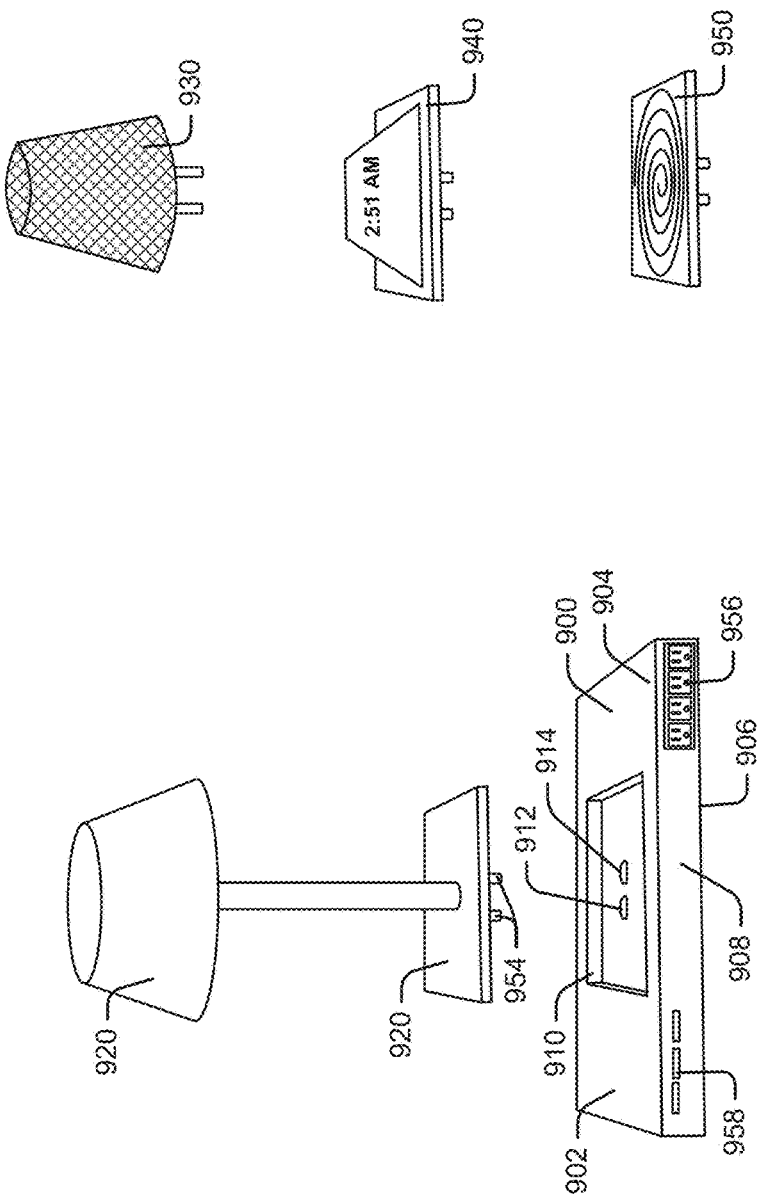
FIG. 26 is a view showing another battery type that forms a device coupling cavity as well as several different types of device add on components including a light component, a speaker component, a clock component and a heating element component.
Figure 27:
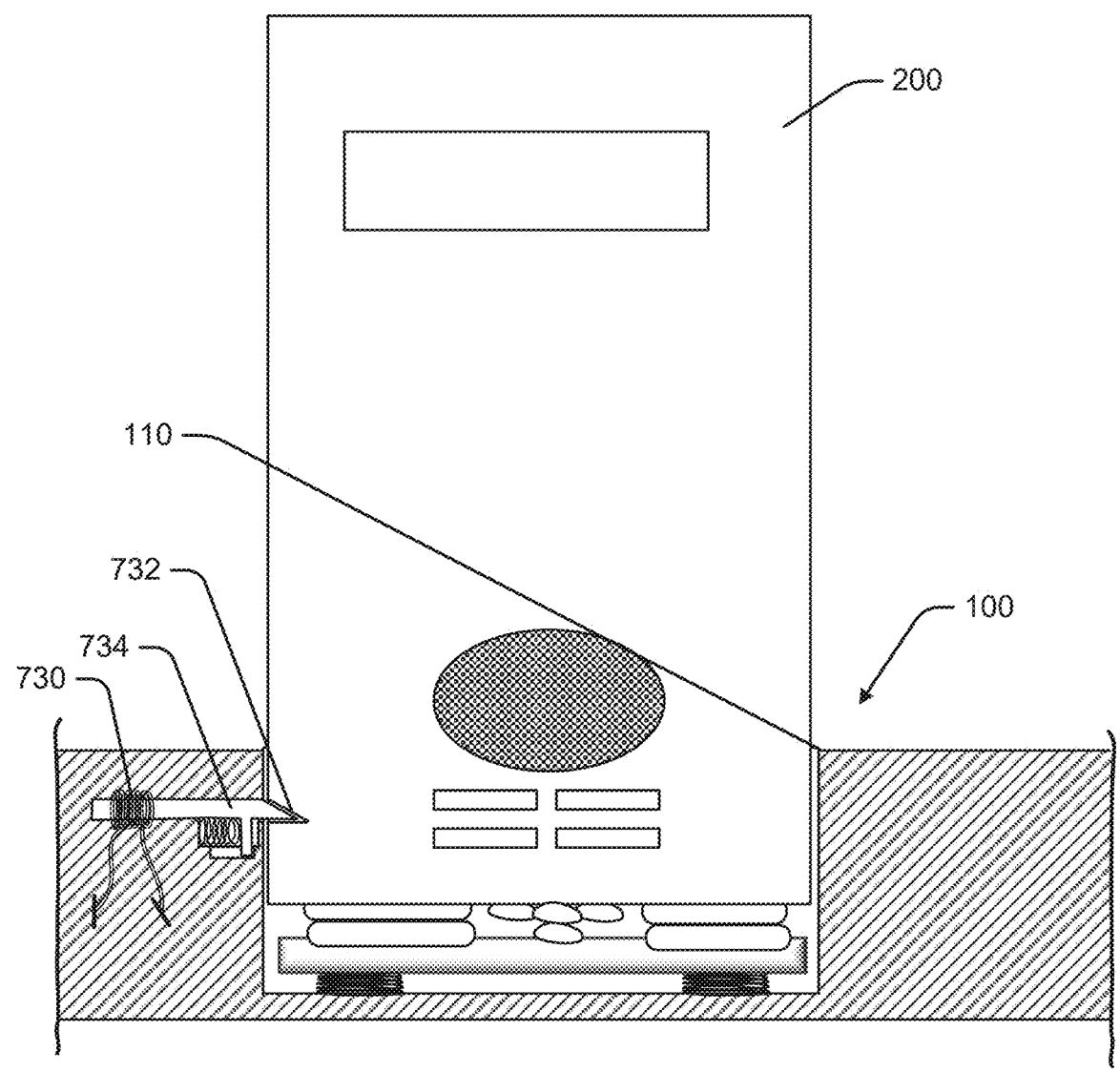
FIG. 27 is a partial cross sectional view of a battery mechanically locked to a charging station.

Yet one other battery form that may be useful in some cases is shown in FIG. 26 at 900. Here, battery 900 may be similar to the other batteries described above except for form and an additional output coupling charge delivery arrangement. Regarding form, battery 900 includes a generally book shaped housing 902 having rectangular upper and lower surfaces 904 and 906, respectively, and four side surfaces including a front surface 908 shown. Here, it is contemplated that battery 900 would rest on a workstation tabletop or shelf surface with the upper surface 904 facing upward. Regarding the additional output coupling arrangement, a generally rectangular recess 910 is formed in the upper surface 904 and first and second contacts 912, 914 for connection to additional affordances are provided centrally within the recessed portion 910.

Here, other affordances or add on devices may be provided at or brought to a workstation that couple to the upper surface of the battery 900 within the recessed portion of the upper surface at 910. Exemplary additional affordances illustrated include a light device 920, a speaker 930, a clock device 940 and a heating coil 950. Other additional devices are contemplated. Each of the additional devices includes a similar coupling mechanism and therefore in the interest of simplifying this explanation, only the coupling mechanism associated with light device 920 is described here in any detail. Light device 920 includes a rectangular plate 952 at a bottom end that fits snugly within the recessed rectangular opening at 910 as well as two contacts 954 arranged on an undersurface of the plate 952 at locations so that they contact and form an electrical circuit when plate 952 is received within recess 910. Thus, an employee can, in effect, plug any of several different additional power consuming affordances into battery 900 to power the affordance.

Referring still to FIG. 26, in some embodiments the battery 900 also includes conventional power outlets 956 and USC or other power ports 958 in front surface 908. Not shown but contemplated in other embodiments are a speaker, a display, a microphone, etc., as described above in other embodiments. In addition, although not shown, it is contemplated that the battery 900 may also have a coupling assembly on an undersurface or in some other surface for coupling to a workstation power distribution system so that the battery can provide power to other workstation devices through that system in addition to providing power to an add on device linked via connectors 912, 914 and to devices via output ports.

In at least some cases it is contemplated that some type of locking mechanism may be provided at each charging station for securing batteries to the station to stabilize the batteries at the station and also, in at least some cases, to control which batteries are released for use by which employees in the case of battery reservation type systems. In this regard, see for instance FIG. 27 that shows a latching or locking mechanism for securing a battery 200 to a charging station 100. Here, the charging positions 110 at the station are recessed and a solenoid 730 operated latch assembly 734 akin to the assembly described above with respect to FIG. 12 is provided which cooperates with a slot 732 in the side surface of the battery 200 to lock the battery to the station until a processor activates the solenoid to remove a distal end of the latch from the battery slot. In some cases when a battery is unlocked, the processor will also light up an associated LED or otherwise provide an indication of which battery is free to be removed.

Figure 18:
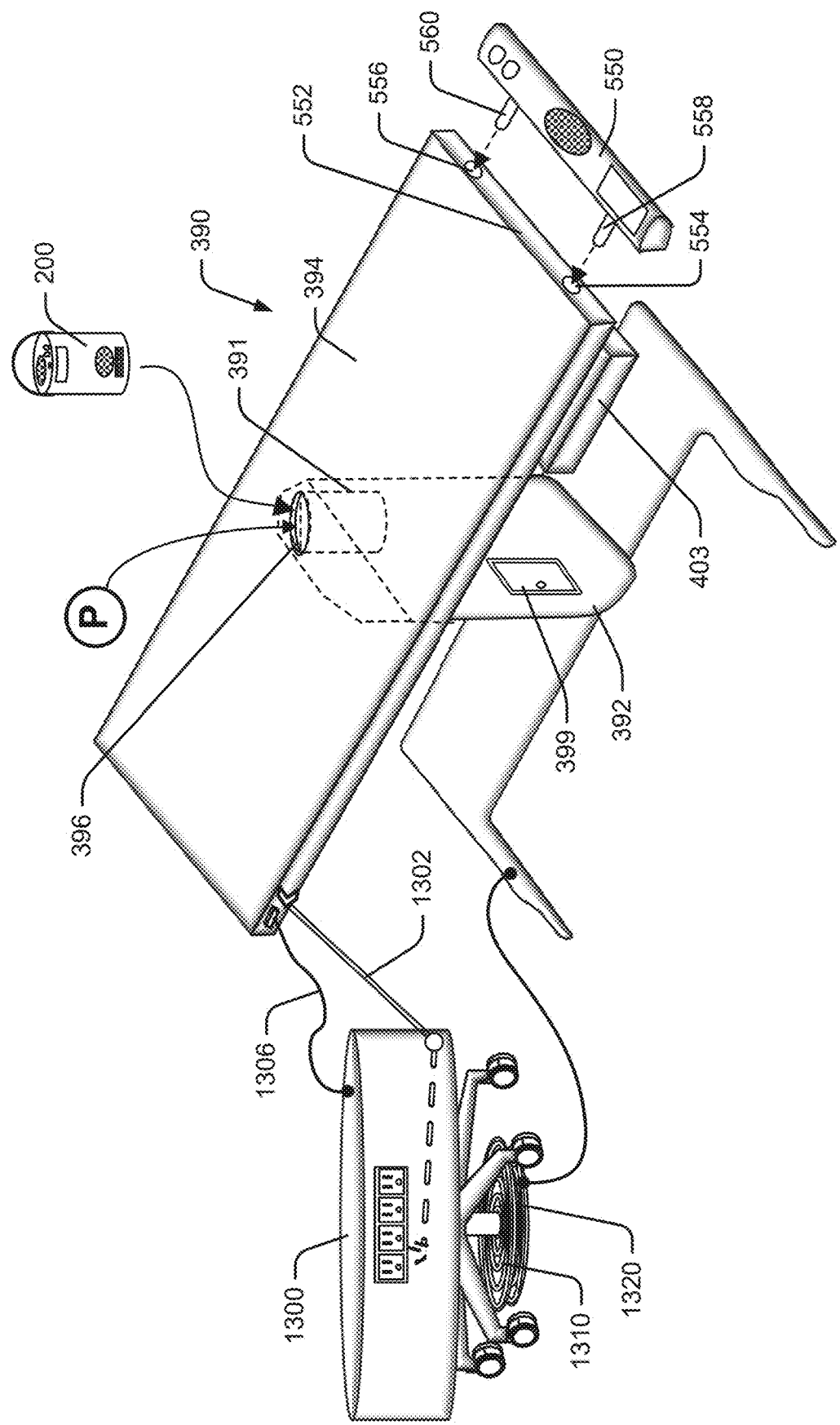
FIG. 18 is a view of another workstation assembly and a portable large format battery.

In still other embodiments a workstation or other affordance arrangement may include a closable compartment for receiving and concealing rechargeable batteries. For instance, in some cases as shown in FIG. 18, a simple battery receiving drawer 403 may be slidably mounted to an undersurface of a workstation worktop which can be opened to insert a battery and closed to conceal the battery. As another instance a cavity (not illustrated) may be formed in the side of a leg member where a hinged door 399 can be opened and closed and where a battery has a form factor that compliments the cavity.

Battery powered employee supporting affordance arrangements other than a typical table based workstation 20 are contemplated. Exemplary other affordance arrangements or configurations are shown generally in FIG. 2 to include a task chair 160, a personal harbor 25, a telepresence station 35 and a small group conference assembly 45. While each of the affordance arrangements is different, many characteristics are similar in relation to implementation of the disclosed power management system. Thus, in each affordance arrangement case, there are three general battery coupling types including surface, hook and cavity coupling types where each type includes mechanical as well as electrical coupling features.

In each affordance arrangement case there are different optimal locations for battery placement. For instance, at a minimum batteries should be designed and placed at locations where they minimally interfere with normal employee activities that take place at the affordance arrangement. Thus, a battery should not restrict an employee's normal movements or movement of other affordances (e.g., a display screen mounted on an articulating support arm) at an arrangement that are intended to optimally support the employee. As another instance, where the batteries include features that need to be accessed (e.g., power ports, interface input buttons, microphones, etc.) or features (e.g. speakers, LED signal lights, display screens, etc.) that generate signals that need to be perceived, the batteries should be located to optimize access as well as perception. As still one other instance, for aesthetic reasons, batteries should when possible be hidden from sight and, when possible, be integrated into typical affordance configurations with only minimal effect on the overall design of the configurations. Thus, for instance, where an affordance arrangement typically includes a flat plate like member such as a tabletop, it will often be useful for at least one system battery option to include a flat plate like battery that can be tightly coupled to the underside of the tabletop or received within a channel that extends from an edge of the tabletop so that the battery minimally effects overall appearance. As another instance, where an affordance arrangement typically includes an elongated relatively thin member such as a back rest support bar in the case of a task chair, it will often be useful for at least one system battery option to include an elongated thin bar like battery that can be tightly coupled to the support bar or received within a channel that extends into the support bar so that the battery minimally effects overall appearance.

Referring again to FIGS. 2 and 6, each of the additional affordance configurations 160, 25, 25 and 45 may include all or a subset of the components described above as being included within the workstation 20 including, among other components, processor 230, electrical input couplers 284, a power cord 1230, a battery charger 1260, LEDs 214, a display 38, speakers 36, input buttons 42, a microphone 40, a wireless transceiver 52, a power distribution system 236, and couplers for electrically connecting to power consuming devices including receptacles/ports 44, induction coils 43, cables 46 and hard wire connections 49.

Figure 28:
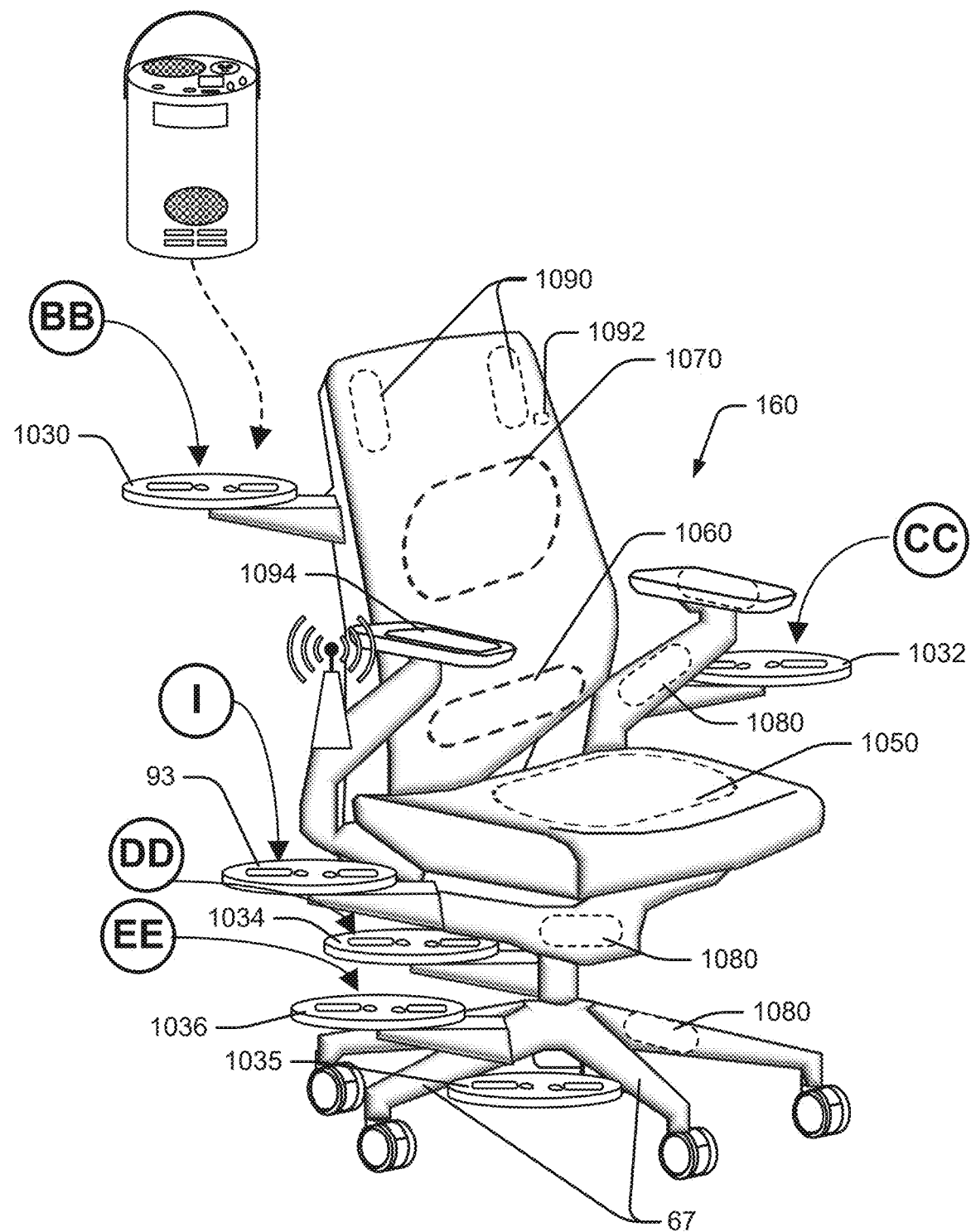
FIG. 28 is a perspective view of a chair assembly that includes a plurality of different battery coupling arrangements.

Referring again to FIG. 3, chair 160 has already been briefly described above where a shelf 93 extending from a seat support structure to support a battery at location "I" was described. Referring to FIG. 28, a powered chair 160 may include one or more power consuming devices that are hardwired 49 to a power distribution system within the chair including but not limited to a heating assembly 1050 within one or both of the seat and backrest, a cooling assembly (also 1050) within one or both of the seat and backrest, a vibrating assembly 1060, a massage (e.g., roller) assembly 1070, one or more motors 1080 for raising or lowering the seat or otherwise changing the relative juxtapositions of chair components (e.g., armrests, a lumbar support, the angle of a backrest, the angle of a seat, the depth of a seat, etc.), speakers 1090, a microphone 1092, a display screen 1094, a transceiver 1096, etc. Although not illustrated, other power consuming devices of any type may be added on to chair 160 and connected to the power distribution system 236 within the chair via plug in to a port 44 (see again FIG. 6), coupling to an induction coil 32, or via a cable (see cable 1110 in FIG. 29) that extends from the chair assembly itself.

Figure 29:
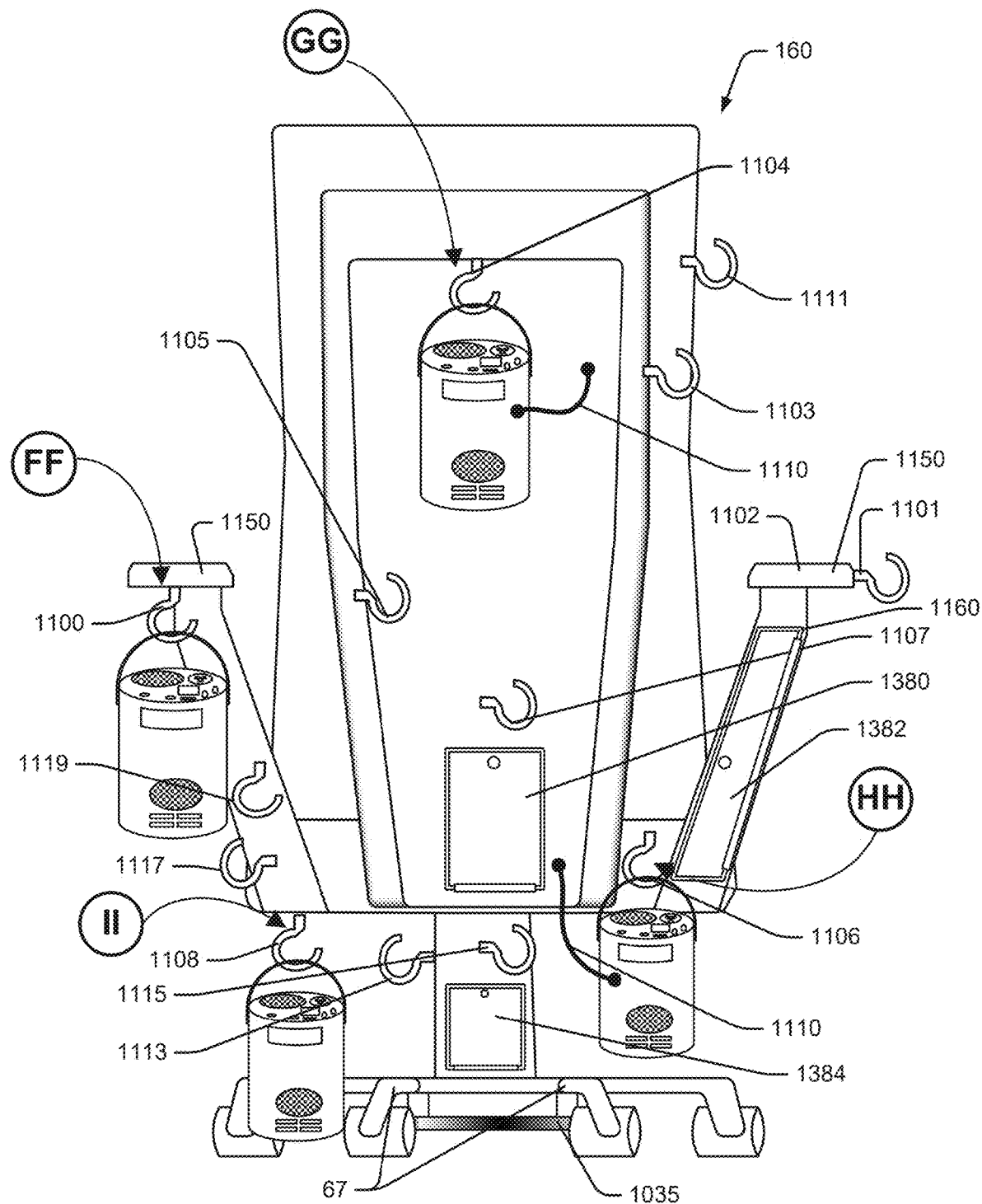
FIG. 29 is a perspective view of a chair assembly that includes a plurality of different hook based battery coupling arrangements.
Figure 30:
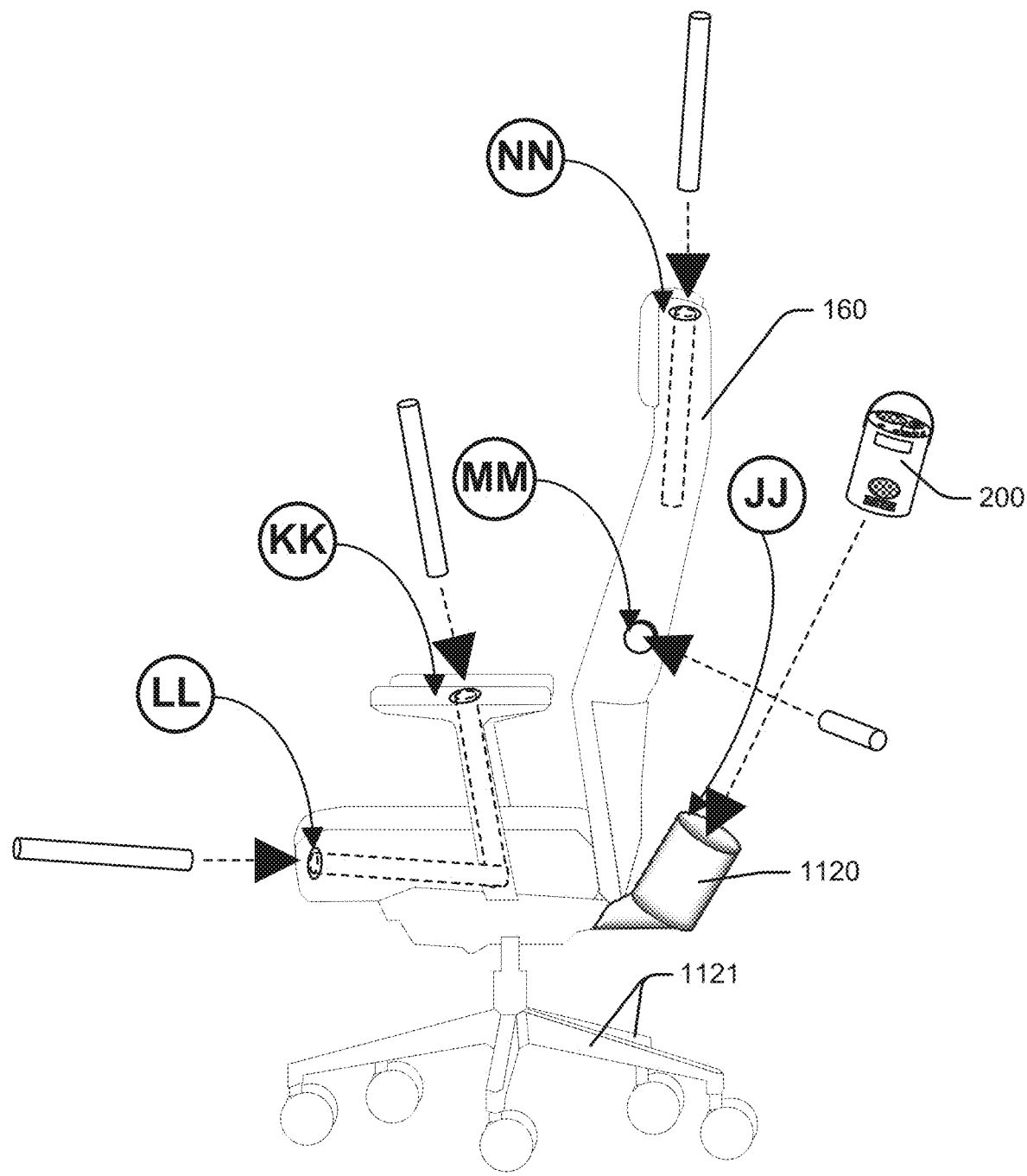
FIG. 30 is a perspective view of a chair assembly that includes a plurality of different cavity based battery coupling arrangements.

More battery location options for chair 160 are illustrated in FIGS. 28 through 30. Other battery receiving shelf placement options include a shelf 1030 mounted to a side or rear portion of a backrest to support a battery at location "BB" that extends either laterally or rearward so that the shelf and battery do not interfere with an employee occupying chair 160, a shelf 1032 mounted to and extending from an armrest laterally or rearward to support a battery at a location "CC", or a shelf 1034 mounted to and extending from a portion of a seat support post that rotates along with the seat to support a battery at a location "DD" either to the side or rear of the post or chair seat. In the case of a shelf that rotates with the seat, the shelf should extend rearward opposite the front part of the seat so that the shelf and supported battery never interfere with an employee's feet when the employee is using the chair. In still other cases the shelf 1036 may extend downward from a lower surface of the seat or laterally from a chair base member below the seat to support a battery at a location "EE" between the undersurface of the seat and the base. In at least some cases where the battery is located between the seat and the lower support base assembly, the battery should be dimensioned so that it does not extend laterally further than the seat member.

Thus, generally, a battery may be supported at a location behind a backrest, to one side of a backrest, behind a seat, below a seat, to the side of a seat, behind an armrest or to the side of an armrest. In particularly advantageous embodiments the center of battery mass is low so that a chair with a battery attached is relatively stable. Also, to increase stability, the center of battery mass should be as close to a central axis of the chair as possible. For instance, in advantageous cases the center of battery mass should be within 15 inches of a central chair axis (e.g., an axis essentially through the center of a chair support post) and in particularly advantageous cases the center of battery mass should be within 8 inches of the central chair axis. In advantageous cases the center of battery mass should be within 15 inches of an ambient floor surface and in particularly advantageous cases the center of battery mass should be within 8 inches of the ambient floor.

In at least some cases where the supporting chair base includes extending foot members 67 as shown in FIGS. 28 and 29, a battery supporting shelf 1035 may be located between (and in some cases generally below) two of the foot members 67 to lower the center of battery mass and increase stability. In this case, the shelf 1035 would preferably be located to the rear of the chair assembly (see specifically FIG. 29) so that the shelf and battery do not interfere with an employee's foot placement below the seat and to this end, the chair may include some type of rotation restriction mechanism that restricts seat rotation about the chair central axis to a limited range (e.g., 180-270 degrees maximum) to a side opposite the shelf 1035.

Figure 16:
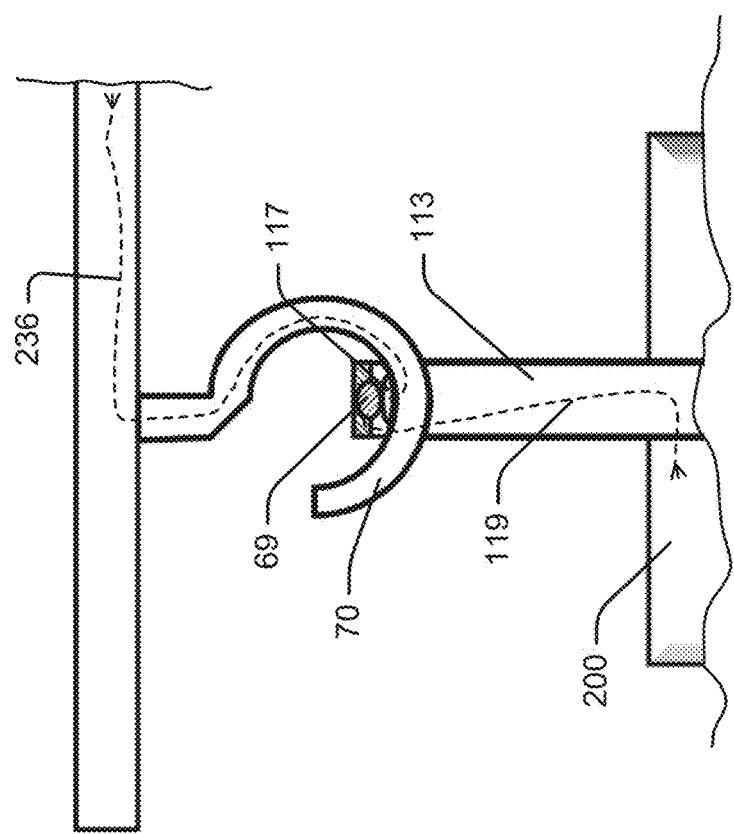
FIG. 16 is a partial view showing a battery handle in cross section to illustrate an electrical coupling that is consistent with at least some aspects of the present disclosure.

Referring now to FIG. 29, hook type battery mounting embodiments are illustrated that are akin to the hook mounting workstation embodiments described with reference to FIGS. 11, 15 and 16. In FIG. 29 it can be seen that a battery supporting hook may extend downward 1100 or outward 1101 (e.g., laterally or rearward) from an arm rest 1150 to support a battery at location "FF", a hook 1104 may extend downward 1104, outward 1103, or inward 1105 from a backrest supporting bar or a rear surface 1107 of a backrest assembly as at 1107 and 1111 or a hook 1106 may extend downward or outward from a rear (or side) edge surface of a seat as at 1109 to support a battery at location "HH" or from a bottom surface as at 1108 of the seat to support a battery at location "II". In some embodiments a hook may extend in any direction from a chair support post as at 1113 and 1115 or from an armrest supporting post 1160 in any direction as at 1117 and 1119.

In some cases a battery handle and associated hook will include contacts akin to those described with reference to FIG. 16 above so that battery power can be provided to a chair that the battery is hooked to. In other cases, the chair 160 may include coupling cables 1110 that extend adjacent one of the chair coupling hooks for connection to a battery as shown in FIG. 29.

In still other embodiments it is contemplated that, instead of the chair 160 including hooks, the chair may include one or more openings for receiving connecting fingers or hooks that extend from a battery akin to the battery embodiment 550 shown in FIG. 18. In addition, as in the battery 550 embodiment, a chair battery may be designed to form an architectural and useful part of the chair assembly. To this end, see in FIG. 32 that another battery form 1150 has the external shape of a chair armrest that mounts to an upper end of an armrest support post 1160. Here, the armrest 1150 and post 1160 have features that enable mechanical and electrical coupling as in other embodiments. In the illustrated example, first and second connection posts 1152 extend from an undersurface of the battery 1150 and a pair of connector ports 1154 are formed in an upper end of post 1160 to receive posts 1152. The ports and fingers may be designed to mechanically secure as well as to form an electrical circuit. Power outlets 1156 are formed in a side wall of battery 1150. The outlets 1156 may be formed on an inside surface of the battery or an externally facing surface or in a front or a rear surface. A speaker 1158 and an output LED 1162 are provided in the external surfaces of the battery 1150. Here, the LED 1162 is provided in an upper batter surface to increase likelihood that a chair user will perceive signals generated by the LED. Similarly, the speaker 1158 is provided in a side surface so that signals generated thereby will not be muffled by a user's arm supported by the armrest assembly. Other embodiments where a chair includes receiving ports and a battery includes posts or other extending coupling members are contemplated. In some cases the ports 1154 and posts 1152 in FIG. 32 may be swapped so that the post 1160 includes posts and the battery arm rest assembly 1150 includes ports.

In some embodiments a chair 160 may include one or more components that form an internal battery receiving channel so that a battery can be inserted into the channel for protection as well as to create an electrical circuit between chair contacts and battery contacts. To this end see FIG. 30 where a basket type receiving housing for receiving a cylindrical battery 200 at location "JJ" is shown at 1120. Here, the battery 200 would be slid into an opening that leads into a cavity formed by housing 1120. In some cases the housing will again form open sides so that input and output devices in the side surfaces of the battery housing are exposed. In some cases a latching mechanism akin to the latching mechanism described above with respect to FIGS. 13 and 14 may be included to lock battery 200 to the chair 160 unless purposefully unlatched. Advantageously, housing 1120 is located on the rear of the chair assembly and is supported by a portion of the assembly that rotates as a chair user rotates the seat about a central chair axis so that the housing and associated battery would rotate therewith and always be out of the way of a chair user occupying the chair. In other embodiments the housing 1120 may extend from a chair arm rest member, an armrest support post, a chair backrest, a support bar structure for a chair backrest, the seat or the support post for the seat and may extend laterally or rearward. In still other cases housing 1120 may be mounted to the base chair support structure 1121 and in that case may be supported between two extending foot members in a fashion similar to that described above with respect to FIG. 29 (see shelf 1035 in FIG. 29). Here, there may be a rotational restriction on seat rotation about the chair central axis so that the housing 1120 would always remain rearward with respect to the seat above.

Referring still to FIG. 30, in some cases a relatively thinner and longer rechargeable battery 1130 may be provided which can more integrally be received in a cavity formed by a chair component so that chair appearance can be relatively conventional. To this end, for instance, in FIG. 30 relatively thin and long cylindrical batteries 1130 are provided which have a shape and dimensions that at least somewhat mirror shapes and dimensions that are common on a chair so that battery receiving cavities can be provided in a seat as shown at location "LL", in an armrest as at location "KK", in a lumbar support region of a backrest as at location "MM", along a height dimension of a backrest as at location "NN", etc. Here, again, once a battery 1130 is inserted into a receiving cavity, it may be latched into the cavity unless purposefully unlatched, it may form an electrical coupling upon insertion, and it may include input and output devices that are at least somewhat exposed externally.

Figure 31:
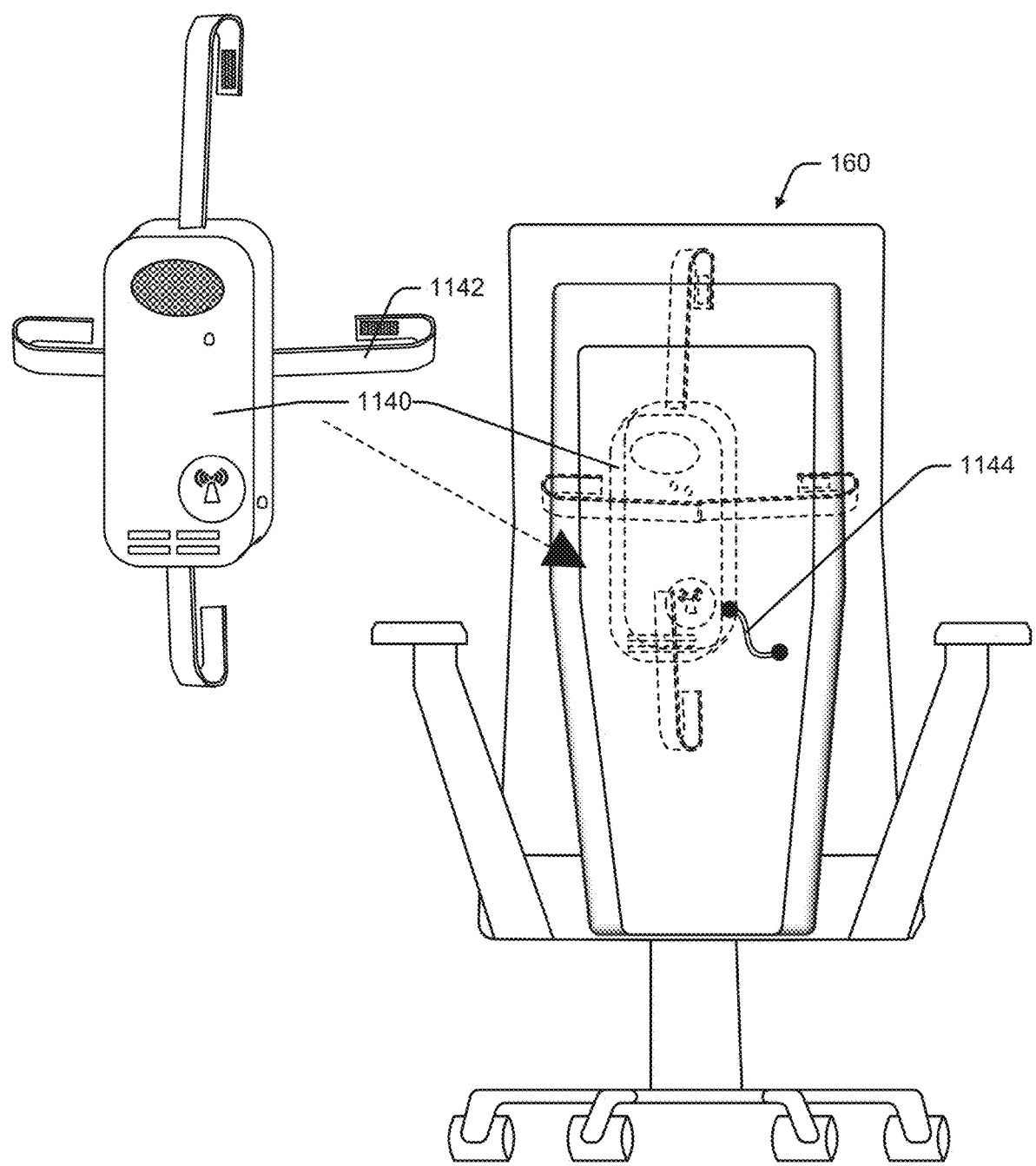
FIG. 31 is a rear view of a chair assembly that includes a strap based battery coupling arrangement.
Figure 32:
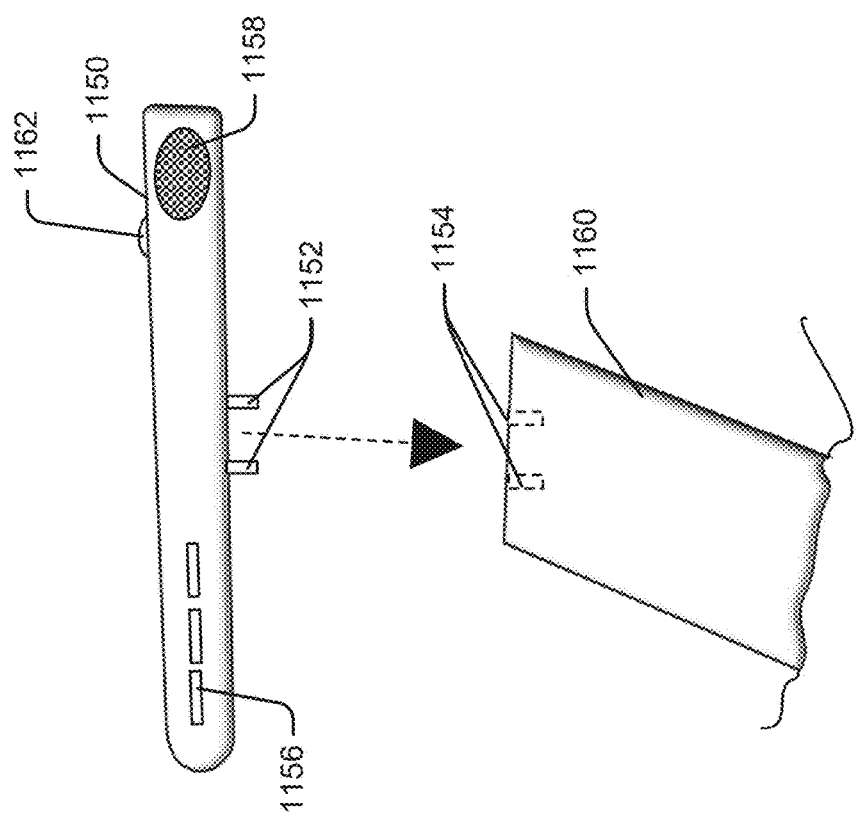
FIG. 32 is a partial view of an armrest shaped battery and coupling assembly at the top of a post.

Referring now to FIG. 31, another battery embodiment 1140 is illustrated that includes battery cells and other battery related devices supported by a housing where flexible straps 1142 are provided with Velcro ends for securing the battery to a supporting affordance that requires power such as a chair 160. Here, as illustrated in phantom, the battery 1140 can be attached via the straps to the backrest frame structure of a chair. Connection of the battery to the chair power distribution system may be via a connection cable 1144 that extends from the rear surface of the chair backrest or it may be via contacts or coils in the strap 1142 and backrest frame or in the battery housing and the rear surface of the backrest itself.

In still other embodiments a chair 160 may include a hidden battery receiving compartment. To this end, see once again FIG. 29 where a hinged door 1380 is located in a lower rear portion of a backrest assembly. Here, it is contemplated that the backrest may form a cavity behind door 1380 for receiving a rechargeable battery. As other examples see door 1382 formed in the rear surface of an armrest support post and door 1384 formed in a lower seat supporting post, each of which would conceal a battery receiving cavity in at least some embodiment.

Figure 33:
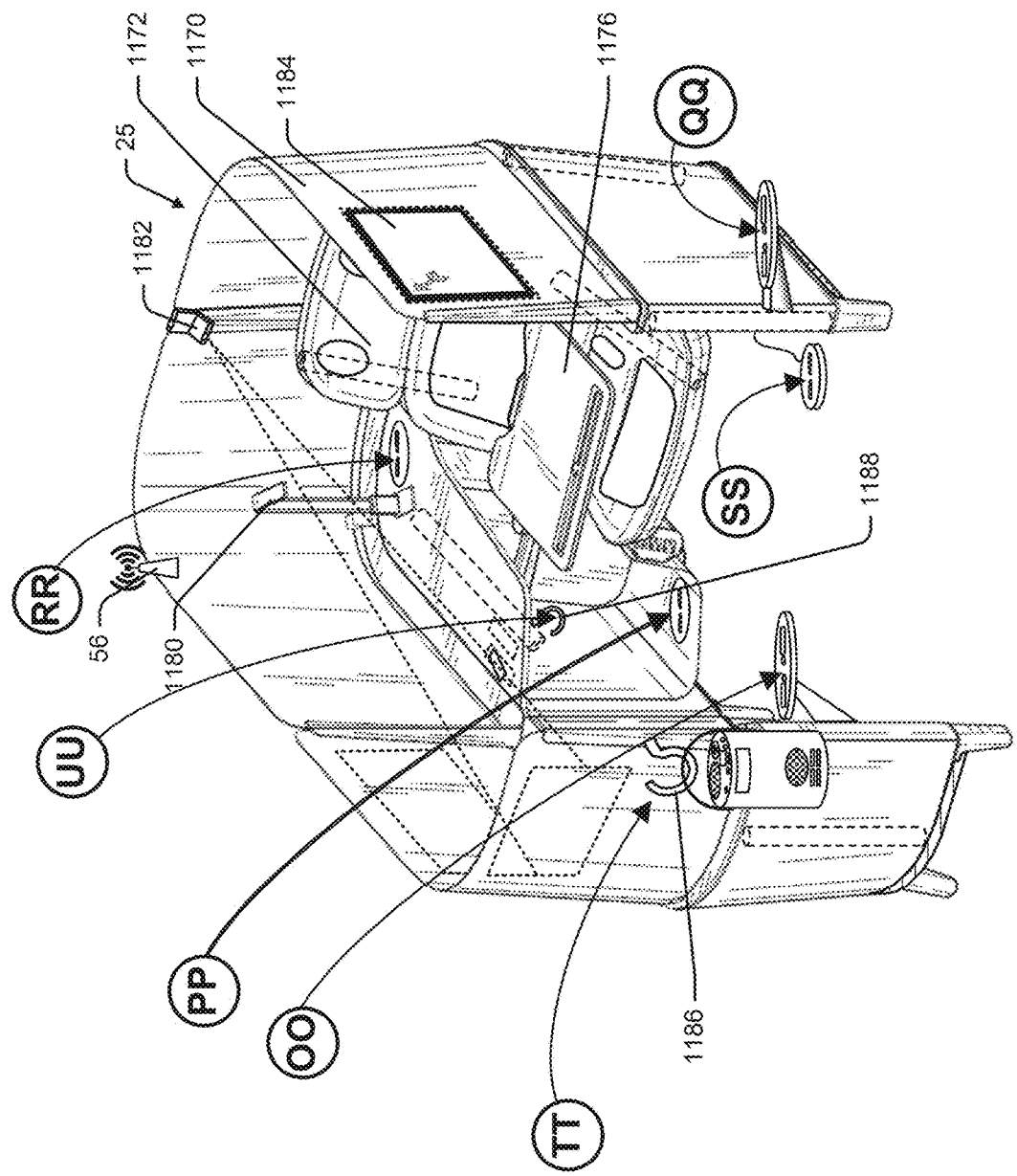
FIG. 33 is a perspective view of a personal harbor type affordance arrangement that is consistent with at least some aspects of the present disclosure.

Referring now to FIG. 33, another employee affordance support assembly in the form or a personal lounge assembly or harbor 25 is illustrated which includes a wall structure 1170 that generally surrounds a lounge chair 1172 to provide a personal semi-private space for an employee to occupy.

The harbor 25 also includes some shelving and storage components to one side of the lounge chair 1172 and a tablet type support arm and tablet 1176 that can rotate about within the space between a storage location and a use location (use location is shown in FIG. 33). The harbor further includes one or more lighting devices 1180, a projector 1182, a flat panel display screen 1184 and may include speakers, a microphone, heaters, cooling components, vibrating mechanisms, adjustable employee supports (e.g., backrest, lumbar, thigh support, etc.).

Here, as in the case of the workstation 20 and chair 160 affordances above, batteries may be mechanical and electrically attached to the arrangement 25 in any of several different ways including, generally, being supported on a horizontal support surface, mounted to a hook, hooked on a support surface, or received within a channel or cavity formed by other harbor components. In FIG. 33 coupling surfaces are shown at locations "OO", "PP", "QQ", "RR", and "SS". Location PP is particularly advantageous as it is a raised location below a side worksurface and out of the way. Location SS is located below the chair seat and therefore also is out of the way. Locations OO and QQ are advantageous as they are proximate an egress into and out of the space defined by the harbor wall structure. Location OO is also advantageous as it is at a location where visual signals generated by the battery (e.g., a lit LED) can be easily observed by a user sitting in the lounge chair. Exemplary connecting and electrical coupling hooks are shown at 1186 and 1188 for supporting a hanging battery at locations "TT" and "UU", respectively. Exemplary locations for receiving thin and elongated batteries are shown in phantom in FIG. 33 and include, within wall supporting posts, within the space defining walls, within lounge components like the seat, the backrest, etc., below a shelf member, in a cavity formed below the seat, in a cavity formed behind the backrest member and in front of an internal surface of the surrounding wall structure, etc.

Figure 34:
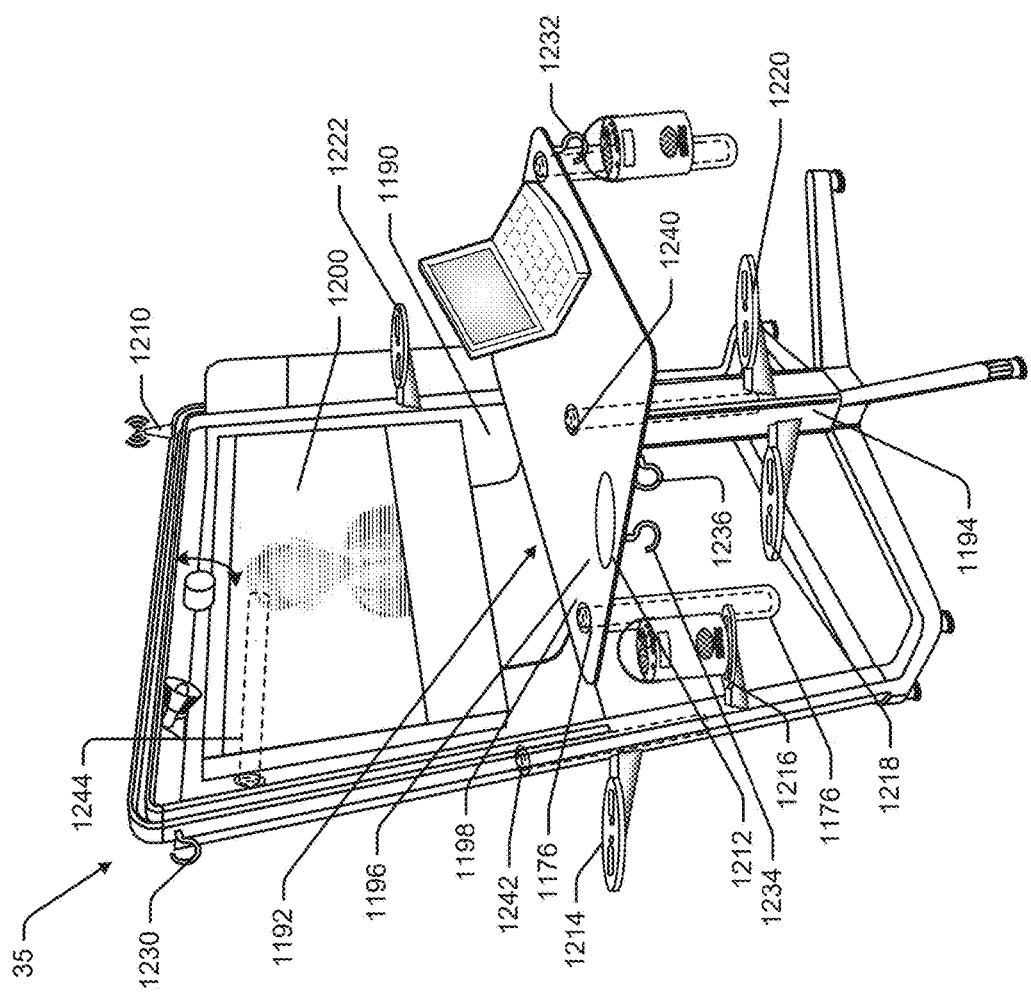
FIG. 34 is a perspective view of a telepresence station affordance arrangement that is consistent with at least some aspects of the present disclosure.

Referring to FIG. 34, one other affordance configuration that may be battery powered includes the telepresence system 35 that includes a totem screen assembly 1190 adjacent a table assembly 1192 that includes a supporting leg structure 1194 and a tabletop 1196 that forms a top surface 1198. A large high definition display screen 1200 is mounted to a front surface of the screen assembly at a height above the height of surface 1198 and faces generally toward space above surface 1198. A camera 1202 and speaker 1204 (and microphone (not illustrated) are integrated into the screen assembly. A wireless transceiver 1210 is provided at system 35. Referring again to FIG. 6, assembly 35 may include other components that are illustrated including in at least some cases a processor 230 for performing one or more of the disclosed functions or processes. Not shown in FIG. 34 are light devices, HVAC type devices, motors for raising or lowering the tabletop 1196 and/or display 1200, one or more of which may be included in the system 35.

Referring still to FIG. 34, as in the case of other affordance configurations described above, telepresence station 35 may each include at least one battery receiving surface including features for mechanically and electrically coupling a battery to the station 35. In some cases the surface may be a portion of an existing surface such as, for instance, the charging location indicated at 1212 on tabletop surface 1198 in FIG. 34 where electrical contacts or a coil are integrated into that surface. In other cases the surface may be provided by an add-on shelf member as shown at 1214, 1216, 1218, 1220, 1222, etc. In the case of an add-on shelf, the shelf may be mounted to the screen and extend forward (see 1216 and 1222), rearward (not shown) or to the side (see 1214). Instead the shelf may be mounted to the leg structure and extend in any direction. For easy of access, in some cases the shelf will extend forward or sideways from the leg assembly as at 1218 or 1220. Again, any type of electrical coupling assembly (e.g., contacts, coils, a cable and plug, etc.) may be used.

Referring still to FIG. 34, in other embodiments hook type connections mechanical and electrical connections are contemplated as shown by exemplary hooks at 1230, 1232, 1234 and 1236. In some cases a hook extends down from an undersurface of tabletop 1198, preferably from a location adjacent a tabletop edge so that the hook is easily accessible and so that a battery supported thereby is adjacent the edge for signaling purposes. In some cases the hook may extend laterally from a tabletop edge as at 1236. In some cases the hook extends from the screen assembly as at 1230 and, in these cases, may extend forward, laterally or rearward and form a location above the height of the worktop 1196 below the worktop 1196 height.

Referring again to FIG. 34, elongated cylindrical battery receiving cavities are shown in phantom for receiving batteries in a more concealed fashion. Here, for instance, a battery receiving cavity can be formed in the leg 1194 where a tabletop opening 1240 enables battery insertion into the cavity. In other cases a basket type housing akin to the housing described above in other embodiments may extend downward from an undersurface of top 1196 to form a battery receiving cavity substantially below the worktop. In other embodiments structure within the screen assembly 1190 may form a battery receiving cavity as shown at 1242. In still other embodiments the battery cavity may be formed behind display screen 1200 as shown at 1244.

Figure 49:
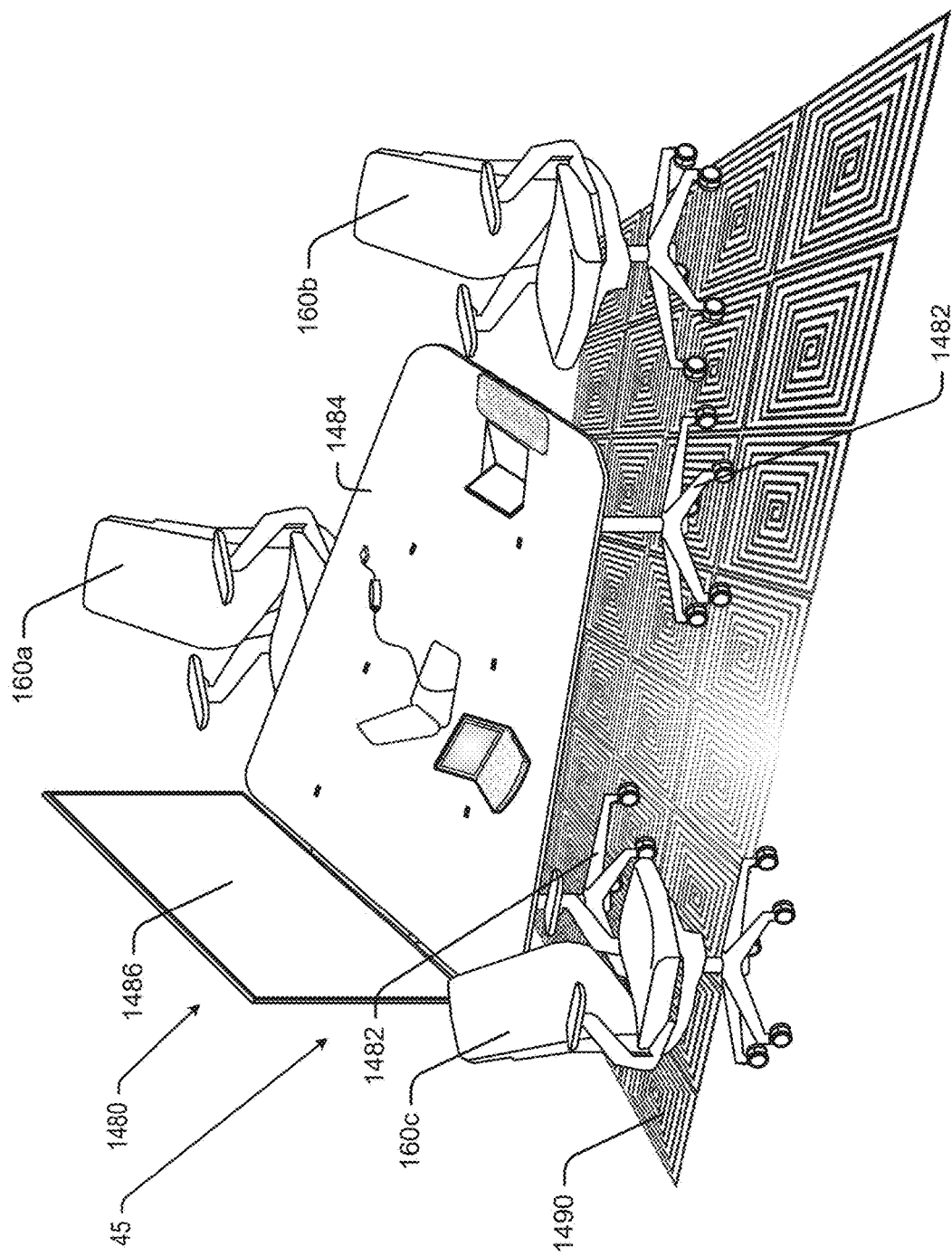
FIG. 49 is a view of a small group type affordance arrangement that is consistent with at least some aspects of the present disclosure.

FIG. 49 shows one other contemplated affordance arrangement that includes a small group conferencing system 45 that includes a content sharing table and display screen assembly 1480, three chairs 160a, 160b, 160c, and a power distribution mat 1490. The table assembly 1480 includes a leg structure 1482 and a tabletop member 1484 as well as a content sharing large display screen 1486 mounted along a flat rear edge of the top 1484. In addition to the display screen, the table assembly may include other components that require power including any other the other devices described above in the other affordance arrangements described. Here, any of the surface supported, hook supported, or cavity receiving battery coupling arrangements described above with respect to the other affordance arrangements may be used with assembly 45 to connect one or more batteries to the table assembly 1480 or any one or more of the chairs 160a, 160b, 160c, etc. For instance, a surface type coupler including contacts, an induction coil, or any other type of electrical coupling assembly may be integrated into a top surface of member 1484. In other cases a battery supporting shelf or hook type coupler may be mounted to and extend from any edge of the top member 1484, from one of the leg members 1482 or from the front surface, rear surface, side edge, top edge or bottom edge of the display screen 1486. Battery receiving cavities or spaces may be formed in any of the tabletop 1484, screen 1486 or legs 1482 or may be formed by additional housing or basket type arrangements adjacent any edge or surface of assembly 1480 as illustrated. Any of the seating assemblies in FIG. 49 may include any of the battery receiving or supporting arrangements described above. Where one of the table assembly or seat assemblies in FIG. 49 is coupled to a battery, in at least some cases that assembly will be electrically operably connected to mat 1490 (e.g., via contacts or inductive coils) and the mat will be electrically connected to the others of the assemblies that comprise arrangement 45 so that power can be delivered to all affordance devices associated with all of the assemblies 1480 and 160*a*, 160*b* and 160*c*.

It should be appreciated that many of the battery forms disclosed herein have shapes that are similar to shapes of components that are typically located at employee supporting affordance arrangements. By providing batteries that have form factors that are similar to the forms of components already located at arrangements, the batteries can be accommodated at the arrangements in minimally intrusive ways. For instance, many affordance arrangements have substantially flat or plate shaped members that form worktops, screens and wall structures as well as elongated members that form legs, posts, supports, arm supports, backrest or seat frames, etc. By providing batteries with flat forms or elongated forms and with dimensions that are equal to or less than the dimensions of similarly shaped arrangement components, the battery coupling components can be designed to locate the batteries parallel to or in some cases within the existing arrangement components.

While not shown, in some cases it is contemplated that two or more battery receiving and electrically coupling subassemblies may be provided at a workstation, in a seat, or at some other affordance configuration so that if an employee knows she will be using the configuration for a duration longer than the charge associated with one battery, she can obtain two batteries to connect to the workstation to power the station devices for a longer period for time.

Referring again to FIG. 3, in at least some cases it is contemplated that each employee supporting configuration including the workstation 20 shown will also include a power cable that is linkable to a conventional receptacle outlet as shown at 1250. Here, the idea is that whenever workstation 20 is near a conventional power receptacle (e.g., when cable 1250 is long enough to reach a power receptacle), the workstation 20 may be plugged into that receptacle to preserve battery power and minimize the number of charging cycles for the battery to prolong the useful life of the battery.

In at least some cases it is contemplated that workstations 20 or other configurations will be constructed to have integrated power distribution systems 236 and a standard power connection cable 1250 where battery powered workstation operation is an option. Here, for instance, the workstation 20 in FIG. 3 may be sold as a plug in station that only includes a coupler 1252 for an add on battery shelf 1254, hook, battery receiving basket, or some other battery supporting arrangement. In this case, the coupler 1252 would be directly electrically linked to the power distribution system 236 so that when the shelf 1254 is installed and a battery is electrically coupled to the shelf 1254, the battery would be coupled to the distribution system 1254. Referring also to FIG. 6, the workstation processor 230 in this case is programmed to always use wired power (e.g., from the standard receptacle) to power station devices when cord 1250 is connected to power. When the cord 1250 is not connected to power because workstation 20 is remotely located and not near a receptacle, if a battery is connected to the workstation, processor 230 would control discharge of the battery to power workstation devices. Here, a hierarchy of power use implemented by processor 230 may including using power from a wired connection first when available, using power from a portable battery second when available and using power from a backup battery 480 (see again FIG. 6) when neither wired power nor a portable battery are available.

In at least some cases at least a subset of the affordance configurations that can be plugged into a standard wall receptacle for power at times will also include a charging device for charging a the backup battery 480 as well as a portable battery that is connected to the configuration. To this end, see the battery charger 1260 in FIG. 6. Here, whenever cord 1250 is plugged into a power receptacle and a battery is attached to the configuration, in addition to using the outlet power to drive configuration devices, processor 230 would charge the connected portable battery as well as the backup battery 480. In this case, the battery charging may occur irrespective of whether or not an employee is currently using the configuration. Thus, for instance, if an employee leaves a portable battery at a workstation overnight where the station is plugged into a receptacle, the battery would continue to charge until full charge capacity is reached.

In at least some cases when a battery at a workstation or other affordance configuration is completely charged, an LED may be lit or some other signal may be generated to indicate the charged state. In cases where a fully charged battery is at a workstation that is not occupied by an employee, the indicator LED or other indicator may generate a different signal to indicate battery availability and full charge. Thus, here for instance, when an employee is walking by a workstation and needs a charged battery, the LED signal would notify the employee that a charged battery is available and not currently being used by another employee at the station so that the employee could retrieve the available battery.

Figure 35:
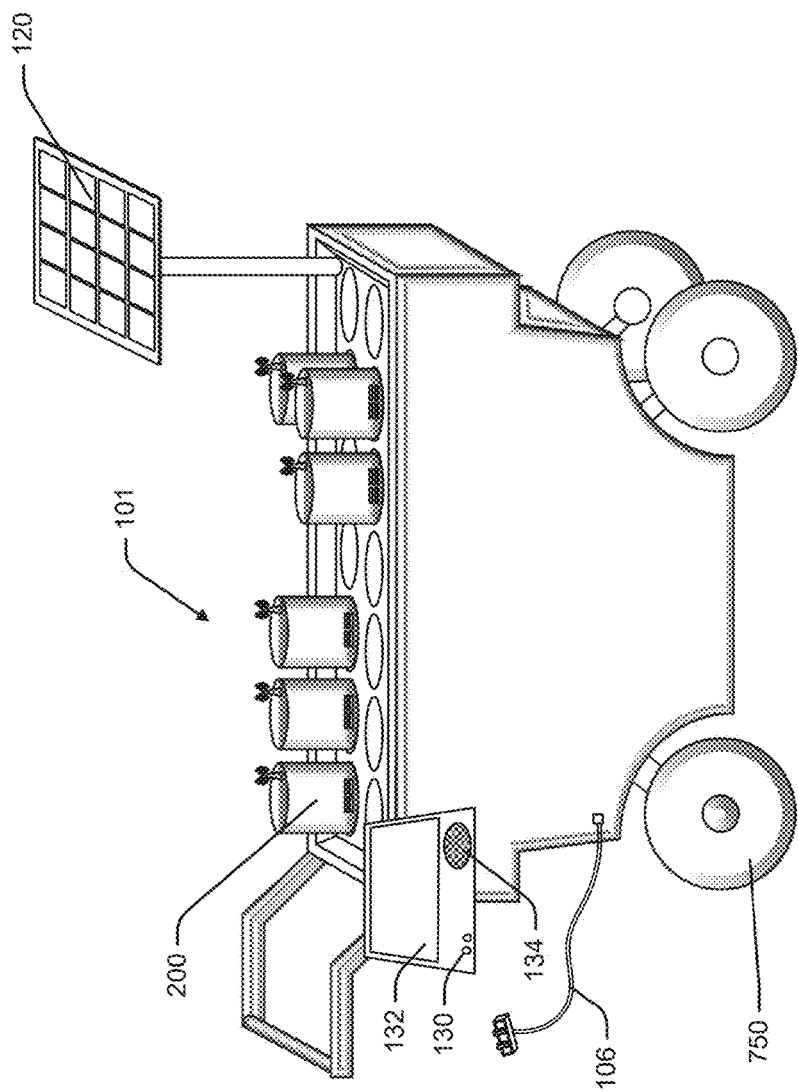
FIG. 35 is a view of a manual mobile battery charging station.

In at least some cases it is contemplated that battery charging stations may be mobile. For instance, see FIG. 35 that shows a manually driven mobile charging station 101. Here, the phrase "manually driven" means that a power custodian (e.g., an employee responsible for, among other things, delivering batteries to and swapping batteries at workstations) manually moves the charging station or cart around within an employer's facility to deliver batteries where needed. Station 101 is similar to stationary station 100 described above except that the station 101 is on wheels 750 and operates as a moveable cart. Here, the cart includes a power cord 106 to be plugged into a power receptacle and also, in some cases, will include a solar cell arrangement 120 akin to the arrangement described above with respect to station 100.

Referring again to FIG. 4, in at least some embodiments station 101 also includes a rechargeable battery 136. Here, the battery 136 may be linked to processor 122 and used to power various components on the station 101 including a transceiver, a speaker, a microphone, a display screen, warning LEDs, etc.

In addition, battery 136 may also be useable to remotely charge other portable batteries that are placed on the charging surface. Thus, for instance, once an employee places a partially charged battery on cart 101, processor 122 may automatically start to recharge the depleted battery. In some cases processor 122 will be programmed to recharge batteries in a smart way given other circumstances. For instance, monitoring charge state of the onboard battery 136, processor 122 may calculate the number of portable batteries 200 that the current charge state should be able to recharge to 100% capacity and may only charge that number of depleted batteries and no more. Thus, for instance, if a current battery 136 charge state is only capable of recharging 5 batteries 200, processor 122 may only commence charging 5 depleted batteries and no more. In some cases as partially depleted batteries are placed on the charging surface, processor 122 may recalculate the number of batteries that can be fully recharged and then change the number that are being charged. For instance, if 5 batteries are being charged currently but all are at 80% charge already, it may be that when a sixth and a seventh battery are placed on the charging surface and each of those is at 80%, that the cart can charge all 7 to full charge states. Battery 136 may charge all the time via the solar cell 120 and may charge any time cord 106 is plugged into a receptacle.

In at least some cases it is contemplated that a power custodians will persistently travel along known paths through an employer's facility per schedules so that every hour or at some other effective cadence there is a charge cart 101 near every location within the facility so that employees can swap batteries whenever optimal. In these cases employees may simply know battery charge cart schedules and may watch for a cart in their area and swap batteries when it makes sense.

In other cases it is contemplated that a system processor may track charge states of batteries at workstations as well as charging cart 101 locations and may provide at least suggestions to a power custodian on travel paths through a facility. Thus, here, for instance, where several batteries currently being used at workstations in a first area of a facility are near complete depletion states, the system processor may transmit instructions to a power custodian directing the custodian to reroute his path from a current path to a different path through the facility to the first area to deliver charged batteries to employees working in the first area. Here, in at least some cases the system processor may track charge states of batteries on a moveable cart and may instruct a custodian to travel a path that passes by a stationary charging station 100 to retrieve additional charged batteries that will be required in the first area if the moveable cart does not have all the charged batteries required in the first area.

In some cases mobile carts will be completely automated so that they move throughout facility space autonomously to deliver batteries to workstations. In this regard see FIG. 36 that shows an automated mobile charging station or cart 103. Referring also and again to FIG. 4, cart 103 is similar to cart 102 in that it is mounted on wheels 750 and includes a battery 136 but in this case the cart 103 also includes one or more transport motors 142 connected to and controlled by processor 122 to automatically drive the wheels and move cart 103 around within a facility. Again, in some cases cart 103 includes a power cord 106 and a solar cell or assembly 120 for charging battery 136 as well as other batteries 200 placed on or otherwise coupled to the cart 103 for charging. In other cases cart 103 may include a charging arm member 754 that extends from the cart to make contacts with a charging rail 756 located at a stationary charging location within a facility. Here, the arm member 754 may be pivotally mounted at a proximal end to cart 103 so that it can be moved from a storage position shown in phantom to an extended connection or use position where a distal end contacts the charging rail 756. Thus, in at least some cases a processor may control cart 103 to move the cart to an optimally located charging rail location and may control arm 754 to move the arm outward and into contact with a rail.

As in the case of the manual mobile carts 101 described above, the automated carts may be programmed and controlled to move through a facility along pre-prescribed and scheduled paths so that they pass through all areas of the facility where portable batteries are used to power workstation and other affordance arrangement devices. Again, here, employees would know general cart schedules and could swap batteries whenever needed and convenient.

In other cases it is contemplated that a system processor may track charge states of batteries at workstations as well as charging cart 103 locations and may change automated charge cart travel paths to deliver batteries to facility locations on an as needed basis. Again, here, for instance, where several batteries currently being used at workstations in a first area of a facility are near complete depletion states, the system processor may control a cart 103 to travel a path through the facility to the first area to deliver charged batteries to employees working in the first area.

In other cases, a system processor may track employee schedules and may proactively move one or more automated mobile charging carts to a location within a facility where a large number of employees are scheduled to persist for at least a threshold duration to ensure that battery power options are available to meet anticipated needs. For instance, in a case where a 200 employee conference will take place in a conference space, the system may automatically move 10 charging carts with fully charged batteries to that space one hour prior to commencement of the conference to meet anticipated power demands.

In at least some cases it is contemplated that all mobile charging carts may not be required all the time to efficiently deliver batteries within a facility. In these cases, a subset of the carts may be automatically moved back to charging rails at charging locations within a facility where the internal battery 136 can be charged to full capacity while other carts are out charging portable batteries 200 and delivering batteries where needed.

In at least some cases larger capacity batteries may be provided within a facility for specific situations such as, for instance, where a plurality of workstations are located proximate each other such that a single battery could power several stations at once, in the case of a larger affordance arrangement to support several different employees at a single meeting, or in other situations where more power is required that can be delivered via one of the smaller carryable batteries. In these cases, instead of requiring several employees to retrieve and transport smaller batteries (e.g., 200 above), in some cases larger battery carts with wheels or casters will be provided that can either be moved manually or automatically to needed locations.

Figure 37:
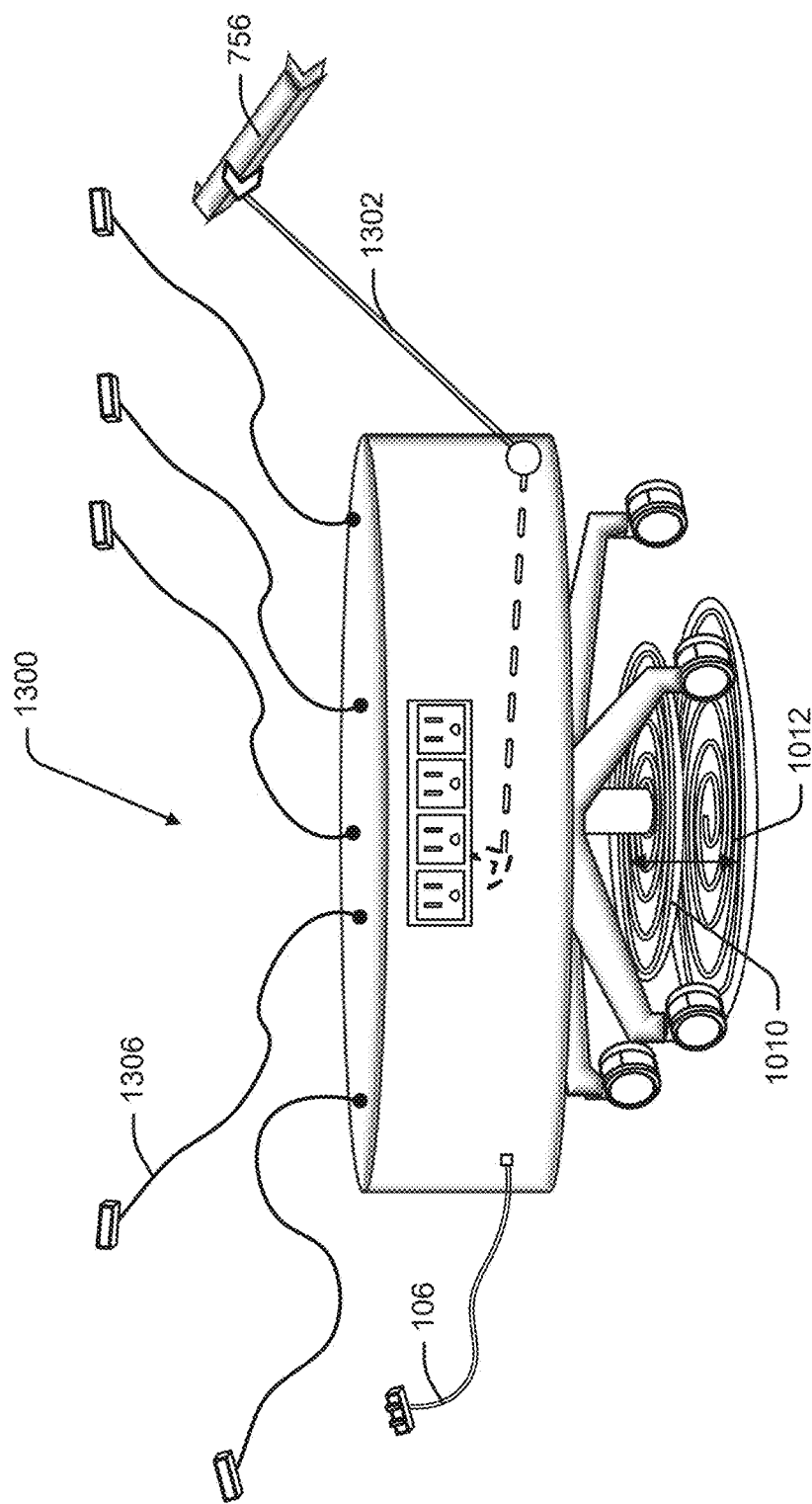
FIG. 37 is a view of a large form robotic battery assembly that is consistent with several aspects of the present disclosure.

To this end, see for instance FIG. 37 that shows an automated mobile battery cart 1300 that includes a larger housing structure that forms a cavity (not illustrated) in which a larger set of battery cells may be provided. As in the case of the automated mobile charging station described with reference to FIG. 36, the automated battery cart 1300 includes powered wheels for driving the cart about to different locations within the facility.

Several different charging options are contemplated for the battery 1300 including a foldable charging arm 1302 that is controlled to extend to a charging rail 756 when the battery needs to be recharged and after the battery is moved to a location adjacent a charging rail. A second option includes a charging cord 106 to connect to a standard power receptacle. A third option includes a charging coil 1310 mounted between the cart wheels that can be raised during cart travel and lowered during charging (or discharging as described below) to form a flux coupling with a charging coil 1312 that is embedded in a floor structure at a stationary charging station.

Several different coupling options are also contemplated for coupling the battery 1300 to a workstation, some of which are shown in FIG. 18. A first option includes either the foldable charging arm 1302 that may operate in a second capacity to link to a workstation via a rail 756 type connector to provide power to workstation devices. A second option includes connector cables 1306 for connecting to workstations or other affordance arrangements. In the case of cables 1306, it is anticipated that when a battery 1300 arrives at a location for use near workstations, each station user would have to grab one of the cables 1306 and attach it somehow to her workstation to provide power to the station distribution system. In FIG. 37 the assembly 1300 includes five connecting cables 1306 so that five separate workstations or other affordance arrangements can be connected up to the battery for charging at the same time. A third option includes the charging coil 1310 mounted between the cart wheels that can be raised during cart travel and lowered during discharging to form a flux coupling with a coil 1320 proximate a workstation and linked to the workstation akin to coil 1312 described above with reference to FIG. 37.

In at least some cases one or more system processors (e.g., a battery processor, a workstation processor, a processor associated with the system server 12 (see again FIG. 1)) may be programmed to help employees manage battery monitoring as well as battery swapping activities in any of several different ways. Here, in most cases the disclosed processes include providing messages to battery using employees that report on battery charge state and/or that encourage employees to swap currently used and somewhat depleted batteries for batteries that have a higher charge at optimal times. In some simple alerting cases the system does not store any information related to battery charge or other battery related information. For example, in some cases it is contemplated that a battery processor 202 or a workstation processor 230 (see FIGS. 5 and 6) may be programmed to monitor battery charge at a workstation and to provide an alert message or other signal to a station user indicating at least a battery state. For instance, see the exemplary text message shown in a pop up window 1330 in FIG. 38 that may be provided via the workstation display screen 38 (see again FIG. 3) or the battery screen 216 (see FIG. 7). To call an employee's attention to the alert, an audible signal may also be generated via a system speaker. In an alternative case, one or more battery or workstation LEDs may be lit to indicate a depleted battery state. In still one other case an audible voice message may be generated via a battery or station speaker broadcasting the same message presented in FIG. 38.

In all cases that follow where a processor generates a text message in a pop up window directed at an employee on a display screen, it should be recognized that, instead of or in addition to the text message, the processor may also present other alerting signals such as lit LEDs, audible beeps or sounds to call an employee's attention to the alert, a broadcast voice representation of the text message, etc. It should also be recognized that the alerts or messages may be provided via any one or a subset of battery output devices, workstation or other affordance configuration devices, or an employee's personal computing device.

Alerts may be generated via battery output devices or station output devices that are dedicated to the power management system (e.g., speakers, LEDs, a dedicated display screen). In other cases alerts may be provided via devices located at a workstation that are primarily for other purposes like a large station display screen, a speaker for general sound, LEDs provided for other purposes.

In any case where an alert is presented, it is contemplated that the nature or characteristics of the alert may change over time as battery charge state or other conditions change. For instance, a first relatively subdued alert may be provided to a user when a battery is depleted to 30% of its maximum charge, a louder or otherwise more intrusive alert may be provided when the battery is depleted to 15% of its maximum charge and an urgent alert (e.g., louder, more urgent text message, etc.) may be presented when the battery has depleted to 5% of its maximum charge so that complete depletion is imminent.

To call an employee's attention to the alert, an audible signal may also be generated via a system speaker. In an alternative case, one or more battery or workstation LEDs may be lit to indicate a depleted battery state. In still one other case an audible voice message may be generated via a battery or station speaker broadcasting the same message presented in FIG. 38.

In cases where an employee uses a portable smart phone, tablet or other computing device, once an employee registers her personal device with the system (e.g., provides an electronically addressable address), a system processor may transmit the battery charge message to the employee's personal device to be presented either visually as text or audibly. Here, it is contemplated that each time an employee retrieves a battery from a charging station or cart for use, some type of battery-employee association would have to occur so that the system would know which employee to send alerts to for the associated battery. Thus, for instance, prior to retrieving a battery from a cart, an employee may have to "unlock" the battery for use by using her portable personal computing device, an electronic badge or some other type of identifier (e.g., bioinformatics) to identify herself to the charging cart. Here, the term "unlock" may include actually releasing the battery by controlling a mechanical locking mechanism to release a specific charged battery for use. In this case, when a battery is unlocked, an LED or the like associated with the battery may be lit to indicate release and encourage the employee to retrieve the associated unlocked battery.

In other cases the term "unlock" may mean to enable the battery for use. Here, when a battery is "locked", the battery may not be enabled for use even if removed from a charging cart. In this case, once an employee is identified by a cart sensor or processor arrangement, a processor would associate the specific battery with the specific employee electronic address for communication purposes and would unlock the battery to enable the battery for use.

Figure 39:
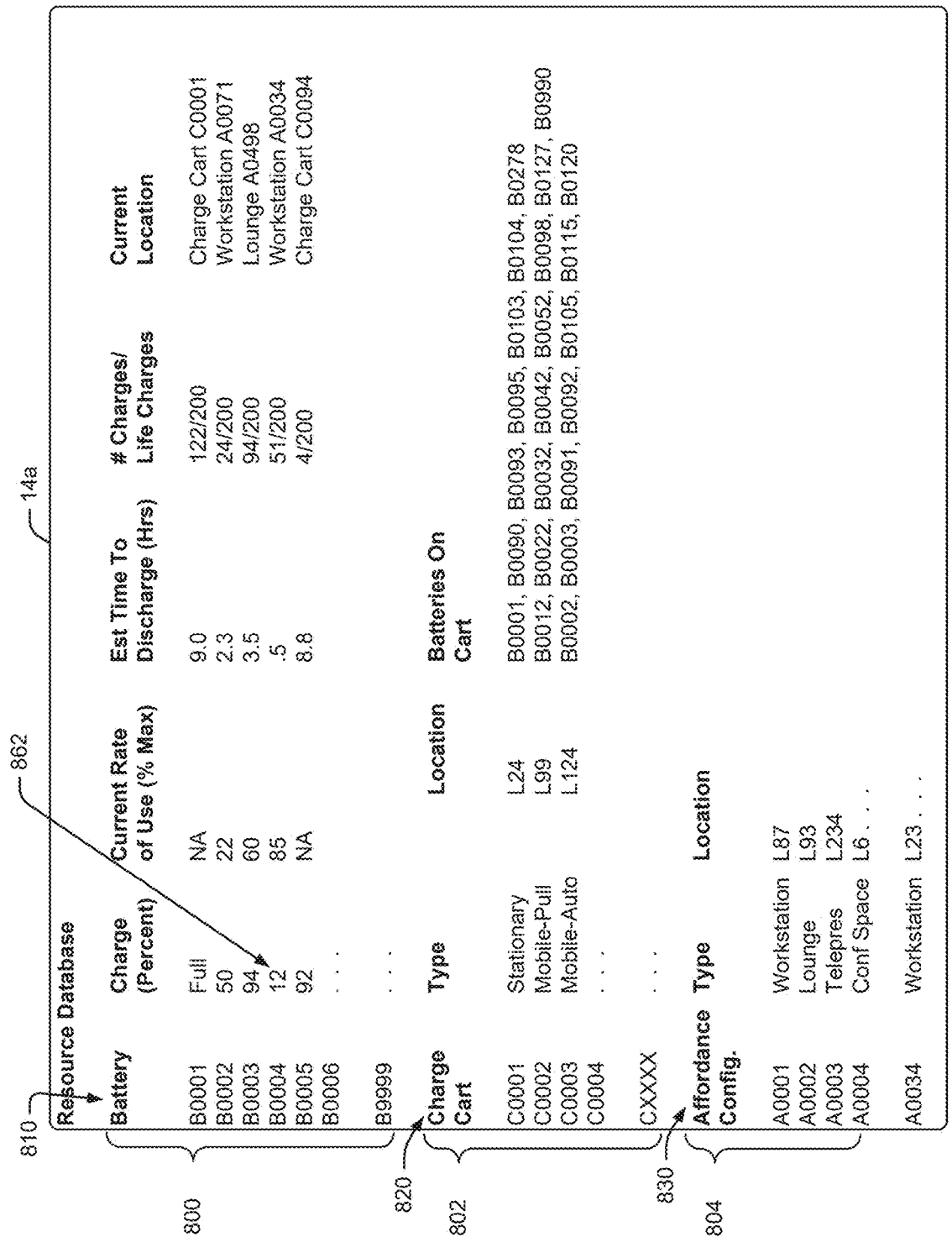
FIG. 39 is a schematic illustrating a database representation corresponding to facility affordances that is consistent with at least some aspects of the present disclosure.

In the case of processes that associate specific batteries with specific employees as well as in other more complex battery management processes and methods, power management data has to be collected and stored in a database (see 14 in FIG. 1). An exemplary simplified system database including a resource dataset 14*a* and an employee data set 14*b* for supporting a plurality of different system methods and processes is illustrated in FIGS. 39 and 40, respectively. The exemplary database is presented in a table form in order to simplify this explanation. In reality, the database would typically be far more complicated. It should also be recognized that while a single database 14 is shown in FIG. 1, in most cases the subsets of the data described in this disclosure would be stored in different databases where server 12 or other system processors access different data from different databases when required to perform disclosed processes. For instance, in FIG. 40, employee schedule data is represented schematically in a database column 850. In most cases an enterprise runs a separate employee scheduling software program and data related to that program is stored in a separate database that can be accessed by other programs when required. As another instance, in cases where battery, charge cart, and employee locations are tracked, in many cases those resource locations will be tracked by programs separate from a battery and power management program and data related thereto may be stored in a separate database for access when needed. Thus, in most cases the database 14 will include a distributed database with data stored in different storage resources and accessed by different system processors.

The data in FIGS. 39 and 40 includes several different data types used in different methods and processes contemplated by this disclosure. Not all methods and processes contemplated use all of the data shown and not all systems contemplated perform all of the disclosed methods and processes so, in at least some cases, a system database will include only a subset of the data shown in FIGS. 39 and 40.

Referring to FIG. 39, the resource data set 14*a* includes information related to system batteries 800, specific charging stations 802, and affordance configurations 804. The battery information 800 includes data arranged in columns and rows where data in each row is associated with a specific system battery (e.g., 200, 400, 500, etc.). A first "Battery" column 810 lists each battery available for use within a facility and exemplary batteries are labelled B0001, B0002, B0003, etc. A "Charge (%)" column indicates a current charge state of each battery in battery column 810. Here, in at least some cases battery processors 202 (see again FIG. 5) may monitor battery charge and periodically wirelessly transmit charge information via facility access points to server 12 shown in FIG. 1. In other cases a workstation processor or other processor may monitor current charge of any battery connected thereto and transmit that information to server 12 for storage and processing. In still other embodiments, a battery or station processor may link to an employee's portable smart phone or other computing device to provide charge data through that device to server 12 via cellular or other wireless connection.

Referring still to FIG. 39, a "Current Rate of Use (% Max)" column indicates a current rate of power use for each battery in battery column 810. The current rate in FIG. 39 is expressed as a percent of maximum battery power that is being used per hour. For instance, 22% indicates that 22% of a maximum total battery power is being used every hour. In this case, if the batter has 44% maximum charge, the expectation would be that the battery would be able to provide charge at a typical use rate for approximately 2 hours. Here, again, either a battery processor, a workstation processor, or a personal computing device may monitor current rate of use and transmit that information to server 12 for storage and consumption. In some cases the current rate of use may be calculated every few minutes or it may be a rolling average over a most recent few minutes (e.g., rolling over last 5 minutes, last 15 minutes, etc.). An "Estimated Time To Discharge (Hrs)" column lists an estimated time to discharge for each battery in column 810 based on typical or average battery charge rate usage. A "#Charges/Life Charges" indicates, for each battery in column 810, the number of times the battery has been charged over a total expected charging cycles for the life of the battery. A "Current Location" column indicates a current location for each battery in column 810.

The charging station data 802 includes a "Charge Cart" column 820 that lists all charging stations that are located within a facility. A "Type" column indicates, for each station in column 820, the type of station where types include stationary, mobile-manual (e.g., manually moved by a power custodian) and mobile-auto (e.g., automatically moves throughout a facility to locations where needed). A "Location" column indicates a current location of the charging station. A "Batteries On Cart" column lists which batteries are located at each station in column 820.

The affordance configuration data 804 includes an "Affordance Configuration" column 830 that lists all affordance configurations within a facility including, for instance, each separate workstation 20, personal harbors 25, telepresence stations 35, chairs 160, etc. A "Type" column indicates, for each affordance in column 830, the type of affordance (e.g., workstation, lounge, etc.). A "Location" column indicates the current locations for each affordance in column 830.

Referring to FIG. 40, the employee data set 14*b* includes information related to each employee that may work in a facility and that may use a battery at a workstation or other affordance. To this end, data set 14*b* includes an "Employee" column 840 that lists each facility employee. "Current Assigned Battery" column indicates one or more batteries that are currently assigned to each specific employee in column 840. A "Typical Rate of Use (% max)" column indicates the average rate of prior battery discharge for each employee in column 840 and is expressed as a discharge percent per hour of a maximum battery charge.

The "Employee Schedule" column includes data sets representing each employee listed in column 840. Thus, for instance, a first schedule data set 852 includes all schedule data related to employee E0001 in column 840, a second set 854 includes all schedule data related to employee E0002, etc. Exemplary employee schedule data may indicate where an employee is scheduled to be located and when. Thus, for instance, data 852 may indicate that employee E0001 will be located in a facility associated with database 14 from 8 AM to noon on a specific day and then will be traveling to New York.

The "Employee Location" column indicates a current location of each employee in column 840. The "Estimated TO Departure" column indicates an estimated time at which each of the employees in column 840 is going to depart the facility. Here, the estimated time of departure may be different than a time that is gleaned from an employee's schedule data in column 850 and may be based on past employee activity. For instance, if a first employee routinely leaves a facility at 6 PM irrespective of when her last scheduled activity ends, the system may automatically track that information and populate a cell in the estimated TO Departure column indicating 6 PM. The "Battery Swap Request State" column indicates if an employee has requested a battery swap or not and if a swap has been requested, a level of urgency regarding the swap. The "Device Address" column indicates an electronic address for an employee's portable computing device that can be used to communicate with that device.

In at least some cases it is contemplated that some of the data in databases 14*a* and 14*b* may not be collected and stored generally or may be missing for specific resources or employees. For instance, in some cases where no battery is currently assigned to a specific employee there may be no data in the "Current Assigned Battery" column in FIG. 40 (see "NA" at 860). As another instance, in some cases an employee's schedule data may not be available for some reason and in that case there would be no data in the schedule column 850. As another instance, in cases where the system does not leverage portable smart computing devices like smart phones or the like for messaging, instructions, warnings, etc., the device address column in FIG. 40 may be eliminated.

Referring again to FIGS. 3, 39 and 40, in a first scenario assume an employee E0002 arrives at the FIG. 1 facility and intends to use workstation A0034 for a few hours. Upon arrival at the facility and on her way to station A0034, employee E0002 passes a battery charging station and picks up an initially fully charged battery B0004 to station A0034 and connects the battery to the station so that battery charge is provided to the distribution system 236 at the station. After a few hours of use assume that the battery B0004 charge is depleted to 12% of the maximum charge as indicated in the FIG. 39 data set at 862 so that the remaining estimated charge time is 0.5 hours. Triggered by the low charge battery state, in some cases a system processor may simply provide a text warning to employee E0002 indicating that the battery will be completely discharged soon or is estimated to be discharged quickly.

In an alternative case, triggered by the low charge state, a system processor may use the location of workstation A0034 and data representing locations of charging stations within the facility as well as battery charge data and data indicating which batteries are at which charging stations to locate a closest charging stations to workstation A0034 that has a fully charged battery that can be swapped for battery B0004. In this case, charging station C0001 in FIG. 1 is the closest station to workstation A0034 and the FIG. 39 database indicates that battery B0001 at station C0001 is fully charged and ready to be swapped. Here, a depleted battery message may indicate that a charged battery that can be swapped is at nearby station C0001 to encourage the employee to swap batteries. An exemplary battery charge text alert is shown in pop up window 1322 in FIG. 41 and reads "You should swap your battery. A fully charged battery you may swap for your current battery is available on Cart C0001 which is located near the restroom 78." Thus, here, the message indicates a battery swap should occur as well as information encouraging the employee to travel to a specific charging cart to retrieve a battery to swap.

Figure 42:
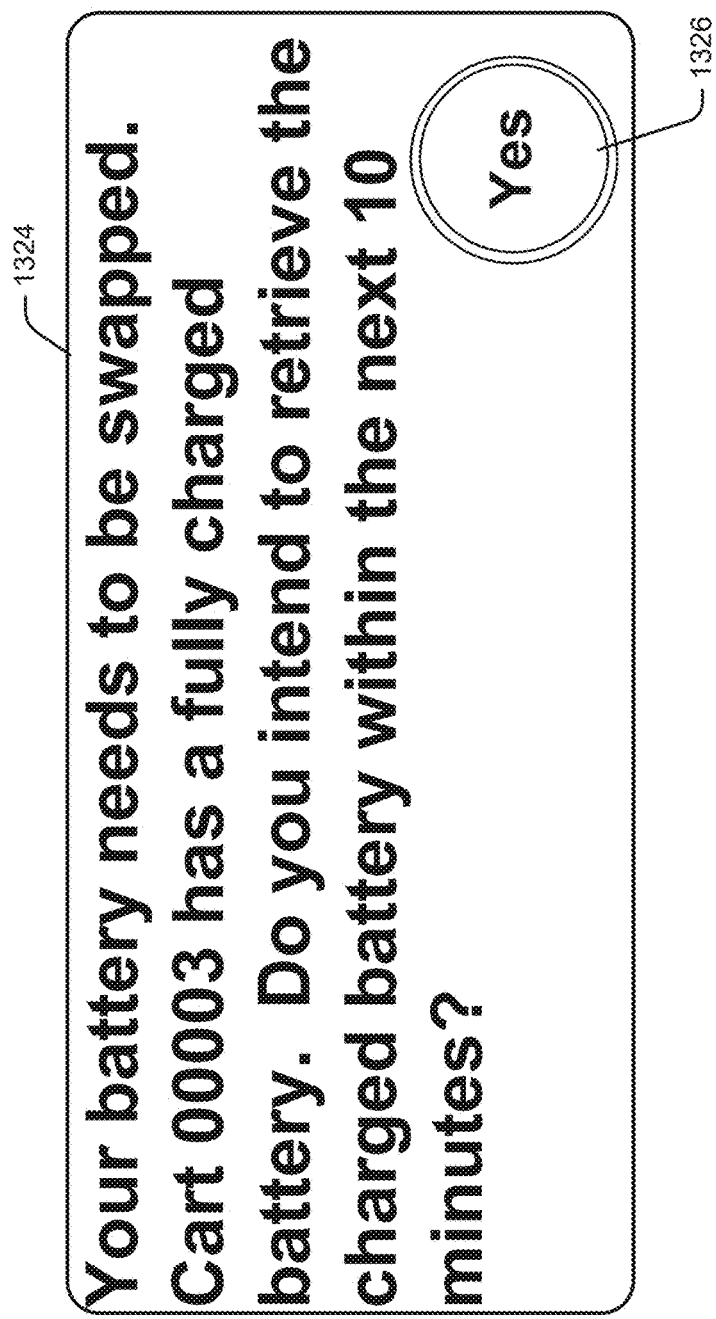
FIG. 42 is similar to FIG. 38, albeit presenting a different alerting message.

In at least some cases it is contemplated that an employee may have the option to reserve a charged battery for retrieval when needed to ensure that a charged battery is available prior to leaving a workstation. In this regard, as described above, in at least some cases batteries on charging carts may be locked, either mechanically or operationally, until associated with specific employees. In some cases an employee may be able to use an interface at a workstation to reserve a charged battery. See for instance FIG. 42 that shows a text message in a pop up window that indicates that a swap is required and also queries an employee if the employee intends to retrieve a battery from a specific suggested cart. The message also includes a touch selectable icon 1326 which can be selected to indicate intent to retrieve a battery. Where icon 1326 is not selected within a threshold time, a processor may simply remove the reminder window. When icon 1326 is selected within a threshold period of time, a system processor may then reserve a battery for use by the employee and lock the battery at the cart so that no one else can take the battery. Here, when the employee arrives to swap a depleted battery for the reserved battery, once the employee's identity is recognized, the processor may unlock the reserved battery so the employee can remove the battery from the charging station.

In this example, employee identification prior to unlocking the reserved battery may take several different forms such as, for instance, placement of the depleted battery on the charging station to be recharged. Here, the depleted battery would have been associated with the employee and therefore when the depleted battery is identified, the employee's identity would be known and the newly assigned battery would be released. In other cases a sensor may have to detect the employee's personal computing device or an identification badge or the like to identify the employee at which point the reserved battery could be released. In still other cases the employee may be recognized by a biometrics sensor. Here, if an employee reserves a battery and then does not show up within some threshold period of time (e.g., within 10 minutes of the time the employee is supposed to retrieve the battery) to retrieve the battery, a system processor may release the battery for use by other employees automatically.

Figure 43:
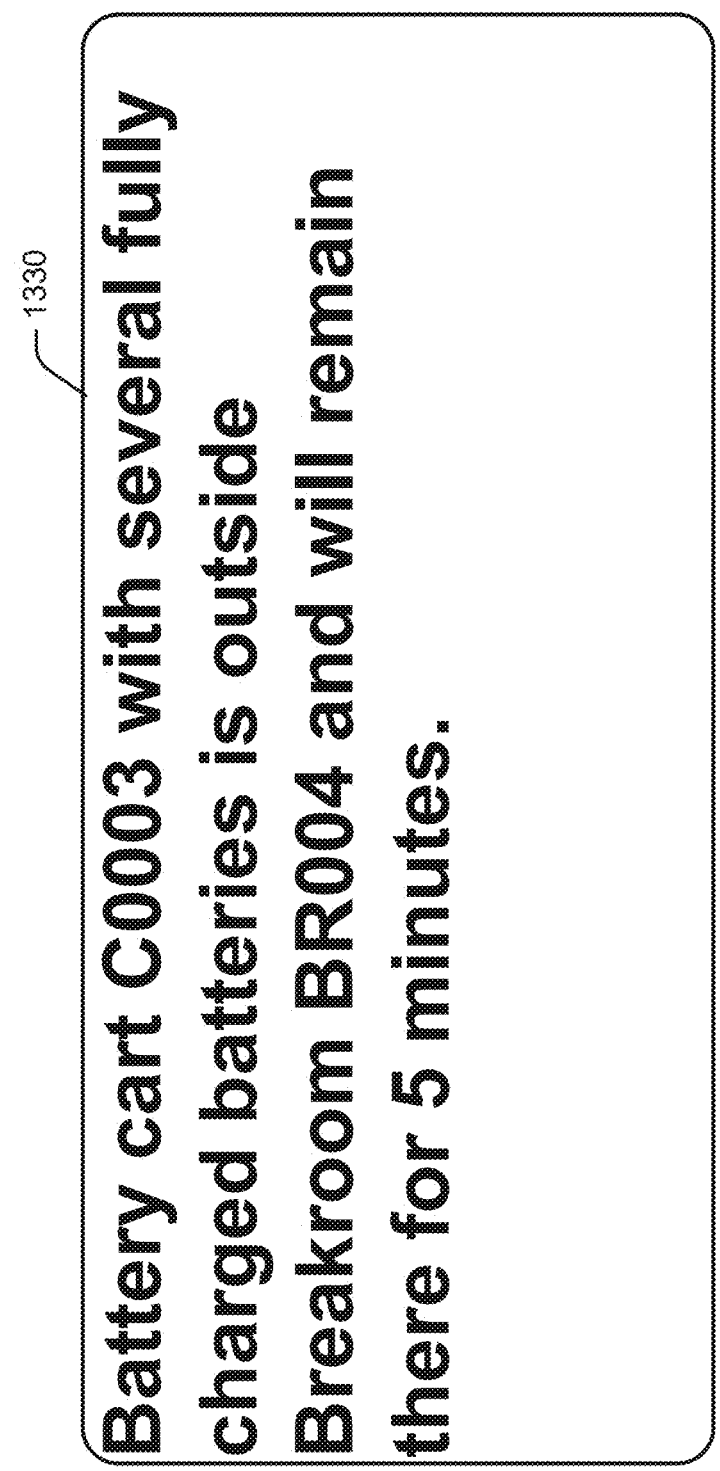
FIG. 43 is similar to FIG. 38, albeit presenting a different alerting message.

In some other cases a system processor may track locations of mobile battery charging carts and may transmit messages to employees at workstations that are currently using portable system batteries when a cart is located within a threshold distance of the employee's workstation. To this end see the exemplary text alert shown in window 1330 in FIG. 43 that reads "Battery cart C0003 with several fully charged batteries is outside Breakroom BR004 and will remain there for 5 minutes." In this case, if an employee wants to swap for a fully charged battery, the employee can do so. In some cases where the processor also tracks battery charge at the workstations, the FIG., 43 message may only be presented to employees at workstations where current battery depletion is at some threshold level (e.g., less than 20% maximum charge or less than 60 minutes of power at current discharge rate).

Figure 44:
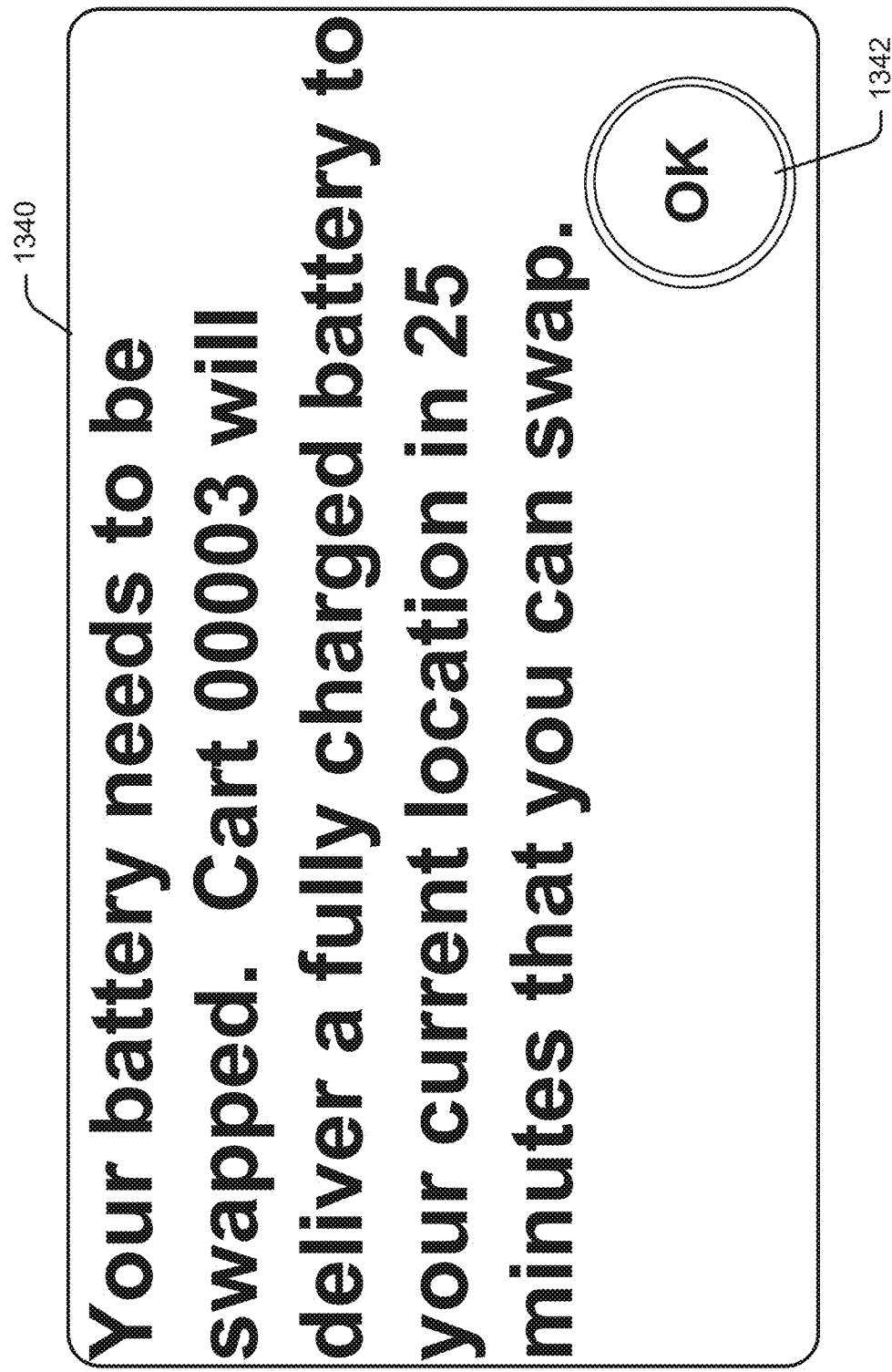
FIG. 44 is similar to FIG. 38, albeit presenting a different alerting message.

In some cases a system processor may also track mobile charge cart schedules and may send messages to employees at workstations indicating estimated times at which mobile carts will be proximate employee locations or immediately adjacent employee locations (i.e., literally next to a station) within the facility so that swapping schedules can be optimized. For instance, see the text message shown in window 1340 in FIG. 44 that indicates "Your battery needs to be swapped. Cart 00003 will deliver a fully charged battery to your current location in 25 minutes that you can swap", with a touch selectable "OK" icon 1342 that can be selected to confirm that the employee wants the system to deliver a charged battery to the workstation for swapping. Here, when icon 1342 is selected, the system processor would change a current mobile charging cart travel path to deliver a fully charged battery to the current location of the responding employee.

Figure 45:
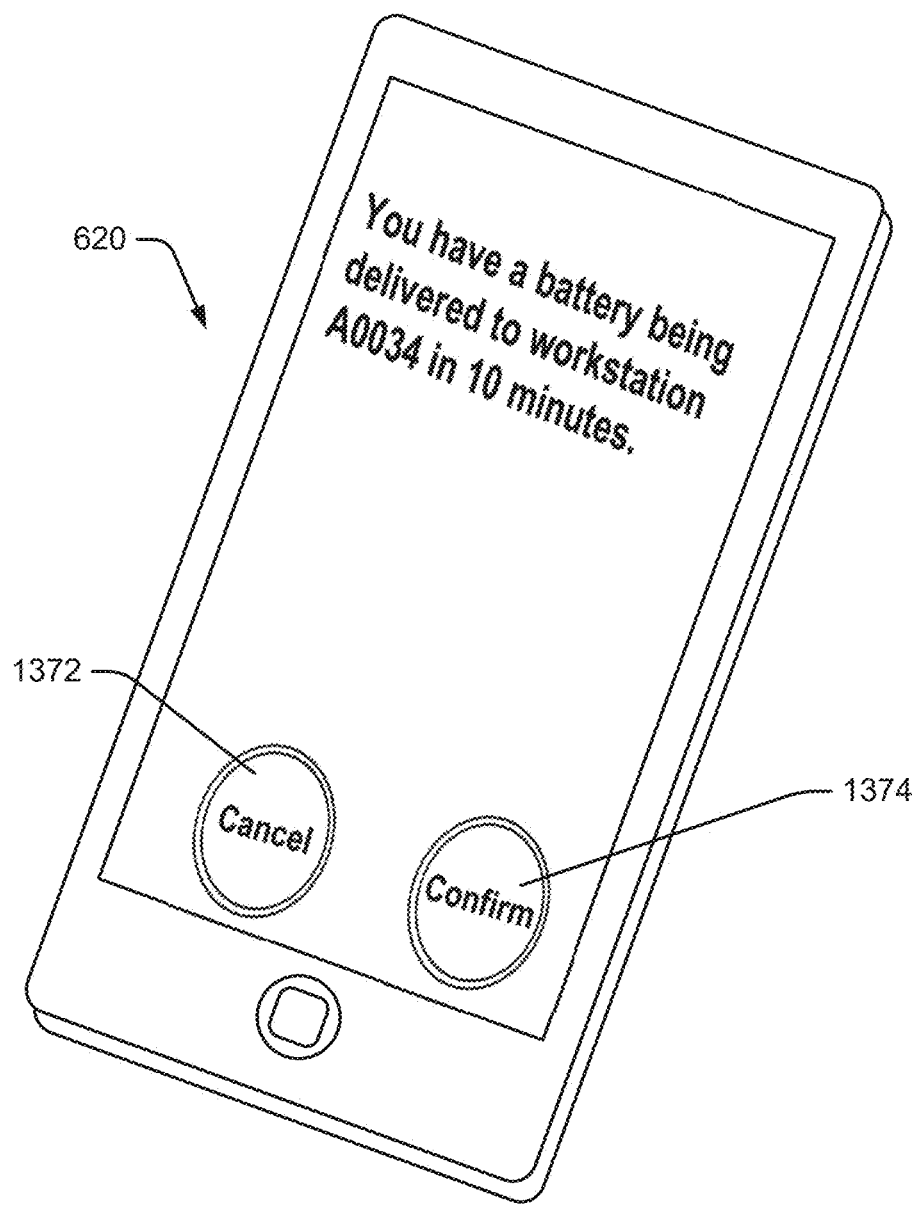
FIG. 45 shows a smart phone device presenting another alert message to a system user.

In at least some cases after an employee indicates that a battery should be delivered to a workstation, the system may track the employee's location and if the employee leaves the workstation prior to the time when the battery is to be delivered (e.g., within 10 minutes of the delivery time), the system may automatically generate and transmit another reminder message to the employee reminding the employee that a battery is to be delivered to the workstation. In other cases the reminder message may include a query to determine if the battery delivery should proceed as scheduled. In this case the message would be via the employee's portable personal computing device 620 as, for instance, shown in FIG. 45, and may include a confirmation icon 1370 and a cancellation icon 1372.

In some embodiments the system may enable an employee to request delivery of a fully charged battery independent of system suggestions. For instance, referring again to FIG. 3, in at least some cases a station input button 42 may be selectable to send a message to the system server 12 requesting delivery of a charged battery. In other cases button 42 may be provided for requesting information on a location of a nearest fully charged battery. In this case, when button 42 is selected, a system processor may indicate the instantaneous location of the nearest charging station that includes a fully charged battery or, in cases where workstations also charge batteries, may indicate the location of a nearest fully charged battery at a workstation that is not currently occupied.

In at least some embodiments system processors may use many other factors in addition to closest fully charged battery to determine where to direct an employee to go to retrieve a battery for swapping. For instance, in some cases a processor may track employee schedule information (see column 850 in FIG. 40) and know that an employee is scheduled to leave a facility within 2 hours when the employee requests a battery swap. In this case, where a partially charged battery at a nearby charging station is charged to a point where it can provide charge for 3 hours, a system processor may suggest that battery or deliver that battery to the employee.

In other cases a system processor may take into account relative percentages of battery charge for all batteries within a general area within the facility. Thus, for instance, where first and second employees request fully charged batteries for swapping, where the battery used by the first employee is 5% charged and the current battery used by the second employee is 30% charged, a processor may recognize the urgent condition of the first employee's charge state and suggest different locations to the two employees based on the relative urgency of the request. In this regard see the battery swap request state column of information in FIG. 40.

As another instance, where some use factor affects batteries differently at different times during their useful life, a system processor may take that factor as well as specific employee discharge rates (see again FIG. 40) when selecting batteries to suggest or deliver. For instance, in some cases it may be that the number of recharges for a typical battery life is increased by 40 if the battery discharge rate is kept below some threshold rate after the first 100 battery charging events. In this case a processor may assess an average battery discharge rate for an employee requesting a battery and where that rate is above the rate threshold, may deliver a fully charged battery that has been recharged less than 100 times. Many other battery use factors are contemplated that may be employed to determine which batteries to suggest to which employees at which times in a way that is most healthy for the overall power delivery system disclosed.

The present disclosure also contemplates systems where batteries automatically swap at workstations and other affordance arrangements without requiring any employee activities. To this end see again FIG. 11 where a mobile battery 1400 is illustrated that includes a housing 1402 and wheels 1404 that would be motor driven and controlled by a battery processor to move the battery 1400 between workstations and a charging station or location. In the illustrated example, battery 1400 is shown to have two battery contacts 1406 and 1408 and the workstation 20 is shown to have a lower bar member 1410 near an ambient floor level that forms two workstation contacts 1412 and 1414 in an upper surface. The battery contacts 1406 and 1408 extend down from the housing and are spaced apart in a pattern similar to the pattern of contacts 1412 and 1414. In some cases the battery contacts 1406 and 1408 may be retractable and extendable and may be retracted during battery travel and extended to make contact with charging contacts (not illustrated) at a charging station and to make contact with the workstation contacts 1412 and 1414 to provide power to the workstation 20 as shown in FIG. 11. Here, it is contemplated that when a battery 1400 at a workstation is to be replaced, a second fully charged battery 1400 would automatically transport to the workstation and upon arrival or just prior thereto, the depleted battery would disconnect from the station and move out of the way so that the second charged battery could move into place and connect to the station. During the short time when no battery 1400 is connected to the station an integrated backup battery would provide required power.

In the case of automatically delivered and connected batteries, in at least some embodiments it is contemplated that a system processor will track employee schedules (see again 850 in FIG. 40) and, when an employee is scheduled to use a specific workstation 20, may automatically move one of the automated batteries to that station prior to arrival of the employee at the station or an associated facility. In some cases the processor may have access to current employee location information as the employee is approaching a facility so that the processor is controlled to only move the battery to the workstation when an employee is scheduled to use the station and also appears to be moving toward the station at approximately the scheduled use time.

In some cases battery powered affordances may be moveable to locations on an as needed basis. For instance, in some cases a fan, heater or other HVAC affordance may be required at a remote location. For example, in some cases a system processor (e.g., server 12) may monitor ambient temperature, airflow, humidity, etc., and may automatically deliver battery powered HVAC devices to locations to regulate and optimize environmental characteristics. To this end see for instance FIG. 47 where a system processor monitors an ambient temperature or air flow sensor 1427 and where a battery powered and automated fan assembly 1420 is shown to include a base housing 1422 on motor driven wheels that may be controlled by the processor to deliver itself to any facility location when a system processor recognizes a need. In this case, when the battery associated with one HVAC assembly 1420 reaches a depleted state, the system processor would have another assembly arrive and replace the first assembly while the first assembly returns to a charging station to recharge its battery.

Figure 48:
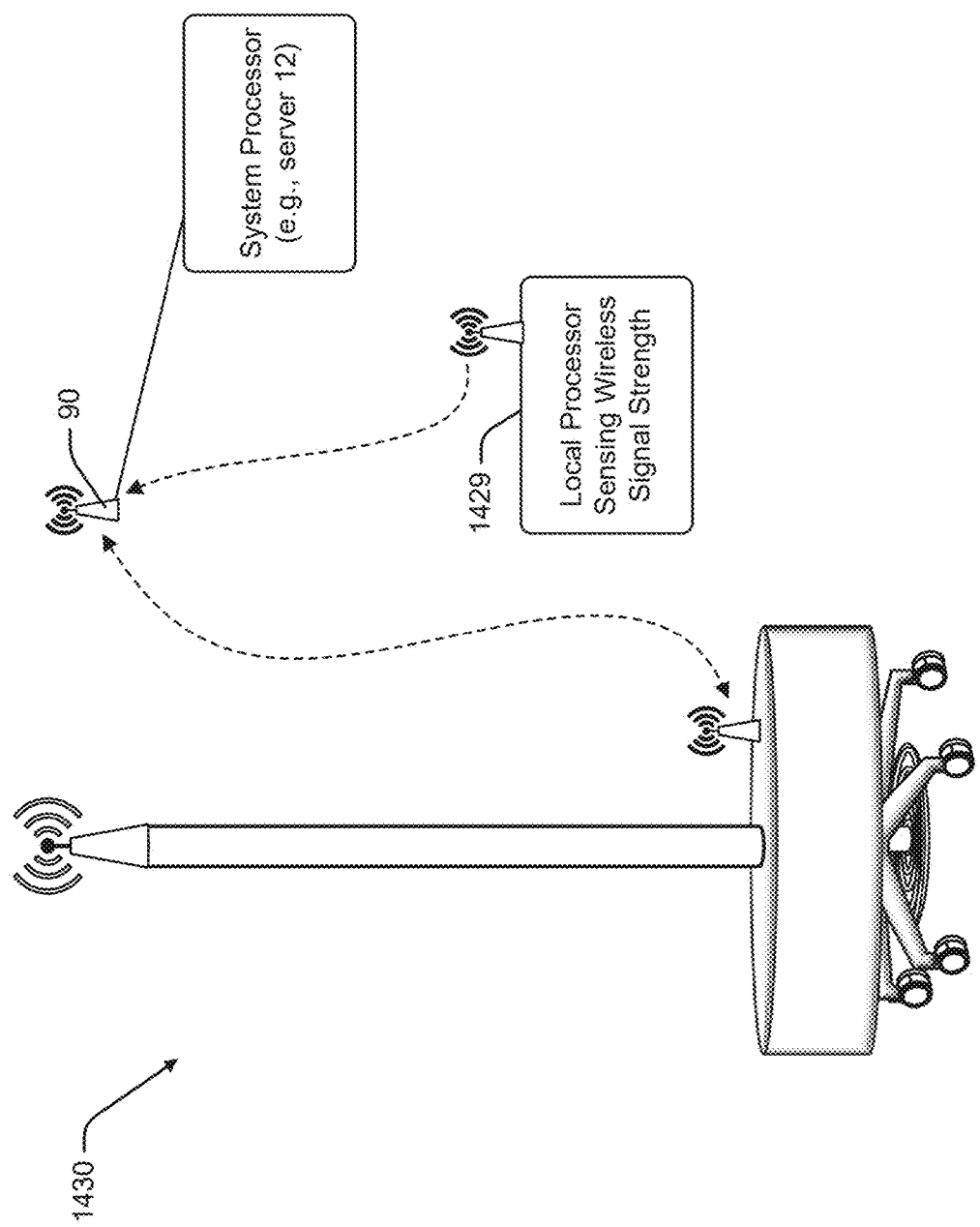
FIG. 48 is a view of an access point type robotic battery assembly that is consistent with at least some aspects of the present disclosure.

As another example, in some cases where employees spread out within a large space, it may be that some facility locations do not have a strong wireless communication capability because there are no access points near those locations. In this case, a system processor recognizing that a wireless signal will be weak in a location occupied by an employee may control an automated battery powered wireless access point assembly to move that assembly to a location proximate the employee. Here, as shown in FIG. 48, a processor 1429 at the location of the weak signal may recognize the weak signal and send that information on to the FIG. 1 server 12 for processing. An automated wireless access point assembly 1430 may then be controlled to move that assembly to the facility location with poor wireless coverage to increase communication capabilities.

Although not shown, other automated affordance delivery assemblies are contemplated including lighting devices, sound systems, projectors, emissive surfaces (e.g., flat panel display screens), privacy screens and shields, dividing wall structures, etc. In still other cases it is contemplated that even battery powered workstations may be automatically controlled to move to different locations within a facility. For instance, at times employer policy may call for employees to be located proximate each other while at other times minimum spacing between adjacent working employees may have to be greater (e.g., more than 10 feet). In these cases a system processor may reconfigure workstations and other affordance arrangements when employees are not present at those workstation or affordance arrangements.

When batteries or workstations or other affordance arrangements are used temporarily by several different employees during the course of a day, in at least some cases employees or employers will have preferences or adopt rules that require those resources to be cleaned between uses. For instance, in some cases each time a battery is placed on a charging station to recharge, it may be required that the outside of the battery housing is wiped down prior to reuse of the battery once charged or prior to unlocking the battery from the cart for use by another employee. In some cases it is contemplated that a system processor may enforce wipe down rules or at least provide indications to employees regarding which batteries and other affordances have been cleaned since last use and which have not and need to be cleaned prior to use.

To this end, in some cases it is contemplated that a janitor or other employee (e.g., a power custodian) may be tasked with cleaning batteries when batteries are returned to charging stations. In this case, for instance, each time a battery is cleaned (e.g., wiped down with an anti-bacterial liquid or the like), the custodian may be charged with resetting the battery to indicate the cleaned state. Resetting may include the custodian entering a "battery clean" code into some system interface to indicate a cleaned battery. For example, when a power custodian wants to clean a battery, the custodian may first use an ID badge or the like to associate with the battery, may clean the battery and then may enter the battery clean code to confirm that the specific battery has been cleaned. Here, then, the system may start recharging the battery and, upon the battery reaching some threshold level of recharge state, may release the battery for use and indicate a clean state by lighting up an LED or otherwise indicating the clean and charged states to employees at the station.

In other cases a system processor may obtain information that can be used to determine if a battery has bene cleaned prior to unlocking the battery or rendering the battery useable. For instance, see again FIG. 3 where charging station 100 includes a camera 5. In some cases camera 5 may collect video of the space associated with station 100 and other station sensors may collect other information which is provided to a system processor where the processor can process the video and detect different activities at the station. One detectable activity at the station may be custodian activity at the station that is consistent with a battery cleaning action. For instance, prior to cleaning a battery at station 100, interrogation of an employee's ID badge may enable a system processor to determine that a power custodian is located at the station. The custodian may pick up a specific battery 200 at the station causing a processor to ID the battery picked up and that the custodian picked up the battery.

The custodian may then move the battery around during a cleaning process where those movements could be detected as cleaning movements. Here, the battery movements may be detected via sensors in a battery itself or else via the video captured by camera 5. Here, when the battery is replaced at that charging station, the processor may recognize the replacement and then register that the battery has been cleaned. In other cases, once the battery is replaced, the processor may query the custodian via display 132 or a display on the battery if the battery has been cleaned and may register a response and release the battery for use once an affirmative signal is received. Again, some "clean battery" indicator may then be illuminated on the battery (e.g., a green LED may be lit). Until a battery is cleaned a "used" or similar indicator (e.g., a red LED may be lit) may be illuminated on the battery to indicate a non-clean condition. Video of battery cleaning activities may be stored in a system database to memorialize battery cleaning activities.

In some cases workstations may also have to be manually cleaned after each use per employer policy or employee preference. Again, it is contemplated that a custodian may be required to confirm a cleaning process for each workstation upon completion causing a system processor to update the status of the workstation in a database and to provide some signal at the station indicating clean state. For instance, in some cases while a workstation is being used by an employee (e.g., the employee is present or somehow is persistently associated with the station), a "clean state" indicator may indicate an in use condition (e.g., a yellow lit LED). Here, once the employee is no longer associated with the station (e.g., leaves or otherwise is disassociated), the clean state indicator may be controlled to indicate a "used" or "needs cleaning" state (e.g., a ref lit LED). Once the station is cleaned, the clean state indicator may be controlled to indicate a "Clean" state (e.g., a green lit LED). This way any employee looking for a station to use will be able to quickly discern which stations are available for use and clean and which are not.

In some cases where workstations are reservable, it is contemplated that two different types of LED indicators may be located at a station, a first indicator indicating clean state, a second indicator indicating an availability status indicator. For instance the clean state indicator may be a 3 state indicator that operates as described above while the availability indicator is 2 state, one color or indication indicating available and a second color or indication indicating either station use or imminent use (e.g., within the next 30 minutes).

In some cases where batteries are delivered to stations for use, it is contemplated that three different types of LED indicators may be located at a station, a first clean state indicator, a second availability status indicator and a third battery or power charge or availability indicator where a green lit LED may indicate a battery with a charge above a threshold level (e.g., at least 80% of full charge). In this case, an employee should be able to quickly discern from the three LEDs at each station which station is clean, available for use and has sufficient battery charge to support at least a few hours of work activities. Referring to FIG. 3, a 3 LED indicator is shown including "clean state" indicator 21, an "availability status" indicator 23 and a battery charge indicator 25. While 3 separate indicators are shown, in other cases a single indicator device may include three separate indicating fields for providing 3 separate indications as described here. In still other cases a single indicator may be provided instead of the 3 indicator assembly where the single indicator indicates either a first state where a workstation is available, clean and has a battery charge that is above the threshold level or a second state where any of those three conditions is missing (e.g., station may be clean and have above threshold charge but may not be available as it is scheduled for imminent use).

As in the case of batteries at a charging station where camera and other sensor data at the station can be used to discern battery clean states, it is contemplated that a system processor may be programmed to collect video images and other sensed data at a workstation that is used to ascertain when the workstation is clean (e.g., has been cleaned). Thus, for instance, a sensor may detect when a janitor or cleaning custodian is at a workstation and if activities sensed are consistent with workstation cleaning. Where activities are consistent with cleaning, the system may automatically change the clean state of the station to clean and then indicate the clean state as shown at 21 in FIG. 3. In an alternative case, once detected activities are consistent with station cleaning, the processor may query the custodian above whether or not the station has just been cleaned and may store affirmative responses and update the clean state indicator as appropriate.

In cases where a custodian has to clean a station or one or more batteries on a cart, it is contemplated that a system processor will track batteries and other affordances that need cleaning and will provide request messages to the custodian whenever a battery or affordance needs to be cleaned. The processor may automatically triage the battery and affordance cleaning tasks and instruct the custodian on which resources to clean first. Thus for example, if space schedules indicate that there will be a large influx of employees into a specific portion of a facility in the afternoon, the system may automatically generate a request to one or more custodians to travel to that area in the facility and clean all currently charging batteries so that they can be used. Here, many factors may be taken into account when determining which batteries should be cleaned in which order. For instance, number of available clean batteries in a specific facility area may be a factor. Other factors include but are not limited to number of employees scheduled to use different facility spaces, current charge states of batteries at charging stations at different locations within a facility (e.g., no need to clean a completely discharged battery immediately as it will not be ready for reuse for some time while it is charging), current charge of batteries in different areas of a facility that are currently being used (e.g., if all batteries in a current area are almost fully charged there may be no immediate need to clean batteries at charging stations in that area, etc.

Figure 47:
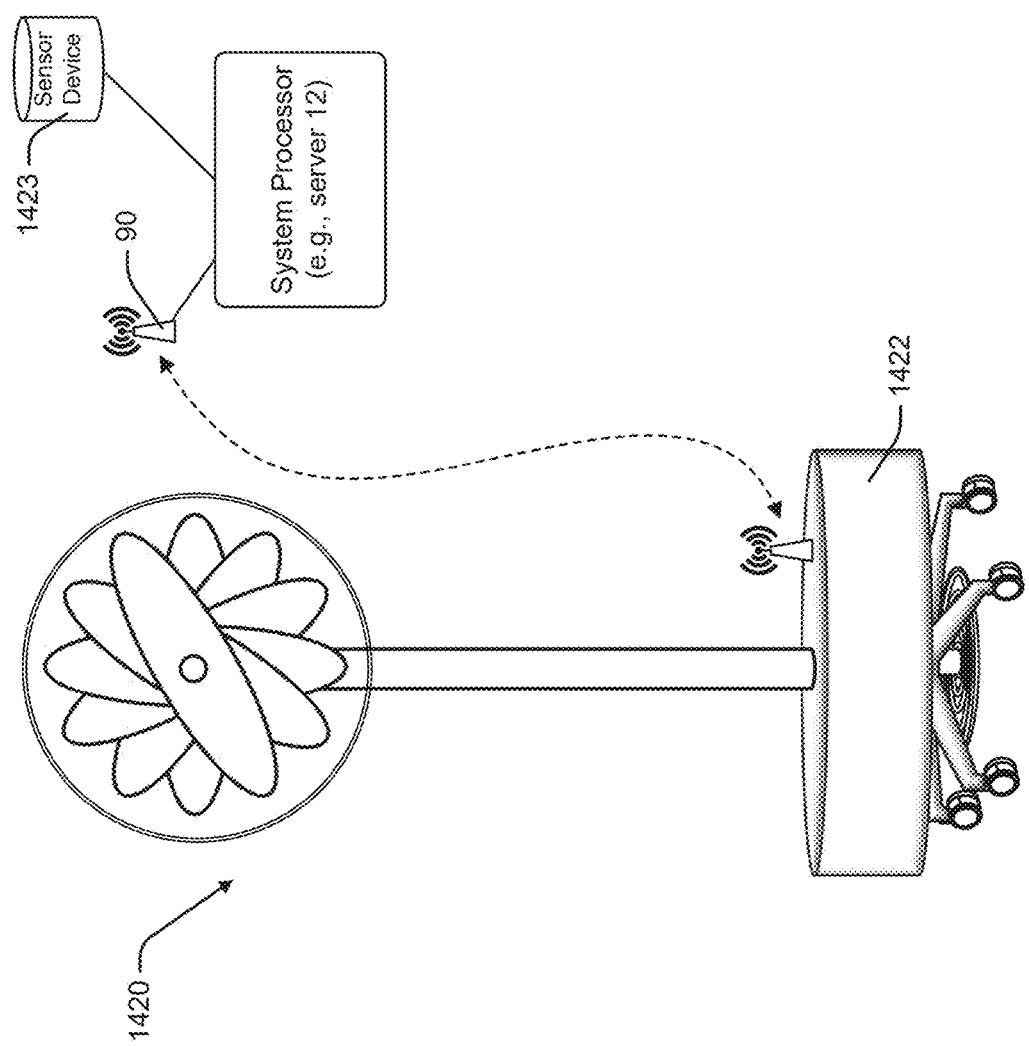
FIG. 47 is a view of a fan type robotic battery assembly that is consistent with at least some aspects of the present disclosure.
Figure 54:
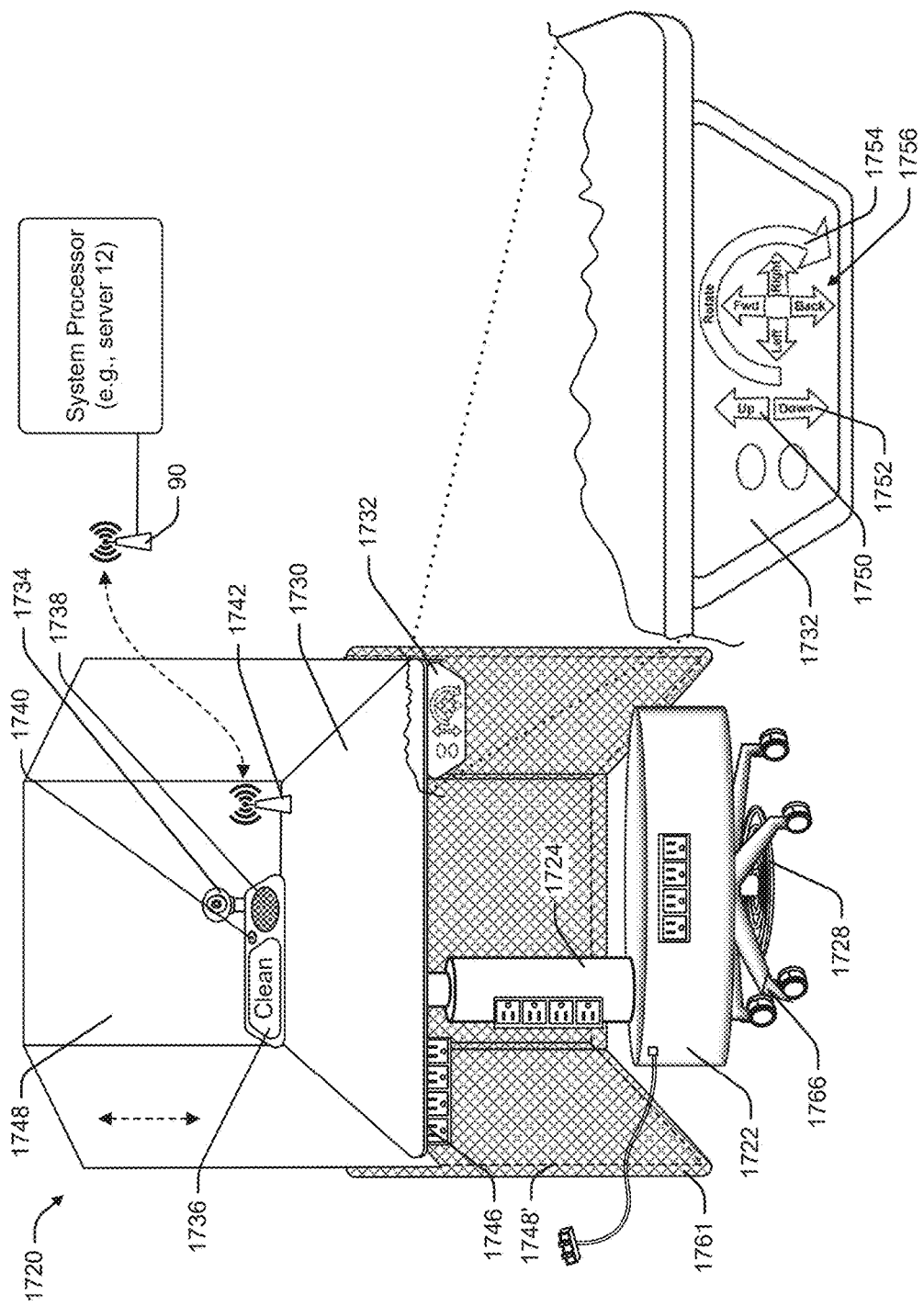
FIG. 54 is a view of a personal meeting table assembly that is consistent with at least some aspects of the present disclosure.

Referring now to FIG. 54, an exemplary automated mobile meeting assembly 1720 is illustrated that is similar to the automated mobile assemblies in FIGS. 47 and 48, albeit including a single employee conferencing assembly designed to support one employee during a meeting or for personal work. To this end, it is contemplated that even when a group of employees meet within a shared space to participate in a meeting, the participants may have different preferences related to social distancing or an employer may have changing policies or requirements related to social distancing. For example, some employees may be comfortable being right next to each other during a meeting with little space separating adjacent employees while others prefer to be in the same space but separated by 8-10 feet. As another example, at one time an employer's policies regarding social distancing may allow employees to work near each other (e.g., within 6 feet), at other times the policies may be more restrictive and require at least 10 feet separation between adjacent employees. These policies and preferences may change routinely given general population health, employee age, personal employee health conditions, etc.

Referring again to FIG. 54, automated mobile assembly 1720 includes a bottom housing 1722 that forms a cavity (not illustrated) for housing large battery cells and other assembly electronics akin to those described above with respect to FIG. 6. Here, in addition, the assembly 1720 may include one or more motors 1760 (see FIG. 6) for driving casters or wheels to move the assembly 1720 about within a facility or at least within a conferencing space. Here, where the assembly 1720 is only to be used within a specific facility space (e.g., a specific conference room), the motors may only need to be able to move the assembly 1720 short distances to bring assemblies together or space them apart within the conference space. In these cases there may be a charging station (e.g., coils within a floor surface that interact with coil 1728 at the bottom of housing 1722) or wired receptacles within the conference space that can be engaged at night or when an assembly 1720 is not being used for recharging purposes. In other cases where assembly 1720 has to travel further distance to reach a charging station or location, the motors may need to be more powerful. In these cases, again, it is contemplated that a system processor would move the assembly 1720 to a remote charging station when battery charge is depleted below some threshold level and, preferably, when the assembly 1720 is not required.

In cases where an assembly 1720 is required and battery charge is low, another assembly 1720 may be delivered to a space to be swapped for the assembly with the depleted battery so an employee can be persistently supported. In some cases a system processor will be programmed to recognize optimal times when assemblies 1720 should be swapped. Thus, for instance, if a meeting break is scheduled for 9:45 AM and an assembly 1720 needs to be swapped, the system may deliver a swappable assembly 1720 with full charge just prior to 9:45 AM.

Figure 55:
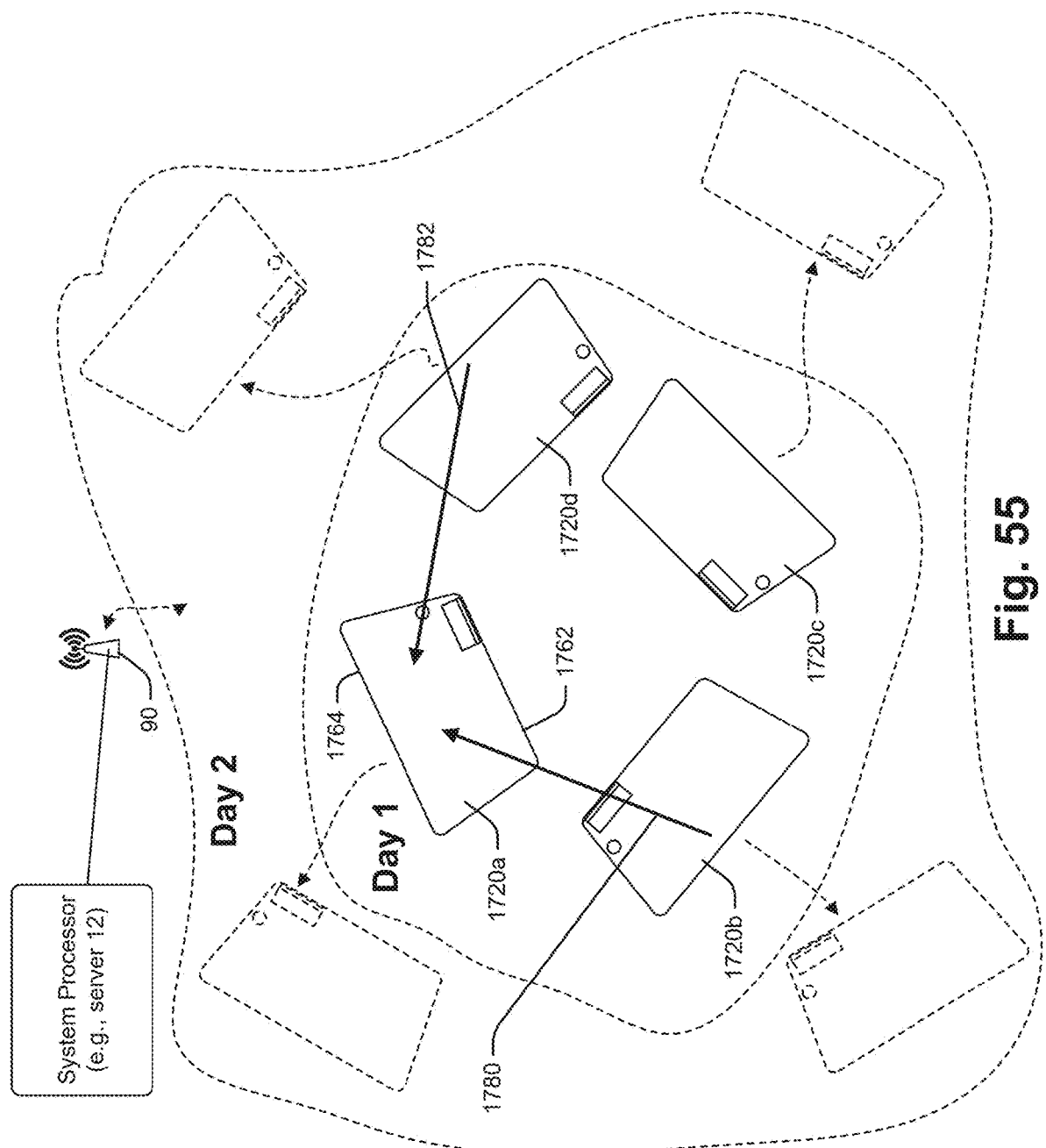
FIG. 55 is a top plan view of several of the table assemblies of FIG. 54 arranged within facility space in a first arrangement and shown in phantom in a second spaced apart arrangement.

Referring again to FIG. 54, assembly 1720 also includes a height adjustable telescoping leg 1724 that extends upward from housing 1722, a tabletop 1730 mounted at an upper end of the leg 1724, a camera 1734, a speaker 1738, a microphone 1740, a wireless transceiver 1742, receptacles 1746, a user interface 1732, and a clean state indicator 1736. Referring also to FIG. 55, in the illustrated embodiment the tabletop 1730 is trapezoidal shaped including a front edge 1762 that is shorter than a rear edge 1764 and lateral edges that extend from the front to the rear edge. Here, an assembly processor (see again 230 in FIG. 6) would be operably linked to the other assembly components and operate in ways similar to those described above. The interface 1732 includes input buttons or devices enabling an assembly user to control movement of assembly 1720 as well as height of the worktop 1730 via motor assisted control. To this end, interface 1732 includes up and down buttons 1750 and 1752 for moving the top 1730 up and down, respectively, as well as a rotation button 1754 and a set of forward, backward, left and right buttons 1756 for rotating assembly 1720 and moving assembly 1720 forward, backward, left and right, respectively. For instance, if an employee using assembly 1720 wants to move assembly 1720 backward (e.g., toward the employee) and away from other assemblies 1720 in front of the employee to increase distance from other assemblies, the employee can simply select the "Back" button on interface 1732.

Referring still to FIG. 54, exemplary assembly 1720 also includes a height adjustable/moveable clear plastic shield 1748 which may be linked to a motor for movement between a stored position (see 1748' in phantom) with an upper edge adjacent or below the edge of tabletop 1730 and a use position 1 as shown at 1748 where the shield essentially operates as a blocking along the lateral and front edge of the tabletop 1730. While a motor is not shown for shield 1748, it is contemplated that a motor would be integrated into the assembly. In other cases shield 1748 may be mounted to sliding mechanisms for manual movement between the stored and use positions by an employee. Here, in at least some cases the slides may be spring loaded and biased toward the use position to aid an employee in raising and lowering the shield per preference. In at least some cases it is contemplated that a system processor may lower the shield 1748 automatically to the stored position when automatically moving the assembly 1720 for any purpose (e.g., recharging) to increase stability as well as to reduce the overall space occupied by the assembly 1720 so that the assembly is more compact and easier to move around without restrictions. In some cases assembly 1720 may include a modesty panel (see 1761 in FIG. 54) and shield 1748 may slide into a stored position adjacent surfaces of that panel. In some cases the shield 1748 may include a single planar member and extend vertically adjacent the front edge of tabletop 1730 and in other cases it may include lateral planar members as well that extend vertically adjacent lateral edges of the tabletop. In some cases the modesty panel 1761 may also be moveable upward and downward between a use position generally above the top surface of the tabletop 1730 and a stored position generally there below. In still other cases it is contemplated that shield 1748 may be glass or some other clear material.

In some cases it is contemplated that the shield may be polarized and controllable so that transparency of the shield can be controlled and adjusted between a clear state and an opaque state per user preference given how the assembly is currently being used. Thus, in this case, the shield 1748 may be down and in a stored position and in that case may be either clear or opaque or may be in the upper use position and in that case may be clear or opaque.

In still other cases it is contemplated that shield 1748 or at least a portion of shield 1748 may comprise a clear emissive surface that can operate as a flat panel display screen for examining visual representations of electronic records or application program output at times, to operate as a transparent window at other times, to operate as an opaque privacy panel at other times, and to operate as both a privacy panel and a display screen at other times. In this case, the shield 1748 may be stored and either transparent or opaque in the stored position, may be partially up (e.g., ¼th or ½ up) to provide a partial display screen for content viewing, fully up and clear to enable protected in person meetings with or within content viewable on inside surfaces of the shield, fully up and opaque for private personal work activities with content viewable on inside surfaces of the shield, or fully up and opaque with no content on the inside surface of the shield.

In at least some cases when assemblies 1720 are used for an in-person meeting, voice signals from all employees in the meeting may be captured by the assembly microphones 1740, transmitted to the other assemblies 1720 in the meeting and broadcast via the speakers 1738 that are included in assemblies 1720 so that all employees in the meeting have the ability to hear other attendees well. Voice broadcast is particularly important where one or more employees in a meeting are substantially spaced apart from each other due to distancing rules or preferences. In addition, voice broadcast can be more important in cases where one or more employees in a meeting have their shields 1748 in the upper use position as shown in FIG. 54.

While only one speaker 1738 is shown in FIG. 54, in other cases it is contemplated that a set of speakers may be provided as part of each assembly 1720 so that when voices of employees at a meeting are broadcast to an assembly user, the voices can be broadcast directionally at the assembly. Thus, for instance, in FIG. 55, if an employee at assembly 1720b speaks, at assembly 1720a that employee's voice signal would be broadcast so that the employee at assembly 1720a has the sense that it is emanating from the direction indicated by arrow 1780. Similarly, if an employee at assembly 1720c speaks, at assembly 1720a that employee's voice signal would be broadcast so that the employee at assembly 1720a has the sense that it is emanating from the direction indicated by arrow 1782.

In cases where an employee has a shield 1748 up, in at least some embodiments where assembly cameras 1734 are used to capture video of employees at a meeting, head-on video representations of each employee at a meeting may be presented on an internal surface of the shield so that the employee with the shield up has the option to view other employees from head on as opposed to in-person through the shield.

The speaker, microphone, transceiver, camera and receptacles included in assembly 1720 operate in a manner similar to that described above. In addition, the "clean state" indicator 1736 operates in a manner similar to that described above. Here, indicator 1736 includes a small flat panel colored display screen that can be controlled to indicate clean state in several ways. For instance, indicator 1736 may be illuminated bright green to indicate that assembly 1720 has been disinfected/cleaned and not used since that time so that the assembly 1720 is ready for use. Once an employee starts to use assembly 1720 and is persistently associated with that assembly, indicator 1736 may illuminated yellow and once the employee is no longer associated with assembly 1720, indicator 1736 may be colored red until it is again disinfected/cleaned. As another instance, a short text message may be presented via indicator 1736 indicating the clean state (e.g., "Clean", "Occupied", "Used").

In at least some cases it is contemplated that a system processor may be programmed do several things in an attempt to enforce social distancing within conference spaces or all facility spaces generally. For instance, where a conference space is designed to accommodate 20 assemblies 1720 under "normal" social distancing conditions where there is no restriction on how close employees can be to each other, when normal conditions occur, the system processor may be programmed to move up to 20 assemblies 1720 into the conferencing space if 20 employees are scheduled to attend a meeting. Here, at times when conditions are not normal and more restrictive social distancing rules are enforced, the processor may be programmed to move a smaller number (e.g., 5) of assemblies 1720 into the conference space thereby discouraging more employees from entering that space to hold meetings. The processor may also be programmed to automatically control the position (e.g., stored or in use) of shield 1748 based on currently enforced social distancing rules (e.g., up and in use when rules are restrictive and down in the stored position when rules are not restrictive). In this case, when more employees than the number of assemblies 1720 in a space need to attend a meeting, the processor may automatically require a subset of the employees to patch in remotely via a conferencing software program, may be programmed to automatically reserve one or more other conference spaces for use by the subset of additional employees, etc., and may provide notifications to employees regarding how to participate in the meeting.

As another example, prior to a meeting commencing in a conference space, currently enforced social distancing rules may cause the system processor to change relative positions of assemblies 1720 within a conference space. To this end see for instance FIG. 55 where four assemblies 1720a through 1720d are illustrated in solid line on day 1 and in phantom on day 2. Here, it is contemplated that on day 1 relatively less restrictive social distancing rules are enforced and on day 2 more restrictive rules are enforced. In this case, when four employees arrive at a conference space, depending on which rules are applied, the assembly spacing and juxtapositions may automatically be different (e.g., rearrangement may occur when the processor recognizes that no one is located within the space).

In at least some cases at times when there are no social distancing restrictions enforced, employees using assemblies 1720a through 1720b may be able to move up to a maximum number of assemblies 1720 into a conference space where the maximum number is the number that the space was designed for and they may be able to arrange the assemblies 1720 however they see fit (e.g., as close together as they way). In other cases, while allowing a maximum number of assemblies 1720 to be moved into a space, the system processor may restrict relative locations of the assemblies in some fashion. For instance, a minimum social distancing rule (e.g., at least one foot apart) may be enforced even under "normal" conditions).

In some cases while locations of assemblies 1720 in a space may be limited, an employee occupying an assembly 1720 may be unrestricted when it comes to rotating the assembly 1720 to face in different directions.

To restrict assembly 1720 movement within a space, a system processor may simply disable the assembly movement motors 1760 (see again FIG. 6) or the interface 1732 (see again FIG. 54). In other cases, referring again to FIG. 54, assembly 1720 may include a locking mechanism 1766 controllable by a system processor to lock one or more of the wheels or casters that support the assembly 1720. In other cases, instead of restricting assembly 1720 movement, the processor may be programmed to provide warnings or alerts to an employee that attempts to move an assembly 1720 to a location that is not consistent with current distancing or other rules. Here, the alert may include an indication via an assembly 1720 indicator, an e-mail, text or other message transmitted to an employee's personal computing device, etc. In still other cases alerts related to violations of current distancing rules may be transmitted to other employees proximate a violating employee within a space that could be affected by the violation or to an administrative employee charged with enforcing distancing rules. The other employees may then take steps to enforce the current rules in some fashion.

In cases where a system processor knows which employee is associated with which of the assemblies 1720, the processor may implement personal distancing preferences of employees to restrict how close other assemblies 1720 can be to assemblies occupied by those specific employees. For instance, if a first employee occupying assembly 1720a in FIG. 55 always prefers to be at least 10 feet from any other employees, a system processor may automatically enforce a rule whereby no other assembly 1720 or other moveable employee affordance arrangement can be moved to a location within 10 feet of assembly 1720a and so that assembly 1720a cannot be moved to a location within 10 feet of any other assembly, unless the first employee indicates via an interface that the personal rule should be temporarily waived. Here, again, a system processor may enforce the rule by disabling movement motors, locking movement wheels or casters, disabling a movement control interface, or may provide alerts when the personal preference is violated.

In cases where personal distancing preferences are more restrictive than employer rules, personal preferences would prevail. Thus, for instance, in a case where an employer's current distance rules require at least 6 feet between employees but allow for shields 1748 (see FIG. 54) to be down but a first employee prefers at least a 10 foot distance from other employees and for a personal shield 1748 to be up in a use position when in a conference setting, the system processor may be programmed to enforce the first employee's preference for at least the first employee but the employer's current rule for all other employees. For example, again referring to FIG. 55, if the first employee is using assembly 1720a and second through third employees are using assemblies 1720b, 1720c n 1720d, respectively, the system processor may automatically configure the assemblies 1720a through 1720d so that assembly 1720a is located at the day 2 location shown spaced from the other assemblies while assemblies 1720b through 1720d are located in a closer cluster as shown in the day 1 locations.

In some cases a system processor will have access to meeting/space scheduling data and personal distancing preferences and may automatically configure assemblies 1720 within spaces to meet current employer distancing rules as well as specific employee personal preferences and may assign specific assemblies 1720 to specific employees within conference spaces. For instance, assume the first employee in the example above that always prefers at least 10 feet between herself and other employees and that prefers her assembly shield 1748 up in the use position when in in-person meetings is to attend a meeting with second through fourth employees that have no personal distancing preferences. Here, referring again to FIG. 55, the system processor may assign assembly 1720a to the first employee and assemblies 1720b through 1720d to the second through fourth assemblies, respectively, just prior to the meeting (e.g., 30 minutes prior to the scheduled start time), the processor may move assemblies to locations consistent with the employer rules and the first employee's preferences so that assembly 1720a is in the same space as assemblies 1720b through 1720d but is spaced therefrom by at least 10 feet and may automatically raise the shield 1748 associated with assembly 1720a and may provide some indication at assembly 1720a that indicates that that assembly is reserved for the first employee. For instance, the reserved indication may present the first employee's name in text via the clean state indicator 1736 shown in FIG. 54 or via test presented on the inside surface of shield 1748 in cases where content can be presented on that surface. In some cases the names of the second through fourth employees may be provided at the other assemblies in this example to make clear that the first employee should not choose one of those assemblies when entering the space.

In cases where a processor recognizes that a number of employees in a conference space is equal to a maximum number that is consistent with current employer rules, in at least some cases it is contemplated that the processor will indicate that circumstance on a display screen or in some other fashion (e.g., an LED or other light device) outside the conference space near an egress to dissuade other employees from entering the space. In other cases it is contemplated that when a number of employees scheduled to attend an in-person meeting in a conference space exceeds a maximum number allowed per current employer rules, a message may be transmitted to each or at least a subset of the employees scheduled to attend the meeting warning of that circumstance so that other plans can be made.

In some cases it is contemplated that when a meeting is set up, an employer's distancing rules may allow all attendees to attend in person in a first conference space but that subsequent changes to distancing rules render it impossible for all original attendees to attend in the first conference space. Here, in at least some cases it is contemplated that a system server may search space scheduling data to identify a larger space that can accommodate all of the original attendees and still meet the new distancing rule requirements. In this case, in addition to sending messages to all attendees rescheduling for the new space, the server may control assemblies 1720 to move the right number into the new space and arrange those assemblies in locations that are consistent with the new distancing rule automatically.

While automated movement of an affordance arrangement for supporting an employee has been described above primarily in the context of assembly 1720 shown in FIG. 54, it should be appreciated that similar concepts and features may be included in any of the affordance arrangements described above with reference to any of FIG. 3 (workstation), 28 (task chair), 33 (lounge assembly), 34 (telepresence arrangement), or 49 (small group conference arrangement), where those arrangements are on motor powered casters or wheels that can be controlled via a system processor. Thus, for example, in at least some cases it is contemplated that if an employer's social distancing rules are non-restrictive one day and are changed the next day either via a manual setting change by an administrative employee or automatically based on information about general population health conditions gleaned from a third party dataset (e.g., a governmental agencies restrictions on health safety), a system processor may automatically control automated moveable resources like assembly 1720 and other affordance arrangements within facility space to spread out those affordances in ways consistent with the new rules. Here, as resources are spread out automatically, employees arriving the next day to use space would simply occupy affordance arrangements as they arrive in some cases. In other cases the processor may assign specific affordances to specific employees and provide directions to or otherwise instruct arriving employees on how to get to their assigned workstations, assemblies 1720 or other affordance arrangements.

In some cases a battery powered assembly 1720 may be delivered to an employee within a facility when needed. For instance, if a first employee is scheduled to participate in a meeting at 1 PM, a system processor may control assembly 1720 to deliver the assembly to the first employee's location at 12:50.

Referring yet again to FIG. 54, in at least some cases assemblies 1720 may not include movement motors and instead each assembly 1720 may have to be moved manually to different locations per user preferences and employer distancing rules for use. Here, a system processor may still be programmed to control assembly movability to at least some degree to enforce distancing rules and user preferences. For instance, where an employee In some cases a power custodian may be charged with swapping charged batteries in at workstations for discharged batteries. In other cases employees using workstations may be responsible for swapping charged batteries for depleted batteries. In either case, a system processor may provide warnings and notifications that facilitate swapping activity. For instance, in some cases, a processor may track scheduled locations of mobile battery carts 102 and charge states of batteries on each cart as well as charge states of batteries at workstations along scheduled paths associated with each mobile cart and may provide timely notifications to workstation users regarding when and where to most efficiently swap batteries. Here, for instance, if a first battery used at a first station is 30% charged and should be able to provide power at the first station for another hour, the processor may determine that in 25 minutes a mobile cart with a fully charged battery will be very close to the first station and therefore that a battery swap should occur at that time as opposed to prior. See FIG. 30 that shows a message window that indicates cart location and timing as well as an affirming virtual button or icon 752 the user can select to accept the offer. In this case, the cart may be controlled to reserve a charged battery for the first user. If the cart is delayed for some reason, the processor may automatically recognize a delay in battery delivery and provide a warning message to the first user. In a case where the cart will not be at the first station location within time for a swap, the processor may identify a different swapping alternative automatically and provide another warning to the first employee with instructions on where to retrieve a fully charged battery.

In cases where a power custodian swaps batteries, the processor may provide swapping guidance messages that optimally indicate battery swapping order so that the least charged batteries in a general area of a facility are swapped prior to batteries that have greater charge or, so that batteries that are most likely to become completely discharged given rates of use are swapped prior to other batteries least likely to become completely discharged. Thus, in at least some cases a first battery that has more charge than a second battery may be replaced prior to the second battery based on discharge rates of the first and second batteries.

In still other cases a processor may be programmed to recognize when a cart with charged batteries is within a general location of any depleted batteries at workstations and may automatically provide timely warnings to station users indicating available proximate charged batteries and suggesting a swap. Thus, for instance, a station user may receive a message indicating battery availability as well as some indication of charge time left on her current battery (e.g., 17 minutes left) and the user may decide if they need more or less charge at that time.

In the case of automated mobile charging stations 103, the system would operate in a manner similar to that described above with respect to the manual mobile charging stations where the cart would move about within a facility and periodically stop for a few minutes so that employees could swap depleted batteries out and fully charged batteries into their stations.

In at least some cases it is contemplated that a processor may alter automated mobile charging station paths based on various factors including number of batteries being charged on the station, charge states of the batteries, employee requests for charged batteries in different facility locations, and perceived battery requirements discerned from other information. For instance, on a first day it may be that only 5 people are scheduled to use hoteling space within a large area within a facility whereas on a second day 200 people are scheduled to hotel within that same space. Here, a system processor may be programmed to automatically deliver a small number of batteries to the large area the first day but a much larger number the second day. Where the large area has a single egress, the processor may be programmed to park 10 mobile charging stations at the egress in the morning for employees to easily access upon entering the area but throughout the day, the processor may move stations about to different locations in the large area based at least in part on the pattern of user locations throughout the area during the day.

Figure 50:
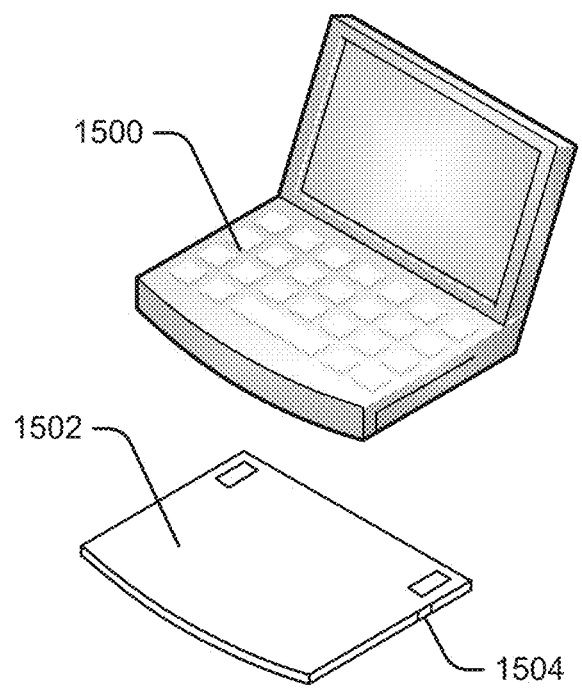
FIG. 50 is a view of a laptop and a laptop shaped battery that may be secured to the laptop.
Figure 51:
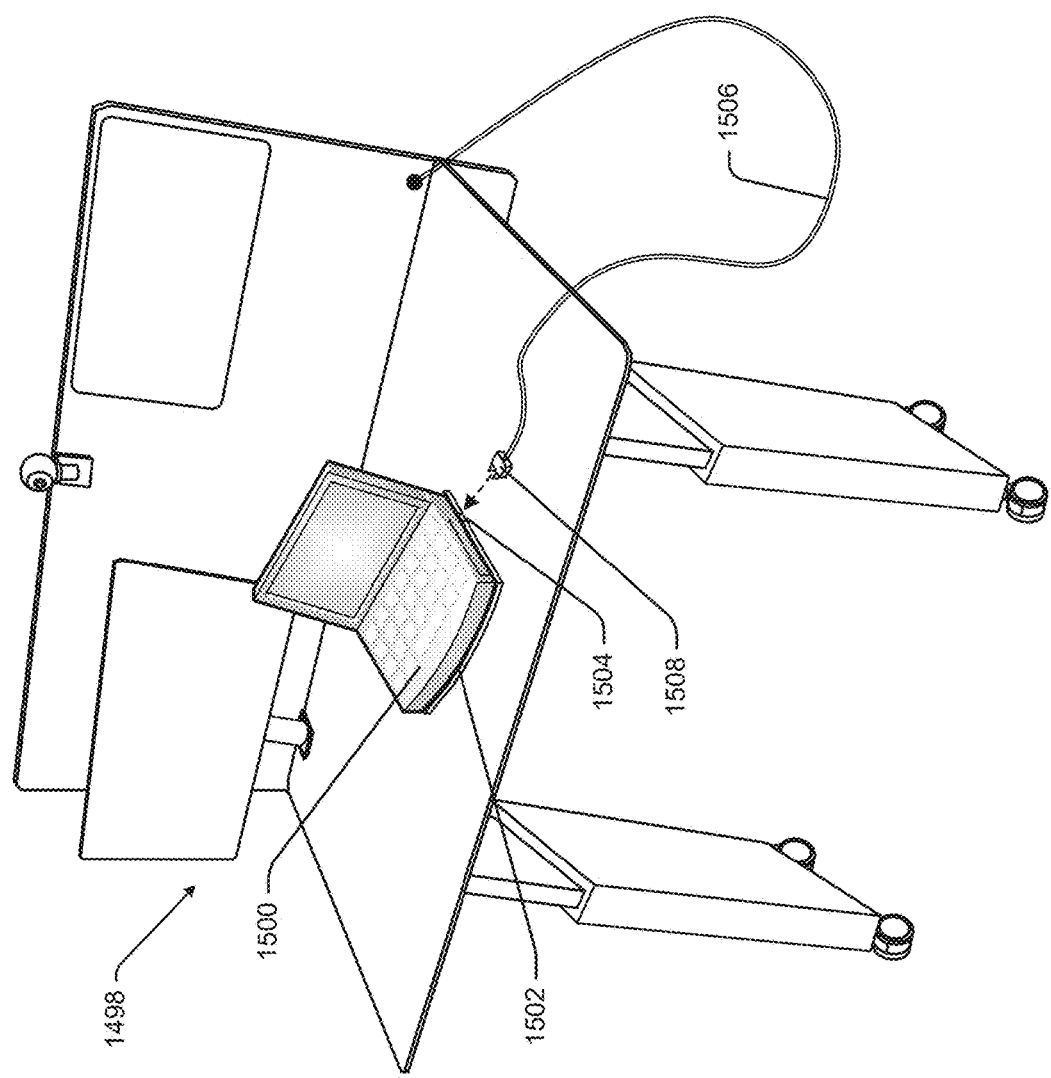
FIG. 51 is a view of a workstation with the laptop and battery assembly of FIG. 50 shown along with a connector cable at the workstation for connecting the battery to a workstation power distribution system.

As battery technology evolves, the ability to store more power in smaller battery footprints is increasing every day. Currently it is possible to provide relatively small batteries that can provide charge to at least some workstations for a meaningful amount of time (e.g., more than an hour) given typical or average discharge rate at a workstation. Currently many workstation users travel with portable computing devices including, for instance, laptops. In at least some cases it is contemplated that thin laptop shaped batteries may be provided that can be coupled to employee laptops for ease of carrying and use at remote workstations to power station devices. To this end, see for instance FIG. 50 where a laptop shaped rechargeable battery is shown at 1502 which may be coupled to an undersurface of a laptop 1500 via mechanical couplers (not illustrated) so that the battery and laptop can be transported together to a workstation for use. Here, battery 1502 may be coupled to the laptop to provide power directly thereto. In addition, battery 1502 is shown to include a power discharge port 1504. Referring also to FIG. 51, laptop 1500 is shown connected to the battery 1502 and located at a workstation 1498. The station 1498 includes a power connection cable 1506 including a plug member 1508 at a distal end that can be inserted into port 1504 to connect the battery 1502 to the power distribution system in the workstation 1498. Here, portable battery 1502 provides power to station devices as needed.

In still other cases it is contemplated that a laptop 1500 (see again FIG. 51) may be equipped with an integrated high power battery that is capable of powering the laptop alone for a long period of time such as, for instance, 20 hours. In some cases it is contemplated that the arrangement in FIG. 51 may not include a separate battery 1502 and instead, power cable 1506 may link directly to a power output port on laptop 1500 so that the laptop battery itself is used to provide power to workstation devices. In this case, because the workstation devices in conjunction with the laptop would draw more power from the laptop battery than the laptop alone, the duration of power at the station 1498 would be less but, nevertheless, still appreciable. In this case the laptop processor may monitor battery discharge and provide alerts and other power management information in a manner similar to that described above. In some cases instead of powering a workstation using a high powered laptop battery, the workstation may be powered by a different portable device battery such as a tablet battery, a smartphone battery, etc.

In at least some embodiments it is contemplated that a system processor may operate to lock or disable any battery that is not located within an area that is associated with an employer's facility space. Thus, for instance, if an employee inadvertently removes a system battery from a facility, the processor may transmit a command to the battery to disable the battery so that it cannot be used. When a battery is no longer located within a facility space, a system processor may generate and transmit an alert to the employee most recently associated with the battery indicating that the battery was removed from the facility and requesting that the battery be returned. In at least some cases after a battery has been disabled because it was removed from a facility space, once the battery is back within the space, the battery may again be disabled.

In at least some cases it is contemplated that a system processor may automatically control workstation or other affordance arrangement devices to minimize battery discharge whenever possible. For instance, referring again to FIG. 3, in at least some cases a workstation 20 will include an employee presence sensor 690 for detecting employee presence at station 20. Where an employee temporarily leaves station 20 (e.g., to obtain a refreshment, use a rest room, visit a colleague, etc.), a system processor may recognize that the station is vacant and may automatically place at least a subset of the power consuming devices in a low power mode. Here, "low power" may mean that a device is completely turned off (e.g., a light, a white noise generator, a fan, a heater, a massage element in a chair, etc.). In other cases low power may mean that a device is simply set to operate in a manner that requires less power. For instance, a display screen may be controlled to present a low power screen saver image while a station is vacant. One advantage here is that a single processor can control power use by many different station devices in a coordinated fashion.

In at least some cases a system processor will enforce a device power hierarchy where different station devices are placed in low power mode at different times as charge depletion increases. Thus, for instance, where workstation devices include a laptop, a large display screen, a light device, a fan, a height adjustable motor driven leg assembly, a chair heater and a chair vibration mechanism, as the battery reaches lower threshold levels of charge during use, the processor may control each of the devices to enter low power operating modes at different threshold levels. For example, in this case when a battery reaches a first discharge threshold, the processor may cut off power to the chair heater and vibration mechanism, when the battery reaches a second discharge threshold, the processor may cut off power to the height adjustable motor that drives the leg assembly to change worktop height, when a third discharge threshold occurs, the processor may cut off power to the fan and light devices, and when a fourth discharge threshold occurs, the processor may reduce brightness of the large display screen.

In at least some cases it is contemplated that when battery charge reaches a threshold depletion level, a system processor may be programmed to suggest ways in which an employee may alter workstation device use in order to conserve battery power and prolong the charge time prior to having to swap batteries. For instance, in the above example where workstation devices include a laptop, a large display screen, a light device, a fan, a height adjustable motor driven leg assembly, a chair heater and a chair vibration mechanism, once a threshold discharge level is reached, a processor may identify and present power saving options as a text or other message type along with input controls to select different options. See, in the regard the text message in the pop-up window 1550 shown in FIG. 52 that gives power saving options including (1) Turn off light, (2) Turn off seat heater, (3) Turn off fan and (4) Turn off height adjustment mechanism. In FIG. 52, the employee either selects one or more of the power saving options followed by the "Enter" icon causing the processor to reduce power accordingly or can select the "No Thanks" icon to forego any power consuming activity.

In at least some cases a system processor may be programmed to at least periodically provide some type of power use report to an employee which is meant to encourage efficient power use. For instance, at the end of each day or week, the processor may calculate a power use per hour average for an employee and present the resulting calculation for the employee to consider. In a more interesting case, the processor may calculate a power use per hour average for each employee that works at a facility and may provide a comparative value to a first employee that compares the first employee's power use numbers to the average for employees associated with the facility. In some cases a processor may provide historical power use data to an employee to show how the employee is progressing in terms of reduction of power use or in comparison to power use by other employees.

In some embodiments employees may be able to set low power control options. For instance, an employee may use an interface (see laptop 16 in FIG. 1) to specify an order in which workstation devices should be powered down or placed in reduced power operating modes. For example, a first employee may specify that station lights should be turned off first when a depletion threshold is met while a second employee may specify that all chair related power consuming devices by set in a low power mode first.

In some cases it is contemplated that a system processor may have access to other ambient information which is used to assess where automated mobile charging stations and other affordances are automatically moved at different times. For instance, a processor may have access to weather data and also to data indicating locations within a facility where substantial natural light enters windows that could be used to charge batteries on sunny days. In this case, referring again to FIG. 36, in a case where an automated mobile battery cart 103 is not currently needed to deliver batteries to employees, a system processor may control the cart to move the cart to a location where substantial sun is available for capture via solar cell 120. Here, sunny charging locations may change during the course of a day so that unneeded charging stations may be moved to different locations at different times as the amount of light entering different windows changes.

In at least some embodiments where specific employees are associated with specific batteries and one of the employees leaves a battery at a workstation prior to leaving a facility, a power custodian may return the battery to a charging station. Here, in at least some cases the returned battery would be associated with the employee during a battery check in process.

In at least some cases it is contemplated that where an employee uses a portable computing device, that device may run a power management application program to facilitate many of the processes and methods described in this disclosure. Here, for instance, a battery or workstation may include a processor that simply monitors battery charge state and transmits that information to the portable device processor. The portable device processor may then monitor the battery state and provide alerts or other messages, receive employee input and transmit control signals to the system server 12 shown in FIG. 1 to initiate battery delivery, cancel battery delivery, reserve a battery for pickup, etc.

In some embodiments described above it is contemplated that charging stations may including locking mechanisms for locking batteries to the stations where the locking mechanisms are controlled to release specific batteries under specific circumstances. For instance, a battery may not be released/unlocked for retrieval by an employee until the battery is fully charged or at least charged above some threshold charge level (e.g., 85% of maximum charge). As another instance, a charged battery at a charging station may be reserved for a specific employee and may not be released for use until that employee is identified at the charging station in some fashion. In some cases similar locking assemblies may be provided at workstations or other affordance arrangements so that batteries are only released once some triggering event occurs such as, for instance, a specific employee is recognized at the station when a release button on a battery device is selected.

In some cases a system processor may be programmed to release or lock all system batteries under certain circumstances. For instance, in some embodiments when a fire or other unsafe condition is detected within a facility building or facility generally via a fire detection system, a system processor may be programmed to unlock all system batteries and control each battery to provide an alarm signal, either audible or visual or both, to proximate employees encouraging the employees to remove the batteries from the facility to avoid exacerbating the unsafe conditions. In other cases the alarm signals may be generated by other affordances like an output device integrated into a workstation or other affordance arrangement, via personal portable computing devices carried by employees within a facility, etc. In this regard, see again FIG. 1 where server 12 has access to third party data sets. Here, one third party dataset may be emergency related and track fire alarms and other environmental conditions so that batteries can be unlocked and warnings to remove batteries can be generated when needed.

In other cases, a processor may be programmed to lock batteries at charging stations, workstations, or other affordance arrangements when emergency conditions occur. For example, in the case of a fire alarm, a system processor may automatically lock batteries in current places and control the batteries to place each battery is a "safe" operating mode automatically.

In an alternative system, the processor may be programmed to automatically control workstation or other affordances to power down in a controlled fashion when an emergency occurs. For instance, again, in the case of a fire alarm, a processor may control all application programs currently running on a computer device linked to a battery to store current records prior to powering down and then power down the computer device. In cases where workstations include backup batteries, the system may present messages to employees regarding portable batteries encouraging removal immediately upon occurrence of an emergency and in these cases when a portable battery is removed, the backup battery may automatically provide power to workstation affordances while the workstation is automatically powered down in a controlled fashion so that no employee work product is lost.

In cases where charging stations or other battery powered affordances are equipped for automated movement within facilities, it is contemplated that those affordances may be automatically moved out of facility areas/spaces where dangerous conditions are detected. For instance, assume a fire is detected in building 2 (see 11b) in FIG. 1, in that case server 12 may control all autonomous mobile charging carts to lock all batteries on the carts and to move all of those carts out of building 2 and to safe locations away from the detected unsafe area. As another instance, there may be one or more designated safe zones or rooms within a facility that are specially designed to prohibit fires or other unsafe conditions via insulation or other means and a system processor may be programmed to move all automated mobile charging stations to those rooms to avoid hazardous conditions.

In at least some cases a system server may track employees in space during emergency situations and may always park moving charging stations in safe positions when one or more employees are present to ensure that no employee is hampered from leaving a facility when an emergency occurs. Here, once a facility area is clear of employees, the system may again resume moving charging stations to safe locations within a facility.

As another instance, in a case where a charging cart is outside on a facility campus when it starts to rain or when a forecast is for raining the near future (e.g., in next 10 minutes), a server 12 may control that cart to automatically move the cart to a safe location under cover in a building or the like. In short, here, the system processor is programmed to implement battery location rules and move in response to circumstances or environmental conditions that occur within different facility spaces.

Figure 56:
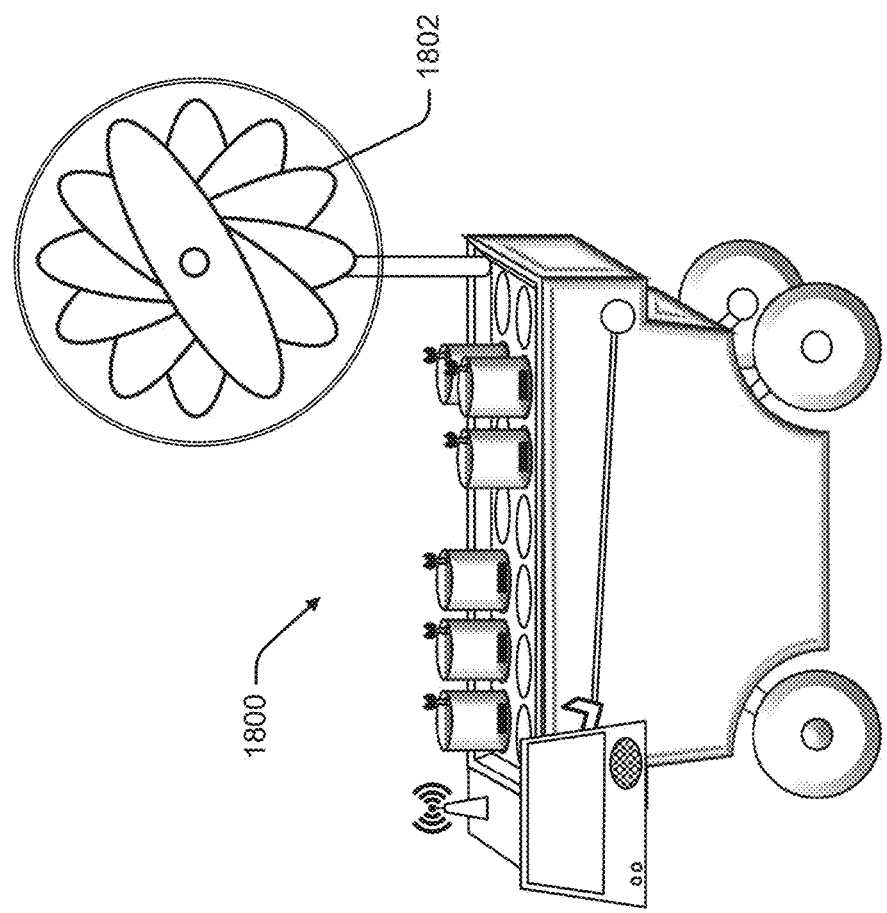
FIG. 56 is a view of a charging station that includes a windmill.

Referring again to FIG. 3, charging stations have already been described above that include solar cells for charging batteries that connected to the stations for receiving charge and where the stations may be automatically controlled to move or migrate toward facility areas where natural light is sufficient to charge station batteries. In other cases it is contemplated that charging stations may have other charging capabilities such as, for instance, a wind mill type device that includes blades connected to a central rotor where, as the rotor rotates, the movement is converted into electrical energy which can be stored in station batteries. Here, instead of moving a charging station with a solar cell to a sunny location, a system processor may move a charging station with a wind mill power source to a windy location. In this regard see exemplary wind charging station 1800 shown in FIG. 56 that includes, among other components similar to those described above, a wind mill 1802 including blades and a rotor. Here, the station 1800 itself can change radial orientation at wind direction changes so that mill rate is optimized at all times.

Figure 57:
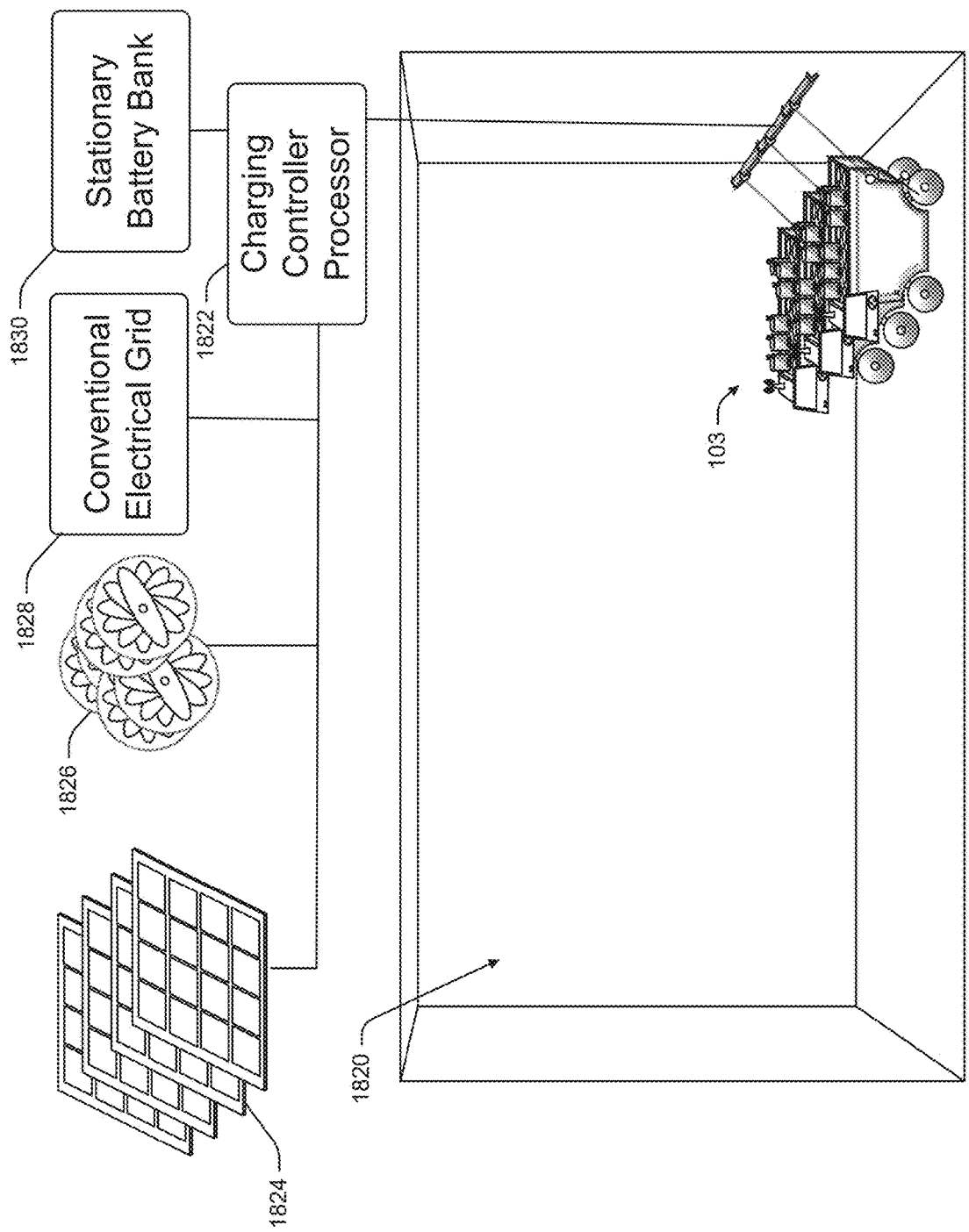
FIG. 57 is a schematic view of a power management system that is consistent with at least some aspects of the present disclosure.

The present disclosure contemplates larger battery power systems. To this end, see FIG. 57 that shows a battery charging room 1820 in which automated mobile charging stations 103 are shown connected to a charging bar as illustrated above. The FIG. 57 system also includes a charging control processor 1822, a bank of solar cells 1824, a bank of wind mills 1826, a connection to a conventional electrical grid 1828, and a bank of stationary batteries 1830. Processor 1822 is linked to each of the cell bank 1824, the mill bank 1826, and grid 1828 to receive power therefrom and is also linked to battery bank 1830 to provide charging power thereto and to receive power therefrom when necessary. Processor 1822 is also linked to the charging rail to provide charge to stations 103 and batteries that are electrically connected to those stations for battery charging purposes. Processor 1822 is programmed to triage the charging process and, to that end, runs one or more charging software applications that are designed to most efficiently and cost effectively provide power to charge system batteries so that sufficient battery power is available for system needs all the time. To this end, at times processor 1822 will link to one of or more of the renewable energy arrangements 1824 and/or 1826 when those resources can meet charge requirement needs. For instance, when charging requirements are low or when weather conditions can generate substantial charging power via arrangements 1824 and 1826, processor 1822 may decouple from grid 1828 to eliminate third party provider fees. However in cases where renewable energy is insufficient to meet current charging needs, processor 1822 may link to grid 1828 as well as the renewable arrangements to access additional power to meet demands. Any excess renewable energy is stored in battery bank 1830 which may also be tapped to meet power needs that the renewable resources cannot meet. Processor 1822 may also store grid power in the batteries during low cost power delivery periods when grid power use is typically at a minimum so that battery power can be used subsequently to reduce power consumptions costs.

While the invention may be susceptible to various modifications and alternative forms, specific embodiments have been shown by way of example in the drawings and have been described in detail herein. However, it should be understood that the invention is not intended to be limited to the particular forms disclosed.

Thus, the invention is to cover all modifications, equivalents, and alternatives falling within the spirit and scope of the invention as defined by the following appended claims.

To apprise the public of the scope of this invention, the following claims are made:

What is claimed is:

1. A power distribution system for use within a facility, the power distribution system comprising:

a plurality of battery charging stations located at different locations throughout the facility;

a plurality of portable rechargeable battery assemblies including at least some battery assemblies connected to at least a subset of the battery charging stations and including at least a first battery assembly that is not located at one of the charging stations;

a charge sensor subsystem for detecting current charge state of the at least a subset of the battery assemblies including a charge state of each battery that is recharging at the battery charging stations and other batteries distributed within the facility;

a location tracking subsystem for tracking current locations of batteries within the facility;

an interface device associated with the first battery assembly;

a processor receiving battery charge and battery location data from the sensor subsystem and the tracking subsystem and running a program to track charge and location of at least a subset of the plurality of battery assemblies within the facility including the first battery assembly, the processor identifying battery assemblies that are discharged to a charge level below a first threshold level, identifying battery assemblies at charge stations that are charged to a charge level above a second threshold level, and providing an alert message via the interface device indicating that at least one of the battery assemblies located at one of the charging stations is charged above the second threshold level when the first battery assembly is discharged below the first threshold level.

2. The power distribution system of claim 1 wherein the processor determines that a second battery assembly that is charged to a level above the second threshold level is located at a first charging station and wherein the alert message further indicates the location of the first charging station.

3. The power distribution system of claim 2 wherein the processor identifies that the location of the first charging station is closest of the at least a subset of charging stations to the location of the first battery assembly where a battery assembly resides that is charged above the second threshold level prior to indicating the location of the first charging station.

4. The power distribution system of claim 2 wherein the interface includes an input feature for receiving an indication that a user intends to swap the first battery assembly for the second battery assembly at the first charging station and wherein, upon selection of the input feature, the first station reserves the second battery assembly for swapping with the first battery assembly.

5. The power distribution system of claim 4 wherein the first charging station includes a locking mechanism for locking battery assemblies to the charging station, the first charging station maintaining the second battery assembly in a locked state until the first battery assembly is locked to the charging station.

6. The power distribution system of claim 5 wherein the first charging station recognizes the first battery assembly when the first battery assembly is locked to the first charging station and unlocks the second battery assembly once the first battery assembly has been recognized.

7. The power distribution system of claim 4 wherein each battery assembly can be disabled and enabled, the processor programmed to maintain the second battery assembly disabled until the first battery assembly is linked to the charging station during a swapping activity.

8. The power distribution system of claim 4 further including an indicator and wherein, upon linking the first battery assembly to the first charging station, the processor controls the indicator to indicate the second battery assembly that was reserved to be swapped with the first battery assembly.

9. The power distribution system of claim 8 wherein the first indicator is integrated into the second battery assembly.

10. The power distribution system of claim 9 wherein the first indicator includes a light device that is illuminated to indicate the reserved battery assembly.

11. The power distribution system of claim 8 wherein the first station includes battery charging locations for receiving battery assemblies during charging, the indicator including a separate indicator for each of the battery charging locations.

12. The power distribution system of claim 1 wherein the interface device is integrated into the first battery assembly.

13. The power distribution system of claim 12 wherein the alert message further indicates a location of one of the charging stations at which one of the charged battery assemblies is located.

14. The power distribution system of claim 1 wherein the first battery assembly is linked to a power using affordance and wherein the interface device is integrated into the power using affordance.

15. The power distribution system of claim 14 wherein the power using affordance includes one of a workstation and a chair assembly.

16. The power distribution system of claim 14 wherein the affordance includes a plurality of power using subassemblies, the system further comprising a processor that reduces power to a subset of the power using subassemblies automatically once the charge state of the first battery assembly drops below the first threshold.

17. The power distribution system of claim 1 wherein the second threshold is substantially fully charged.

18. The power distribution system of claim 1 wherein the first threshold level for the first battery assembly is dynamic and is a function of historical power use rate by a current user of the first battery assembly.

19. A power distribution system for use within a facility, the power distribution system comprising:
a plurality of battery charging stations located at different locations throughout the facility;
a plurality of portable rechargeable battery assemblies including at least some battery assemblies connected to at least a subset of the battery charging stations and including at least a first battery assembly that is not located at one of the charging stations;
a charge sensor subsystem for detecting current charge state of at least a subset of the battery assemblies including charge state of each battery that is recharging at the battery charging stations and other batteries distributed within the facility;
a location tracking subsystem for tracking current locations of batteries within the facility;
an interface device associated with the first battery assembly;
a processor receiving battery charge and battery location data from the sensor subsystem and the tracking subsystem and running a program to track charge and location of the battery assemblies within the facility, the processor using current power usage from the first battery assembly to estimate a time at which the first battery assembly charge will drop below a first threshold level and using current charging information from the charging stations to identify battery assemblies at the stations that should be charged above a second threshold level when the first battery assembly charge drops below the first threshold level, and providing a notification via the interface device indicating that at least one of the battery assemblies located at one of the charging stations should be charged above the second threshold level when the first battery assembly is estimated to be discharged below the first threshold level.

20. The power distribution system of claim 19 wherein the step of the processor identifying battery assemblies at the stations that should be charged above a second threshold level when the first battery assembly charge is expected to drop below the first threshold level includes identifying at least a second battery assembly located at a first charging station that is estimated to be charged above the second threshold level when it is estimated that the first battery assembly charge will drop below the first threshold level.

21. The power distribution system of claim 20 wherein the interface includes an input feature for receiving an indication that a user intends to swap the first battery assembly for the second battery assembly at the first charging station and wherein, upon selection of the input feature, the first station reserves the second battery assembly for swapping with the first battery assembly.

22. The power distribution system of claim 21 wherein the first charging station includes a locking mechanism for locking battery assemblies to the charging station, the first charging station maintaining the second battery assembly in a locked state until the first battery assembly is locked to the charging station.

23. The power distribution system of claim 22 wherein the first charging station recognizes the first battery assembly when the first battery assembly is locked to the first charging station and unlocks the second battery assembly once the first battery assembly has been recognized.

24. The power distribution system of claim 21 wherein each battery assembly can be disabled and enabled, the processor programmed to maintain the second battery assembly disabled until the first battery assembly is linked to the charging station during a swapping activity.

25. The power distribution system of claim 21 further including an indicator and wherein, upon linking the first battery assembly to the first charging station, the processor controls the indicator to indicate the second battery assembly that was reserved to be swapped with the first battery assembly.

26. The power distribution system of claim 25 wherein the first indicator is integrated into the second battery assembly.

27. The power distribution system of claim 26 wherein the first indicator includes a light device that is illuminated to indicate the reserved battery assembly.

28. The power distribution system of claim 25 wherein the first station includes battery charging locations for receiving battery assemblies during charging, the indicator including a separate indicator for each of the battery charging locations.

29. The power distribution system of claim 19 wherein the interface device is integrated into the first battery assembly.

30. The power distribution system of claim 19 wherein the notification further indicates a location of one of the charging stations at which at least one of the battery assemblies estimated to be charged above the second threshold level is located.

31. The power distribution system of claim 19 wherein the first battery assembly is linked to a power using affordance and wherein the interface device is integrated into the power using affordance.

32. The power distribution system of claim 31 wherein the power using affordance includes one of a workstation and a chair assembly.

33. The power distribution system of claim 31 wherein the affordance includes a plurality of power using subassemblies, the system further comprising a processor that reduces power to a subset of the power using subassemblies automatically once the charge state of the first battery assembly drops below the first threshold.

34. A power distribution system for use within a facility, the power distribution system comprising:
- a plurality of battery charging stations located at different locations throughout the facility;
- a plurality of portable rechargeable battery assemblies including at least some battery assemblies connected to at least a subset of the battery charging stations and including at least a first battery assembly that is not located at one of the charging stations;
- a charge sensor subsystem for detecting current charge state of at least a subset of the battery assemblies including charge state of each battery that is recharging at the battery charging stations and other batteries distributed within the facility;
- a location tracking subsystem for tracking current locations of batteries within the facility;
- an interface device associated with the first battery assembly and usable to reserve a charged battery at a battery charging station for swapping when the first battery assembly is discharged below a first threshold level;
- a processor receiving battery charge and battery location data from the sensor subsystem and the tracking subsystem and running a program to track charge and location of the battery assemblies within the facility, the processor using current power usage from the first battery assembly to estimate a time at which the first battery assembly charge will drop below a first threshold level and using current charging information from the charging stations to identify battery assemblies at the stations that should be charged above a second threshold level when the first battery assembly charge drops below the first threshold level, providing a notification via the interface device indicating that at least one of the battery assemblies located at one of the charging stations should be charged above the second threshold level when the first battery assembly is estimated to be discharged below the first threshold level, receiving an indication via the interface device to reserve the battery assembly that should be charged above the second threshold level for swapping with the first battery assembly once the first battery assembly is discharged below the first threshold level.

* * * * *